US011314330B2

(12) United States Patent
Moussette et al.

(10) Patent No.: US 11,314,330 B2
(45) Date of Patent: Apr. 26, 2022

(54) TACTILE FEEDBACK FOR LOCKED DEVICE USER INTERFACES

(71) Applicant: Apple Inc., Cupertino, CA (US)

(72) Inventors: Camille Moussette, Los Gatos, CA (US); Jean-Pierre M. Mouilleseaux, San Francisco, CA (US); Chanaka G. Karunamuni, San Jose, CA (US); Madeleine S. Cordier, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/972,040

(22) Filed: May 4, 2018

(65) Prior Publication Data

US 2018/0335848 A1 Nov. 22, 2018

Related U.S. Application Data

(60) Provisional application No. 62/507,138, filed on May 16, 2017.

(51) Int. Cl.
*G06F 3/01* (2006.01)
*G06F 3/0481* (2013.01)
(Continued)

(52) U.S. Cl.
CPC ............ *G06F 3/016* (2013.01); *G06F 3/0484* (2013.01); *G06F 3/0488* (2013.01);
(Continued)

(58) Field of Classification Search
None
See application file for complete search history.

(56) References Cited

U.S. PATENT DOCUMENTS 5,959,624 A 9/1999 Johnston, Jr. et al.
5,990,869 A 11/1999 Kubica et al.
(Continued)

FOREIGN PATENT DOCUMENTS

AU 2016100246 A4 4/2016
AU 2016100653 A4 6/2016
(Continued)

OTHER PUBLICATIONS

Office Action, dated Mar. 22, 2019, received in Australian Patent Application No. 2017251751, which corresponds with U.S. Appl. No. 15/270,885, 3 pages.
(Continued)

*Primary Examiner* — Christopher R Lamb
(74) *Attorney, Agent, or Firm* — Morgan, Lewis & Bockius LLP

(57) ABSTRACT

An electronic device detects, on a touch-sensitive surface, a user input directed to a user interface element associated with a respective operation, for example in a user interface for a locked mode of operation of the device. A first portion of the user input includes an increase in intensity of the contact followed by a second portion of the user input that includes a decrease in intensity of the contact. In response to the user input, the device displays a transformation of the user interface element, wherein a degree of the transformation is determined based on an intensity of the user input. If the user input satisfies feed-forward criteria, including a requirement that a characteristic intensity of the contact increase above a feed-forward intensity threshold, the device generates a first tactile output without performing the respective operation. Otherwise, the device generates a second tactile output and performs the respective operation.

47 Claims, 80 Drawing Sheets

(51) Int. Cl.
  *G06F 3/0484* (2013.01)
  *G06F 3/0488* (2013.01)
  *G06F 3/04817* (2022.01)
  *G06F 3/04845* (2022.01)
  *G06F 3/04883* (2022.01)
  *G06F 3/04842* (2022.01)

(52) U.S. Cl.
  CPC ...... *G06F 3/04817* (2013.01); *G06F 3/04842* (2013.01); *G06F 3/04845* (2013.01); *G06F 3/04883* (2013.01); *G06F 2203/04806* (2013.01); *G06F 2203/04808* (2013.01)

(56) References Cited

U.S. PATENT DOCUMENTS

| | | |
|---|---|---|
| 6,211,861 B1 | 4/2001 | Rosenberg et al. |
| 6,424,251 B1 | 7/2002 | Byre |
| 6,433,771 B1 | 8/2002 | Yocum et al. |
| 6,560,165 B1 | 5/2003 | Barker |
| 7,130,664 B1 | 10/2006 | Williams |
| 7,305,257 B2 | 12/2007 | Ladouceur et al. |
| 7,308,253 B2 | 12/2007 | Moody et al. |
| 7,469,381 B2 | 12/2008 | Ording |
| 7,479,949 B2 | 1/2009 | Jobs et al. |
| 7,720,213 B2 | 5/2010 | Desai et al. |
| 7,809,406 B2 | 10/2010 | Weinans |
| 7,958,456 B2 | 6/2011 | Ording et al. |
| 7,978,183 B2 | 7/2011 | Rosenberg et al. |
| 8,026,814 B1 | 9/2011 | Heinze et al. |
| 8,131,848 B1 | 3/2012 | Denise |
| 8,165,640 B2 | 4/2012 | Mullen |
| 8,204,548 B1 | 6/2012 | Blinn et al. |
| 8,207,832 B2 | 6/2012 | Yun et al. |
| 8,209,606 B2 | 6/2012 | Ording |
| 8,266,550 B1 | 9/2012 | Cleron et al. |
| 8,331,268 B2 | 12/2012 | Hicks, III |
| 8,509,856 B1 | 8/2013 | Blinn et al. |
| 8,548,418 B1 | 10/2013 | Jintaseranee et al. |
| 8,619,051 B2 | 12/2013 | Lacroix et al. |
| 8,624,864 B2 | 1/2014 | Birnbaum et al. |
| 8,659,571 B2 | 2/2014 | Birnbaum et al. |
| 8,676,274 B2 | 3/2014 | Li |
| 8,698,766 B2 | 4/2014 | Ali et al. |
| 8,712,383 B1 | 4/2014 | Hayes et al. |
| 8,717,151 B2 | 5/2014 | Forutanpour et al. |
| 8,750,296 B2 | 6/2014 | Bosschaert et al. |
| 8,754,757 B1 | 6/2014 | Ullrich et al. |
| 8,768,838 B1 | 7/2014 | Hoffman |
| 8,773,356 B2 | 7/2014 | Martin et al. |
| 8,886,252 B2 | 11/2014 | Luke et al. |
| 8,886,576 B1 | 11/2014 | Sanketi et al. |
| 8,914,743 B2 | 12/2014 | Nakajima et al. |
| 9,088,668 B1 | 7/2015 | Salvador |
| 9,092,953 B1 | 7/2015 | Mortimer et al. |
| 9,100,805 B2 | 8/2015 | Oshita |
| 9,110,529 B2 | 8/2015 | Kido |
| 9,110,562 B1 | 8/2015 | Eldawy |
| 9,166,823 B2 | 10/2015 | Karmarkar |
| 9,189,932 B2 | 11/2015 | Kerdemelidis |
| 9,247,525 B2 | 1/2016 | Jacobs et al. |
| 9,304,675 B2 | 4/2016 | Lemay et al. |
| 9,335,924 B2 | 5/2016 | Jobs et al. |
| 9,357,052 B2 | 5/2016 | Ullrich |
| 9,411,422 B1 | 8/2016 | McClendon et al. |
| 9,430,796 B1 | 8/2016 | So |
| 9,509,829 B2 | 11/2016 | Culbert et al. |
| 9,542,820 B2 | 1/2017 | Moussette et al. |
| 9,548,050 B2 | 1/2017 | Gruber et al. |
| 9,588,586 B2 | 3/2017 | Rihn |
| 9,600,175 B2 | 3/2017 | Araki |
| 9,652,140 B2 | 5/2017 | Song et al. |
| 9,658,760 B2 | 5/2017 | Tee et al. |
| 9,665,960 B1 | 5/2017 | Masters et al. |
| 9,690,382 B1 | 6/2017 | Moussette et al. |
| 9,830,784 B2 | 11/2017 | Moussette et al. |
| 9,852,590 B2 | 12/2017 | Bhatia |
| 9,864,432 B1 | 1/2018 | Moussette et al. |
| 9,928,699 B2 | 3/2018 | Moussette et al. |
| 9,954,996 B2 | 4/2018 | Christie et al. |
| 9,984,539 B2 | 5/2018 | Moussette et al. |
| 10,013,162 B2 | 7/2018 | Fleizach et al. |
| 10,034,129 B1 | 7/2018 | Ellis et al. |
| 10,276,000 B2 | 4/2019 | Moussette et al. |
| 10,791,273 B1 | 9/2020 | Manzari et al. |
| 2001/0002126 A1 | 5/2001 | Rosenberg et al. |
| 2002/0080112 A1 | 6/2002 | Braun et al. |
| 2002/0115478 A1 | 8/2002 | Fujisawa et al. |
| 2004/0088353 A1 | 5/2004 | Mendelsohn et al. |
| 2004/0095311 A1 | 5/2004 | Tarlton et al. |
| 2004/0213401 A1 | 10/2004 | Aupperle et al. |
| 2004/0233161 A1 | 11/2004 | Shahoian et al. |
| 2005/0231489 A1 | 10/2005 | Ladouceur et al. |
| 2005/0275638 A1 | 12/2005 | Kolmykov-Zotov et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0045252 A1 | 3/2006 | Gorti et al. |
| 2006/0248183 A1 | 11/2006 | Barton |
| 2007/0046627 A1 | 3/2007 | Soh et al. |
| 2007/0055770 A1 | 3/2007 | Karmakar et al. |
| 2007/0088560 A1 | 4/2007 | Mock et al. |
| 2007/0106457 A1 | 5/2007 | Rosenberg |
| 2007/0132789 A1 | 6/2007 | Ording et al. |
| 2007/0146316 A1 | 6/2007 | Poupyrev et al. |
| 2007/0193436 A1 | 8/2007 | Chu |
| 2007/0226646 A1 | 9/2007 | Nagiyama et al. |
| 2007/0274503 A1 | 11/2007 | Klemm et al. |
| 2007/0283239 A1 | 12/2007 | Morris |
| 2008/0024459 A1 | 1/2008 | Poupyrev et al. |
| 2008/0122796 A1 | 5/2008 | Jobs et al. |
| 2008/0161062 A1 | 7/2008 | Harris et al. |
| 2008/0174570 A1 | 7/2008 | Jobs et al. |
| 2008/0270931 A1 | 10/2008 | Bamford |
| 2009/0075694 A1* | 3/2009 | Kim ........................ G06F 3/016 455/556.1 |
| 2009/0085878 A1 | 4/2009 | Heubel et al. |
| 2009/0128581 A1 | 5/2009 | Brid et al. |
| 2009/0135142 A1 | 5/2009 | Fu et al. |
| 2009/0167508 A1 | 7/2009 | Fadell et al. |
| 2009/0167509 A1 | 7/2009 | Fadell et al. |
| 2009/0167704 A1 | 7/2009 | Terlizzi et al. |
| 2009/0178008 A1 | 7/2009 | Herz et al. |
| 2009/0215432 A1 | 8/2009 | Matsuoka |
| 2009/0215479 A1 | 8/2009 | Karmarkar |
| 2009/0222902 A1 | 9/2009 | Bender et al. |
| 2009/0228825 A1 | 9/2009 | Van O's et al. |
| 2009/0231271 A1 | 9/2009 | Heubel et al. |
| 2009/0284463 A1 | 11/2009 | Morimoto et al. |
| 2009/0292990 A1 | 11/2009 | Park et al. |
| 2009/0303031 A1 | 12/2009 | Strohallen et al. |
| 2009/0322497 A1 | 12/2009 | Ku et al. |
| 2009/0325645 A1 | 12/2009 | Bang et al. |
| 2009/0325647 A1 | 12/2009 | Cho et al. |
| 2010/0017489 A1 | 1/2010 | Birnbaum et al. |
| 2010/0077328 A1 | 3/2010 | Berg et al. |
| 2010/0099445 A1 | 4/2010 | Song et al. |
| 2010/0114974 A1 | 5/2010 | Jung et al. |
| 2010/0141411 A1 | 6/2010 | Ahn et al. |
| 2010/0144395 A1 | 6/2010 | Komiya |
| 2010/0156818 A1 | 6/2010 | Burrough et al. |
| 2010/0188327 A1 | 7/2010 | Frid et al. |
| 2010/0231367 A1 | 9/2010 | Cruz-Hernandez et al. |
| 2010/0231534 A1 | 9/2010 | Chaudhri et al. |
| 2010/0231537 A1 | 9/2010 | Pisula et al. |
| 2010/0267424 A1 | 10/2010 | Kim et al. |
| 2010/0299638 A1 | 11/2010 | Choi |
| 2010/0302003 A1 | 12/2010 | Zellner |
| 2010/0302042 A1 | 12/2010 | Barnett et al. |
| 2010/0321411 A1 | 12/2010 | Paek et al. |
| 2011/0001707 A1 | 1/2011 | Faubert et al. |
| 2011/0017828 A1 | 1/2011 | Pine |
| 2011/0018695 A1 | 1/2011 | Bells et al. |
| 2011/0027381 A1 | 2/2011 | Gradl et al. |

(56) References Cited

U.S. PATENT DOCUMENTS

| | | |
|---|---|---|
| 2011/0053577 A1 | 3/2011 | Lee et al. |
| 2011/0055753 A1 | 3/2011 | Horodezky et al. |
| 2011/0061028 A1 | 3/2011 | Bachman et al. |
| 2011/0074695 A1 | 3/2011 | Rapp et al. |
| 2011/0081889 A1 | 4/2011 | Gao et al. |
| 2011/0102349 A1 | 5/2011 | Harris |
| 2011/0126148 A1 | 5/2011 | Krishnaraj et al. |
| 2011/0141142 A1 | 6/2011 | Leffert et al. |
| 2011/0148608 A1 | 6/2011 | Grant et al. |
| 2011/0179388 A1 | 7/2011 | Fleizach et al. |
| 2011/0190595 A1 | 8/2011 | Bennett et al. |
| 2011/0202843 A1 | 8/2011 | Morris |
| 2011/0210926 A1 | 9/2011 | Pasquero et al. |
| 2011/0252346 A1 | 10/2011 | Chaudhri et al. |
| 2011/0264491 A1 | 10/2011 | Birnbaum et al. |
| 2011/0266375 A1 | 11/2011 | Ono et al. |
| 2011/0267181 A1 | 11/2011 | Kildal |
| 2011/0267294 A1 | 11/2011 | Kildal |
| 2011/0270358 A1 | 11/2011 | Davis et al. |
| 2011/0271181 A1 | 11/2011 | Tsai et al. |
| 2011/0279380 A1* | 11/2011 | Weber .................... G06F 3/016 345/173 |
| 2011/0279381 A1* | 11/2011 | Tong ...................... G06F 3/016 345/173 |
| 2011/0316698 A1 | 12/2011 | Palin et al. |
| 2012/0016879 A1 | 1/2012 | Groux et al. |
| 2012/0019365 A1 | 1/2012 | Tuikka et al. |
| 2012/0026110 A1 | 2/2012 | Yamano |
| 2012/0027216 A1 | 2/2012 | Tirry et al. |
| 2012/0028577 A1 | 2/2012 | Rodriguez et al. |
| 2012/0044251 A1 | 2/2012 | Mark et al. |
| 2012/0050324 A1 | 3/2012 | Jeong et al. |
| 2012/0056806 A1 | 3/2012 | Rosenberg et al. |
| 2012/0062491 A1 | 3/2012 | Coni et al. |
| 2012/0105367 A1 | 5/2012 | Son et al. |
| 2012/0173770 A1 | 7/2012 | Walker et al. |
| 2012/0174033 A1 | 7/2012 | Joo |
| 2012/0191704 A1 | 7/2012 | Jones |
| 2012/0216139 A1 | 8/2012 | Ording et al. |
| 2012/0229276 A1 | 9/2012 | Ronkainen |
| 2012/0249461 A1 | 10/2012 | Flanagan et al. |
| 2012/0268412 A1 | 10/2012 | Cruz-Hernandez et al. |
| 2012/0286943 A1 | 11/2012 | Rothkopf et al. |
| 2012/0286944 A1 | 11/2012 | Forutanpour et al. |
| 2012/0299857 A1 | 11/2012 | Grant et al. |
| 2012/0299859 A1 | 11/2012 | Kinoshita |
| 2012/0306631 A1 | 12/2012 | Hughes |
| 2012/0306632 A1 | 12/2012 | Fleizach et al. |
| 2012/0306790 A1 | 12/2012 | Kyung et al. |
| 2012/0311477 A1 | 12/2012 | Mattos et al. |
| 2012/0327006 A1 | 12/2012 | Israr et al. |
| 2013/0031507 A1 | 1/2013 | George |
| 2013/0091462 A1 | 4/2013 | Gray et al. |
| 2013/0165226 A1 | 6/2013 | Thorner |
| 2013/0167058 A1 | 6/2013 | Levee et al. |
| 2013/0174100 A1 | 7/2013 | Seymour et al. |
| 2013/0174137 A1 | 7/2013 | Kim |
| 2013/0201115 A1 | 8/2013 | Heubel |
| 2013/0222224 A1 | 8/2013 | Eriksson et al. |
| 2013/0225300 A1 | 8/2013 | Brinlee |
| 2013/0234929 A1 | 9/2013 | Libin |
| 2013/0244633 A1 | 9/2013 | Jacobs et al. |
| 2013/0262298 A1 | 10/2013 | Morley |
| 2013/0265268 A1 | 10/2013 | Okumura et al. |
| 2013/0282325 A1 | 10/2013 | Takahashi et al. |
| 2013/0290442 A1 | 10/2013 | Dgani |
| 2013/0300684 A1 | 11/2013 | Kim et al. |
| 2013/0307786 A1 | 11/2013 | Heubel |
| 2013/0316744 A1 | 11/2013 | Newham et al. |
| 2013/0318437 A1 | 11/2013 | Jung et al. |
| 2013/0321317 A1 | 12/2013 | Hirukawa |
| 2013/0321337 A1 | 12/2013 | Graham et al. |
| 2013/0326367 A1 | 12/2013 | Nakamura et al. |
| 2013/0332721 A1 | 12/2013 | Chaudhri et al. |
| 2014/0002386 A1 | 1/2014 | Rosenberg et al. |
| 2014/0007005 A1 | 1/2014 | Libin et al. |
| 2014/0024414 A1 | 1/2014 | Fuji |
| 2014/0039900 A1 | 2/2014 | Heubel et al. |
| 2014/0059427 A1 | 2/2014 | Dombrowski et al. |
| 2014/0074716 A1 | 3/2014 | Ni |
| 2014/0075375 A1 | 3/2014 | Hwang et al. |
| 2014/0082501 A1 | 3/2014 | Bae et al. |
| 2014/0091857 A1 | 4/2014 | Bernstein |
| 2014/0092037 A1 | 4/2014 | Kim |
| 2014/0132568 A1 | 5/2014 | Hirose et al. |
| 2014/0168105 A1 | 6/2014 | Zhou |
| 2014/0168110 A1 | 6/2014 | Araki et al. |
| 2014/0168124 A1 | 6/2014 | Park et al. |
| 2014/0176415 A1 | 6/2014 | Buuck et al. |
| 2014/0176452 A1 | 6/2014 | Aleksov et al. |
| 2014/0176455 A1 | 6/2014 | Araki et al. |
| 2014/0181222 A1 | 6/2014 | Geris et al. |
| 2014/0181756 A1 | 6/2014 | Kuo |
| 2014/0197946 A1 | 7/2014 | Park et al. |
| 2014/0207880 A1 | 7/2014 | Malkin et al. |
| 2014/0210740 A1 | 7/2014 | Lee |
| 2014/0215494 A1 | 7/2014 | Kim |
| 2014/0218317 A1 | 8/2014 | Aberg et al. |
| 2014/0232657 A1 | 8/2014 | Aviles et al. |
| 2014/0232679 A1* | 8/2014 | Whitman ................ G06F 3/041 345/174 |
| 2014/0253319 A1 | 9/2014 | Chang |
| 2014/0258857 A1 | 9/2014 | Dykstra-Erickson et al. |
| 2014/0267076 A1 | 9/2014 | Birnbaum et al. |
| 2014/0273858 A1 | 9/2014 | Panther et al. |
| 2014/0281924 A1 | 9/2014 | Chipman et al. |
| 2014/0282011 A1 | 9/2014 | Dellinger et al. |
| 2014/0292501 A1 | 10/2014 | Lim et al. |
| 2014/0292668 A1 | 10/2014 | Fricklas et al. |
| 2014/0292706 A1 | 10/2014 | Hunt et al. |
| 2014/0298172 A1 | 10/2014 | Choi |
| 2014/0300454 A1 | 10/2014 | Lacroix et al. |
| 2014/0304651 A1 | 10/2014 | Johansson et al. |
| 2014/0320402 A1 | 10/2014 | Stahlberg |
| 2014/0320431 A1 | 10/2014 | Cruz-Hernandez et al. |
| 2014/0320435 A1 | 10/2014 | Modarres et al. |
| 2014/0325440 A1 | 10/2014 | Kondo |
| 2014/0329567 A1 | 11/2014 | Chan et al. |
| 2014/0333564 A1 | 11/2014 | Hong et al. |
| 2014/0340316 A1 | 11/2014 | Gu et al. |
| 2014/0351698 A1 | 11/2014 | Nakagawa |
| 2014/0358709 A1 | 12/2014 | Wu |
| 2014/0363113 A1 | 12/2014 | McGavran et al. |
| 2014/0368440 A1 | 12/2014 | Polyakov et al. |
| 2015/0002477 A1 | 1/2015 | Cheatham, III et al. |
| 2015/0020015 A1 | 1/2015 | Zhou |
| 2015/0050966 A1 | 2/2015 | West |
| 2015/0054727 A1 | 2/2015 | Saboune et al. |
| 2015/0062052 A1 | 3/2015 | Bernstein et al. |
| 2015/0067495 A1 | 3/2015 | Bernstein et al. |
| 2015/0067496 A1 | 3/2015 | Missig et al. |
| 2015/0067497 A1* | 3/2015 | Cieplinski ........... G06F 3/04883 715/702 |
| 2015/0067563 A1 | 3/2015 | Bernstein et al. |
| 2015/0067596 A1 | 3/2015 | Brown et al. |
| 2015/0070150 A1 | 3/2015 | Levesque et al. |
| 2015/0070153 A1 | 3/2015 | Bhatia |
| 2015/0070260 A1 | 3/2015 | Saboune et al. |
| 2015/0077335 A1 | 3/2015 | Taguchi et al. |
| 2015/0078586 A1 | 3/2015 | Ang et al. |
| 2015/0082183 A1 | 3/2015 | Hale et al. |
| 2015/0089613 A1 | 3/2015 | Tippett et al. |
| 2015/0097657 A1 | 4/2015 | Gandhi et al. |
| 2015/0103028 A1 | 4/2015 | Ruemelin et al. |
| 2015/0116205 A1* | 4/2015 | Westerman ............ G06F 3/016 345/156 |
| 2015/0116239 A1 | 4/2015 | Kaplan et al. |
| 2015/0123775 A1 | 5/2015 | Kerdemelidis |
| 2015/0134531 A1 | 5/2015 | Xia |
| 2015/0135109 A1 | 5/2015 | Zambetti et al. |
| 2015/0138046 A1 | 5/2015 | Moon |
| 2015/0145656 A1 | 5/2015 | Levesque et al. |
| 2015/0145657 A1 | 5/2015 | Levesque et al. |
| 2015/0149899 A1 | 5/2015 | Bernstein et al. |

(56) References Cited

U.S. PATENT DOCUMENTS

| | | |
|---|---|---|
| 2015/0149964 A1* | 5/2015 | Bernstein ............. G06F 3/0414 715/836 |
| 2015/0153828 A1 | 6/2015 | Monkhouse et al. |
| 2015/0153830 A1 | 6/2015 | Hirose et al. |
| 2015/0156196 A1 | 6/2015 | Kim et al. |
| 2015/0169059 A1 | 6/2015 | Behles et al. |
| 2015/0199172 A1 | 7/2015 | Ringuette et al. |
| 2015/0201065 A1 | 7/2015 | Shim et al. |
| 2015/0227173 A1 | 8/2015 | Hwang |
| 2015/0227204 A1 | 8/2015 | Gipson et al. |
| 2015/0227280 A1 | 8/2015 | Westerman et al. |
| 2015/0227589 A1 | 8/2015 | Chakrabarti et al. |
| 2015/0234464 A1 | 8/2015 | Yliaho |
| 2015/0244848 A1 | 8/2015 | Park et al. |
| 2015/0248161 A1 | 9/2015 | Komori et al. |
| 2015/0253835 A1 | 9/2015 | Yu |
| 2015/0254570 A1 | 9/2015 | Florence et al. |
| 2015/0254947 A1 | 9/2015 | Komori et al. |
| 2015/0261296 A1 | 9/2015 | Yoshikawa |
| 2015/0261387 A1 | 9/2015 | Petersen |
| 2015/0268725 A1 | 9/2015 | Levesque et al. |
| 2015/0286288 A1 | 10/2015 | Lee et al. |
| 2015/0293592 A1 | 10/2015 | Cheong et al. |
| 2015/0301697 A1 | 10/2015 | Petrell et al. |
| 2015/0301838 A1 | 10/2015 | Steeves |
| 2015/0323996 A1 | 11/2015 | Obana et al. |
| 2015/0332226 A1 | 11/2015 | Wu et al. |
| 2015/0332565 A1 | 11/2015 | Cho et al. |
| 2015/0346916 A1 | 12/2015 | Jisrawi et al. |
| 2015/0347010 A1 | 12/2015 | Yang et al. |
| 2015/0350146 A1 | 12/2015 | Cary et al. |
| 2015/0365306 A1 | 12/2015 | Chaudhri et al. |
| 2016/0007290 A1 | 1/2016 | Lindemann et al. |
| 2016/0034152 A1 | 2/2016 | Wilson et al. |
| 2016/0034253 A1 | 2/2016 | Bang et al. |
| 2016/0036996 A1 | 2/2016 | Midholt et al. |
| 2016/0041750 A1 | 2/2016 | Cieplinski et al. |
| 2016/0062464 A1 | 3/2016 | Moussette et al. |
| 2016/0062465 A1 | 3/2016 | Moussette et al. |
| 2016/0062466 A1 | 3/2016 | Moussette et al. |
| 2016/0062467 A1 | 3/2016 | Buxton et al. |
| 2016/0062590 A1 | 3/2016 | Karunamuni et al. |
| 2016/0063496 A1 | 3/2016 | Royyuru et al. |
| 2016/0063825 A1 | 3/2016 | Moussette et al. |
| 2016/0063826 A1 | 3/2016 | Morrell et al. |
| 2016/0063827 A1 | 3/2016 | Moussette et al. |
| 2016/0063828 A1 | 3/2016 | Moussette et al. |
| 2016/0063850 A1 | 3/2016 | Yang et al. |
| 2016/0065525 A1 | 3/2016 | Dye et al. |
| 2016/0103830 A1 | 4/2016 | Cheong et al. |
| 2016/0123745 A1 | 5/2016 | Cotier et al. |
| 2016/0161922 A1 | 6/2016 | Shin |
| 2016/0165038 A1 | 6/2016 | Lim et al. |
| 2016/0179203 A1 | 6/2016 | Modarres et al. |
| 2016/0187988 A1 | 6/2016 | Levesque et al. |
| 2016/0189492 A1 | 6/2016 | Hamam et al. |
| 2016/0205244 A1 | 7/2016 | Dvortsov et al. |
| 2016/0246376 A1 | 8/2016 | Birnbaum et al. |
| 2016/0259435 A1 | 9/2016 | Qian et al. |
| 2016/0259499 A1 | 9/2016 | Kocienda et al. |
| 2016/0259519 A1 | 9/2016 | Foss et al. |
| 2016/0259528 A1 | 9/2016 | Foss et al. |
| 2016/0259542 A1 | 9/2016 | Chaudhri et al. |
| 2016/0295010 A1 | 10/2016 | Miller |
| 2016/0313875 A1 | 10/2016 | Williams et al. |
| 2016/0339750 A1 | 11/2016 | Elnajjar |
| 2016/0342973 A1 | 11/2016 | Jueng et al. |
| 2016/0349936 A1 | 12/2016 | Cho et al. |
| 2016/0357354 A1 | 12/2016 | Chen et al. |
| 2016/0357362 A1 | 12/2016 | Gauci et al. |
| 2016/0357363 A1 | 12/2016 | Decker et al. |
| 2017/0001121 A1 | 1/2017 | Cheong et al. |
| 2017/0031495 A1 | 2/2017 | Smith |
| 2017/0046024 A1* | 2/2017 | Dascola ............. H04M 1/72522 |
| 2017/0068511 A1 | 3/2017 | Brown et al. |
| 2017/0075520 A1 | 3/2017 | Bauer et al. |
| 2017/0075534 A1 | 3/2017 | Leschenko |
| 2017/0083096 A1 | 3/2017 | Rihn et al. |
| 2017/0102916 A1 | 4/2017 | Noble et al. |
| 2017/0185729 A1 | 6/2017 | Boray et al. |
| 2017/0201786 A1 | 7/2017 | Pyhalammi et al. |
| 2017/0357317 A1 | 12/2017 | Chaudhri et al. |
| 2017/0357318 A1 | 12/2017 | Chaudhri et al. |
| 2017/0357319 A1 | 12/2017 | Chaudhri et al. |
| 2017/0357320 A1 | 12/2017 | Chaudhri et al. |
| 2017/0358181 A1 | 12/2017 | Moussette et al. |
| 2018/0067557 A1 | 3/2018 | Robert et al. |
| 2018/0082552 A1 | 3/2018 | Moussette et al. |
| 2018/0129292 A1 | 5/2018 | Moussette et al. |
| 2018/0204425 A1 | 7/2018 | Moussette et al. |
| 2018/0367489 A1 | 12/2018 | Dye et al. |
| 2019/0026017 A1 | 1/2019 | Lee et al. |
| 2019/0033970 A1 | 1/2019 | Mellor et al. |
| 2019/0050055 A1 | 2/2019 | Chaudhri et al. |
| 2019/0138103 A1 | 5/2019 | Robert et al. |
| 2019/0213846 A1 | 7/2019 | Moussette et al. |
| 2019/0332179 A1 | 10/2019 | Robert et al. |
| 2020/0110466 A1 | 4/2020 | Moussette et al. |
| 2020/0111334 A1 | 4/2020 | Moussette et al. |
| 2020/0286343 A1 | 9/2020 | Moussette et al. |
| 2021/0117005 A1 | 4/2021 | Robert et al. |
| 2021/0192904 A1 | 6/2021 | Moussette et al. |
| 2021/0264748 A1 | 8/2021 | Moussette et al. |

FOREIGN PATENT DOCUMENTS

| | | |
|---|---|---|
| CN | 101232665 A | 7/2008 |
| CN | 101375582 A | 2/2009 |
| CN | 101631162 A | 1/2010 |
| CN | 101901048 A | 12/2010 |
| CN | 102330123 A | 2/2012 |
| CN | 102420906 A | 4/2012 |
| CN | 102484664 A | 5/2012 |
| CN | 102609078 A | 7/2012 |
| CN | 102651920 A | 8/2012 |
| CN | 103503428 A | 1/2014 |
| CN | 103649885 A | 3/2014 |
| CN | 103793051 A | 5/2014 |
| CN | 1038438424 A | 6/2014 |
| CN | 104049743 A | 9/2014 |
| CN | 104049746 A | 9/2014 |
| CN | 104123035 A | 10/2014 |
| CN | 104142781 A | 11/2014 |
| CN | 104321723 A | 1/2015 |
| CN | 104375633 A | 2/2015 |
| CN | 104412201 A | 3/2015 |
| CN | 104423595 A | 3/2015 |
| CN | 104471521 A | 3/2015 |
| CN | 104487929 A | 4/2015 |
| CN | 104508618 A | 4/2015 |
| CN | 104536643 A | 4/2015 |
| CN | 104598149 A | 5/2015 |
| CN | 104685444 A | 6/2015 |
| CN | 104685447 A | 6/2015 |
| CN | 104903835 A | 9/2015 |
| CN | 104932681 A | 9/2015 |
| CN | 105027034 A | 11/2015 |
| CN | 105144057 A | 12/2015 |
| CN | 105260049 A | 1/2016 |
| CN | 105278746 A | 1/2016 |
| CN | 105759957 A | 7/2016 |
| DE | 102010048745 A1 | 4/2012 |
| EP | 1 406 150 | 4/2004 |
| EP | 2 141 569 A2 | 1/2010 |
| EP | 2 194 697 A1 | 6/2010 |
| EP | 2 328 063 A1 | 1/2011 |
| EP | 2 378 406 A2 | 10/2011 |
| EP | 2 386 935 A1 | 11/2011 |
| EP | 2 434 387 A2 | 3/2012 |
| EP | 2 728 445 A2 | 5/2014 |
| EP | 2 733 575 A1 | 5/2014 |
| EP | 2 821 912 A1 | 1/2015 |
| EP | 2 827 225 A2 | 1/2015 |
| EP | 2 846 226 A2 | 3/2015 |

(56) References Cited

FOREIGN PATENT DOCUMENTS

| | | |
|---|---|---|
| EP | 2 846 549 A1 | 3/2015 |
| EP | 2 847 658 A1 | 3/2015 |
| EP | 2 857 933 A1 | 4/2015 |
| EP | 2 950 182 A1 | 12/2015 |
| EP | 2 955 608 A1 | 12/2015 |
| EP | 2 977 859 A1 | 1/2016 |
| GB | 2532766 A | 6/2016 |
| GB | 2533572 A | 6/2016 |
| JP | 1999068888 A | 3/1999 |
| JP | 2000209311 A | 7/2000 |
| JP | 2004064117 A | 2/2004 |
| JP | 2004363999 A | 12/2004 |
| JP | 2005276089 A | 10/2005 |
| JP | 2008181365 A | 8/2008 |
| JP | 2008282125 A | 11/2008 |
| JP | 2009265818 A | 11/2009 |
| JP | 2010114702 A | 5/2010 |
| JP | 2010136151 A | 6/2010 |
| JP | 2010152716 A | 7/2010 |
| JP | 2010268086 A | 11/2010 |
| JP | 2011004397 A | 1/2011 |
| JP | 2011129019 A | 6/2011 |
| JP | 2011159110 A | 8/2011 |
| JP | 2013503578 A | 1/2013 |
| JP | 2013507059 A | 2/2013 |
| JP | 2013103430 A | 5/2013 |
| JP | 2013528855 A | 7/2013 |
| JP | JR 2013162167 A | 8/2013 |
| JP | 201300879 A | 10/2013 |
| JP | 2014164754 A | 9/2014 |
| JP | 2014215639 A | 11/2014 |
| JP | 2014229150 A | 12/2014 |
| JP | 2015007836 A | 1/2015 |
| JP | 2015015600 A | 1/2015 |
| JP | 2015519655 A | 7/2015 |
| KR | 20060006843 A | 1/2006 |
| KR | 20090113186 A | 10/2009 |
| KR | 20100056396 A | 5/2010 |
| KR | 20110136220 A | 12/2011 |
| KR | 20130075412 A | 7/2013 |
| KR | 20140002563 A | 1/2014 |
| KR | 20140025552 A | 3/2014 |
| KR | 20140094489 A | 7/2014 |
| KR | 20150013264 A | 2/2015 |
| TW | I388995 B | 3/2013 |
| WO | WO 01/24158 A1 | 4/2001 |
| WO | WO 2004/053830 A1 | 6/2004 |
| WO | WO 2008/075082 A1 | 6/2008 |
| WO | WO 2012/081182 A1 | 6/2012 |
| WO | WO 2013/089294 A1 | 6/2013 |
| WO | WO 2013/156815 A1 | 10/2013 |
| WO | WO 2013/169300 A1 | 11/2013 |
| WO | WO 2013/169842 A2 | 11/2013 |
| WO | WO 2013/169853 A1 | 11/2013 |
| WO | WO 2013/169854 A2 | 11/2013 |
| WO | WO 2013/169865 A2 | 11/2013 |
| WO | WO 2013/169875 A2 | 11/2013 |
| WO | WO 2013/173838 A2 | 11/2013 |
| WO | WO 2014/095756 A1 | 6/2014 |
| WO | WO 2014/105275 A1 | 7/2014 |
| WO | WO 2015/092379 A1 | 6/2015 |
| WO | WO 2015/116056 A1 | 8/2015 |
| WO | WO 2015/187274 | 12/2015 |
| WO | WO 2016/036509 A1 | 3/2016 |
| WO | WO 2016/171848 A1 | 10/2016 |
| WO | WO 2017/027526 A1 | 2/2017 |
| WO | WO 2017/065365 A1 | 4/2017 |

OTHER PUBLICATIONS

Office Action, dated Feb. 2, 2019, received in Chinese Patent Application No. 2017107348777, which corresponds with U.S. Appl. No. 15/270,885, 10 pages.

Intention to Grant, dated Feb. 1, 2019, received in European Patent Application No. 17177493.8, which corresponds with U.S. Appl. No. 15/270,885, 4 pages.

Notice of Allowance, dated Feb. 13, 2019, received in Danish Patent Application No. 2016-70724, which corresponds with U.S. Appl. No. 15/271,073, 2 pages.

Office Action, dated Apr. 2, 2019, received in Chinese Patent Application No. 2017800042913, which corresponds with U.S. Appl. No. 15/272,380, 5 pages.

Patent, dated Jan. 4, 2019, received in Danish Patent Application No. 201670729, which corresponds with U.S. Appl. No. 15/272,380, 7 pages.

Patent, dated Mar. 13, 2019, received in Danish Patent Application No. 201670735, which corresponds with U.S. Appl. No. 15/272,380, 3 pages.

Notification to Grant, dated Apr. 10, 2019, received in Chinese Patent Application No. 201710736303.3, which corresponds with U.S. Appl. No. 15/271,534, 6 pages.

Office Action, dated Mar. 5, 2019, received in Chinese Patent Application No. 201710736331.5, which corresponds with U.S. Appl. No. 15/271,108, 6 pages.

Office Action, dated Mar. 21, 2019, received in Korean Patent Application No. 2019-7000444, which corresponds with U.S. Appl. No. 14/869,870, 3 pages.

Office Action, dated Feb. 12, 2019, received in U.S. Appl. No. 15/823,436, 7 pages.

Notice of Allowance, dated Apr. 11, 2019, received in U.S. Appl. No. 15/863,765, 10 pages.

Office Action, dated Feb. 13, 2019, received in U.S. Appl. No. 16/240,684, 9 pages.

Notice of Allowance, dated Mar. 19, 2019, received in U.S. Appl. No. 16/240,684, 5 pages.

Office Action, dated Oct. 15, 2016, received in Chinese Patent Application No. 201780030418.9, which corresponds with U.S. Appl. No. 15/619,359, 3 pages.

Office Action, dated Oct. 4, 2019, received in European Patent Application No. 17733235.0, which corresponds with U.S. Appl. No. 15/619,359, 4 pages.

Office Action, dated Nov. 14, 2019, received in Australian Patent Application No. 2017251751, which corresponds with U.S. Appl. No. 15/270,885, 3 pages.

Patent, dated Oct. 25, 2019, received in Chinese Patent Application No. 201710734877.7, which corresponds with U.S. Appl. No. 15/270,885, 6 pages.

Office Action, dated Sep. 27, 2019, received in Danish Patent Application No. 201670720, which corresponds with U.S. Appl. No. 15/271,073, 2 pages.

Patent, dated Nov. 1, 2019, received in Chinese Patent Application No. 201710728497.2, which corresponds with U.S. Appl. No. 15/271,653, 6 pages.

Dosher et al., "Human Interaction with Small Haptic Effects", University of Washington, Seattle, WA, Jun. 2005, 16 pages.

Immersion, "The Value of Haptics", San Jose, California, 2010, 12 pages.

Sulaiman et al., "User Haptic Experience and the Design of Drawing Interfaces", *Interacting with Computers*, http://doi.org/10.1016/j.intcom.2009.11.009, Dec. 5, 2009, 20 pages.

VladMaxSoft, "Make Your iPhone Ring Louder When Inside a Pocket or Bag with Ringing Pocket Tweak", https://www.reddit.com/r/jailbreak/comments/1zj6zx/release_make_your_iphone_ring_louder_when_inside/, Mar. 4, 2014, 8 pages.

Notice of Allowance, dated Jan. 31, 2018, received in U.S. Appl. No. 15/619,359, 8 pages.

Notice of Allowance, dated Oct. 2, 2017, received in U.S. Appl. No. 15/619,359, 9 pages.

Certificate of Grant, dated May 18, 2017, received in Australian Patent Application No. 2017100428, which corresponds with U.S. Appl. No. 15/619,359, 1 page.

Office Action, dated Jun. 27, 2017, received in Australian Patent Application No. 2017100482, which corresponds with U.S. Appl. No. 15/619,359, 7 pages.

Certificate of Examination, dated Oct. 27, 2017, received in Australian Patent Application No. 2017100482, which corresponds with U.S. Appl. No. 15/619,359, 1 page.

(56) References Cited

OTHER PUBLICATIONS

Office Action, dated Jan. 24, 2018, received in Danish Patent Application No. 201770369, which corresponds with U.S. Appl. No. 15/619,359, 6 pages.
Notice of Allowance, dated Dec. 14, 2016, received in U.S. Appl. No. 15/270,885, 13 pages.
Notice of Allowance, dated Apr. 10, 2017, received in U.S. Appl. No. 15/270,885, 5 pages.
Notice of Allowance, dated Jul. 21, 2017, received in U.S. Appl. No. 15/270,885, 10 pages.
Notice of Allowance, dated Nov. 22, 2017, received in U.S. Appl. No. 15/270,885, 5 pages.
Notice of Acceptance, dated Aug. 18, 2017, received in Australian Patent Application No. 2017216447, which corresponds with U.S. Appl. No. 15/270,885, 3 pages.
Grant, dated Dec. 21, 2017, received in Australian Application No. 2017216447, which corresponds with U.S. Appl. No. 15/270,885, 1 page.
Notice of Acceptance, dated Aug. 21, 2017, received in Australian Patent Application No. 2017216475, which corresponds with U.S. Appl. No. 15/270,885, 3 pages.
Grant, dated Dec. 21, 2017, received in Australian Application No. 2017216475, which corresponds with U.S. Appl. No. 15/270,885, 1 page.
Office Action, dated Jan. 5, 2017, received in Danish Patent Application No. 201670721, which corresponds with U.S. Appl. No. 15/270,885, 7 pages.
Office Action, dated Jul. 20, 2017, received in Danish Patent Application No. 201670721, which corresponds with U.S. Appl. No. 15/270,885, 2 pages.
Decision to Grant, dated Oct. 25, 2017, received in Danish Patent Application No. 201670721, which corresponds with U.S. Appl. No. 15/270,885, 2 pages.
Office action, dated Jan. 18, 2017, received in Danish Patent Application No. 201670726, which corresponds with U.S. Appl. No. 15/270,885, 7 pages.
Office Action, dated Apr. 5, 2017, received in Danish Patent Application No. 201670726, which corresponds with U.S. Appl. No. 15/270,885, 2 pages.
Notice of Allowance, dated Jul. 18, 2017, received in Danish Patent Application No. 201670726, which corresponds with U.S. Appl. No. 15/270,885, 2 pages.
Patent, dated Oct. 16, 2017, received in Danish Patent Application No. 201670726, which corresponds with U.S. Appl. No. 15/270,885, 2 pages.
Office Action, dated Aug. 25, 2017, received in European patent Application No. 17177160.3, which corresponds with U.S. Appl. No. 15/270,885, 3 pages.
Office Action, dated Jan. 24, 2018, received in European Patent Application No. 17177160.3, which corresponds with U.S. Appl. No. 15/270,885, 4 pages.
Office Action, dated Jan. 17, 2017, received in U.S. Appl. No. 15/271,073, 8 pages.
Notice of Allowance, dated May 2, 2017, received in U.S. Appl. No. 15/271,073, 5 pages.
Notice of Allowance, dated Aug. 21, 2017, received in Australian Application No. 2017213578, which corresponds with U.S. Appl. No. 15/271,073, 3 pages.
Grant, dated Dec. 21, 2017, received in Australian Application No. 2017213578, which corresponds with U.S. Appl. No. 15/271,073, 1 page.
Notice of Allowance, dated Sep. 7, 2017, received in Australian Application No. 2017216471, which corresponds with U.S. Appl. No. 15/271,073, 3 pages.
Grant, dated Dec. 21, 2017, received in Australian Application No. 2017216471, which corresponds with U.S. Appl. No. 15/271,073, 1 page.
Notice of Allowance, dated Aug. 24, 2017, received in Australian Application No. 2017216453, which corresponds with U.S. Appl. No. 15/271,073, 3 pages.
Grant, dated Dec. 21, 2017, received in Australian Application No. 2017216453, which corresponds with U.S. Appl. No. 15/271,073, 1 page.
Office Action, dated Sep. 8, 2017, received in Chinese Application No. 201710735308.4, which corresponds with U.S. Appl. No. 15/271,073, 4 pages.
Office Action, dated Jan. 20, 2017, received in Danish Patent Application No. 201670720, which corresponds with U.S. Appl. No. 15/271,073, 9 pages.
Office Action, dated Sep. 4, 2017, received in Danish Patent Application No. 201670720, which corresponds with U.S. Appl. No. 15/271,073, 4 pages.
Office Action, dated Apr. 5, 2017, received in Danish Patent Application No. 2016-70724, which corresponds with U.S. Appl. No. 15/271,073, 5 pages.
Office Action, dated Aug. 1, 2017, received in Danish Patent Application No. 2016-70724, which corresponds with U.S. Appl. No. 15/271,073, 5 pages.
Office Action, dated Feb. 14, 2018, received in Danish Patent Application No. 2016-70724, which corresponds with U.S. Appl. No. 15/271,073, 2 pages.
Office Action, dated Jan. 25, 2017, received in Danish Patent Application No. 201670725, which corresponds with U.S. Appl. No. 15/271,073, 6 pages.
Office Action, dated Apr. 5, 2017, received in Danish Patent Application No. 201670725, which corresponds with U.S. Appl. No. 15/271,073, 3 pages.
Office Action, dated Oct. 12, 2017, received in Danish Patent Application No. 201670725, which corresponds with U.S. Appl. No. 15/271,073, 3 pages.
Office Action, dated May 16, 2018, received in Danish Patent Application No. 201670725, which corresponds with U.S. Appl. No. 15/271,073, 2 pages.
Office Action, dated Feb. 10, 2017, received in U.S. Appl. No. 15/272,380, 18 pages.
Notice of Allowance, dated Dec. 6, 2017, received in U.S. Appl. No. 15/272,380, 11 pages.
Notice of Allowance, dated Mar. 8, 2018, received in U.S. Appl. No. 15/272,380, 11 pages.
Certificate of Grant, dated Aug. 23, 2017, received in Australian Patent Application No. 2017101092, which corresponds with U.S. Appl. No. 15/272,380, 1 page.
Office Action, dated Oct. 4, 2017, received in Australian Patent Application No. 2017101092, which correspond with U.S. Appl. No. 15/272,380, 8 pages.
Certificate of Grant, dated Apr. 26, 2018, received in Australian Patent Application No. 2018100429, which corresponds with U.S. Appl. No. 15/272,380, 1 page.
Office Action, dated May 31, 2018, received in Australian Patent Application No. 2018100429, which corresponds with U.S. Appl. No. 15/272,380, 5 pages.
Office Action, dated Feb. 23, 2017, received in Danish Patent Application No. 201670729, which corresponds with U.S. Appl. No. 15/272,380, 9 pages.
Office Action, dated Aug. 28, 2017, received in Danish Patent Application No. 201670729, which corresponds with U.S. Appl. No. 15/272,380, 3 pages.
Office Action, dated Mar. 9, 2018, received in Danish Patent Application No. 01670729, which corresponds with U.S. Appl. No. 15/272,380, 2 pages.
Office Action, dated May 17, 2018, received in Danish Patent Application No. 01670729, which corresponds with U.S. Appl. No. 15/272,380, 2 pages.
Office Action, dated Jan. 24, 2017, received in Danish Patent Application No. 201670735, which corresponds with U.S. Appl. No. 15/272,380, 8 pages.
Office Action, dated Jul. 27, 2017, received in Danish Patent Application No. 201670735, which corresponds with U.S. Appl. No. 15/272,380, 3 pages.
Office Action, dated Dec. 7, 2017, received in Danish Patent Application No. 201670735, which corresponds with U.S. Appl. No. 15/272,380, 3 pages.

(56) References Cited

OTHER PUBLICATIONS

Office Action, dated Jan. 11, 2017, received in Danish Patent Application No. 201670736, which corresponds with U.S. Appl. No. 15/272,380, 11 pages.
Office Action, dated Aug. 30, 2017, received in Danish Patent Application No. 201670736, which corresponds with U.S. Appl. No. 15/272,380, 4 pages.
Office Action, dated Mar. 16, 2018, received in Danish Patent Application No. 201670736, which corresponds with U.S. Appl. No. 15/272,380, 4 pages.
Office Action, dated Jan. 30, 2017, received in Danish Patent Application No. 201670737, which corresponds with U.S. Appl. No. 15/272,380, 9 pages.
Office Action, dated Aug. 31, 2017, received in Danish U.S. Appl. No. 15/272,380 (7423DK03), which corresponds with U.S. Appl. No. 15/272,380, 4 pages.
Notice of Allowance, dated Feb. 22, 2017, received in U.S. Appl. No. 15/271,534 (7442), 13 pages.
Office Action, dated Jan. 10, 2017, received in U.S. Appl. No. 15/271,653 (7443), 9 pages.
Office Action, dated Sep. 13, 2017, received in Chinese U.S. Appl. No. 15/271,653.2 (7443CN), which corresponds with U.S. Appl. No. 15/271,653, 3 pages.
Office Action, dated Jan. 27, 2017, received in U.S. Appl. No. 15/271,708 (7444), 8 pages.
Notice of Allowance, dated Apr. 5, 2017, received in U.S. Appl. No. 15/271,708 (7444), 5 pages.
Office Action, dated Nov. 22, 2017, received in Chinese U.S. Appl. No. 15/271,108.5 (7444CN), which corresponds with U.S. Appl. No. 15/271,108, 3 pages.
Office Action, dated Nov. 30, 2015, received in U.S. Appl. No. 14/835,708 (7467), 28 pages.
Final Office Action, dated May 20, 2016, received in U.S. Appl. No. 14/835,708 (7467), 7 pages.
Notice of Allowance, dated Aug. 29, 2016, received in U.S. Appl. No. 14/835,708 (7467), 9 pages.
Office Action, dated Oct. 30, 2017, received in Australian U.S. Appl. No. 14/835,708 (7467AU), which corresponds with U.S. Appl. No. 14/835,708, 2 pages.
Notice of Acceptance, dated Apr. 5, 2018, received in Australian U.S. Appl. No. 14/835,708 (7467AU), which corresponds with U.S. Appl. No. 14/835,708, 5 pages.
Office Action, dated May 11, 2018, received in Japanese U.S. Appl. No. 14/835,708 (7467JP), which corresponds with U.S. Appl. No. 14/835,708, 8 pages.
Office Action, dated Dec. 26, 2017, received in Korean Patent Application No. 2017-7005874 (7467KR), which corresponds with U.S. Appl. No. 14/835,708, 11 pages.
Office Action, dated Aug. 1, 2016, received in Taiwanese U.S. Appl. No. 14/835,708 (7467TW), which corresponds with U.S. Appl. No. 14/835,708, 17 pages.
Office Action, dated Dec. 20, 2016, received in Taiwanese Patent Application No. 104126890, which corresponds with U.S. Appl. No. 14/835,708, 5 pages.
Office Action, dated Dec. 28, 2016, received in Taiwanese Patent Application No. 104126890, which corresponds with U.S. Appl. No. 14/835,708, 3 pages.
Patent, dated Apr. 11, 2018, received in Taiwanese Patent Application No. 104126890, which corresponds with U.S. Appl. No. 14/835,708, 5 pages.
Office action, dated Apr. 5, 2017, received in Taiwanese Patent Application No. 105139726, which corresponds with U.S. Appl. No. 14/835,708, 2 pages.
Notice of Allowance, dated Jul. 21, 2017, received in Taiwanese Patent Application No. 105139726, which corresponds with U.S. Appl. No. 14/835,708, 6 pages.
Patent, dated Nov. 1, 2017, received in Taiwanese Patent Application No. 105139726, which corresponds with U.S. Appl. No. 14/835,708, 5 pages.
Office Action, dated Feb. 12, 2016, received in U.S. Appl. No. 14/869,825, 15 pages.
Final Office Action, dated Jul. 8, 2016, received in U.S. Appl. No. 14/869,825, 20 pages.
Office Action, dated Dec. 27, 2016, received in U.S. Appl. No. 14/869,825, 27 pages.
Office Action, dated Feb. 12, 2016, received in U.S. Appl. No. 14/869,829, 20 pages.
Final Office Action, dated Aug. 8, 2016, received in U.S. Appl. No. 14/869,829, 28 pages.
Office Action, dated Mar. 7, 2017, received in U.S. Appl. No. 14/869,829, 24 pages.
Final Office Action, dated Jul. 24, 2017, received in U.S. Appl. No. 14/869,829, 30 pages.
Examiner's Answer, dated Mar. 21, 2018, received in U.S. Appl. No. 14/869,829, 8 pages.
Office Action, dated Feb. 18, 2016, received in U.S. Appl. No. 14/869,834, 17 pages.
Final Office Action, dated Aug. 8, 2016, received in U.S. Appl. No. 14/869,834, 22 pages.
Office Action, dated Mar. 7, 2017, received in U.S. Appl. No. 14/869,834, 20 pages.
Final Office Action, dated Jul. 25, 2017, received in U.S. Appl. No. 14/869,834, 18 pages.
Notice of Allowance, dated Nov. 7, 2017, received in U.S. Appl. No. 14/869,834, 9 pages.
Office Action, dated Feb. 17, 2016, received in U.S. Appl. No. 14/869,835, 15 pages.
Final Office Action, dated Aug. 4, 2016, received in U.S. Appl. No. 14/869,835, 21 pages.
Office Action, dated Jan. 6, 2017, received in U.S. Appl. No. 14/869,835, 17 pages.
Final Office Action, dated Jun. 28, 2017, received in U.S. Appl. No. 14/869,835, 24 pages.
Office Action, dated Nov. 30, 2017, received in U.S. Appl. No. 14/869,835, 8 pages.
Notice of Allowance, dated May 29, 2018, received in U.S. Appl. No. 14/869,835, 12 pages.
Office Action, dated Dec. 30, 2015, received in U.S. Appl. No. 14/869,837, 35 pages.
Final Office Action, dated Jun. 30, 2016, received in U.S. Appl. No. 14/869,837, 37 pages.
Office Action, dated Jan. 17, 2017, received in U.S. Appl. No. 14/869,837, 27 pages.
Notice of Allowance, dated Jul. 31, 2017, received in U.S. Appl. No. 14/869,837, 27 pages.
Office Action, dated Aug. 31, 2017, received in Danish Patent Application No. 201770372, 10 pages.
Office Action, dated Apr. 17, 2018, received in Danish Patent Application No. 201770372, 5 pages.
Office Action, dated Mar. 7, 2018, received in U.S. Appl. No. 15/688,754, 9 pages.
International Search Report and Written Opinion, dated Nov. 29, 2017, received in International Patent Application No. PCT/US2017/037004, which corresponds with U.S. Appl. No. 15/619,359, 21 pages.
Extended European Search Report, dated Oct. 20, 2017, received in European Patent Application No. 17177493.8, 6 pages.
Invitation to Pay Additional Fees, dated Nov. 8, 2017, received in International Patent Application No. PCT/US2017/045152, which corresponds with U.S. Appl. No. 15/270,885, 17 pages.
International Search Report and Written Opinion, dated Jan. 18, 2018, received in International Patent Application No. PCT/US2017/045152, which corresponds with U.S. Appl. No. 15/270,885, 20 pages.
Extended European Search Report, dated Jan. 10, 2018, received in European Patent Application No. 17186196.6, which corresponds with U.S. Appl. No. 15/271,073, 8 pages.
Extended European Search Report, dated Jan. 9, 2018, received in European Patent Application No. 17186312.9, which corresponds with U.S. Appl. No. 15/271,073, 6 pages.

(56) References Cited

OTHER PUBLICATIONS

Extended European Search Report, dated Jan. 5, 2018, received in European Patent Application No. 17186313.7, which corresponds with U.S. Appl. No. 15/271,073, 9 pages.
International Search Report and Written Opinion, dated Jan. 16, 2018, received in International Patent Application No. PCT/US2017/045740, which corresponds with U.S. Appl. No. 15/271,073, 19 pages.
International Search Report and Written Opinion, dated Jan. 18, 2018, received in International Patent Application No. PCT/US2017/044851, which corresponds with U.S. Appl. No. 15/272,380, 17 pages.
International Search Report and Written Opinion, dated Mar. 15, 2016, received in International Patent Application No. PCT/US2015/041858, which corresponds with U.S. Appl. No. 14/835,708, 31 pages.
Office Action, dated May 23, 2019, received in Australian Patent Application No. 2017286532, which corresponds with U.S. Appl. No. 15/619,359, 3 pages.
Office Action, dated May 10, 2019, received in European Patent Application No. 17733235.0, which corresponds with U.S. Appl. No. 15/619,359, 9 pages.
Intention to Grant, dated Jul. 4, 2019, received in Danish Patent Application No. 201770369, which corresponds with U.S. Appl. No. 15/619,359, 2 pages.
Grant, dated Jul. 8, 2019, received in Danish Patent Application No. 201770369, which corresponds with U.S. Appl. No. 15/619,359, 2 pages.
Patent, dated Jul. 12, 2019, received in Danish Patent Application No. 2017 70369, which corresponds with U.S. Appl. No. 15/619,359, 4 pages.
Office Action, dated Aug. 9, 2019, received in Australian Patent Application No. 2017251751, which corresponds with U.S. Appl. No. 15/270,885, 5 pages.
Notice of Allowance, dated Aug. 14, 2019, received in Chinese Patent Application No. 201710734877.7, which corresponds with U.S. Appl. No. 15/270,885, 5 pages.
Decision to Grant, dated May 16, 2019, received in European Patent Application No. 17177160.3, which corresponds with U.S. Appl. No. 15/270,885, 1 page.
Patent, dated Jun. 12, 2019, received in European Patent Application No. 17177160.3, which corresponds with U.S. Appl. No. 15/270,885, 3 page.
Decision to Grant, dated Apr. 18, 2019, received in European Patent Application No. 17177493.8, which corresponds with U.S. Appl. No. 15/270,885, 4 pages.
Patent, dated May 27, 2019, received in European Patent Application No. 17177493.8, which corresponds with U.S. Appl. No. 15/270,885, 2 pages.
Office Action, dated Aug. 1, 2019, received in European Patent Application No. 19168886.0, which corresponds with U.S. Appl. No. 15/270,885, 5 pages.
Notice of Acceptance, dated Apr. 26, 2019, received in Australian Patent Application No. 201761484, which corresponds with U.S. Appl. No. 15/271,073, 3 pages.
Notice of Allowance, dated Jul. 1, 2019, received in Chinese Patent Application No. 201710735308.4, which corresponds with U.S. Appl. No. 15/271,073, 5 pages.
Office Action, dated Jul. 16, 2019, received in Chinese Patent Application No. 2017800042913, which corresponds with U.S. Appl. No. 15/272,380, 6 pages.
Office Action, dated Jun. 5, 2019, received in Chinese Patent Application No. 2018108328493, which corresponds with U.S. Appl. No. 15/272,380, 4 pages.
Office Action, dated May 14, 2019, received in Danish Patent Application No. 201670736, which corresponds with U.S. Appl. No. 15/272,380, 3 pages.
Office Action, dated Aug. 5, 2019, received in Japanese Patent Application No. 2019-090875, which corresponds with U.S. Appl. No. 15/272,380, 7 pages.

Office Action, dated Jul. 23, 2109, received in Chinese Patent Application No. 2018110167326.2, which corresponds with U.S. Appl. No. 15/275,083, 6 pages.
Notice of Allowance, dated Apr. 23, 2019, received in Japanese Patent Application No. 2018550359, which corresponds with U.S. Appl. No. 15/275,083, 4 pages.
Patent, dated May 17, 2019, received in Japanese Patent Application No. 2018550359, which corresponds with U.S. Appl. No. 15/275,083, 4 pages.
Patent, dated Jun. 7, 2019, received in Chinese Patent Application No. 201710736303.3, which corresponds with U.S. Appl. No. 15/271,534, 6 pages.
Notice of Allowance, dated Jul. 31, 2019, received in Chinese Patent Application No. 201710736331.5, which corresponds with U.S. Appl. No. 15/271,108, 3 pages.
Office Action, dated Apr. 18, 2019, received in Chinese Patent Application No. 201580044092.6, which corresponds with U.S. Appl. No. 14/835,708, 5 pages.
Office Action, dated Apr. 18, 2019, received in European Patent Application No. 15748122.7, which corresponds with U.S. Appl. No. 14/835,708, 5 pages.
Notice of Allowance, dated May 24, 2019, received in Japanese Patent Application No. 2017509011, which corresponds with U.S. Appl. No. 14/835,708, 5 pages.
Patent, dated Jun. 14, 2019, received in Japanese Patent Application No. 2017509011, which corresponds with U.S. Appl. No. 14/835,708, 3 pages.
Notice of Allowance, dated May 9, 2019, received in U.S. Appl. No. 14/869,829, 8 pages.
Notice of Allowance, dated Jun. 26, 2019, received in U.S. Appl. No. 14/869,829, 8 pages.
Office Action, dated May 3, 2019, received in Australian Patent Application No. 2018202796, which corresponds with U.S. Appl. No. 14/869,834, 2 pages.
Office Action, dated May 10, 2019, received in Danish Patent Application No. 201770372, 5 pages.
Notice of Allowance, dated Jul. 24, 2019, received in U.S. Appl. No. 15/823,436, 5 pages.
Office Action, dated Jul. 17, 2019, received in U.S. Appl. No. 16/355,621, 7 pages.
Office Action, dated Aug. 21, 2019, received in U.S. Appl. No. 16/508,218, 9 pages.
European Search Report, dated Jul. 16, 2019, received in European Patent Application No. 19168886.0, which corresponds with U.S. Appl. No. 15/270,885, 6 pages.
Certificate of Grant, dated Aug. 28, 2019, received in Australian Patent Application No. 201761484, which corresponds with U.S. Appl. No. 15/271,073, 4 pages.
Patent, dated Aug. 27, 2019, received in Chinese Application No. 201710735308.4, which corresponds with U.S. Appl. No. 15/271,073, 6 pages.
Patent, dated Jun. 26, 2019, received in Danish Patent Application No. 2016-70724, which corresponds with U.S. Appl. No. 15/271,073, 4 pages.
Intention to Grant, dated Sep. 5, 2019, received in Danish Patent Application No. 201670725, which corresponds with U.S. Appl. No. 15/271,073, 2 pages.
Notice of Allowance, dated Sep. 4, 2019, received in Chinese Patent Application No. 201710728497.2, which corresponds with U.S. Appl. No. 15/271,653, 5 pages.
Patent, dated Sep. 3, 2019, received in Chinese Patent Application No. 201710736331.5, which corresponds with U.S. Appl. No. 15/271,108, 6 pages.
Notice of Allowance, dated Sep. 10, 2019, received in Korean Patent Application No. 2019-7000444, which corresponds with U.S. Appl. No. 14/869,870, 4 pages.
Notice of Allowance, dated Sep. 18, 2019, received in U.S. Appl. No. 15/863,765, 8 pages.
Intention to Grant, dated Dec. 7, 2018, received in European Patent Application No. 17177160.3, which corresponds with U.S. Appl. No. 15/270,885, 7 pages.

(56) References Cited

OTHER PUBLICATIONS

Office Action, dated Oct. 5, 2018, received in Australian Patent Application No. 201761484, which corresponds with U.S. Appl. No. 15/271,073, 2 pages.
Office Action, dated Jan. 3, 2019, received in Chinese Application No. 201710735308.4, which corresponds with U.S. Appl. No. 15/271,073, 6 pages.
Intention to Grant, dated Nov. 21, 2018, received in Danish Patent Application No. 201670735, which corresponds with U.S. Appl. No. 15/272,380, 2 pages.
Office Action, dated Oct. 26, 2018, received in European Patent Application No. 18183341.9, which corresponds with U.S. Appl. No. 15/272,380, 7 pages.
Office Action, dated Jan. 14, 2019, received in European Patent Application No. 18191063.9, which corresponds with U.S. Appl. No. 15/275,083, 9 pages.
Office Action, dated Nov. 23, 2018, received in Chinese Patent Application No. 201710736303.3, which corresponds with U.S. Appl. No. 15/271,534, 7 pages.
Office Action, dated Dec. 29, 2018, received in Chinese Patent Application No. 201710728497.2, which corresponds with U.S. Appl. No. 15/271,653, 6 pages.
Office Action, dated Dec. 14, 2018, received in Japanese Patent Application No. 2017509011, which corresponds with U.S. Appl. No. 14/835,708, 8 pages.
Final Office Action, dated Nov. 8, 2018, received in Korean Patent Application No. 2017-7005874, which corresponds with U.S. Appl. No. 14/835,708, 3 pages.
Notice of Allowance, dated Dec. 20, 2018, received in U.S. Appl. No. 15/905,671, 9 pages.
International Preliminary Report on Patentability, dated Dec. 18, 2018, received in International Patent Application No. PCT/US2017/037004, which corresponds with U.S. Appl. No. 15/619,359, 12 pages.
European Search Report, dated Dec. 3, 2018, received in European Patent Application No. 18191063.9, which corresponds with U.S. Appl. No. 15/275,083, 4 pages.
Office Action, dated Jun. 15, 2018, received in Danish Patent Application No. 201670735, which corresponds with U.S. Appl. No. 15/272,380, 2 pages.
Notice of Allowance, dated Jul. 12, 2018, received in U.S. Appl. No. 15/275,083, 22 pages.
Office Action, dated Jul. 20, 2018, received in U.S. Appl. No. 15/905,671, 7 pages.
Office Action, dated Aug. 6, 2018, received in Danish Patent Application No. 201770369, which corresponds with U.S. Appl. No. 15/619,359, 5 pages.
Office Action, dated Aug. 14, 2018, received in Danish Patent Application No. 201670720, which corresponds with U.S. Appl. No. 15/271,073, 2 pages.
Certificate of Examination, dated Aug. 7, 2018, received in Australian Patent Application No. 2018100429, which corresponds with U.S. Appl. No. 15/272,380, 1 page.
Notice of Allowance, dated Oct. 2, 2018, received in Danish Patent Application No. 201670729, which corresponds with U.S. Appl. No. 15/272,380, 2 pages.
Office Action, dated Jul. 25, 2018, received in Danish Patent Application No. 201670737, which corresponds with U.S. Appl. No. 15/272,380, 5 pages.
Notice of Allowance, dated Aug. 27, 2018, received in U.S. Appl. No. 15/273,688, 27 pages.
Certificate of Grant, dated Aug. 2, 2018, received in Australian Patent Application No. 2015312344, which corresponds with U.S. Appl. No. 14/835,708, 1 page.
Final Office Action, dated Jul. 17, 2018, received in Korean Patent Application No. 2017-7005874, which corresponds with U.S. Appl. No. 14/835,708, 3 pages.
Notice of Allowance, dated Aug. 27, 2018, received in U.S. Appl. No. 15/688,754, 5 pages.

European Search Report, dated Sep. 27, 2018, received in European Patent Application No. 18183341.9, which corresponds with U.S. Appl. No. 15/271,073, 4 pages.
International Search Report and Written Opinion, dated Aug. 22, 2018, received in International Patent Application No. PCT/US2018032936, which corresponds with U.S. Appl. No. 15/972,040, 14 pages.
Intention to Grant, dated Feb. 28, 2020, received in European Patent Application No. 17186312.9, which corresponds with U.S. Appl. No. 15/271,073, 5 pages.
Notice of Acceptance, dated Feb. 17, 2020, received in Australian Patent Application No. 2018202796, which corresponds with U.S. Appl. No. 14/869,834, 3 pages.
Notice of Allowance, dated Feb. 3, 2020, received in Japanese Patent Application No. 2018-558694, which corresponds with U.S. Appl. No. 15/619,359, 5 pages.
Patent, dated Feb. 4, 2020, received in Danish Patent Application No. 201670725, which corresponds with U.S. Appl. No. 15/272,380, 4 pages.
Notification to Grant, dated Jan. 16, 2020, received in Chinese Patent Application No. 2017800042913, which corresponds with U.S. Appl. No. 15/272,380, 6 pages.
Decision to Grant, dated Feb. 17, 2020, received in Danish Patent Application No. 201670736, which corresponds with U.S. Appl. No. 15/272,380, 2 pages.
Notice of Allowance, dated Feb. 24, 2020, received in Korean Patent Appiication No. 2017-7005874, which corresponds with U.S. Appl. No. 14/835,708, 5 pages.
Office Action, dated Feb. 11, 2020, received in Korean Patent Application No. 2019-7036500, which corresponds with U.S. Appl. No. 14/869,829, 2 pages.
Notice of Allowance, dated Feb. 14, 2020, received in U.S. Appl. No. 16/355,621, 9 pages.
Office Action, dated Feb. 10, 2020, received in U.S. Appl. No. 16/705,673, 6 pages.
Office Action, dated Nov. 18, 2019, received in Australian Patent Application No. 2017286532, which corresponds with U.S. Appl. No. 15/619,359 2 pages.
Notice of Acceptance, dated Dec. 19, 2019, received in Australian Patent Application No. 2017251751, which corresponds with U.S. Appl. No. 15/270,885, 3 pages.
Decision to Grant, dated Dec. 19, 2019, received in Danish Patnet Application No. 201670725, which corresponds with U.S. Appl. No. 15/271,073, 2 pages.
Intention to Grant, dated Dec. 18, 2019, received in Danish Patent Application No. 201670736, which corresponds with U.S. Appl. No. 15/272,380, 2 pages.
Office Action, dated Dec. 11, 2019, received in Chinese Patent Application No. 201580044092.6, which corresponds with U.S. Appl. No. 14/835,708, 5 pages.
Oral Summons, dated Jan. 2, 2020, received in Korean Patent Application No. 2017-7005874, which corresponds with U.S. Appl. No. 14/835,708, 5 pages.
Patent, dated Dec. 10, 2019, received in Korean Patent Application No. 2019-7000444, which corresponds with U.S. Appl. No. 14/869,870, 4 pages.
Office Action, dated Nov. 26, 2019, received in Australian Patent Application No. 2019202429, which corresponds with U.S. Appl. No. 16/240,684, 2 pages.
Final Office Action, dated Dec. 12, 2019, received in U.S. Appl. No. 16/355,621, 8 pages.
Notice of Allowance, dated Dec. 4, 2019, received in U.S. Appl. No. 16/508,218, 5 pages.
Notice of Acceptance, dated Apr. 2, 2020, received in Australian Patent Application No. 2017286532, which corresponds with U.S. Appl. No. 15/619,359, 3 pages.
Office Action, dated Jun. 3, 2020, received in Chinese Patent Application No. 201780030418.9, which corresponds with U.S. Appl. No. 15/619,359, 3 pages.
Certificate of Grant, dated Apr. 30, 2020, received in Australian Patent Application No. 2017251751, which corresponds with U.S. Appl. No. 15/270,885, 1 page.

(56) References Cited

OTHER PUBLICATIONS

Patent, dated May 6, 2020, received in European Patent Application No. 17186196.6, which corresponds with U.S. Appl. No. 15/271,073, 2 pages.
Patent, dated May 6, 2020, received in European Patent Application No. 17186312.9, which corresponds with U.S. Appl. No. 15/271,073, 2 pages.
Patent, dated May 19, 2020, received in Danish Patent Application No. 201670736, which corresponds with U.S. Appl. No. 15/272,380, 4 pages.
Office Action, dated Jun. 15, 2020, received in European Patent Application No. 20155940.8, which corresponds with U.S. Appl. No. 15/272,380, 8 pages.
Office Action, dated Apr. 17, 2020, received in Japanese Patent Application No. 2019-090875, which corresponds with U.S. Appl. No. 15/272,380, 2 pages.
Office Action, dated May 27, 2020, received in Chinese Patent Application No. 2018110167326.2, which corresponds with U.S. Appl. No. 15/275,083, 4 pages.
Office Action, dated Jun. 22, 2020, received in Japanese Patent Application No. 2019-046172, which corresponds with U.S. Appl. No. 14/869,829, 7 pages.
Patent, dated Jun. 18, 2020, received in Australian Patent Application No. 2018202796, which corresponds with U.S. Appl. No. 14/869,834, 3 pages.
Office Action, dated Jun. 1, 2020, received in Australian Patent Application No. 2018271107, which corresponds with U.S. Appl. No. 15/972,040, 4 pages.
Final Office Action, dated May 18, 2020, received in U.S. Appl. No. 16/705,673, 7 pages.
Office Action, dated Jun. 24, 2020, received in U.S. Appl. No. 16/553,064, 21 pages.
European Search Report, dated Jun. 2, 2020, received in European Patent Application No. 20155940.8, which corresponds with U.S. Appl. No. 15/271,073, 4 pages.
Certificate of Grant, dated Aug. 13, 2020, received in Australian Patent Application No. 2017286532, which corresponds with U.S. Appl. No. 15/619,359, 4 pages.
Notice of Allowance, dated Oct. 30, 2020, received in Korean Patent Application No. 2018-7032284, which corresponds with U.S. Appl. No. 15/619,359, 5 pages.
Intention to Grant, dated Sep. 11, 2020, received in European Patent Application No. 19168886.0, which corresponds with U.S. Appl. No. 15/270,885, 11 pages.
Office Action, dated Sep. 30, 2020, received in European Patent Application No. 17186313.7, which corresponds with U.S. Appl. No. 15/271,073, 5 pages.
Notice of Allowance, dated Sep. 11, 2020, received in Japanese Patent Application No. 2019-090875, which corresponds with U.S. Appl. No. 15/272,380, 5 pages.
Office Action, dated Aug. 28, 2020, received in Chinese Patent Application No. 201580044092.6, which corresponds with U.S. Appl. No. 14/835,708, 10 pages.
Office Action, dated Dec. 1, 2020, received in Chinese Patent Application No. 201580044092.6, which corresponds with U.S. Appl. No. 14/835,708, 8 pages.
Office Action, dated Sep. 3, 2020, received in Korean Patent Application No. 2019-7036500, which corresponds with U.S. Appl. No. 14/869,829, 5 pages.
Patent, dated Oct. 29, 2020, received in Korean Patent Application No. 2019-7036500, which corresponds with U.S. Appl. No. 14/869,829, 4 pages.
Notice of Allowance, dated Nov. 26, 2020, received in Australian Patent Application No. 2018271107, which corresponds with U.S. Appl. No. 15/972,040, 2 pages.
Office Action, dated Oct. 30, 2020, received in Japanese Patent Application No., which corresponds with U.S. Appl. No. 15/972,040.
Office action, dated Nov. 19, 2020, received in Korean Patent Application No. 2020-7030968, which corresponds with U.S. Appl. No. 15/823,436 pages.
Final Office Action, dated Sep. 23, 2020, received in U.S. Appl. No. 16/157,891, 16 pages.
Notice of Acceptance, dated Sep. 30, 2020, received in Australian Patent Application No. 2019202429, which corresponds with U.S. Appl. No. 16/240,684, 3 pages.
Office Action, dated Sep. 8, 2020, received in U.S. Appl. No. 16/705,673, 6 pages.
Notice of Allowance, dated Sep. 17, 2020, received in U.S. Appl. No. 16/553,064, 3 pages.
Office Action, dated Sep. 1, 2020, received in U.S. Appl. No. 16/846,124, 8 pages.
Notice of Allowance, dated Sep. 22, 2020, received in U.S. Appl. No. 16/846,124, 5 pages.
Office Action, dated Oct. 9, 2020, received in U.S. Appl. No. 16/885,166, 9 pages.
Decision to Refuse, dated Feb. 15, 2021, received in European Patent Application No. 17733235.0, which corresponds with U.S. Appl. No. 15/619,359, 14 pages.
Patent, dated Jan. 27, 2021, received in Korean Patent Application No. 2018-7032284, which corresponds with U.S. Appl. No. 15/619,359, 3 pages.
Decision to Grant, dated Jan. 28, 2021, received in European Patent Application No. 19168886.0, which corresponds with U.S. Appl. No. 15/270,885, 4 pages.
Patent, dated Feb. 24, 2021, received in European Patent Application No. 19168886.0, which corresponds with U.S. Appl. No. 15/270,885, 4 pages.
Office Action, dated Feb. 4, 2021, received in Chinese Patent Application No. 2018108328493, which corresponds with U.S. Appl. No. 15/272,380, 1 page.
Office Action, dated Apr. 26, 2021, received in European Patent Application No. 18183341.9, which corresponds with U.S. Appl. No. 15/272,380, 6 pages.
Office Action, dated Feb. 2, 2021, received in Chinese Patent Application No. 2018110167326.2, which corresponds with U.S. Appl. No. 15/275,083, 2 pages.
Office Action, dated Mar. 22, 2021, received in Australian Patent Application No. 2020202916, which corresponds with U.S. Appl. No. 14/869,829, 3 pages.
Notice of Allowance, dated Feb. 22, 2021, received in Japanese Patent Application No. 2019-046172, which corresponds with U.S. Appl. No. 14/869,829, 2 pages.
Patent, dated Mar. 8, 2021, received in Japanese Patent Application No. 2019-046172, which corresponds with U.S. Appl. No. 14/869,829, 3 pages.
Certificate of Grant, dated Mar. 18, 2021, received in Australian Patent Application No. 2018271107, which corresponds with U.S. Appl. No. 15/972,040, 3 pages.
Office Action, dated Mar. 8, 2021, received in Japanese Patent Application No. 2019-562305, which corresponds with U.S. Appl. No. 15/972,040, 2 pages.
Notice of Allowance, dated Apr. 5, 2021, received in Korean Patent Application No. 2020-7030968, which corresponds with U.S. Appl. No. 15/823,436 3 pages.
Office Action, dated Feb. 5, 2021, received in U.S. Appl. No. 16/157,891, 18 pages.
Certificate of Grant, dated Jan. 28, 2021, received in Australian Patent Application No. 2019202429, which corresponds with U.S. Appl. No. 16/240,684, 3 pages.
Office Action, dated Mar. 8, 2021, received in Japanese Patent Application No. 2020-035108, which corresponds with U.S. Appl. No. 16/355,621, 2 pages.
Notice of Allowance, dated Feb. 25, 2021, received in U.S. Appl. No. 16/885,166, 9 pages.
Office Action, dated Feb. 26, 2021, received in Korean Patent Application No. 2021-7002786, which corresponds with U.S. Appl. No. 16/885,166, 4 pages.
Office Action, dated May 3, 2021, received in European Patent Application No. 17751545.9, which corresponds with U.S. Appl. No. 15/272,380, 6 pages.
Office Action, dated Apr. 29, 2021, received in European Patent Application No. 18191063.9, which corresponds with U.S. Appl. No. 15/275,083, 3 pages.

(56) References Cited

OTHER PUBLICATIONS

Office Action, dated May 6, 2021, received in Australian Patent Application No. 2020203587, which corresponds with U.S. Appl. No. 16/885,166, 3 pages.
Office Action, dated Mar. 10, 2020, received in Chinese Patent Application No. 201780030418.9, which corresponds with U.S. Appl. No. 15/619,359, 3 pages.
Patent, dated Mar. 4, 2020, received in Japanese Patent Application No. 2018-558694, which corresponds with U.S. Appl. No. 15/619,359, 6 pages.
Office Action, dated Mar. 31, 2020, received in Korean Patent Application No. 2018-7032284, which corresponds with U.S. Appl. No. 15/619,359, 2 pages.
Decision to Grant, dated Apr. 9, 2020, received in European Patent Application No. 17186196.6, which corresponds with U.S. Appl. No. 15/271,073, 2 pages.
Decision to Grant, dated Apr. 9, 2020, received in European Patent Application No. 17186312.9, which corresponds with U.S. Appl. No. 15/271,073, 2 pages.
Office Action, dated Apr. 3, 2020, received in Chinese Patent Application No. 2018108328493, which corresponds with U.S. Appl. No. 15/272,380, 8 pages.
Patent, dated Mar. 26, 2020, received in Korean Patent Application No. 2017-7005874, which corresponds with U.S. Appl. No. 14/835,708, 4 pages.
Office Action, dated Mar. 24, 2020, received in U.S. Appl. No. 16/157,891, 16 pages.
Office Action, dated Jan. 11, 2021, received in Chinese Patent Application No. 201780030418.9, which corresponds with U.S. Appl. No. 15/619,359, 6 pages.
Office Action, dated Jan. 15, 2021, received in Chinese Patent Application No. 202010082072.0, which corresponds with U.S. Appl. No. 15/272,380, 2 pages.
Office Action, dated Jun. 16, 2021, received in Chinese Patent Application No. 202010082072.0, which corresponds with U.S. Appl. No. 15/272,380, 2 pages.
Notice of Allowance, dated Jun. 3, 2021, received in Australian Patent Application No. 2020202916, which corresponds with U.S. Appl. No. 14/869,829, 3 pages.
Office Action, dated Jul. 29, 2021, received in Australian Patent Application No. 2020289876, which corresponds with U.S. Appl. No. 15/972,040, 4 pages.
Patent, dated Jul. 5, 2021, received in Korean Patent Application No. 2020-7030968, which corresponds with U.S. Appl. No. 15/823,436, 4 pages.
Final Office Action, dated Jul. 6, 2020, received in U.S. Appl. No. 16/157,891, 21 pages.
Office Action, dated Sep. 14, 2021, received in Chinese Patent Application No. 202010238633.1, which corresponds with U.S. Appl. No. 16/157,891, 2 pages.
Final Office Action, dated Aug. 30, 2021, received in Korean Patent Application No. 2021-7002786, which corresponds with U.S. Appl. No. 16/885,166, 3 pages.
Office Action, dated Jun. 9, 2021, received in U.S. Appl. No. 17/138,664, 10 pages.
Notice of Allowance, dated Aug. 27, 2021, received in U.S. Appl. No. 17/138,664, 5 pages.
Office Action, dated Sep. 28, 2021, received in Chinese Patent Application No. 202010238671.7, which corresponds with U.S. Appl. No. 15/273,688, 1 page.
Notice of Allowance, dated Oct. 8, 2021, received in Japanese Patent Application No. 2020-172113, which corresponds with U.S. Appl. No. 15/273,688, 2 pages.
Certificate of Grant, dated Oct. 22, 2021, received in Australian Patent Application No. 202020916, which corresponds with U.S. Appl. No. 14/869,829, 3 pages.
Office Action, dated Sep. 30, 2021, received in European Patent Application No. 18730541.2, which corresponds with U.S. Appl. No. 15/972,040, 8 pages.
Office Action, dated Sep. 18, 2021, received in Chinese Patent Application No. 201911032592.4, which corresponds with U.S. Appl. No. 15/688,754, 7 pages.
Notice of Allowance, dated Sep. 24, 2021, received in Chinese Patent Application No. 201910901923.7, which corresponds with U.S. Appl. No. 15/863,765, 6 pages.
Notice of Allowance, dated Sep. 23, 2021, received in Chinese Patent Application No. 201911023034.1, which corresponds with U.S. Appl. No. 16/240,684, 2 pages.
Intent to Grant, dated Oct. 9, 2021, received in Australian Patent Application No. 2020294270, which corresponds with U.S. Appl. No. 16/508,218, 2 pages.
Notice of Allowance, dated Oct. 28, 2021, received in Australian Patent Application No. 2020203587, which corresponds with U.S. Appl. No. 16/885,166, 3 pages.
Intention to Grant, dated Dec. 23, 2021, received in European Patent Application No. 17186313.7, which corresponds with U.S. Appl. No. 15/271,073, 7 pages.
Office Action, dated Nov. 30, 2021, received in European Patent Application No. 20155940.8, which corresponds with U.S. Application No. 15/272,380, 7 pages.
Patent, dated Oct. 28, 2021, received in Japanese Patent Application No. 2020-172113, which corresponds with U.S. Appl. No. 15/273,688, 3 pages.
Notice of Allowance, dated Dec. 13, 2021, received in Australian Patent Application No. 2020289876, which corresponds with U.S. Appl. No. 15/972,040, 3 pages.
Patent, dated Dec. 14, 2021, received in Chinese Application Patent No. 201910901923.7, which corresponds with U.S. Appl. No. 15/863,765, 6 pages.
Notice of Allowance, dated Dec. 17, 2021, received in U.S. Appl. No. 16/157,891, 14 pages.
Patent, dated Nov. 2, 2021, received in Chinese Application Patent No. 201911023034.1, which corresponds with U.S. Appl. No. 16/240,684, 6 pages.
Notice of Allowance, dated Dec. 7, 2021, received in Korean Patent Application No. 2021-7021011, which corresponds with U.S. Appl. No. 16/705,673, 5 pages.
Notice of Allowance, dated Nov. 25, 2021, received in Korean Patent Application No. 2021-7002786, which corresponds with U.S. Appl. No. 16/885,166, 2 pages.
Notice of Allowance, dated Feb. 9, 2022, received in Chinese Application Patent No. 202010082072.2, which corresponds with U.S. Appl. No. 15/272.380, 1 page.
Notice of Allowance, dated Jan. 6, 2022, received in Chinese Application Patent No. 201911032592.4, which corresponds with U.S. Appl. No. 15/688,754, 1 page.
Office Action, dated Jan. 17, 2022, received in Japanese Patent Application No. 2020-035108, which corresponds with U.S. Appl. No. 16/355,621, 2 pages.
Patent, dated Jan. 27, 2022, received in Korean Patent Application No. 2021-7002786, which corresponds with U.S. Appl. No. 16/885,166, 6 pages.

* cited by examiner

604 Display, on the display, a user interface that includes a respective user interface element, wherein the respective user interface element is associated with a respective operation (B)

635 The user interface that includes the respective user interface element is displayed in accordance with a determination that the device is in a locked state.

636 The electronic device includes a flashlight and the respective user interface element is a flashlight icon for controlling a state of the flashlight

638 The electronic device includes a a camera, and the respective user interface element is a camera application icon for displaying a camera application user interface for the camera

610 Display a transformation of the respective user interface element, wherein a degree of the transformation is determined based on an intensity of the user input (C)

640 Displaying the transformation of the respective user interface element includes displaying a first transformation of the respective user interface element as the intensity of the user input increases, and reversing the first transformation as the intensity of the user input decreases

642 The degree of the transformation of the respective user interface element increases as the intensity of the input increases and decreases as the intensity of the input decreases

644 Displaying the transformation of the respective user interface element starts when the detected intensity of the user input satisfies a second intensity threshold that is below the feed-forward intensity threshold

Figure 6C

612 In accordance with a determination that the first portion of the user input satisfies feed-forward criteria, wherein the feed-forward criteria include a requirement that a characteristic intensity of the contact increase above a feed-forward intensity threshold in order for the feed-forward criteria to be met, generating a first tactile output without performing the respective operation (D)

650 The feed-forward criteria further include a requirement that the contact remain at the location that corresponds to the respective user interface element during the first portion of the input in order for the feed-forward criteria to be met 652 The feed-forward criteria further include a requirement that the contact remain on the touch-sensitive surface for at least a predefined threshold amount of time in order for the feed-forward criteria to be met 654 The first tactile output includes a sequence of tactile output components that change as the intensity of the contact increases (E1)

656 In accordance with a determination that, after meeting the feed-forward criteria, the user input meets cancellation criteria, wherein the cancellation criteria include a requirement that the contact move more than a threshold distance from the respective activatable user interface object:

reversing the transformation of the respective user interface object;

forgoing performing the respective operation; and generating a cancellation tactile output

Figure 6D (E2)

660 Continuing to detect, on the touch-sensitive surface, the user input directed to the respective user interface element, including detecting a third portion of the user input that includes a second increase in intensity of the contact followed by a fourth portion of the user input that includes a second decrease in intensity of the contact, wherein the third portion of the user input follows the second portion of the user input 661 In response to detecting the user input:

662 Display a second transformation of the respective user interface element, wherein a degree of the second transformation is determined based on an intensity of the user input 663 In accordance with a determination that the third portion of the user input satisfies the feed-forward criteria, generating the first tactile output without performing the respective operation 664 In accordance with a determination that the fourth portion of the user input satisfies the activation criteria:

665 Generate the second tactile output

666 Perform, at the device, the respective operation associated with the respective user interface element (E4)

667 The user interface is a first user interface

668 Detect a second user input corresponding to a request to display a second user interface distinct from the first user interface; and in response to detecting the second user input, display the second user interface.

Figure 6E (E5)

681 In accordance with a determination that the respective operation associated with the respective user interface element includes activating a function associated with the respective user interface element, the first tactile output and/or the second tactile output are instances of a first reference tactile output 682 In accordance with a determination that the respective operation includes deactivating the function associated with the respective user interface element, the first tactile output and/or the second tactile output are instances of a second reference tactile output that is distinct from the first reference tactile output (E6)

683 The user interface includes a third respective user interface element

684 Detect a third user input directed to the third user interface element; and in response to detecting the third user input, display a transformation of the third user interface element, including increasing a size of the third user interface element (E7)

686 The user interface includes a plurality of user interface elements, other than the respective user interface element, in a scrolling list 688 Detect a fourth user input corresponding to a request to scroll the plurality of user interface elements in the scrolling list; and in response to detecting the fourth user input:

scroll the plurality of user interface elements in the scrolling list; and cease to display the respective user interface element associated with the respective operation

Figure 6G (E8)
↓

690 The user interface includes a plurality of user interface elements, other than the respective user interface element, in a scrolling list

↓

692 Detect a fifth user input corresponding to a request to scroll the plurality of user interface elements in the scrolling list; and in response to detecting the fifth user input:

scroll the plurality of user interface elements in the scrolling list; and cease to display the respective user interface element associated with the respective operation (E9)
↓

694 The user interface includes a background

↓

696 Detect a sixth user input directed to the background of the user interface, including detecting a contact at a location that corresponds to the background and detecting change in intensity of the contact; and in response to detecting the sixth user input:

in accordance with a determination that a characteristic intensity of the contact reached a background-animation intensity threshold, display an animation of the background; and in accordance with a determination that a characteristic intensity of the contact did not reach the background-animation intensity threshold, forgo displaying the animation of the background

↓

698 Displaying the animation of the background includes progressing through the animation of the background as the intensity of the sixth user input increases, and reversing the progression through the animation as the intensity of the sixth user input decreases

Figure 6H

720 In response to detecting, via the one or more input devices, the activation of the capture affordance, in accordance with the determination that the activation of the capture affordance was detected while the camera user interface was in the second media capture mode, generating a second tactile output that has a lower amplitude than the first tactile output in conjunction with capturing the media of the second type 722 The second tactile output includes the first tactile output with reduced amplitude 724 For a respective tactile output generated while capturing the media of the second type, the respective tactile output is selected based on a determination that the respective tactile output interferes with the captured media by an amount that is below a predefined threshold 726 The second tactile output includes the first tactile output with scale reduced to zero

730 Capturing the media of the first type includes capturing a sequence of images 732 The first tactile output corresponds to an initial image in the sequence of images 734 For each image in the sequence of images other than the initial image, determining a time interval from a point in time corresponding to capturing a most recent prior image for which the first tactile output was generated, to a point in time corresponding to capturing the respective image 736 In accordance with a determination that the time interval is less than a predefined time period, capturing the respective image without generating the first tactile output 738 In accordance with a determination that the time interval is greater than the predefined time period, capturing the respective image and generating the first tactile output

Figure 7B

TACTILE FEEDBACK FOR LOCKED DEVICE USER INTERFACES

RELATED APPLICATIONS

This application claims priority to U.S. Provisional Application Ser. No. 62/507,138, filed May 16, 2017, which is incorporate by reference herein in its entirety.

TECHNICAL FIELD

This relates generally to electronic devices with touch-sensitive surfaces, including but not limited to electronic devices with touch-sensitive surfaces that generate tactile outputs to provide haptic feedback.

BACKGROUND

The use of touch-sensitive surfaces as input devices for computers and other electronic computing devices has increased significantly in recent years. Example touch-sensitive surfaces include touchpads and touch-screen displays. Such surfaces are widely used to manipulate user interfaces and objects therein on a display. User interface objects can include icons and notifications displayed in a lock screen user interface, as well as the locked-mode controls of an application having functionality available to the user while the device operates in a locked mode (e.g., prior to authentication of the user, for example through entry of a passcode or fingerprint or other user authentication information).

Example locked screen features include icons for accessing applications or device features available in the device's locked mode. Examples include a flashlight icon for toggling a state of a flashlight in the device, a camera application, and features within the camera application that are accessible in the device's locked mode. User manipulations of user interface features include adjusting the position and/or size of one or more user interface objects or activating buttons or opening files/applications represented by user interface objects, as well as associating metadata with one or more user interface objects or otherwise manipulating user interfaces. Example user interface objects include digital images, video, text, icons, control elements such as buttons and other graphics. A user will, in some circumstances, need to perform such manipulations on user interface objects in a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

Haptic feedback, typically in combination with visual and/or audio feedback, is often used to indicate a particular state of electronic devices.

But methods for performing these manipulations are cumbersome and inefficient. For example, using a sequence of mouse based inputs to select one or more user interface objects and perform one or more actions on the selected user interface objects is tedious and creates a significant cognitive burden on a user. In addition, these methods take longer than necessary, thereby wasting energy. This latter consideration is particularly important in battery-operated devices.

SUMMARY

Accordingly, there is a need for electronic devices with faster, more efficient methods and interfaces for providing haptic feedback to a user while providing access to locked mode device features, but preventing accidental activation of such features, and for providing an improved camera application user interface that provides tactile outputs that confirm user actions, but suppresses or reduces the generation of tactile outputs when such tactile outputs would disrupt or reduce the quality of the audio portion of media captured in certain operating modes. Such methods and interfaces optionally complement or replace conventional methods for providing access to locked mode features, and capturing media with a camera application. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method performed at an electronic device with a display, a touch-sensitive surface, and one or more tactile output generators, includes displaying, on the display, a user interface that includes a respective user interface element, wherein the respective user interface element is associated with a respective operation. The method further includes detecting, on the touch-sensitive surface, a user input directed to the respective user interface element, including detecting a contact at a location that corresponds to the respective user interface element and detecting a first portion of the user input that includes an increase in intensity of the contact followed by a second portion of the user input that includes a decrease in intensity of the contact. The method further includes, in response to detecting the user input, displaying a transformation of the respective user interface element, wherein a degree of the transformation is determined based on an intensity of the user input; and in accordance with a determination that the first portion of the user input satisfies feed-forward criteria, wherein the feed-forward criteria include a requirement that a characteristic intensity of the contact increase above a feed-forward intensity threshold in order for the feed-forward criteria to be met, generating a first tactile output without performing the respective operation.

The method further includes, in accordance with a determination that the second portion of the user input satisfies activation criteria, wherein the activation criteria include a requirement that the characteristic intensity of the contact decrease below an activation intensity threshold: generating a second tactile output; and performing, at the device, the respective operation associated with the respective user interface element. Further, the method includes, in accordance with a determination that the characteristic intensity of the contact does not satisfy the feed-forward intensity threshold during the user input: forgoing generating the first tactile output and the second tactile output; and forgoing performing the respective operation associated with the respective user interface element.

In accordance with some embodiments, a method performed at an electronic device with one or more input devices, one or more output devices, and one or more tactile output generators, includes displaying a camera user interface for capturing media, wherein the camera has a plurality of media capture modes. The method further includes, while displaying the camera user interface, detecting, via the one or more input devices, activation of a capture affordance, and in response to detecting, via the one or more input devices, activation of the capture affordance: in accordance with a determination that the activation of the capture affordance was detected while the camera user interface was in a first media capture mode, wherein capturing media in the first media capture mode includes capturing media of a first type that includes one or more images captured without audio: capturing media of the first type, and generating a first tactile output. The method further includes, in response to detecting, via the one or more input devices, activation of the capture affordance: in accordance with a determination that the activation of the capture affordance was detected while the camera user interface was in a second media capture mode that is distinct from the first media capture mode, wherein capturing media in the second media capture mode includes capturing media of a second type that includes a sequence of images and corresponding audio: capturing media of the second type, and forgoing generating the first tactile output in response to activation of the capture affordance.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

Thus, electronic devices with displays, touch-sensitive surfaces, optionally one or more sensors to detect intensities of contacts with the touch-sensitive surface, optionally one or more tactile output generators, optionally one or more device orientation sensors, and optionally an audio system, are provided with improved methods and interfaces for providing tactile outputs, thereby increasing the effectiveness, efficiency, and user satisfaction with such devices. Such methods and interfaces may complement or replace conventional methods for providing tactile outputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6H are flow diagrams of a process for generating tactile outputs in response to user actions on the user interface of a device in the locked mode of operation, in accordance with some embodiments.

FIGS. 7A-7C are flow diagrams of a process for generating tactile outputs in response to user actions on the user interface of a camera application in accordance with some embodiments.

DESCRIPTION OF EMBODIMENTS

Many electronic devices have graphical user interfaces for use when the device is in a locked mode of operation, for authenticating the user, as well as for providing access to a reduced set of device features, such as for toggling a state of a flashlight in the device, and for enabling use of a camera in the device using a camera application. As described in more detail below, to ensure that user inputs to access such features are not accidental, a variety of intensity-based criteria, time-base criteria, and tactile outputs are employed to both make use of the device efficient and intuitive, thereby enabling intuitive and fast access to the locked mode features while reducing the likelihood of inadvertent activations of such features.

Many electronic devices provide feedback as input is detected at a graphical user interface to provide an indication of the effects the input has on device operations. Methods described herein provide haptic feedback, often in conjunction with visual and/or audio feedback, to help a user understand the effects of detected inputs on device operations and to provide information to a user about the state of a device.

Figure 7A:
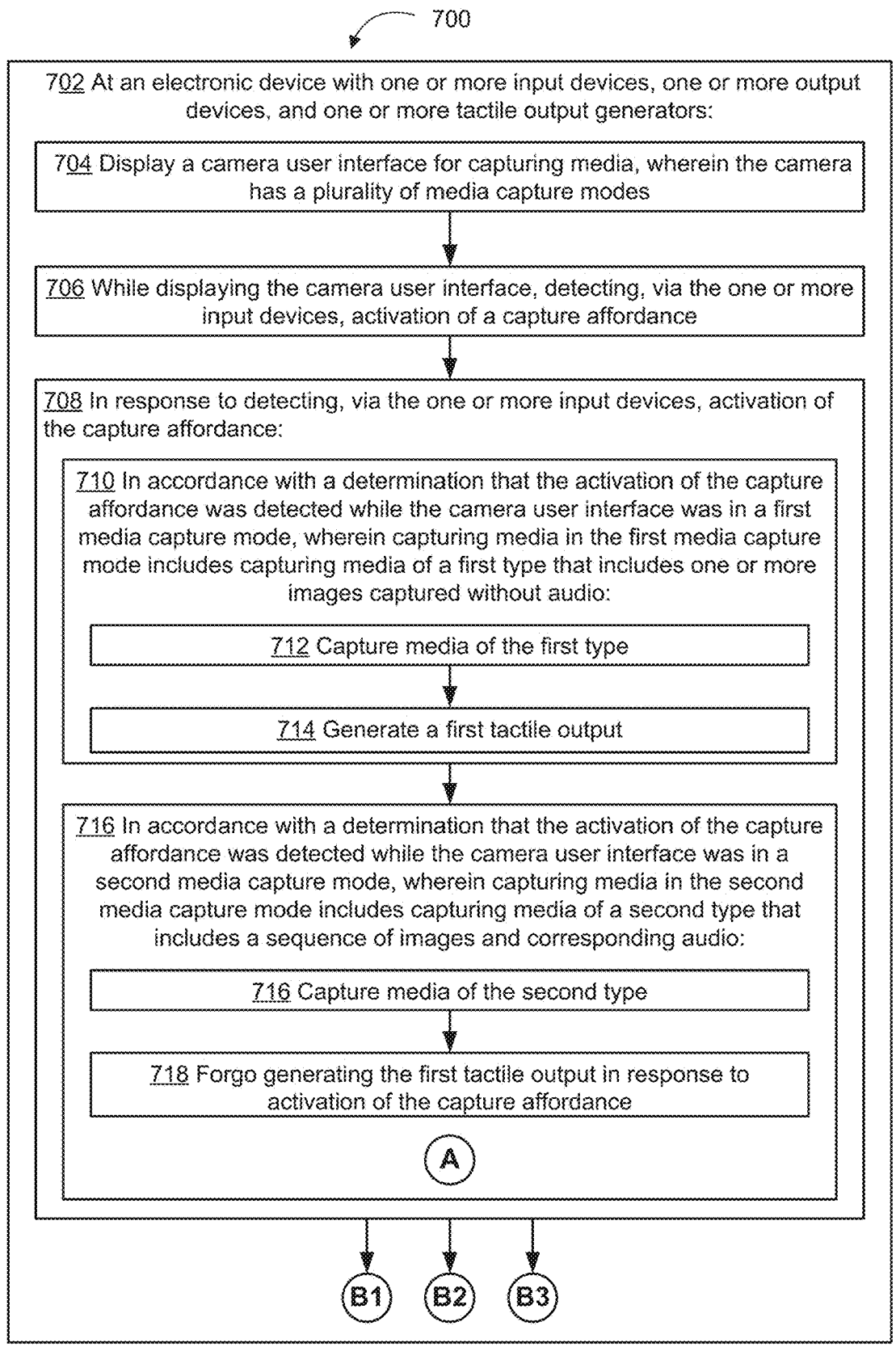
Figure 7C:
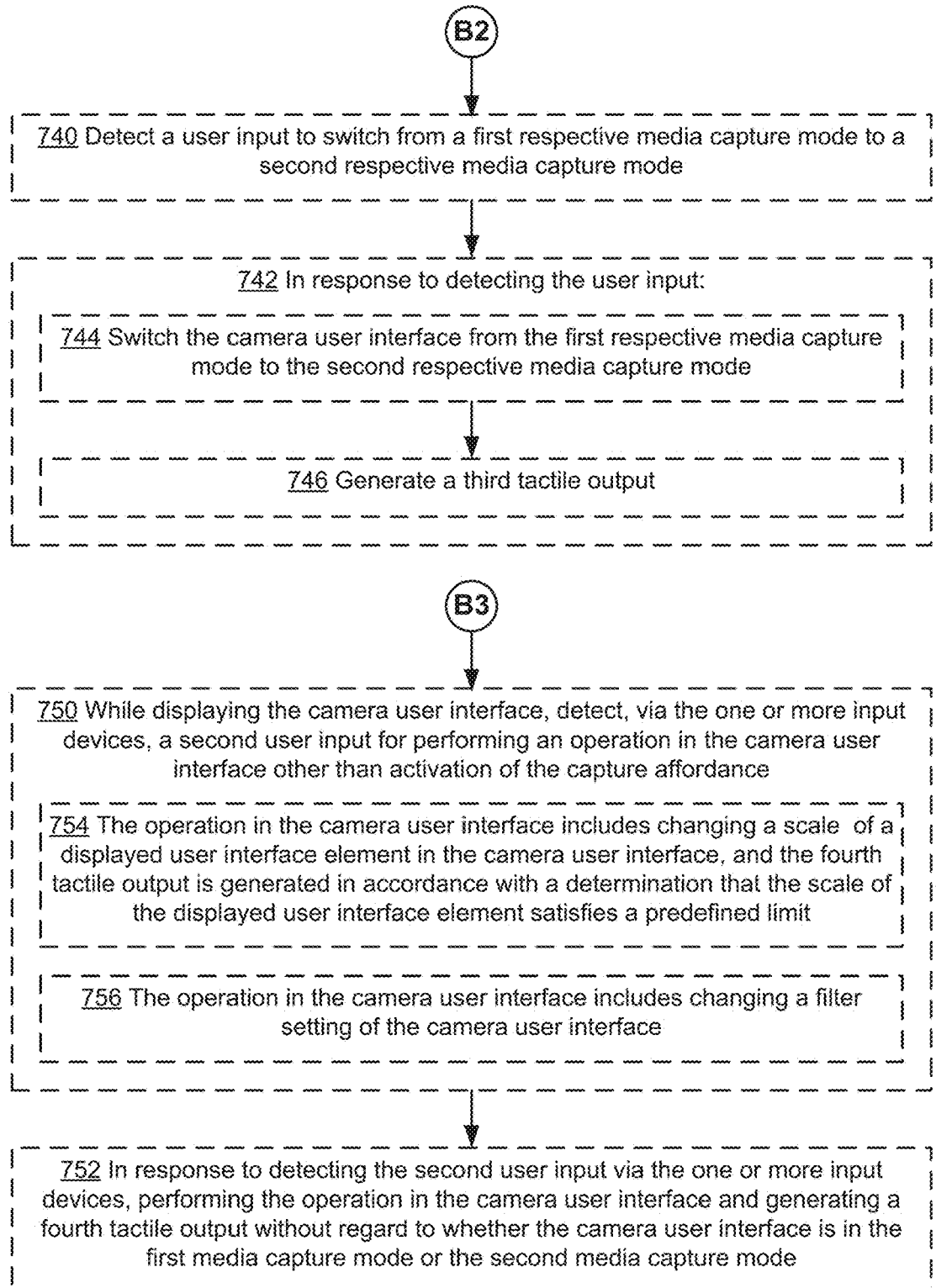

Below, FIGS. 1A-1C, 2, and 3 provide a description of example devices. FIGS. 4A-4B and 5A-5BA illustrate example user interfaces for accessing locked mode features of a device, and for providing tactile outputs to a user while accessing camera application features, while suppresses or reducing the amplitude of various tactile outputs so as to avoid interference with recording the audio portion of media being captured by the camera application. FIGS. 6A-6H illustrate a flow diagram of a method of accessing locked mode features of a device. FIGS. 7A-7C illustrate a flow diagram of a method of accessing camera application features of a device, including providing tactile outputs to confirm user inputs, while suppressing or reducing the amplitude of various tactile outputs so as to avoid interference with recording the audio portion of media being captured by the camera application. The user interfaces in FIGS. 5A-5BA are used to illustrate the processes in FIGS. 6A-6H, and 7A-7C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
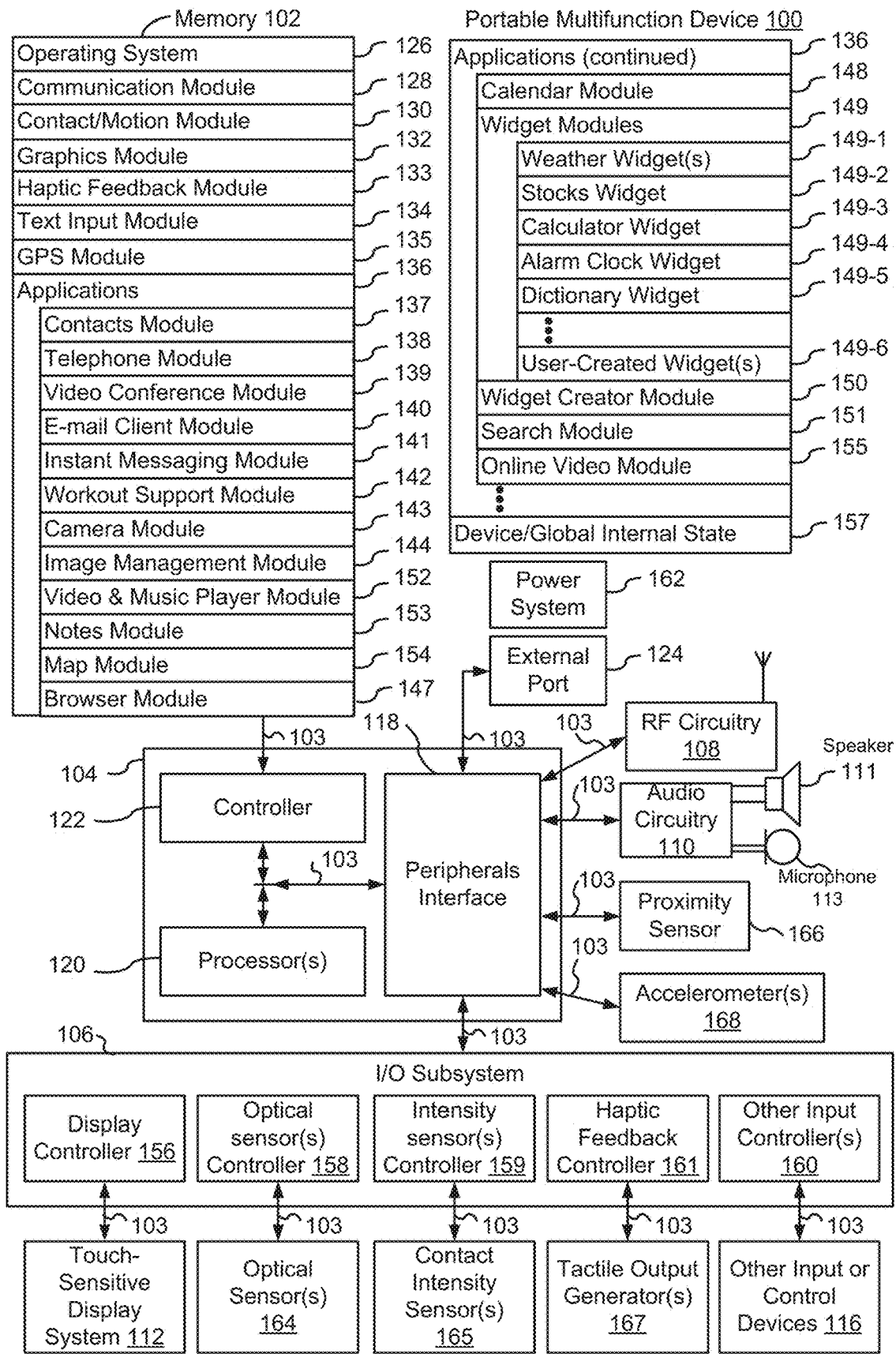
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

Figure 4A:
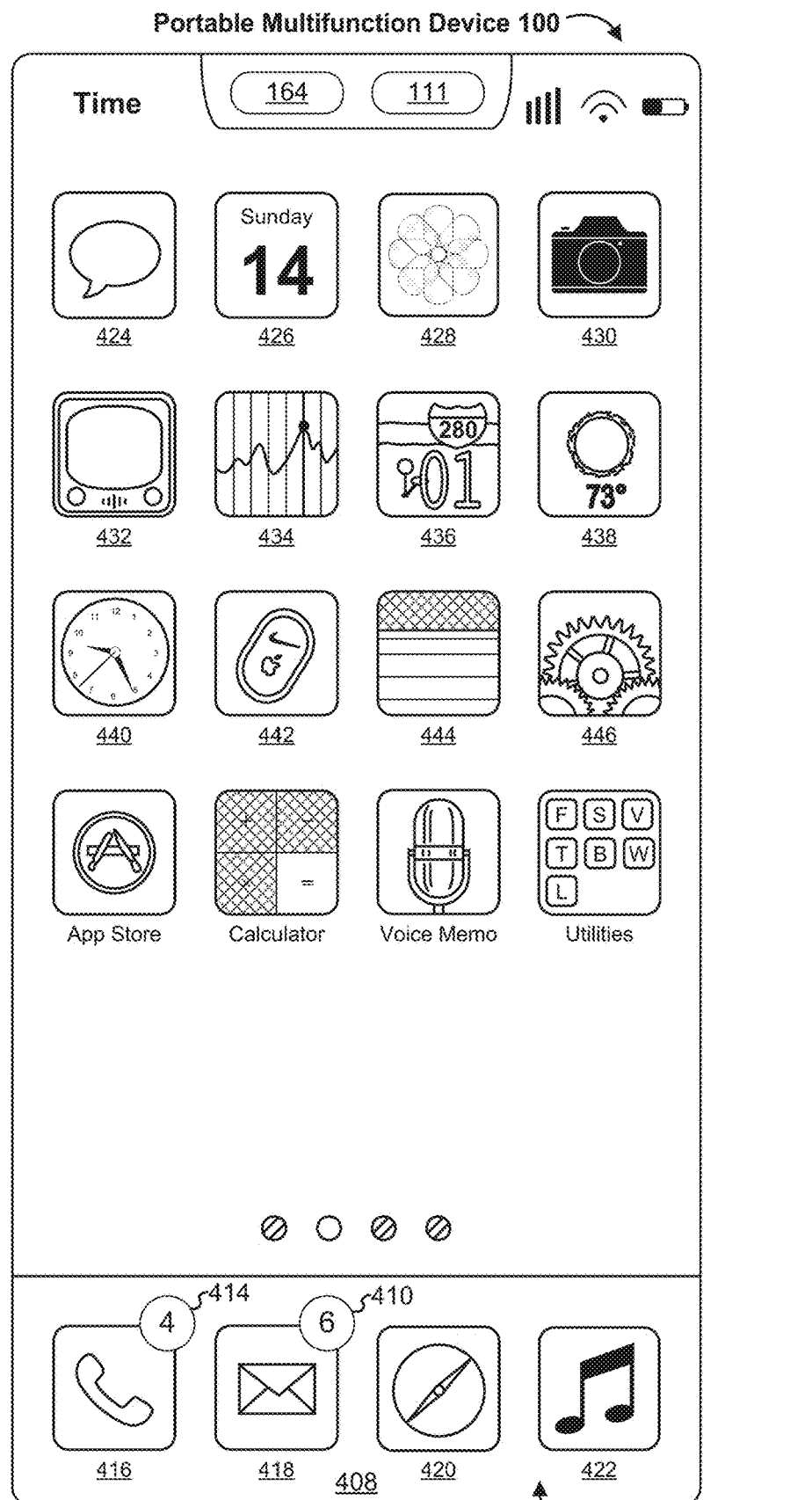
FIG. 4A illustrates an example user interface for a menu of applications on a portable multifunction device in accordance with some embodiments.
Figure 4B:
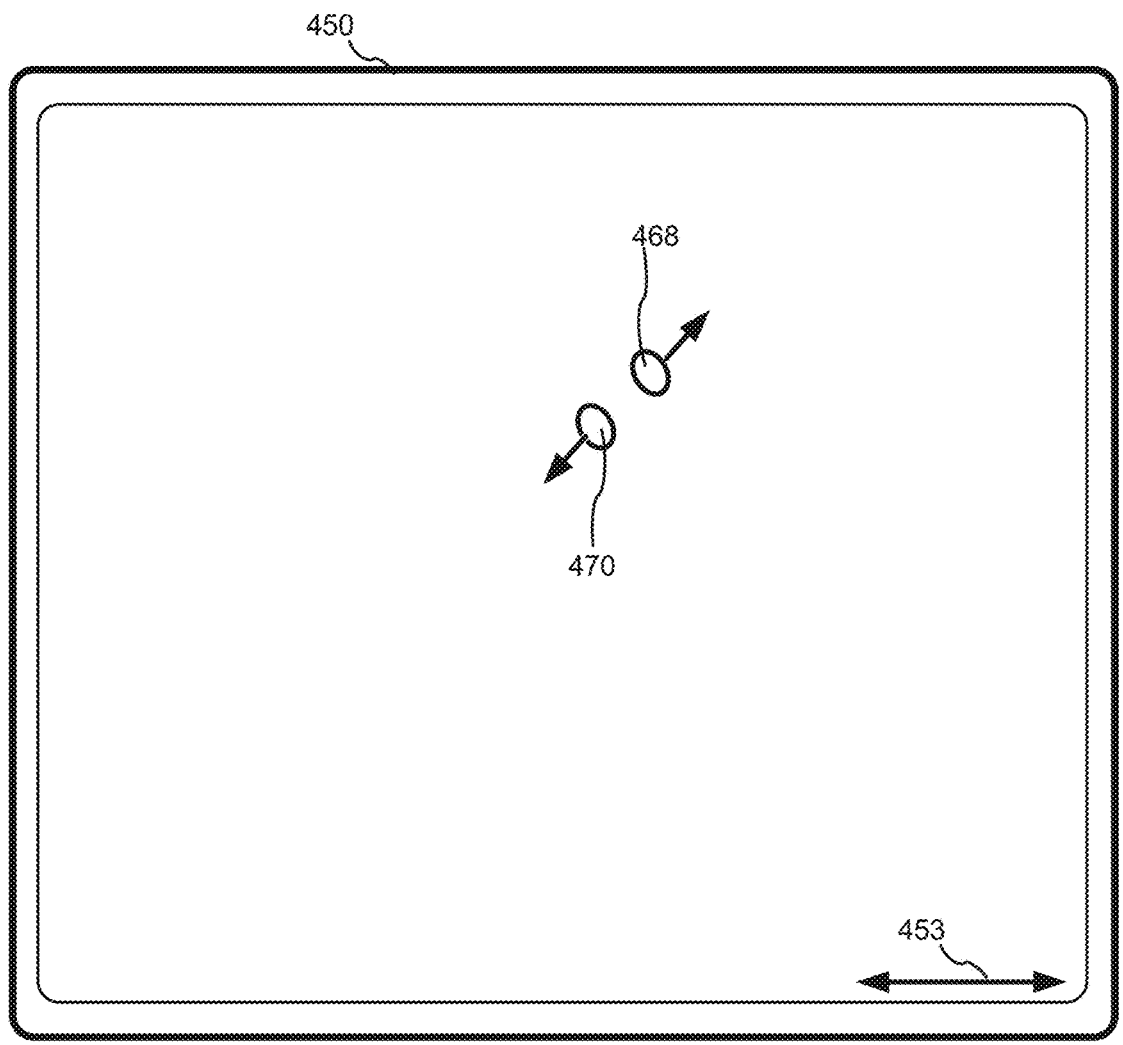
FIG. 4B illustrates an example user interface for a multifunction device with a touch-sensitive surface that is separate from the display in accordance with some embodiments.
Figure 4B:
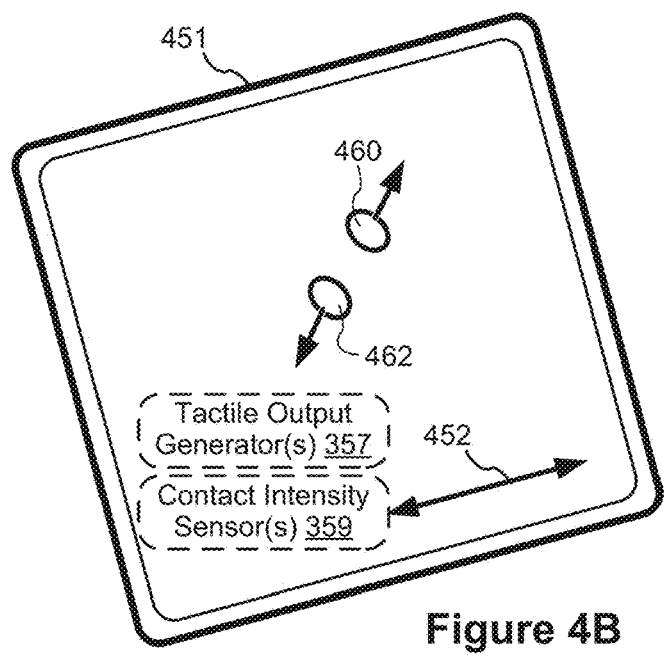
Figure 4C:
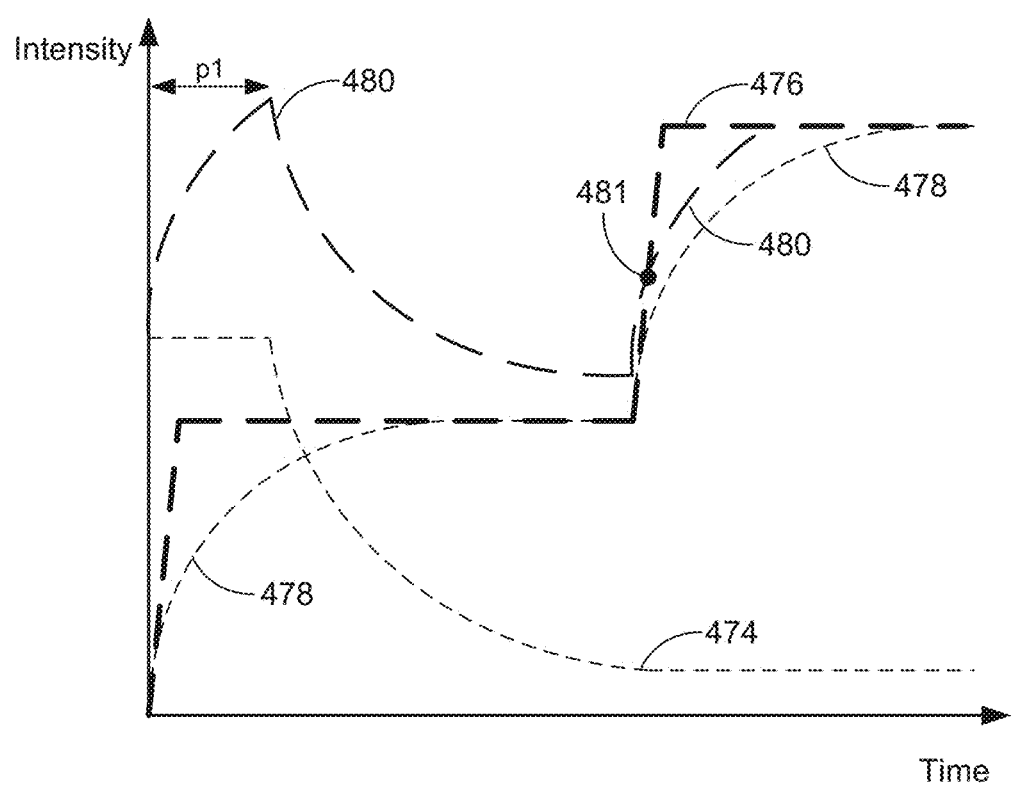
FIGS. 4C-4E illustrate examples of dynamic intensity thresholds in accordance with some embodiments.
Figure 4D:
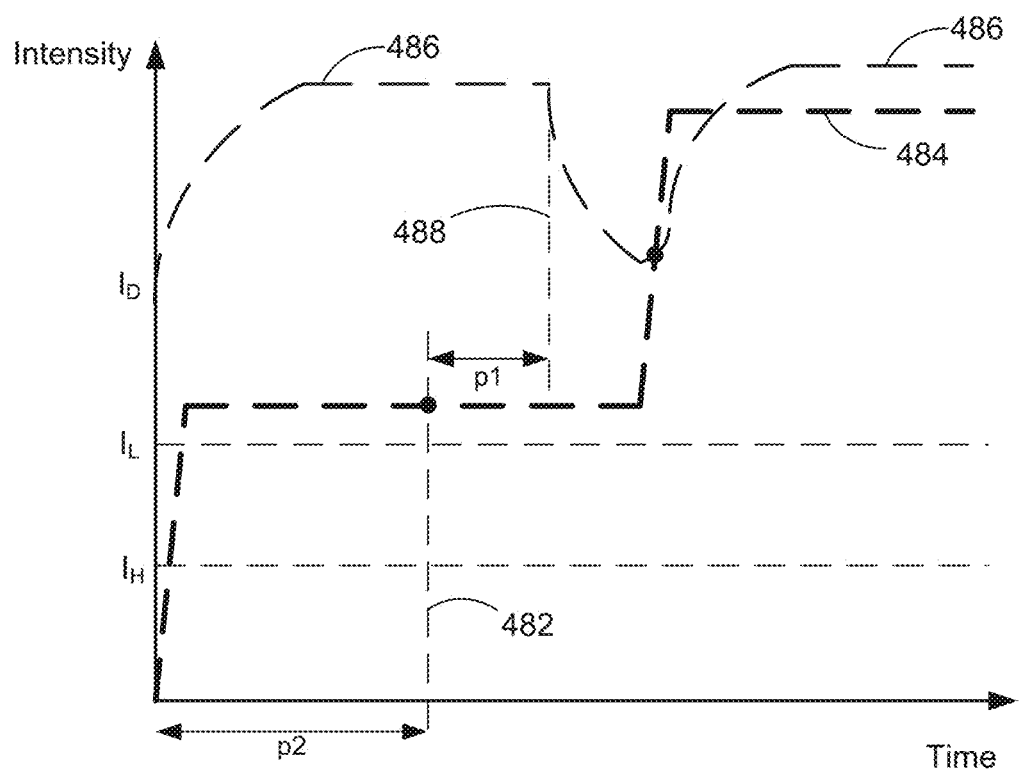
Figure 4E:
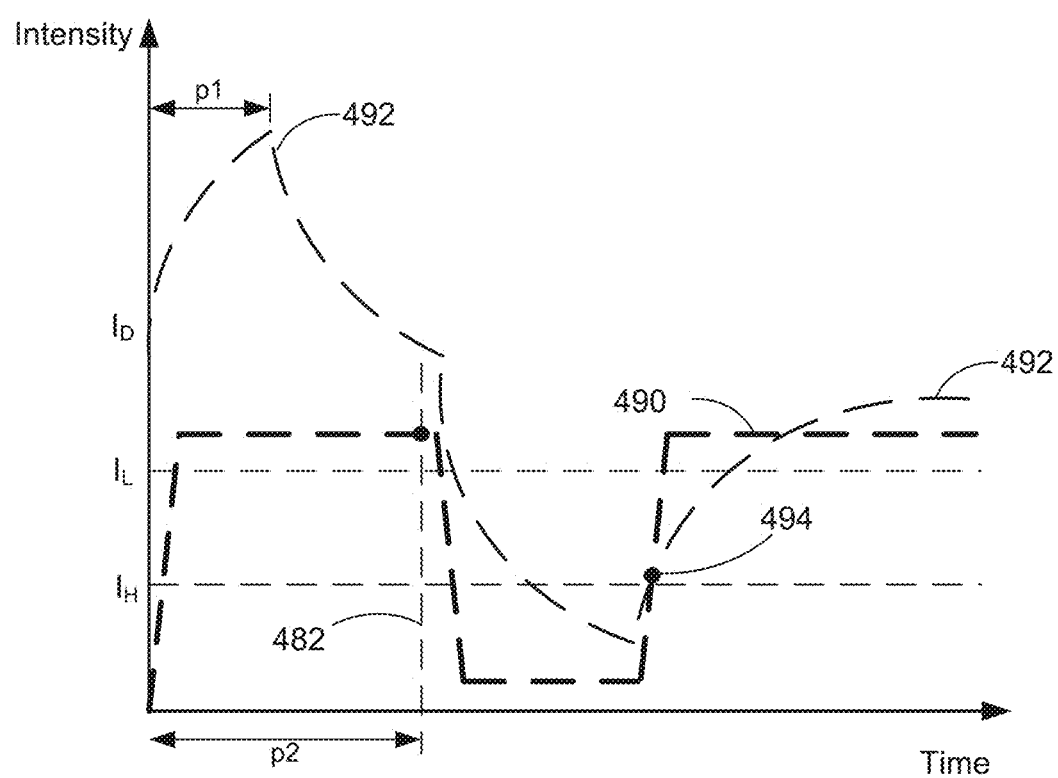
Figure 4F:
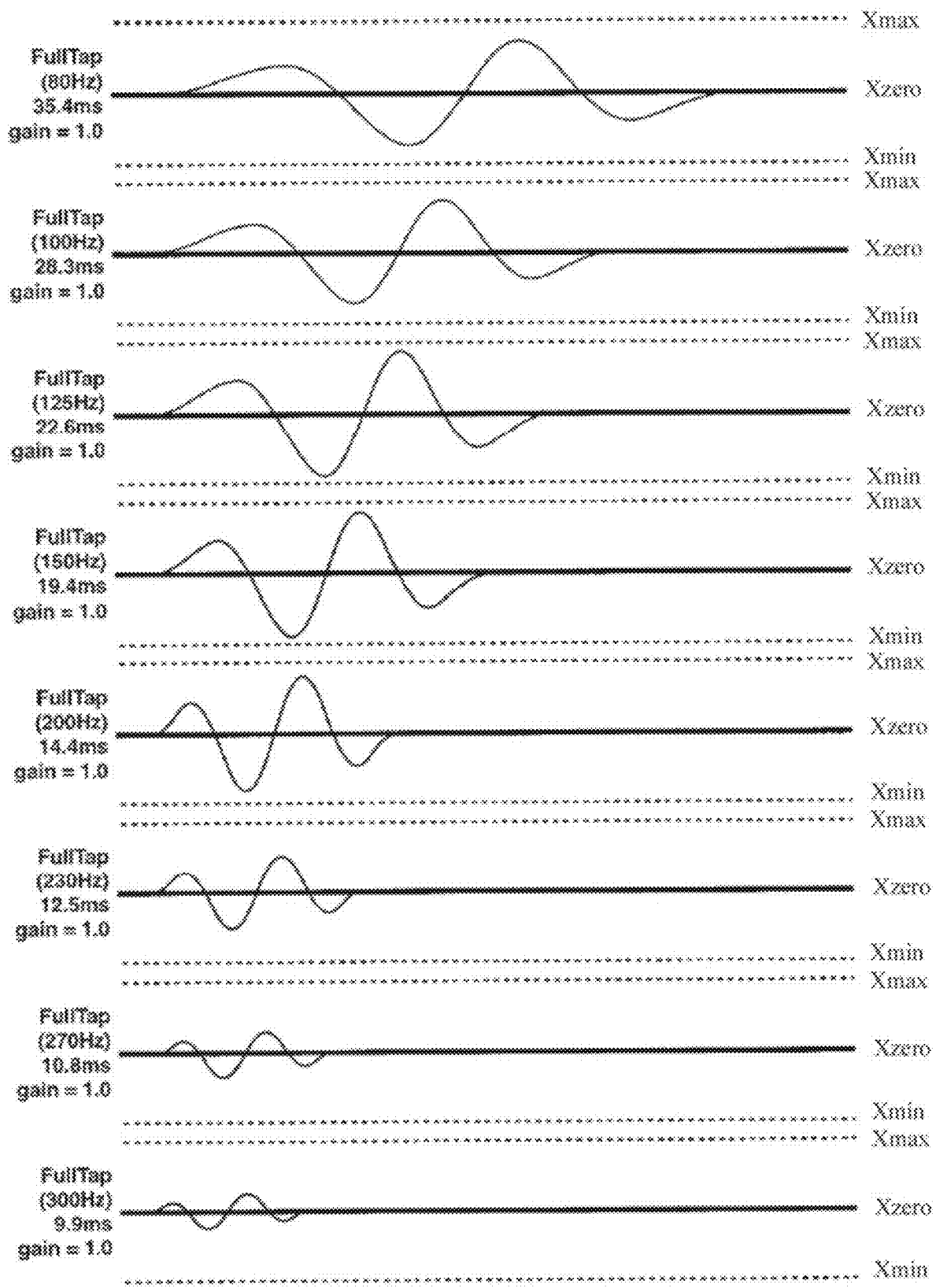
FIGS. 4F-4K illustrate a set of sample tactile output patterns in accordance with some embodiments.
Figure 4G:
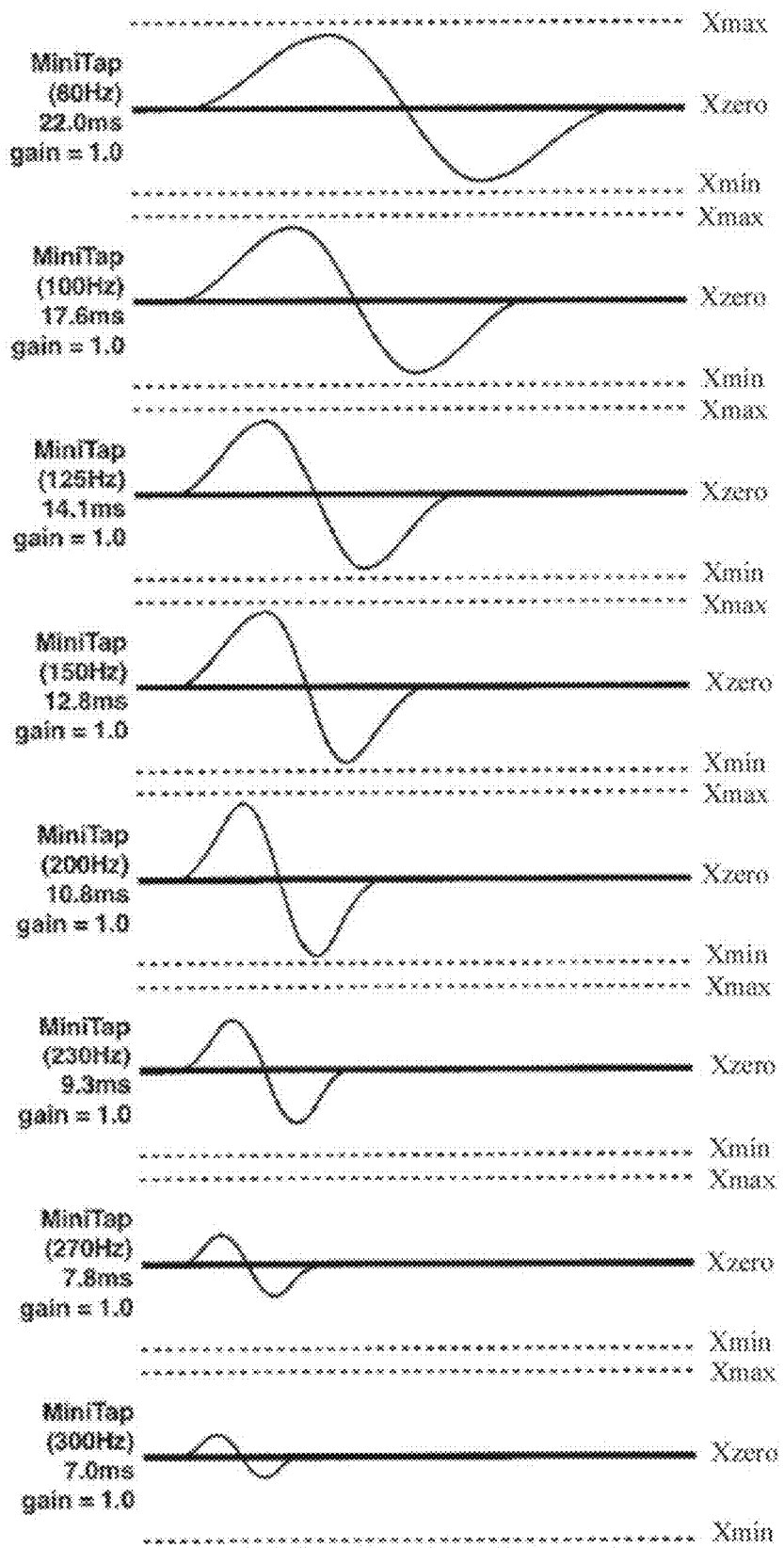
Figure 4H:
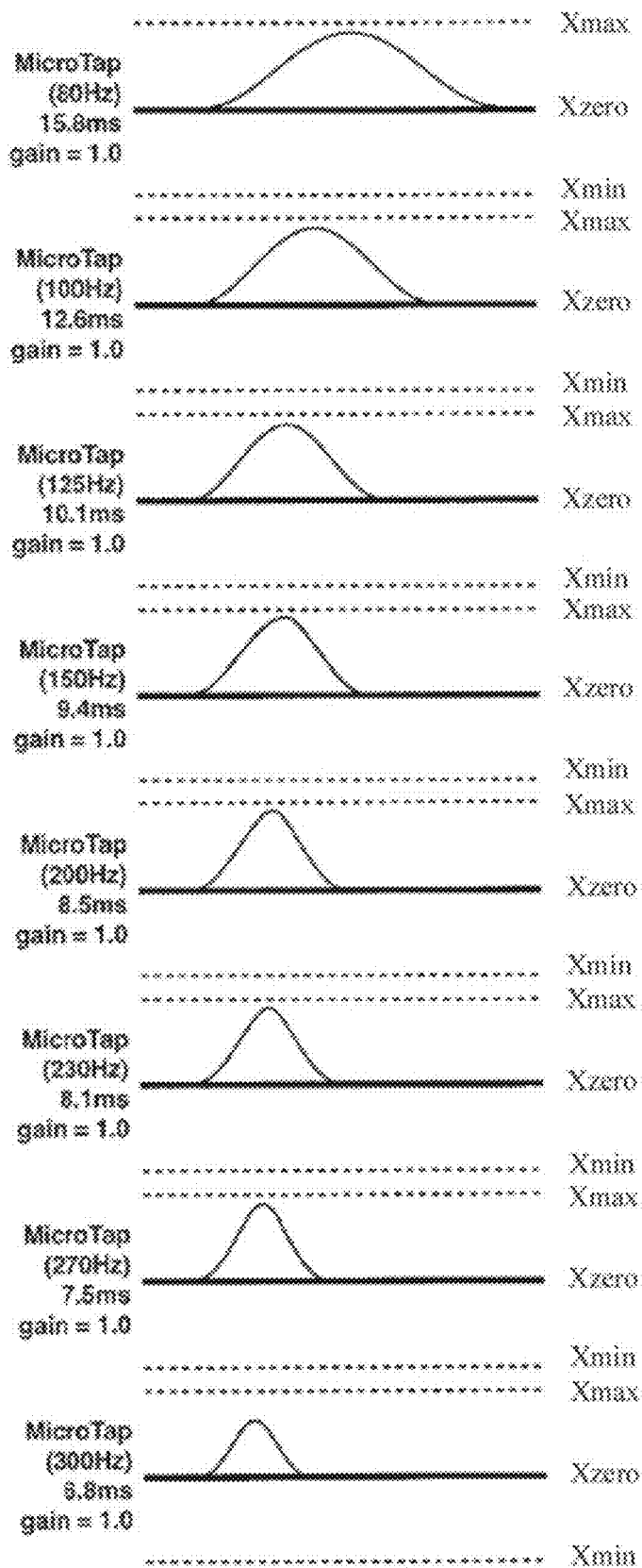
Figure 4I:
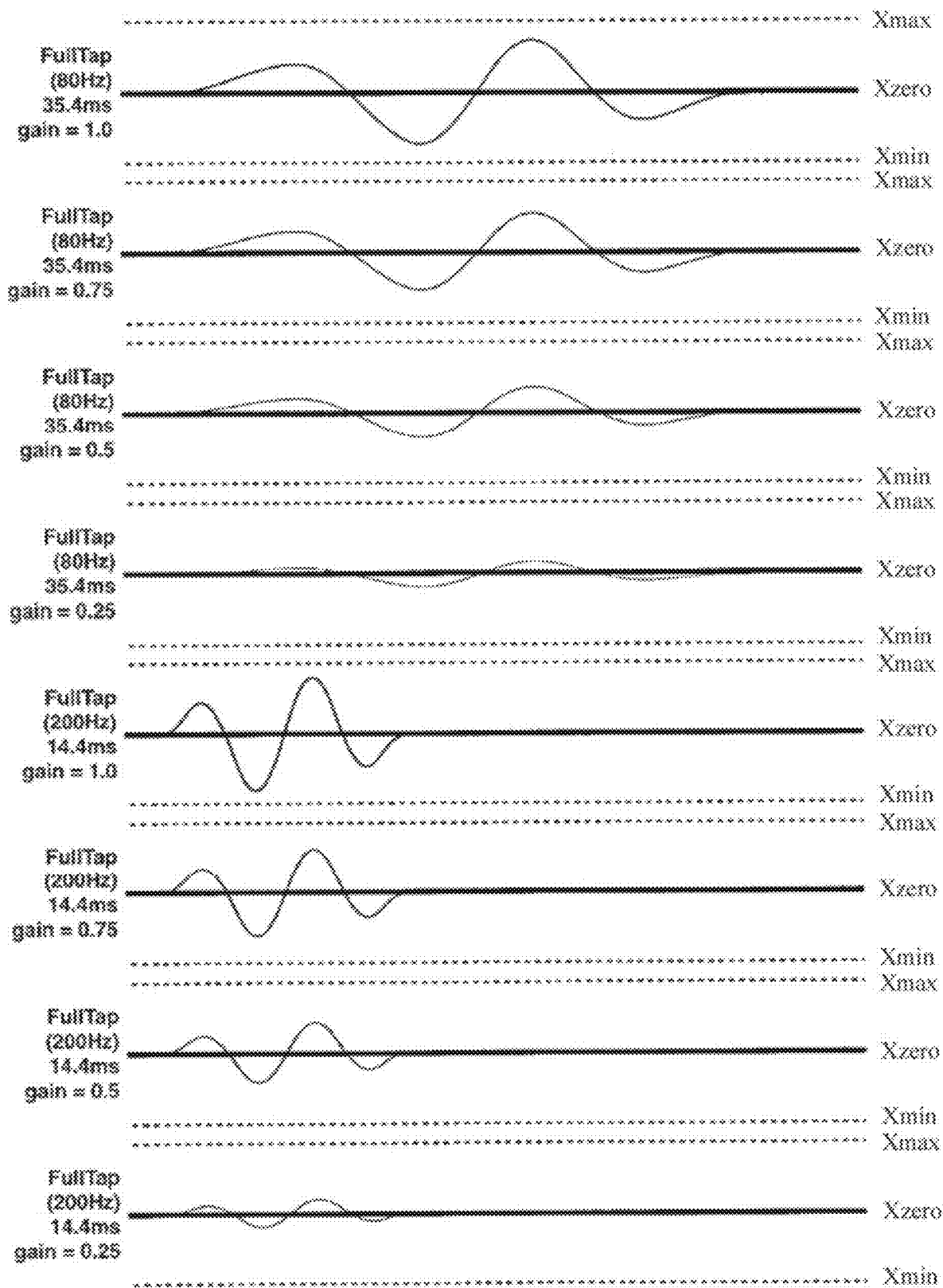
Figure 4J:
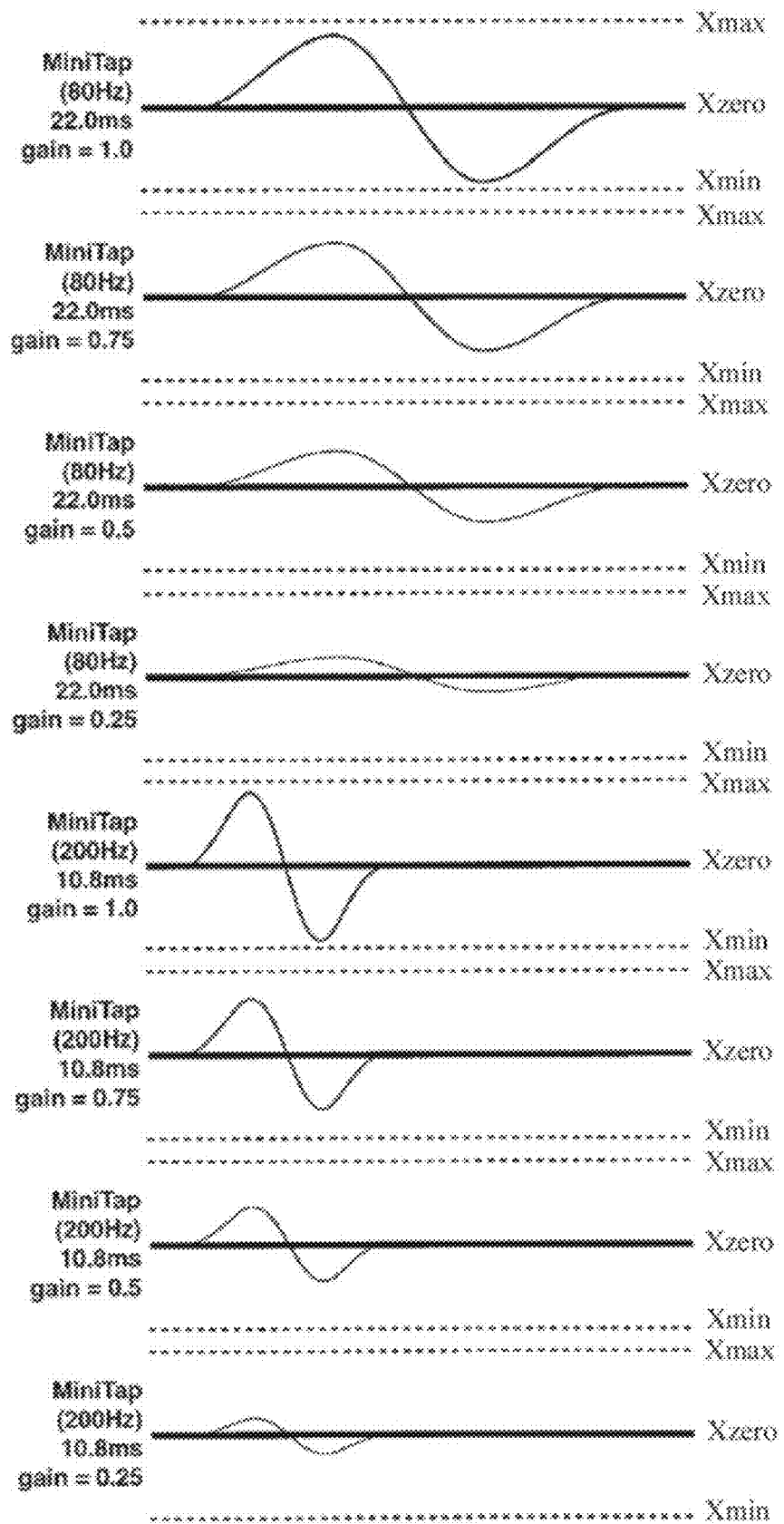
Figure 4K:
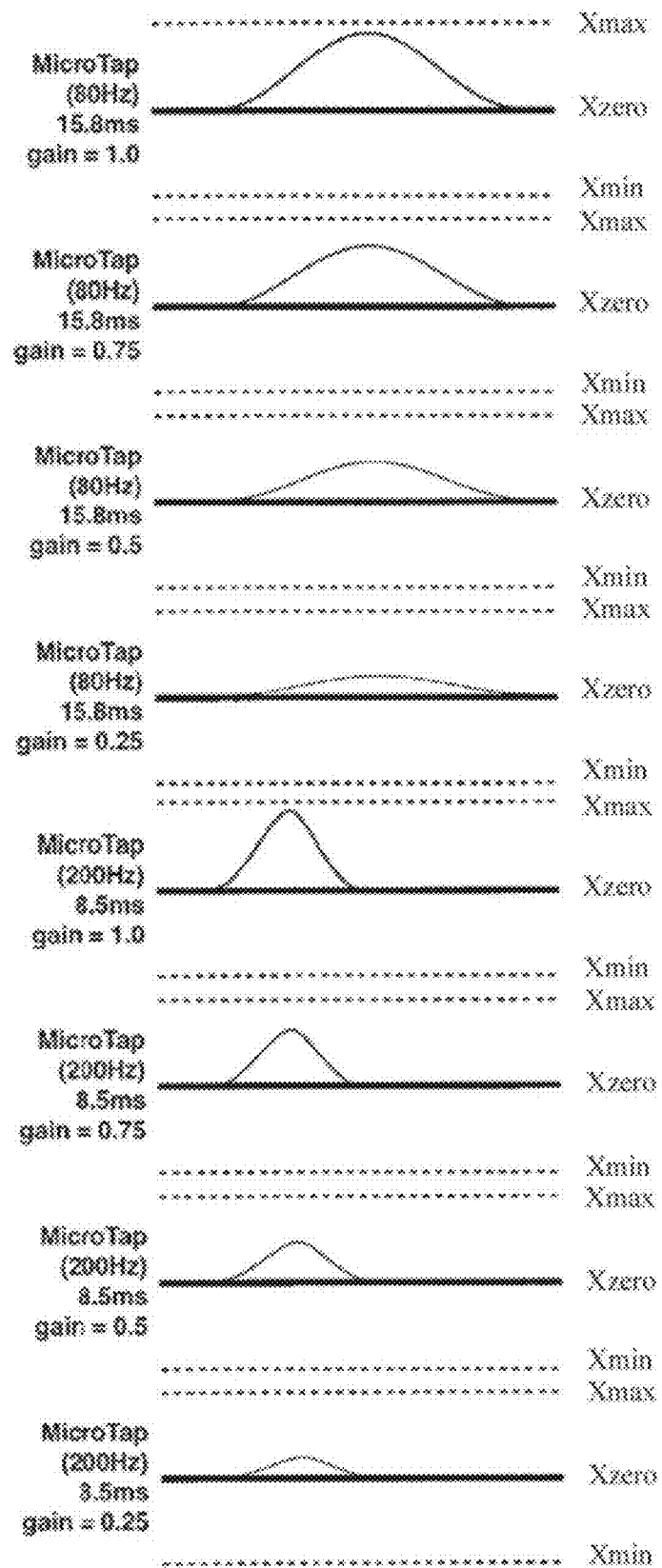

FIGS. 4F-4H provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in this figure, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 4I-4K, which are each shown with variants having a gain of 1.0, 0.75, 0.5, and 0.25. As shown in FIGS. 4I-4K, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 4F-4K show tactile output patterns that have a particular waveform. The waveform of a tactile output pattern represents the pattern of physical displacements relative to a neutral position (e.g., $x_{zero}$) versus time that a moveable mass goes through to generate a tactile output with that tactile output pattern. For example, a first set of tactile output patterns shown in FIG. 4F (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 4G (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 4H (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 4F-4K include $x_{min}$ and $x_{max}$ values which represent the maximum and minimum extent of movement of the moveable mass. For larger electronic devices with larger moveable masses, there may be larger or smaller minimum and maximum extents of movement of the mass. The examples shown in FIGS. 4F-4K describe movement of a mass in 1 dimension, however similar principles would also apply to movement of a moveable mass in two or three dimensions.

As shown in FIGS. 4F-4H, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 4F-4H, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 4F). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 4F-4H, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 4F-4H for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
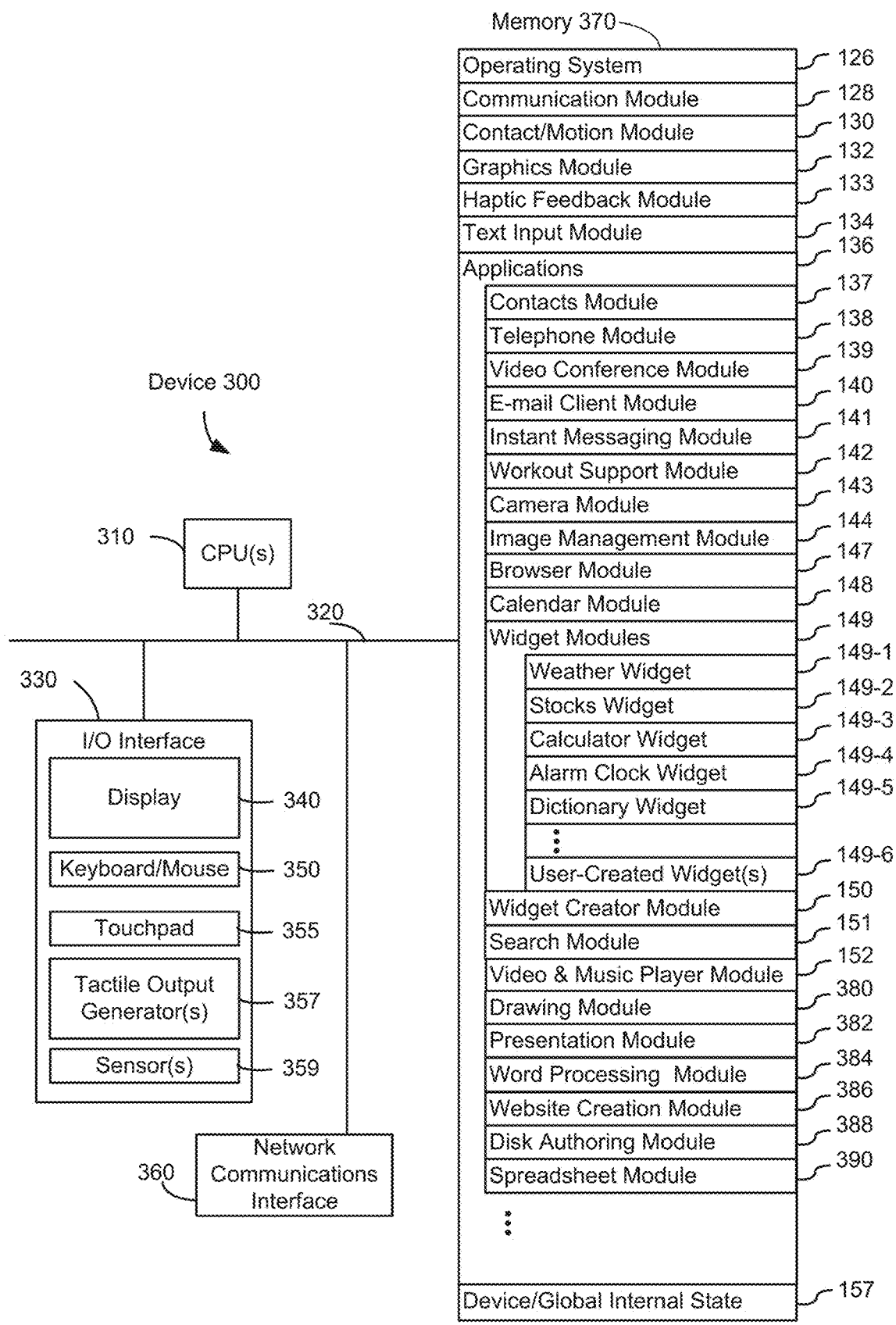
FIG. 3 is a block diagram of an example multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other;

and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;

camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
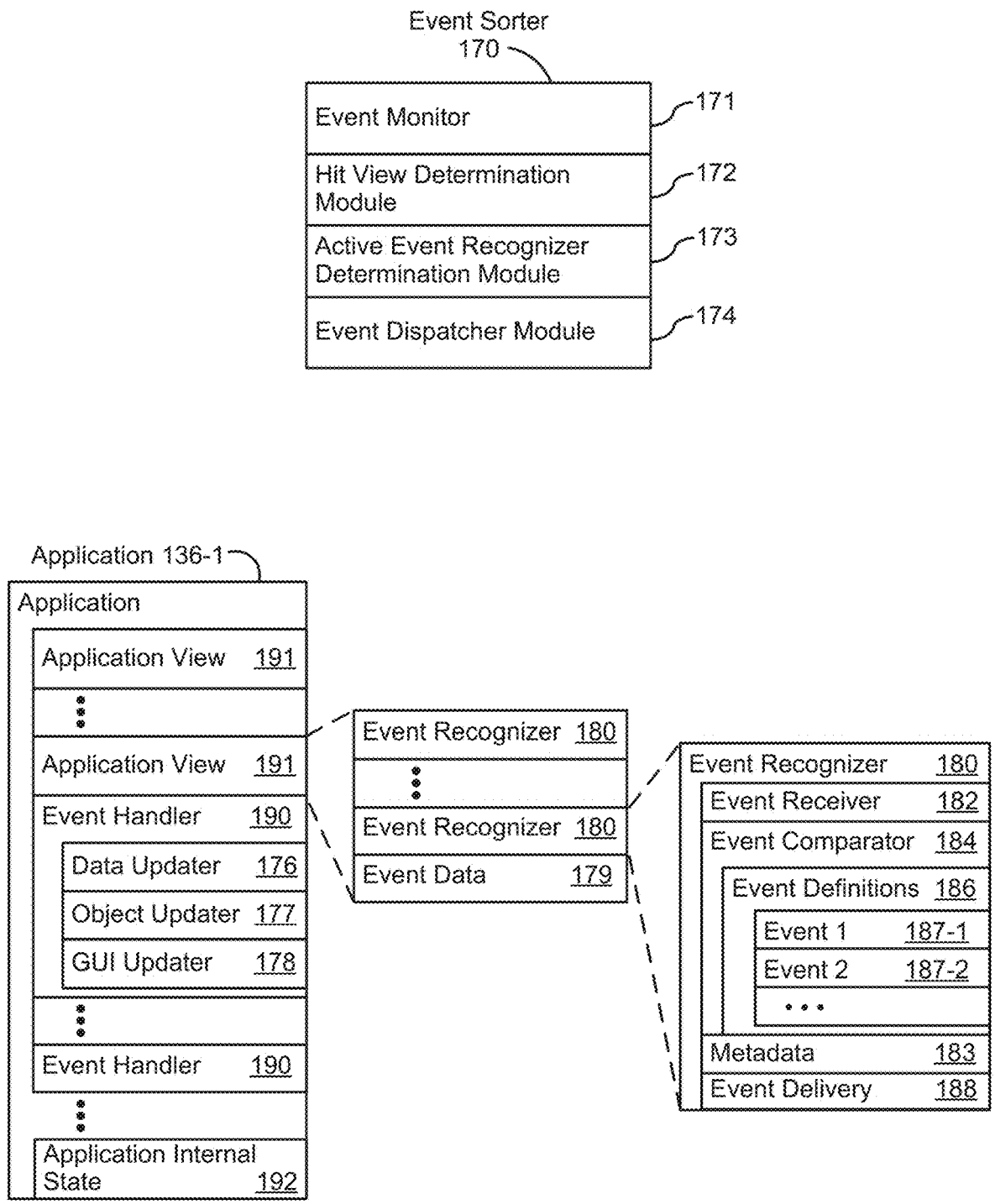
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
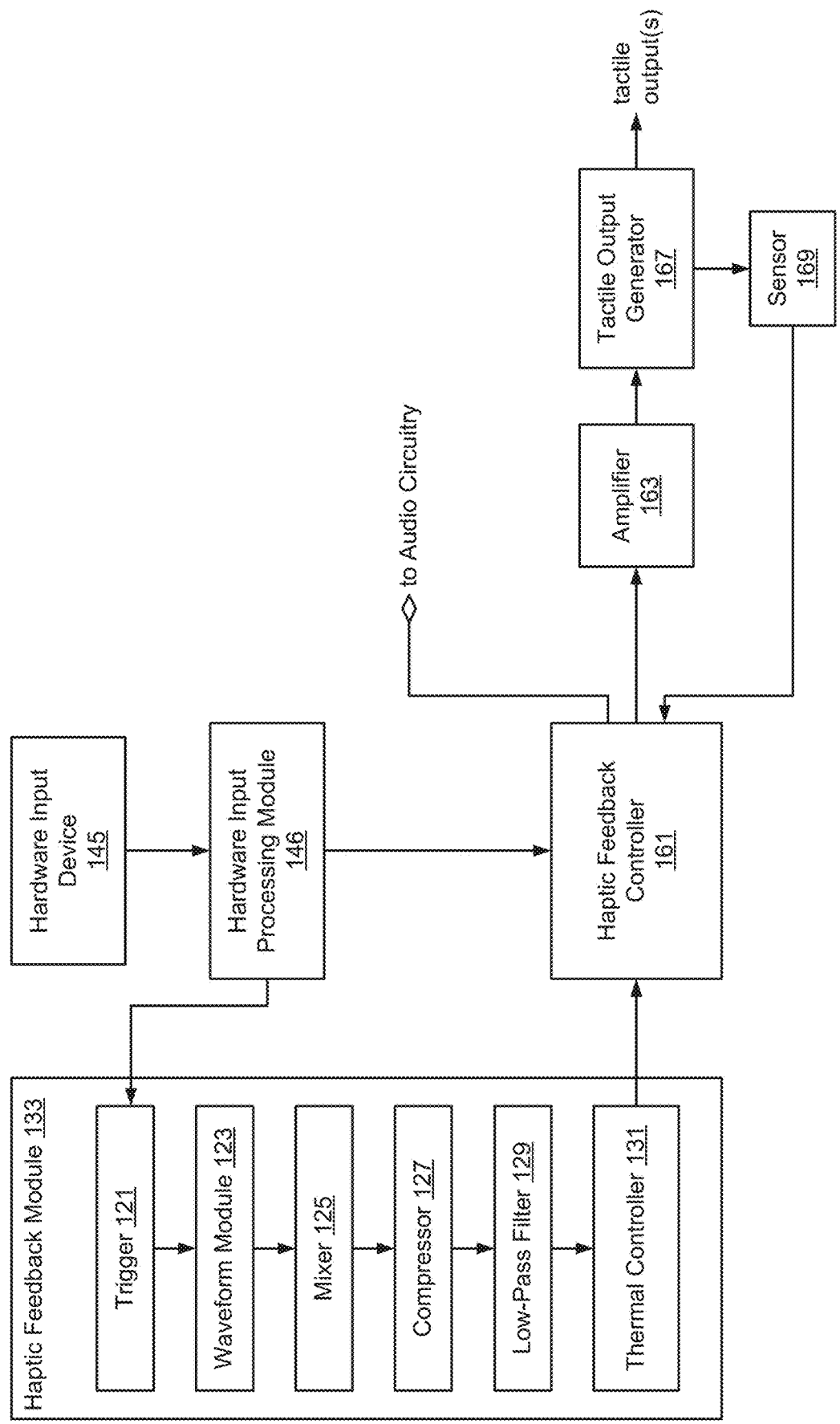
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123, such as the waveforms described in greater detail below with reference to FIGS. 4F-4G).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g. haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

Figure 2:
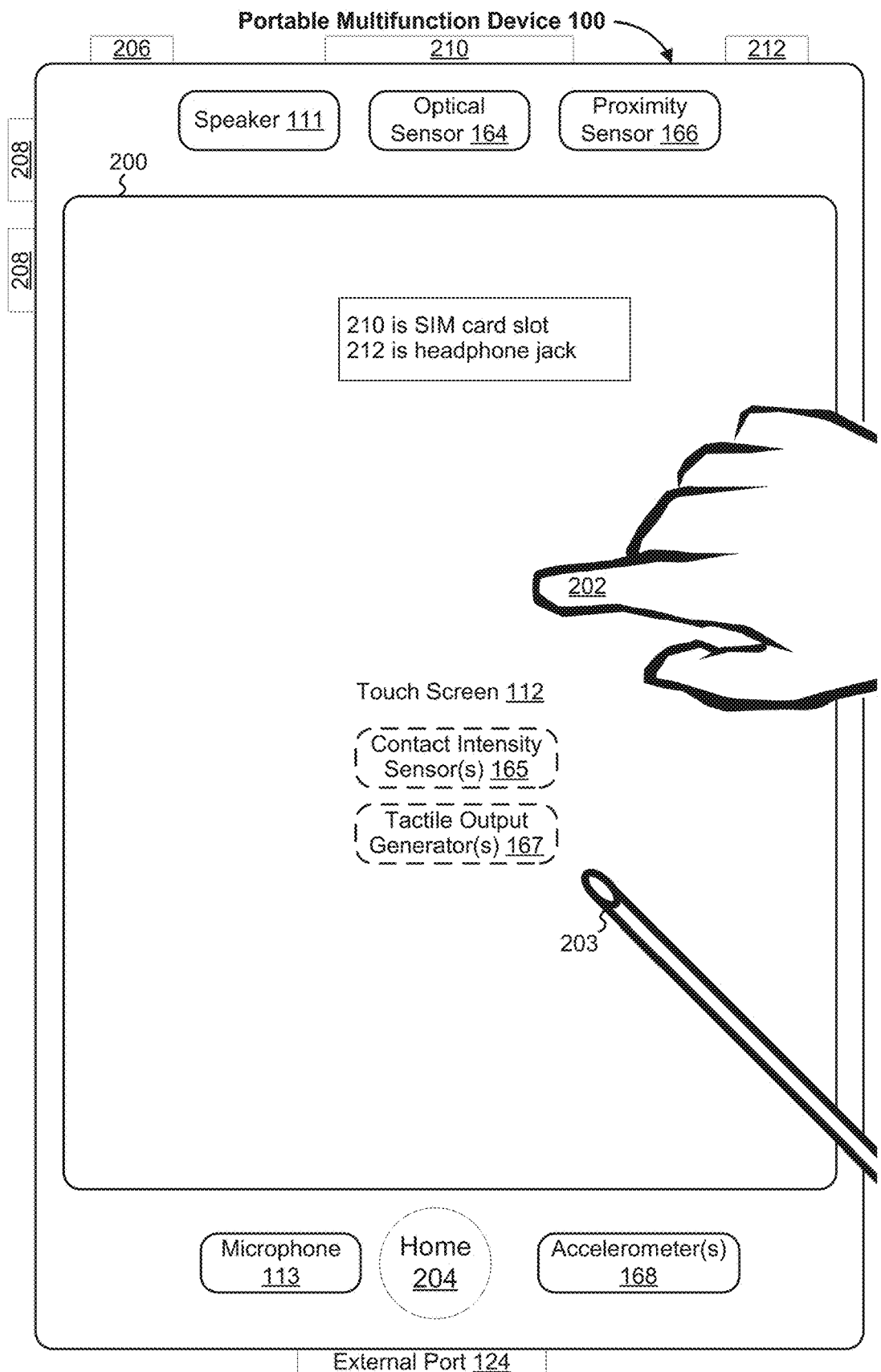
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, labeled "Music;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$) (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

FIG. 4D illustrates another dynamic intensity threshold 486 (e.g., intensity threshold $IT_D$). FIG. 4D also illustrates two other intensity thresholds: a first intensity threshold $IT_H$ and a second intensity threshold $IT_L$. In FIG. 4D, although touch input 484 satisfies the first intensity threshold $IT_H$ and the second intensity threshold $IT_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $IT_L$ was triggered). This type of dynamic intensity threshold reduces accidental triggering of a response associated with the dynamic intensity threshold $IT_D$ immediately after, or concurrently with, triggering a response associated with a lower intensity threshold, such as the first intensity threshold $IT_H$ or the second intensity threshold $IT_L$.

FIG. 4E illustrate yet another dynamic intensity threshold 492 (e.g., intensity threshold $IT_D$). In FIG. 4E, a response associated with the intensity threshold $IT_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $IT_L$, followed by an increase in the intensity of touch input 490, without releasing touch input 490, can trigger a response associated with the intensity threshold $IT_D$ (e.g., at time 494) even when the intensity of touch input 490 is below another intensity threshold, for example, the intensity threshold $IT_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Although only specific frequencies, amplitudes, and waveforms are represented in the sample tactile output patterns in FIGS. 4F-4K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well.

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

Figure 5A:
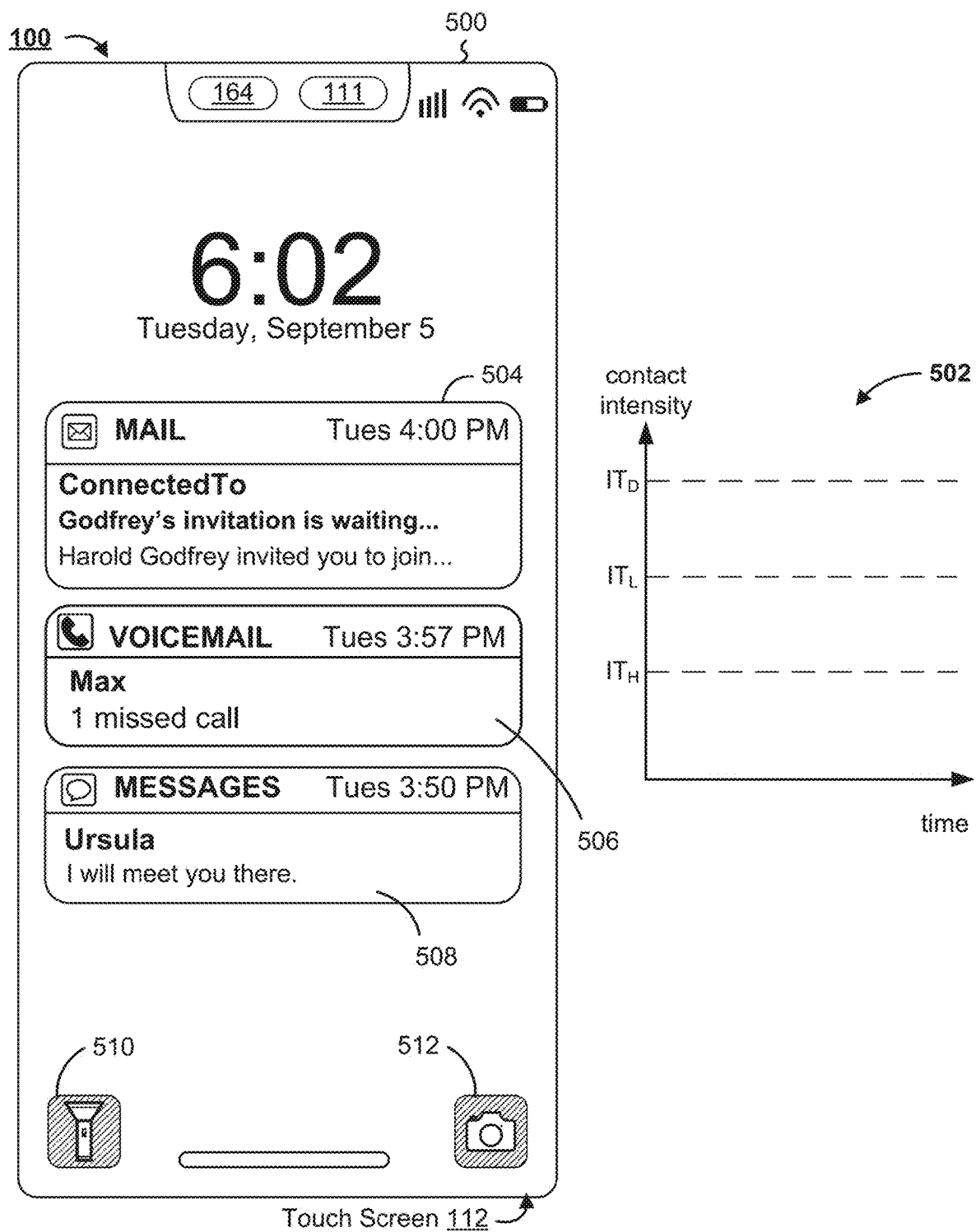
FIGS. 5A-5BA illustrate example user interfaces for generating tactile outputs in accordance with some embodiments.
Figure 5B:
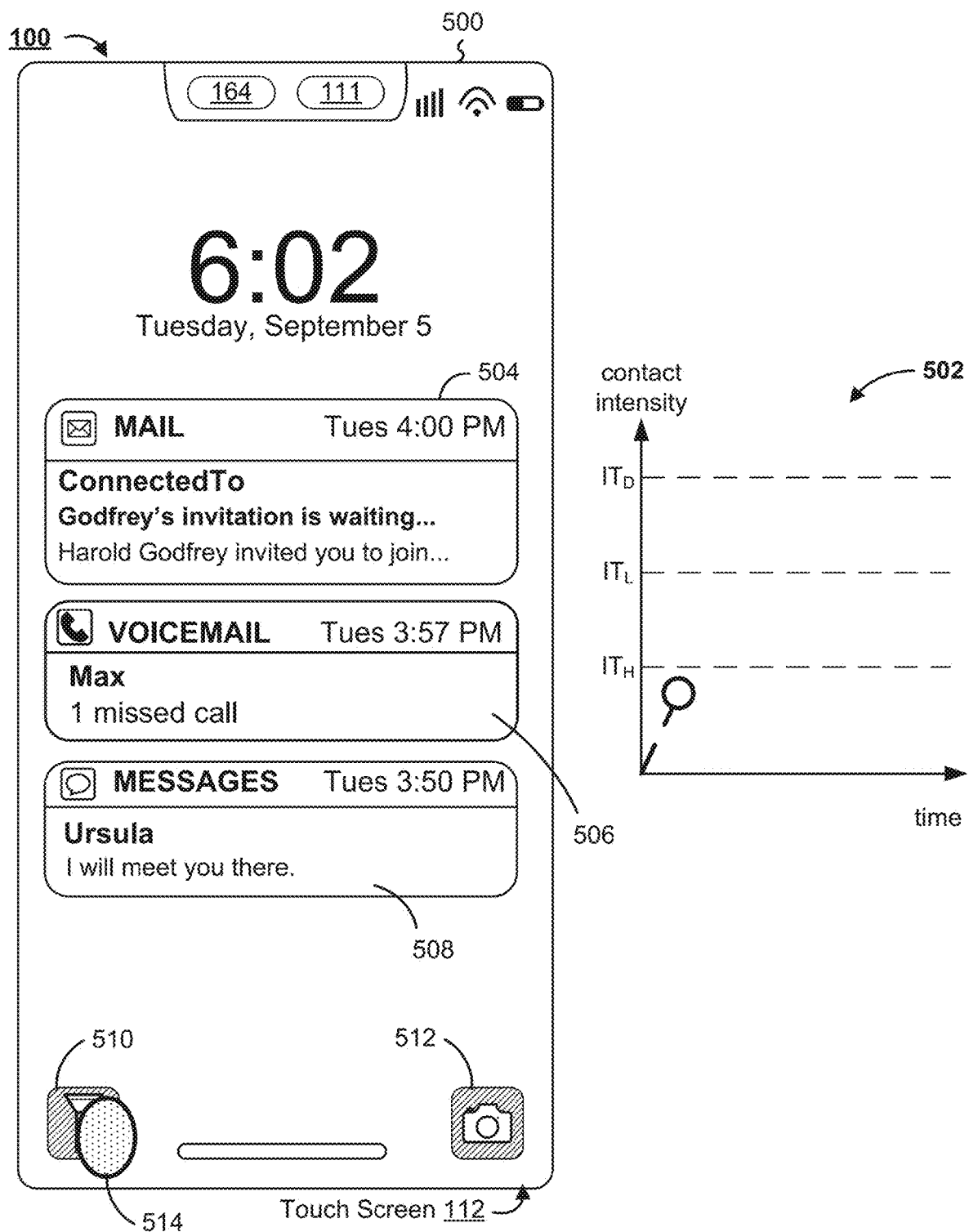

FIGS. 5A-5BA illustrate example user interfaces for generating tactile outputs in accordance with some embodiments. The user interfaces in these figures are used to illustrate the processes described below, including the processes in FIGS. 6A-6H and 7A-7C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5BA illustrate example user interfaces for generating tactile outputs in accordance with some embodiments.

FIG. 5A illustrates a lock screen user interface 500 displayed on touch screen 112 of device 100. In some embodiments, lock screen 500 is displayed upon waking device 100 from a screen-off to a screen-on state. Lock screen 500 includes a plurality of user interface elements, including a list of notifications 504, 506, and 508, flashlight icon 510, and camera icon 512. Flashlight icon 510 shows a light-colored flashlight on a darker background, corresponding to a flashlight of device 100 being in a deactivated state (e.g., turned off). Contact intensity graph 502 indicates the intensity of contacts detected on lock screen 500.

FIG. 5B illustrates a transition of lock screen 500 from FIG. 5A. FIG. 5B shows contact 514 detected on touch screen 112 at a location corresponding to flashlight icon 510. Contact intensity graph 502 shows that the contact intensity of contact 514 is below intensity threshold $IT_H$. No changes to lock screen 500 are displayed in response to detecting contact 514 with intensity below intensity threshold $IT_H$.

Figure 5C:
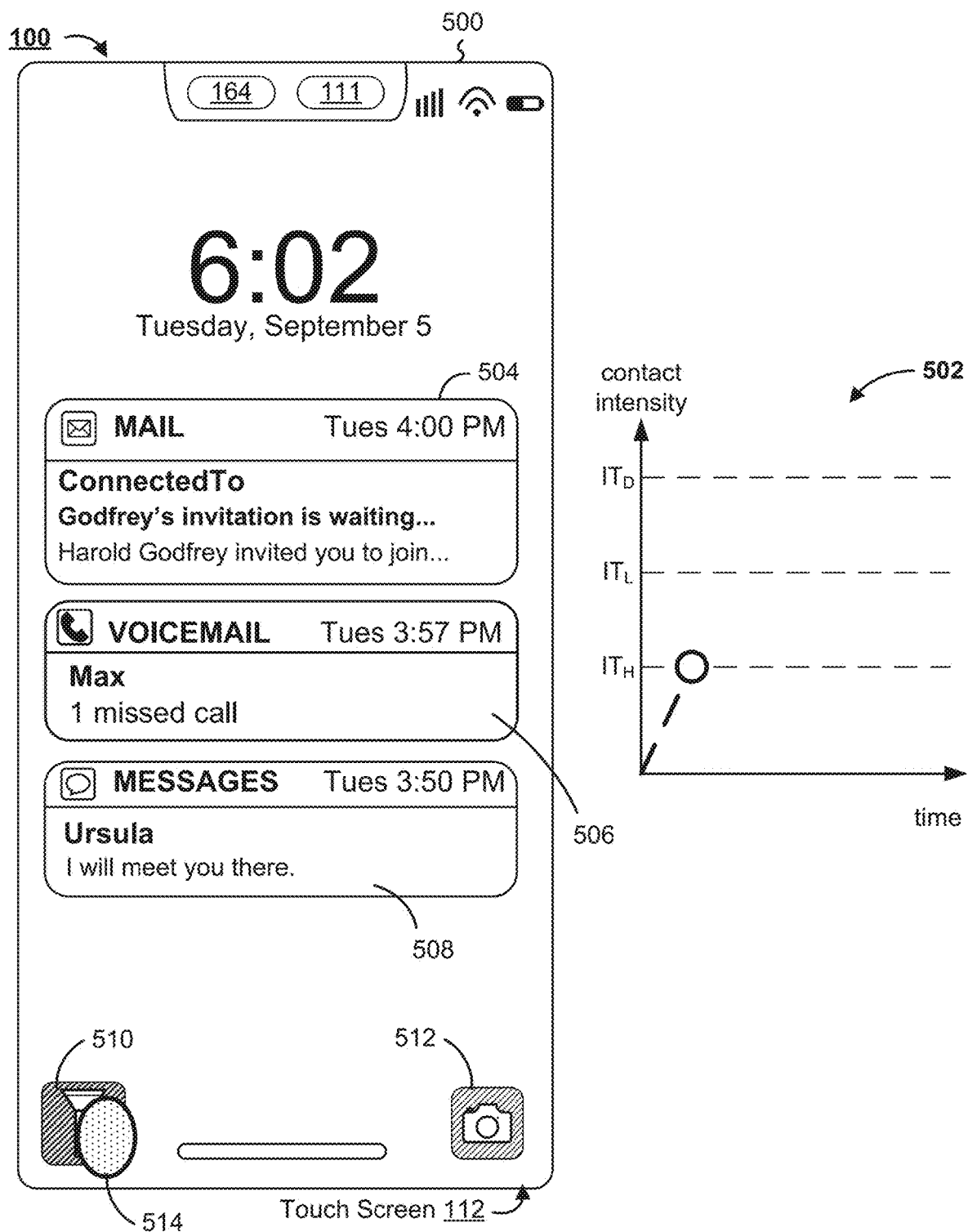

FIG. 5C illustrates a transition of lock screen 500 from FIG. 5B. In FIG. 5C, the intensity of contact 514 has increased to intensity threshold $IT_H$. In accordance with contact 514 having intensity $IT_H$, flashlight icon 510 is displayed with a transformation from its appearance in FIGS. 5A-5B. In particular, flashlight icon has a darker background and is larger in scale.

Figure 5D:
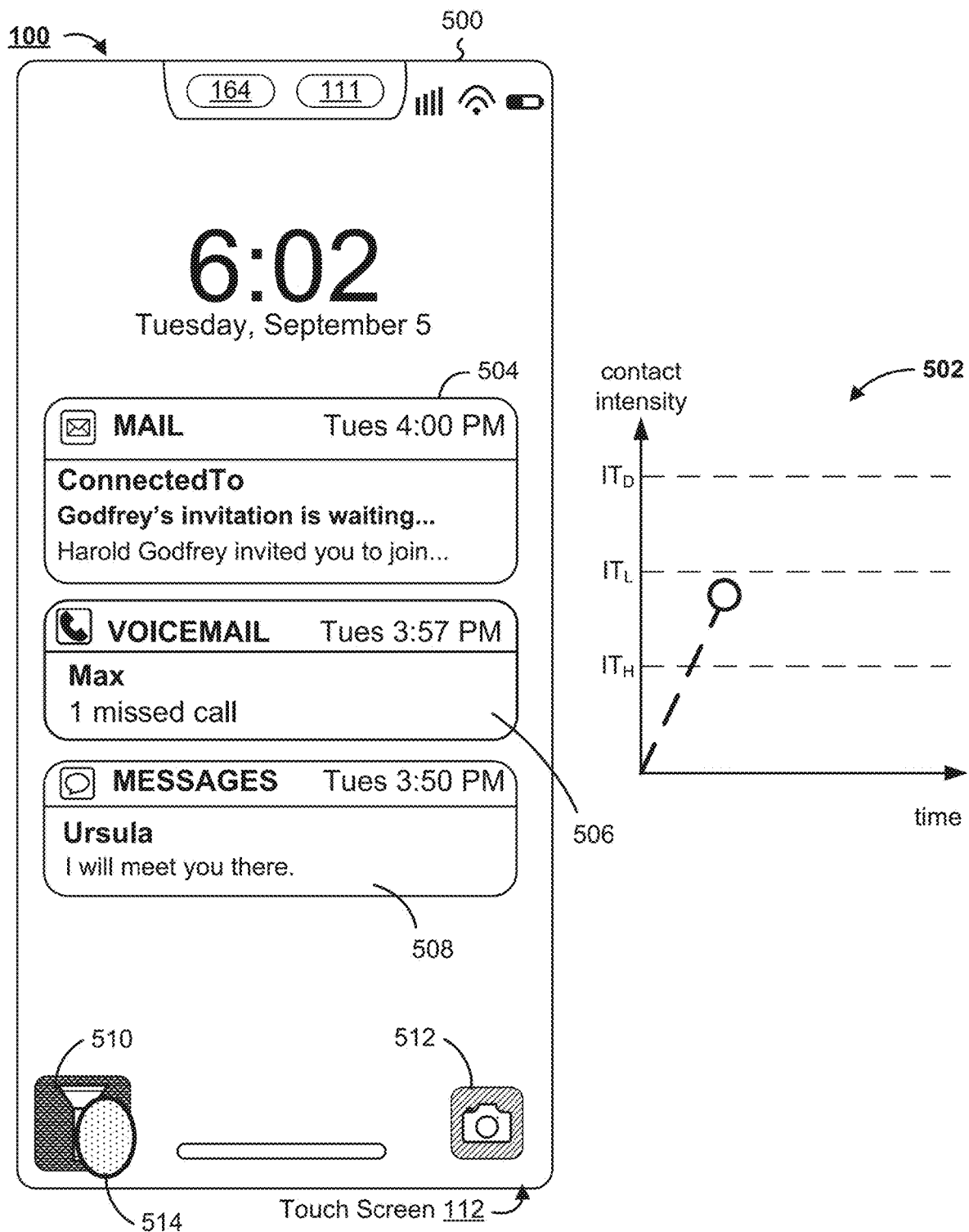

FIG. 5D illustrates a transition of lock screen 500 from FIG. 5C. In FIG. 5D, the intensity of contact 514 has increased above intensity threshold $IT_H$. In the example in FIG. 5D, the degree of transformation of flashlight icon 510 is based on the intensity of contact 514. Thus, in accordance with the increase in the intensity of contact 514, flashlight icon 510 has an even darker background and is even larger in scale than in FIG. 5C.

Figure 5E:
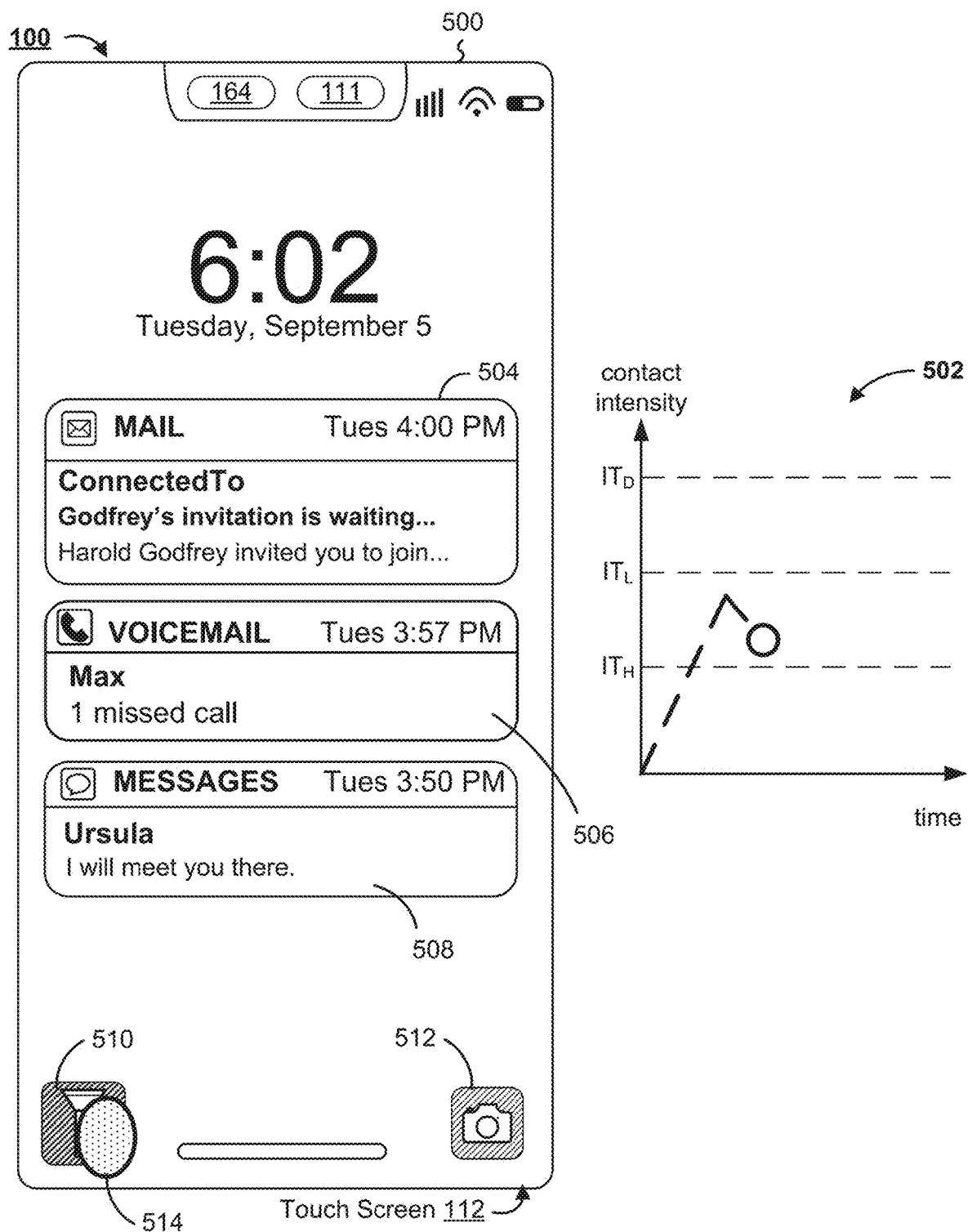

FIG. 5E illustrates a transition of lock screen 500 from FIG. 5D. In FIG. 5E, the intensity of contact 514 has decreased from its intensity in FIG. 5D, as shown in contact intensity graph 502. Because the degree of transformation of flashlight icon 510 is based on the intensity of contact 514, in accordance with the decrease in the intensity of contact 514, flashlight icon 510 has a lighter background and is smaller in scale (e.g., the transformation of flashlight icon 510 from FIG. 5C to 5D is reversed as a function of intensity).

Figure 5F:
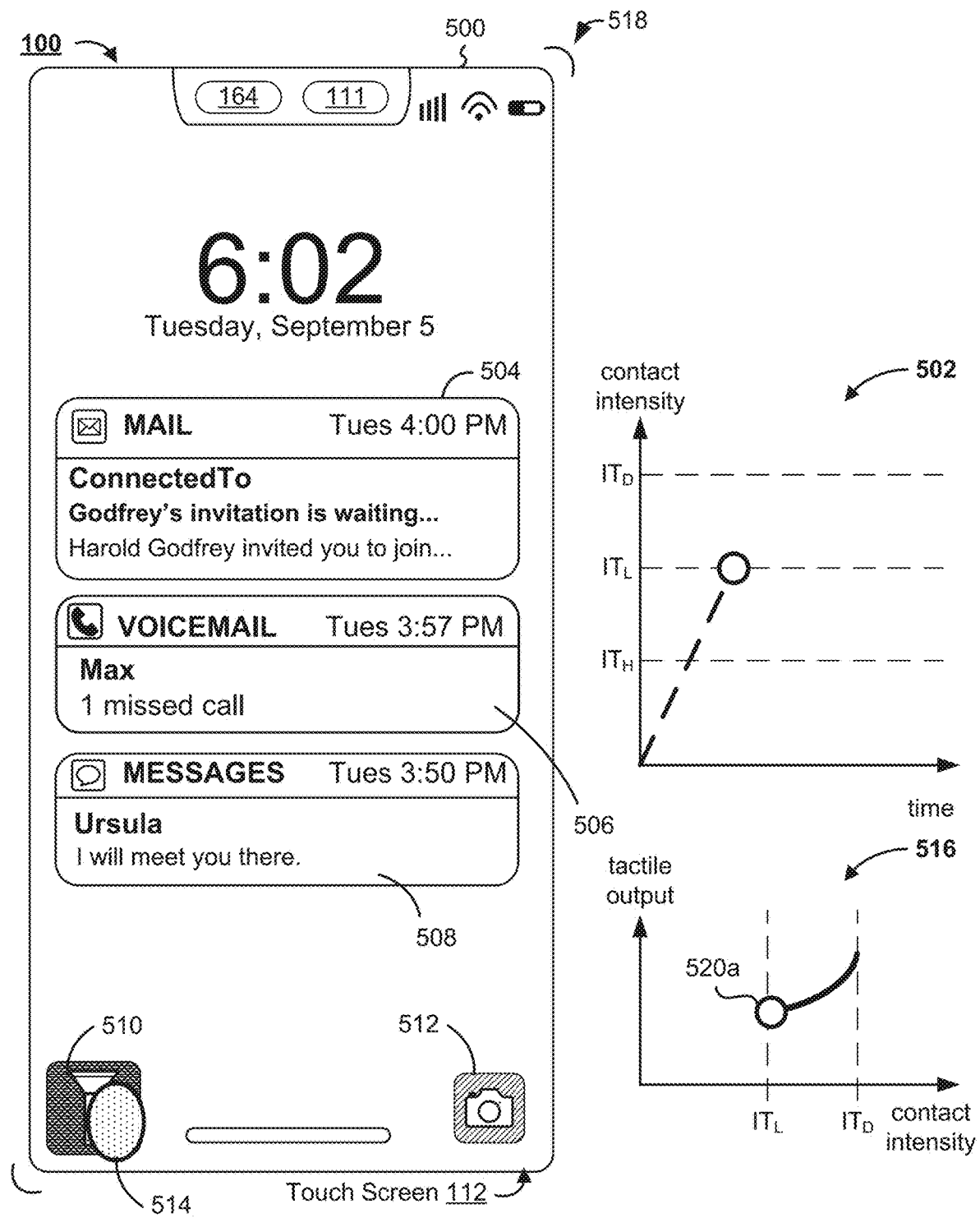

FIG. 5F illustrates an alternate transition of lock screen 500 from FIG. 5D. In FIG. 5F, the intensity of contact 514 has increased to intensity threshold $IT_L$, as shown in contact intensity graph 502. In some embodiments, as in the example shown in FIG. 5F, tactile output 518 is generated in accordance with the intensity of contact 514 reaching intensity threshold $IT_L$, and the intensity of the generated tactile output increases as the intensity of contact 514 continues to increase (e.g., approaches intensity threshold $IT_D$). Tactile output intensity graph 516 shows an example of how the intensity of the generated tactile output increases as a function of contact intensity. Accordingly, tactile output 518 is generated with tactile output intensity level 520a corresponding to contact intensity $IT_L$.

In some embodiments, tactile output 518, and other tactile outputs 522, 524, 528, 530, 532, 558, 570, 572, 588, 596, 589, 585 and 569 are implemented using various ones of tactile outputs types described above with respect to FIGS. 4F-4K.

Figure 5G:
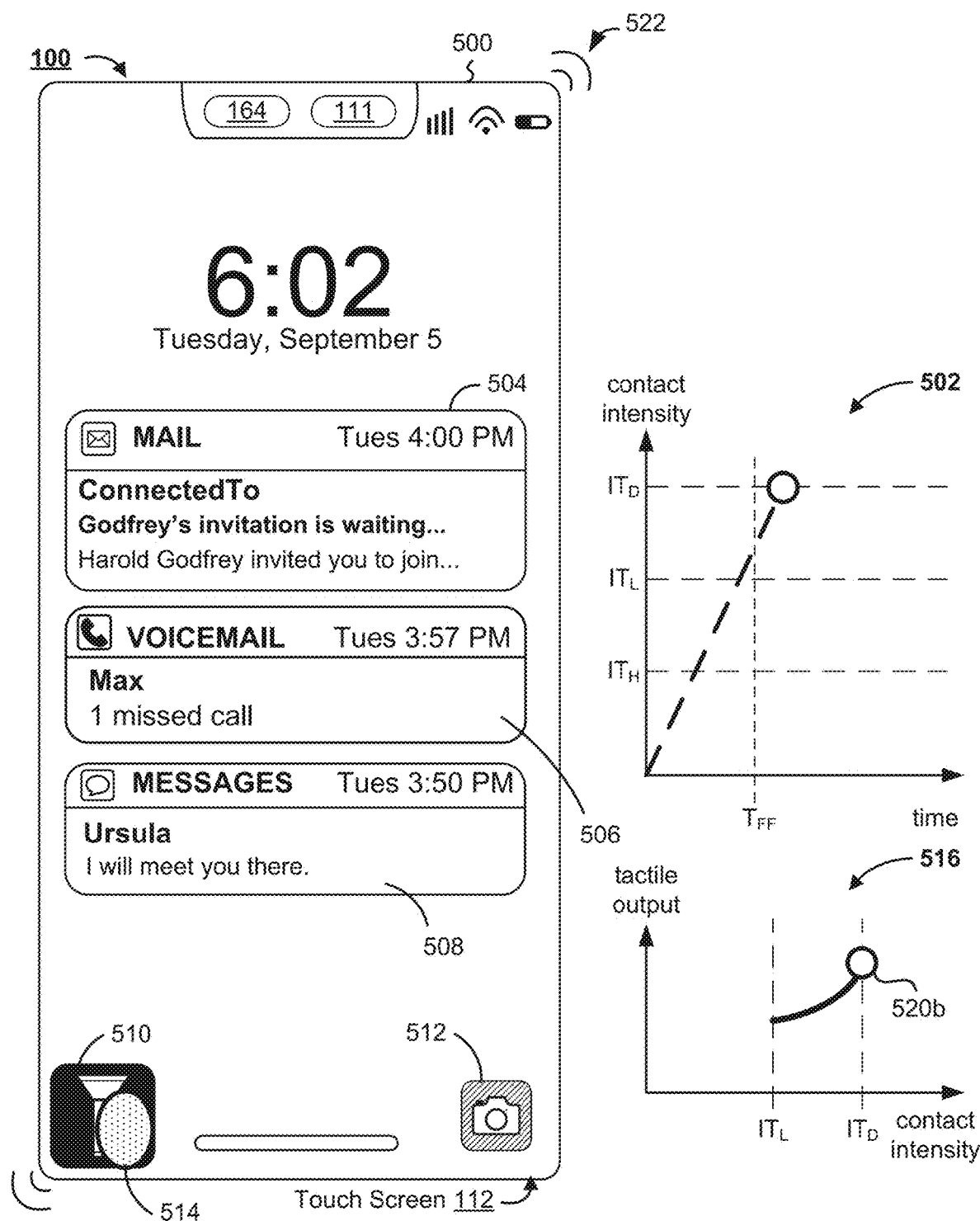

FIG. 5G illustrates a transition of lock screen 500 from FIG. 5F. In FIG. 5G, the intensity of contact 514 has increased to intensity threshold $IT_D$, as shown in contact intensity graph 502. In addition, contact 514 has been detected for at least a predefined feed-forward time period $T_{FF}$ (e.g., since contact 514 was detected). Tactile output 522 is generated with tactile output intensity level 520b corresponding to a contact intensity of $IT_D$, as shown in tactile output intensity graph 516 (e.g., in accordance with the intensity of contact 514 reaching intensity threshold $IT_D$, and optionally in accordance with contact 514 being detected for at least predefined time period $T_{FF}$). Flashlight icon 510 has a fully darkened background and is at an even greater (e.g., maximum) scale (e.g., flashlight icon 510 is displayed with an even greater (e.g., maximum) degree of transformation from its appearance in FIGS. 5A-5B), in accordance with the intensity of contact 514 reaching intensity threshold $IT_D$.

In some embodiments, tactile output 522 is generated (e.g., with tactile output intensity level 520b) in accordance with the intensity of contact 514 reaching intensity threshold $IT_D$, but tactile outputs are not generated prior to the intensity of contact 514 reaching intensity threshold $IT_D$.

Figure 5H:
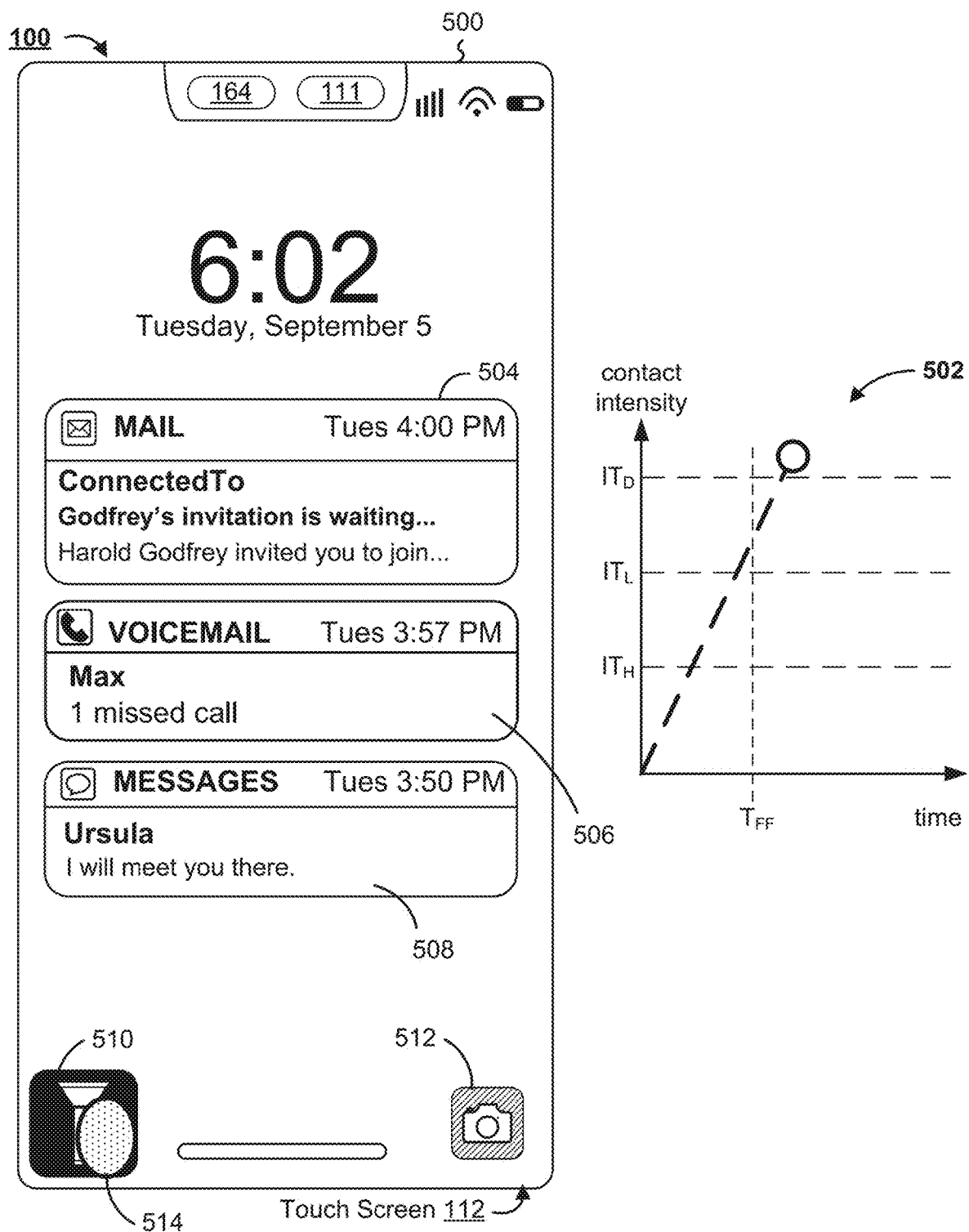

FIG. 5H illustrates a transition of lock screen 500 from FIG. 5G. In FIG. 5H, the intensity of contact 514 has increased above intensity threshold $IT_D$, as shown in contact intensity graph 502. However, because flashlight icon 510 was displayed with the maximum degree of transformation in FIG. 5G, no additional changes in the appearance of flashlight icon 510 are displayed in accordance with the intensity of contact 514 increasing above intensity threshold $IT_D$. In addition, no additional tactile output is generated.

Figure 5I:
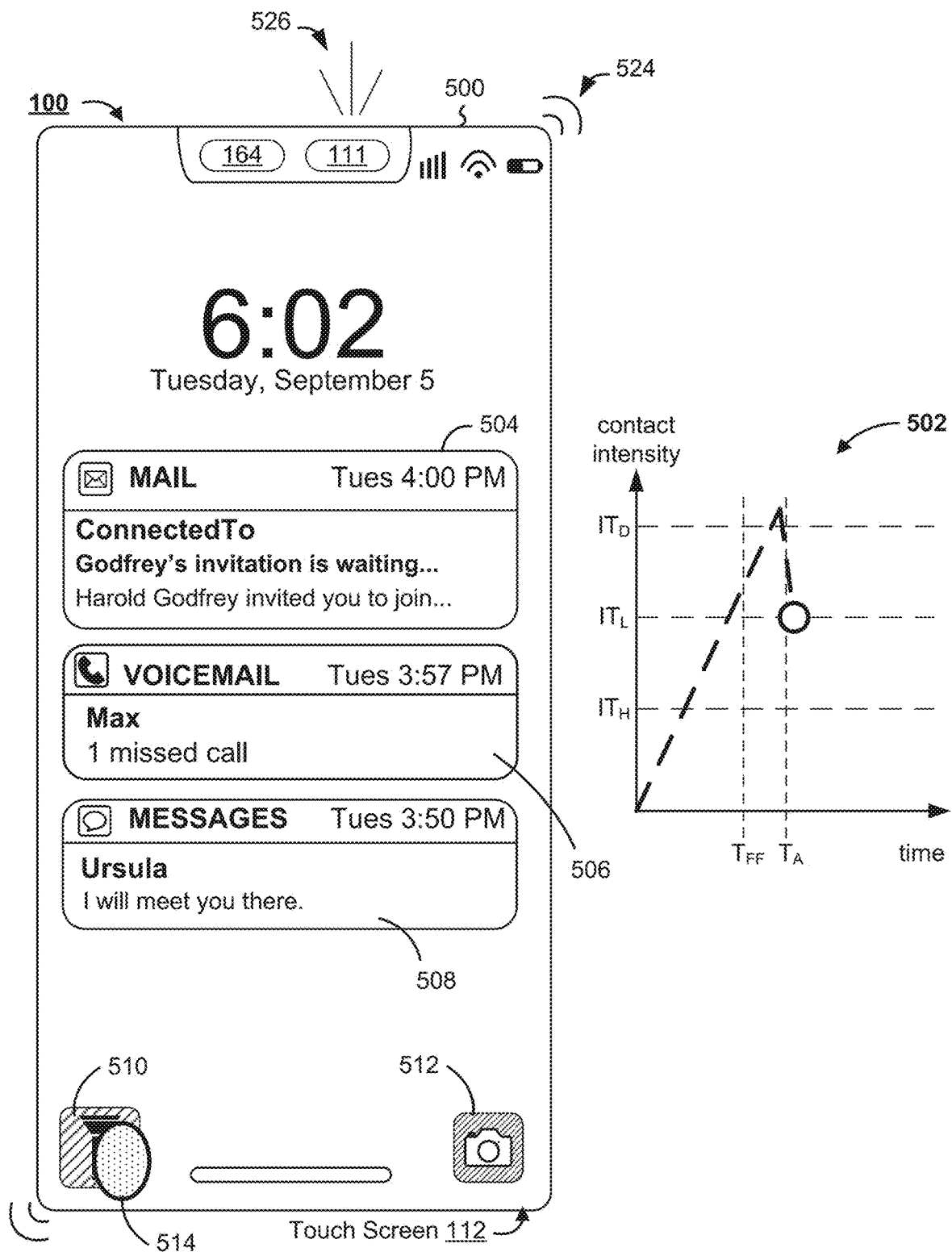

FIG. 5I illustrates a transition of lock screen 500 from FIG. 5H. In FIG. 5I, the intensity of contact 514 has decreased to intensity threshold $IT_L$, as shown in contact intensity graph 502. In addition, contact 514 has been detected for at least a predefined activation time period $T_A$ (e.g., since contact 514 was detected). In accordance with the intensity of contact 514 decreasing to intensity threshold $IT_L$, and optionally also in accordance with contact 514 being detected for at least predefined time period $T_A$, tactile output 524 is generated, and a flashlight of device 100 is activated (e.g., turned on), as indicated by flashlight beams 526. In some embodiments, tactile output 524 is not generated, and flashlight of device 100 is not activated (e.g., turned on) until the intensity of contact 514 decreases to intensity threshold $IT_L$. In accordance with the activation of the flashlight, flashlight icon 510 changes from showing a light-colored flashlight on a darker background to showing a dark-colored flashlight on a lighter background (e.g., a transformation of the flashlight icon 510, as shown in the transition from FIG. 5H to FIG. 5I, which corresponds to the flashlight of device 100 being in the activated state). The change in flashlight icon 510 from FIG. 5H to FIG. 5I is sometimes said to be an inversion of the background and foreground colors of the flashlight icon.

Figure 5J:
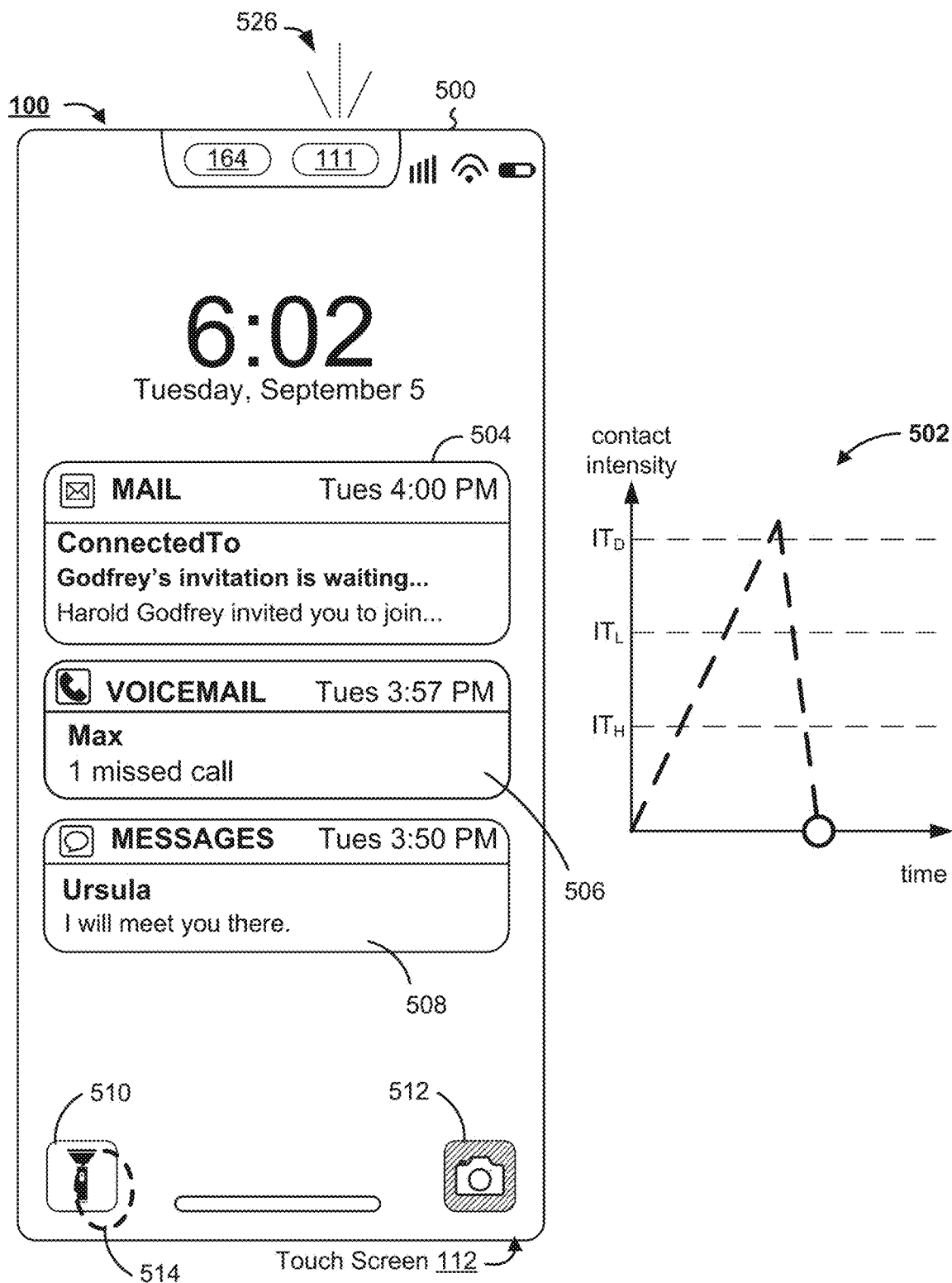

FIG. 5J illustrates a transition of lock screen 500 from FIG. 5I. In FIG. 5J, contact 514 has been lifted off, and the intensity of contact 514 has decreased to zero, as shown in contact intensity graph 502. The flashlight of device 100 is activated (e.g., remains activated after being activated in FIG. 5I), as indicated by flashlight beams 526. In accordance with the decrease in intensity of contact 514, flashlight icon 510 is displayed with a transformation from its appearance in FIG. 5J (e.g., the reverse of the transformation of flashlight icon 510 in FIG. 5I that was displayed in accordance with a higher contact intensity). Flashlight icon 510 shows a dark-colored flashlight on a white background, corresponding to the flashlight of device 100 being in the activated state, and corresponding to contact intensities below intensity threshold $IT_H$ or to no contact being detected.

Figure 5K:
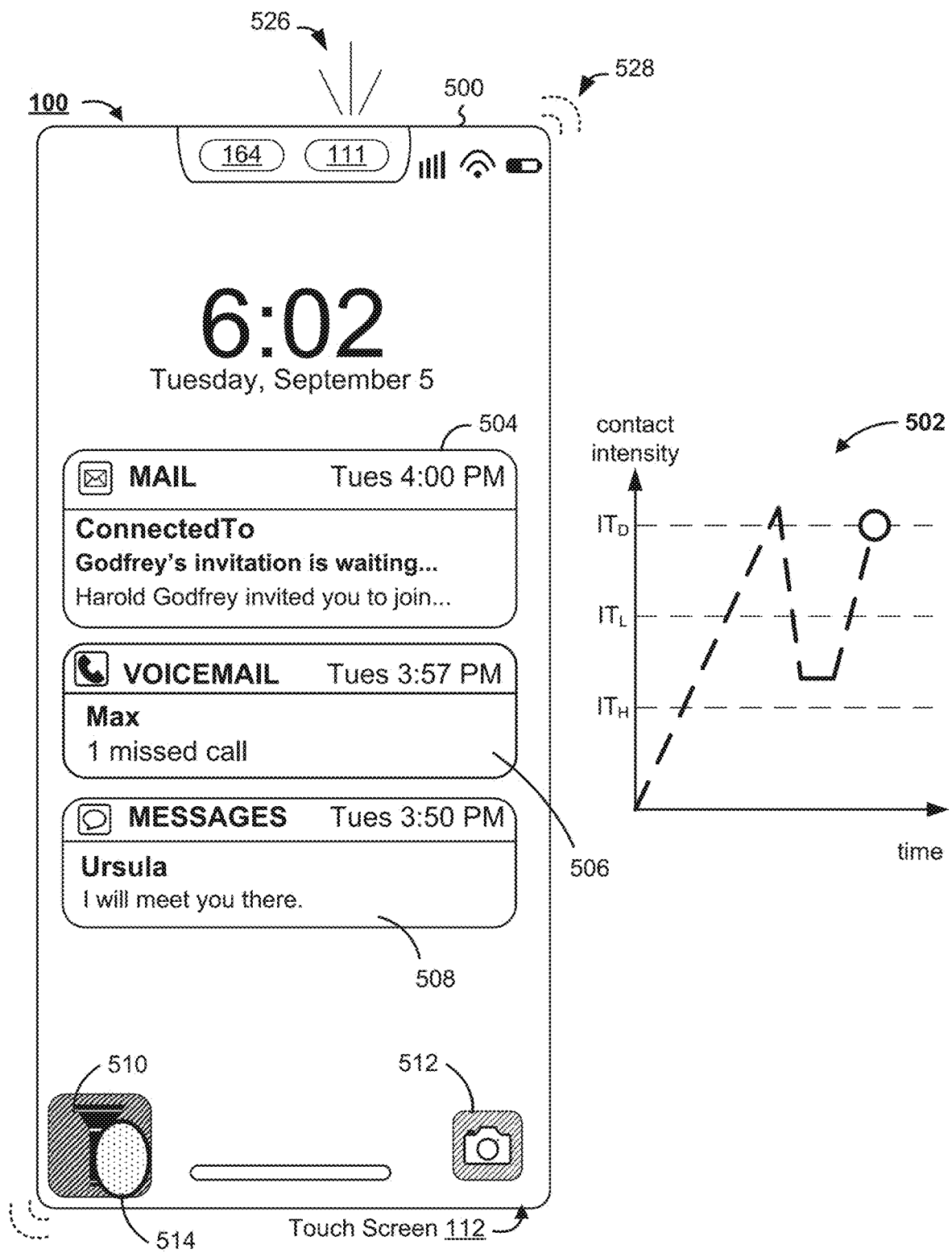

FIG. 5K illustrates an alternate transition of lock screen 500 from FIG. 5I. In FIG. 5K, contact 514 is maintained on touch screen 112 at the location corresponding to flashlight icon 510. The intensity of contact 514 initially decreases below intensity threshold $IT_L$ and then increases again to intensity threshold $IT_D$. In accordance with the intensity of contact 514 increasing to intensity threshold $IT_D$, tactile output 528 is generated. In the example shown in FIG. 5K, tactile output 528 is different from tactile output 522 that was previously generated (e.g., the tactile output generated for reaching intensity threshold $IT_D$ while the flashlight is off is different from the tactile output generated for reaching intensity threshold $IT_D$ while the flashlight is on). Flashlight icon 510 changes to show a dark-colored flashlight on a lighter-colored background, indicating that the flashlight has been activated, as further indicated by flashlight beams 526. In accordance with the intensity of contact 514 being at $IT_D$, flashlight 510 has a maximally darkened background and is at an even greater (e.g., maximum) scale (e.g., flashlight icon 510 is displayed with an even greater (e.g., maximum) degree of transformation from its appearance in FIGS. 5I-5J).

Figure 5L:
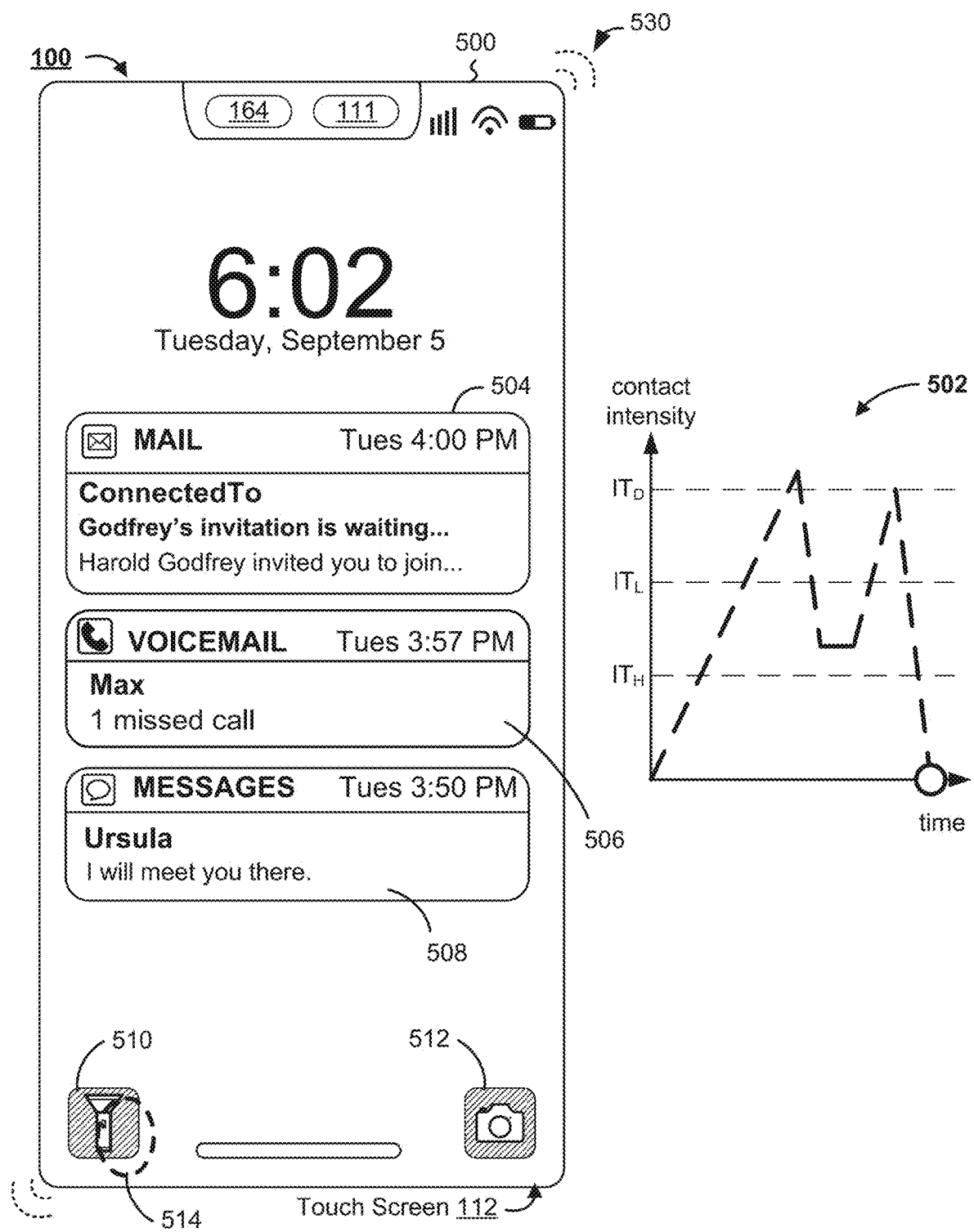

FIG. 5L illustrates a transition of lock screen 500 from FIG. 5K. In FIG. 5L, contact 514 has been lifted off, and the intensity of contact 514 has decreased to zero, as shown in contact intensity graph 502. In accordance with the intensity of contact 514 decreasing from intensity threshold $IT_D$ in FIG. 5K to below intensity threshold $IT_L$ in FIG. 5L, tactile output 530 is generated (e.g., tactile output 530 is the same type of tactile output as tactile output 528, FIG. 5K). In addition, in accordance with the intensity of contact 514 decreasing from intensity threshold $IT_D$ in FIG. 5K to below intensity threshold $IT_L$ in FIG. 5L, the state of the flashlight of device 100 is toggled. The flashlight changes from being activated in FIG. 5K to being deactivated (e.g., turned off) in FIG. 5L, as indicated by the lack of flashlight beams. Flashlight icon 510 shows the light-colored flashlight displayed on the darker background (e.g., as in FIG. 5A), corresponding to the flashlight being in a deactivated state and corresponding to contact intensities below intensity threshold $IT_H$ or to no contact being detected.

Figure 5M:
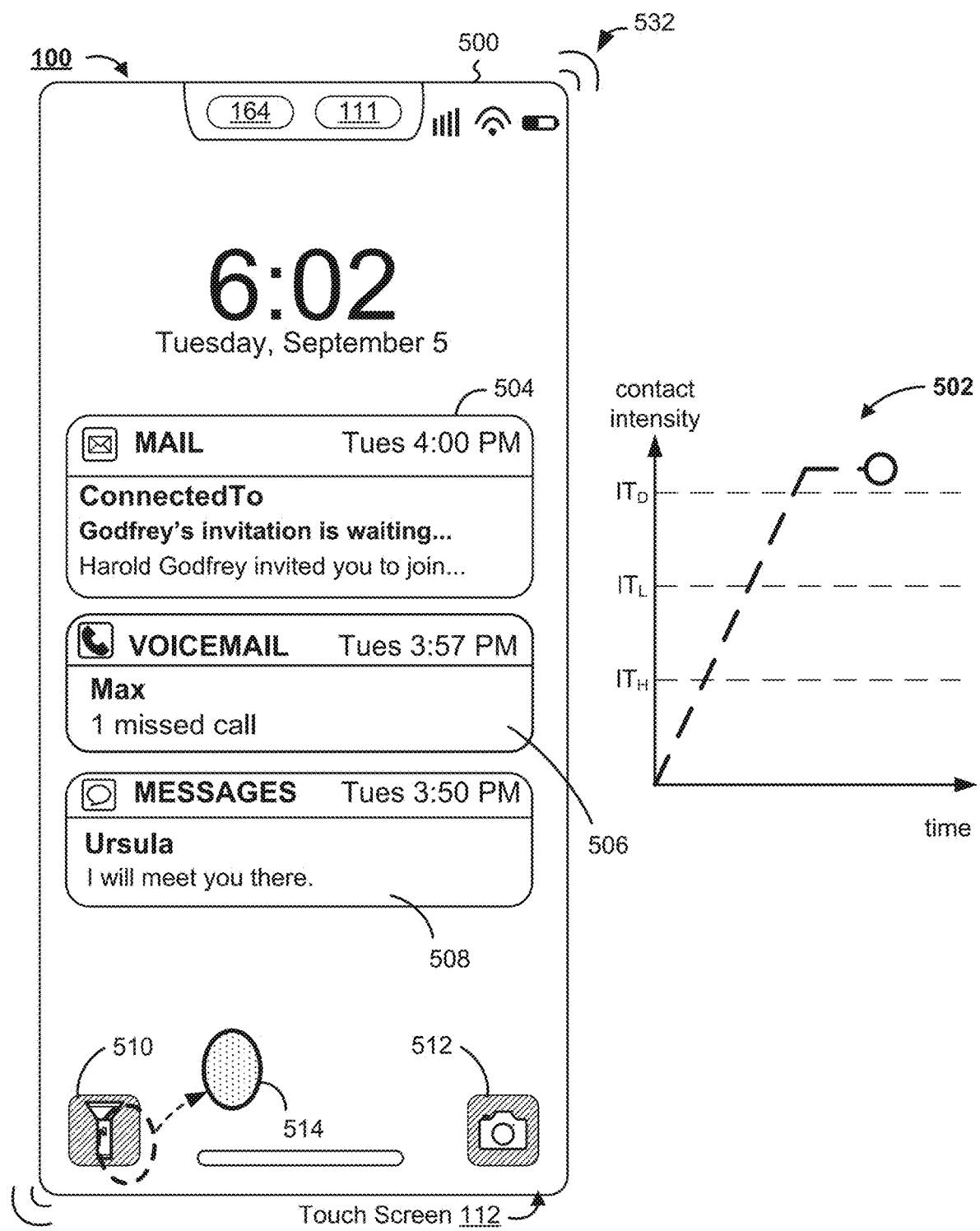

FIG. 5M illustrates an alternate transition of lock screen 500 from FIG. 5H. In FIG. 5M, contact 514 has moved away from flashlight icon 510, to a location on touch screen 112 that does correspond to flashlight icon 510. In accordance with the lateral movement of contact 514 away from flashlight icon 510, tactile output 532 is generated. The intensity of contact 514 remains above intensity threshold $IT_D$, as shown in contact intensity graph 502 (e.g., tactile output 532 is generated not as a result of a decrease in contact intensity, as described above with reference to FIGS. 5I and 5L). In some embodiments, tactile output 532 is a cancellation tactile output that indicates that toggling the state of the flashlight will not be performed even if the intensity of contact 514 subsequently decreases to or below intensity threshold $IT_L$ (e.g., as described above with reference to FIG. 5I). In addition, in accordance with the lateral movement of contact 514 away from flashlight icon 510, the transformation of flashlight icon 510 is reversed from the maximum degree of transformation in FIG. 5H, with the fully darkened background and at the maximum scale, to the light-colored flashlight displayed on the darker background in FIG. 5M (e.g., the initial appearance of flashlight icon 510 in FIG. 5A, corresponding to the flashlight being in a deactivated state and corresponding to contact intensities below intensity threshold $IT_H$ or to no contact being detected).

Figure 5N:
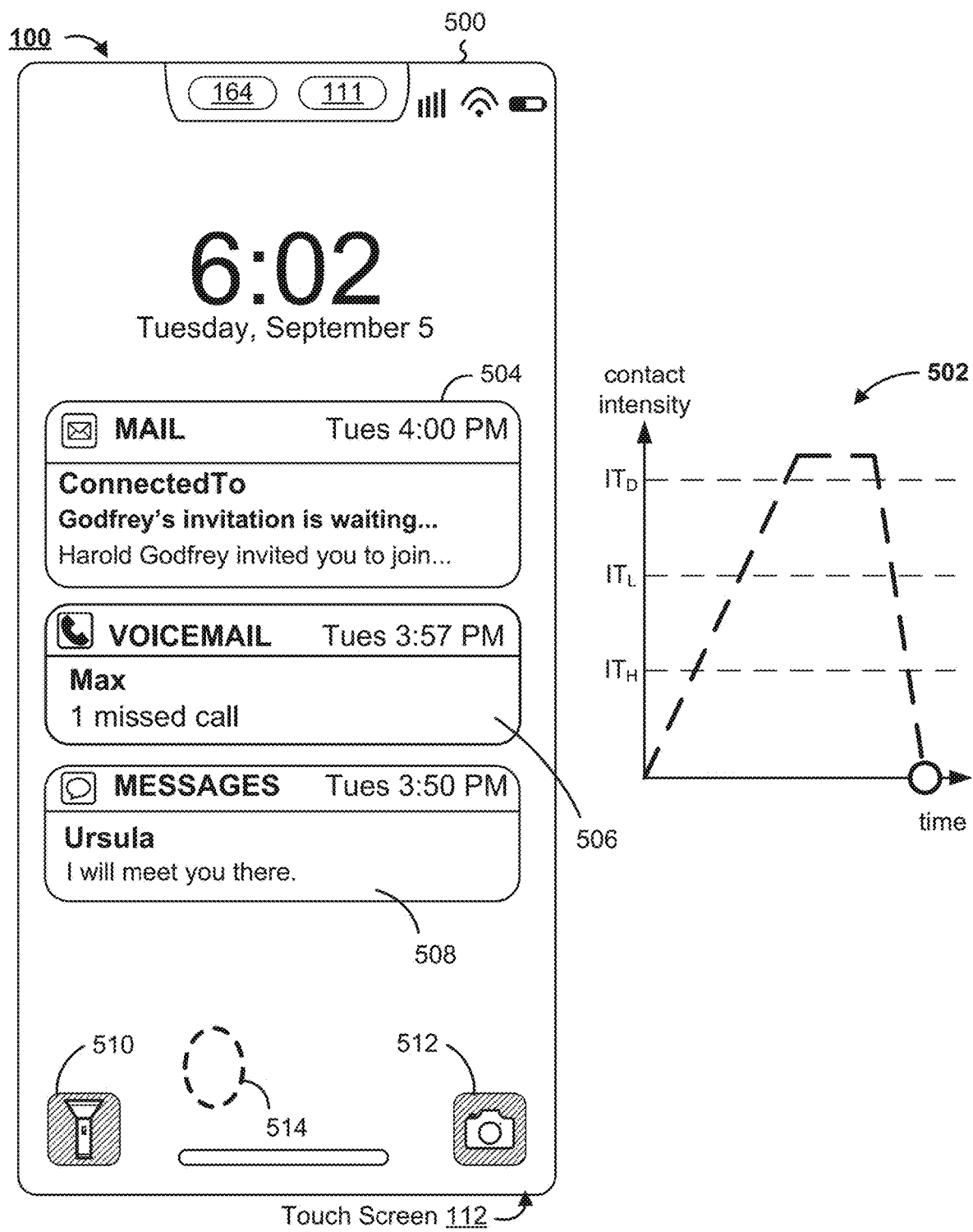

FIG. 5N illustrates a transition of lock screen 500 from FIG. 5M. In FIG. 5N, contact 514 has been lifted off, and the intensity of contact 514 has decreased to zero, as shown in contact intensity graph 502. In accordance with the cancellation of the toggling operation, described above with reference to FIG. 5M, the flashlight of device 100 remains deactivated in FIG. 5N, even though the intensity of contact 514 met other criteria for toggling the flashlight (e.g., increasing to intensity threshold $IT_D$ and to intensity threshold $IT_L$). In addition, a tactile output is not generated even though the intensity of contact 514 decreased past intensity threshold $IT_L$.

Figure 5O:
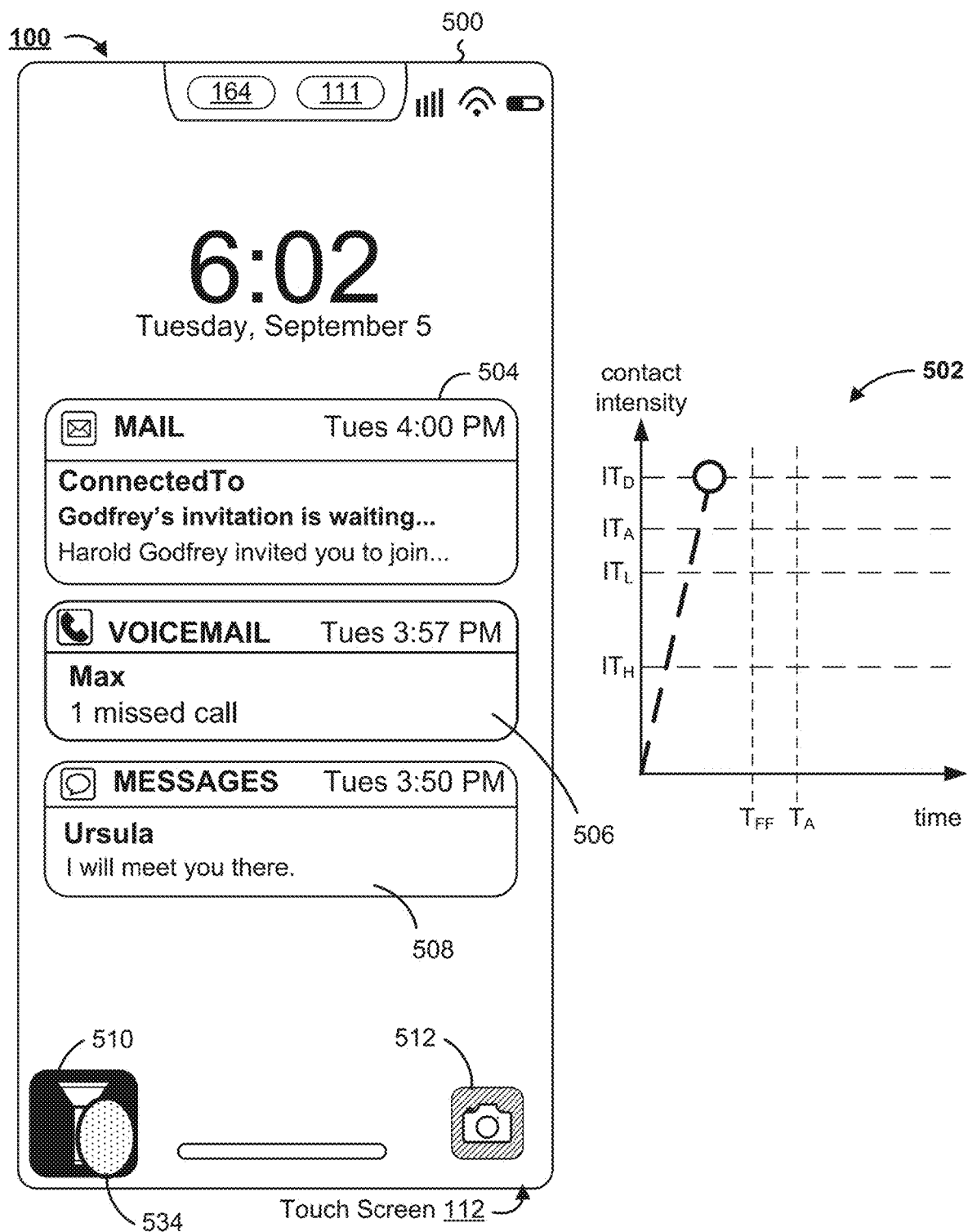
Figure 5P:
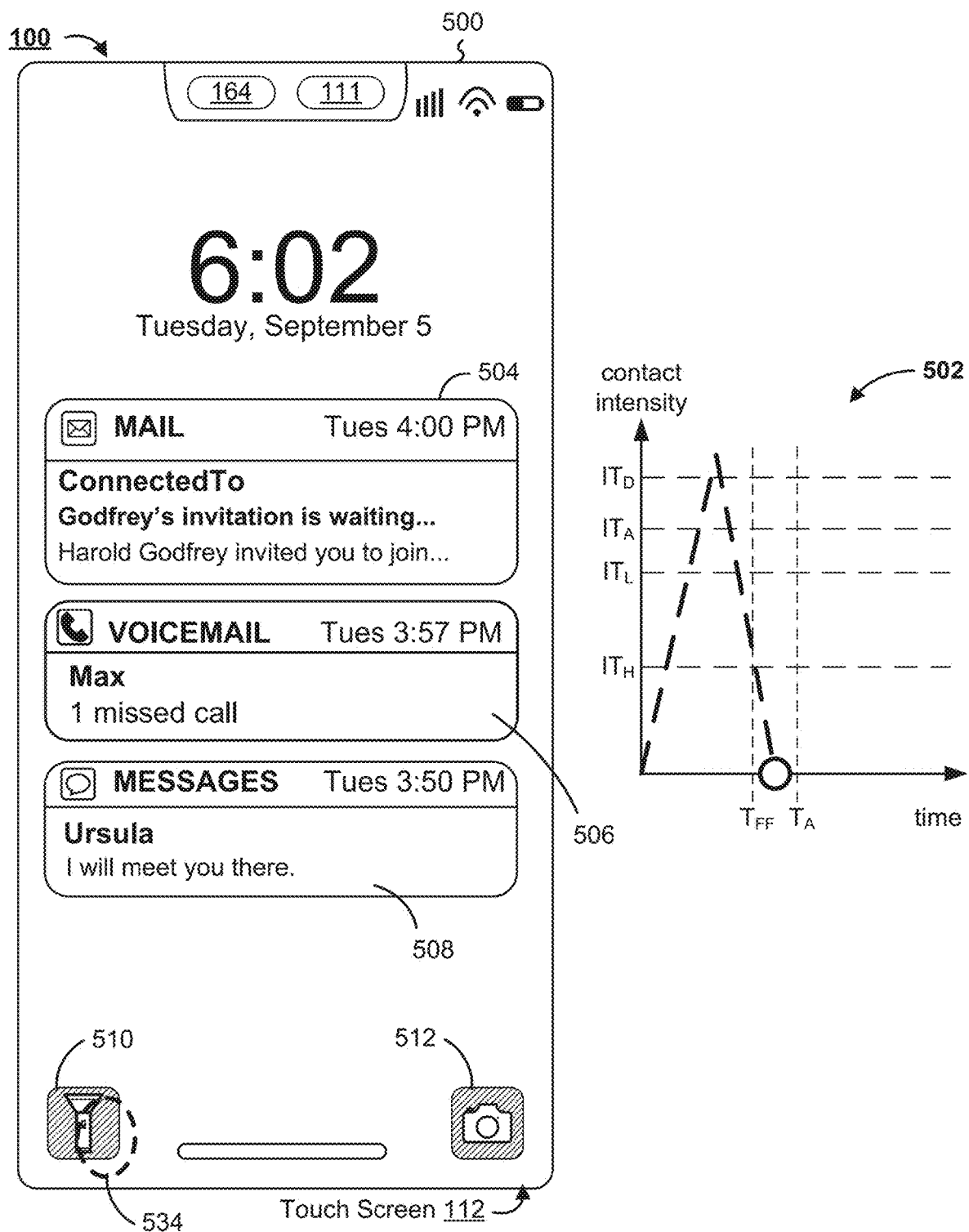

FIGS. 5O-5P illustrates an alternate transition of lock screen 500 from FIG. 5A in response to a user input that includes a contact and liftoff of the contact before a pre-defined time period (e.g., a fast tap gesture). FIG. 5O shows a first portion of user input 534 including a contact detected on touch screen 112 at a location corresponding to flashlight icon 510 and an increase in the intensity of the contact to intensity threshold $IT_D$, as shown in contact intensity graph 502. The first portion of user input 534 (e.g., the contact) is detected for an amount of time that is less than the pre-defined feed-forward time period $T_{FF}$ (e.g., user input 534 does not satisfy feed-forward criteria that include a timing requirement). In accordance with the intensity of user input 534 increasing to intensity threshold $IT_D$, flashlight icon 510 is displayed with the maximum degree of transformation (e.g., with the fully darkened background and at maximum scale), but a tactile output is not generated, because the first portion of user input 534 lasted (e.g., was detected) for a period of time that was shorter than the predefined feed-forward time period $T_{FF}$.

FIG. 5P shows a second portion of user input 534 that includes liftoff of the contact and a decrease in the intensity of the contact to zero, as shown in contact intensity graph 502. The total amount of time that user input 534 was detected, including both the first and second portions, is less than the predefined activation time period $T_A$ (e.g., user input 534 does not satisfy activation criteria that include a timing requirement). Although the intensity of user input 534 decreased from intensity threshold $IT_D$ to below intensity threshold $IT_L$, the state of the flashlight is not toggled and a tactile output is not generated, because user input 534 lasted for a period of time that was shorter than the predefined activation time period $T_A$ (and/or because the first portion of user input 534 did not last for a period of time that was at least as long as the predefined feed-forward time period $T_{FF}$). Accordingly, the flashlight remains deactivated. In addition, flashlight icon 510 continues to show a light-colored flashlight on a darker background, corresponding to the flashlight being deactivated, and, in accordance with the intensity of user input 534 decreasing from $IT_D$) to zero, the transformation of flashlight icon 510 is reversed to its original appearance as shown in FIG. 5A.

With reference to FIGS. 5O-5P, for a user input that does not satisfy the predefined activation time period $T_A$ and/or the predefined feed-forward time period $T_{FF}$, the state of the flashlight is not toggled. However, in some embodiments, a tactile output is still generated when the first portion of the user input increases to intensity threshold $IT_D$ even if the first portion of the user input does not satisfy the feed-forward time period $T_{FF}$. In some embodiments, a tactile output is still generated when the second portion of the user input decreases to intensity threshold $IT_L$, even if the user input does not satisfy the activation time period $T_A$.

Figure 5Q:
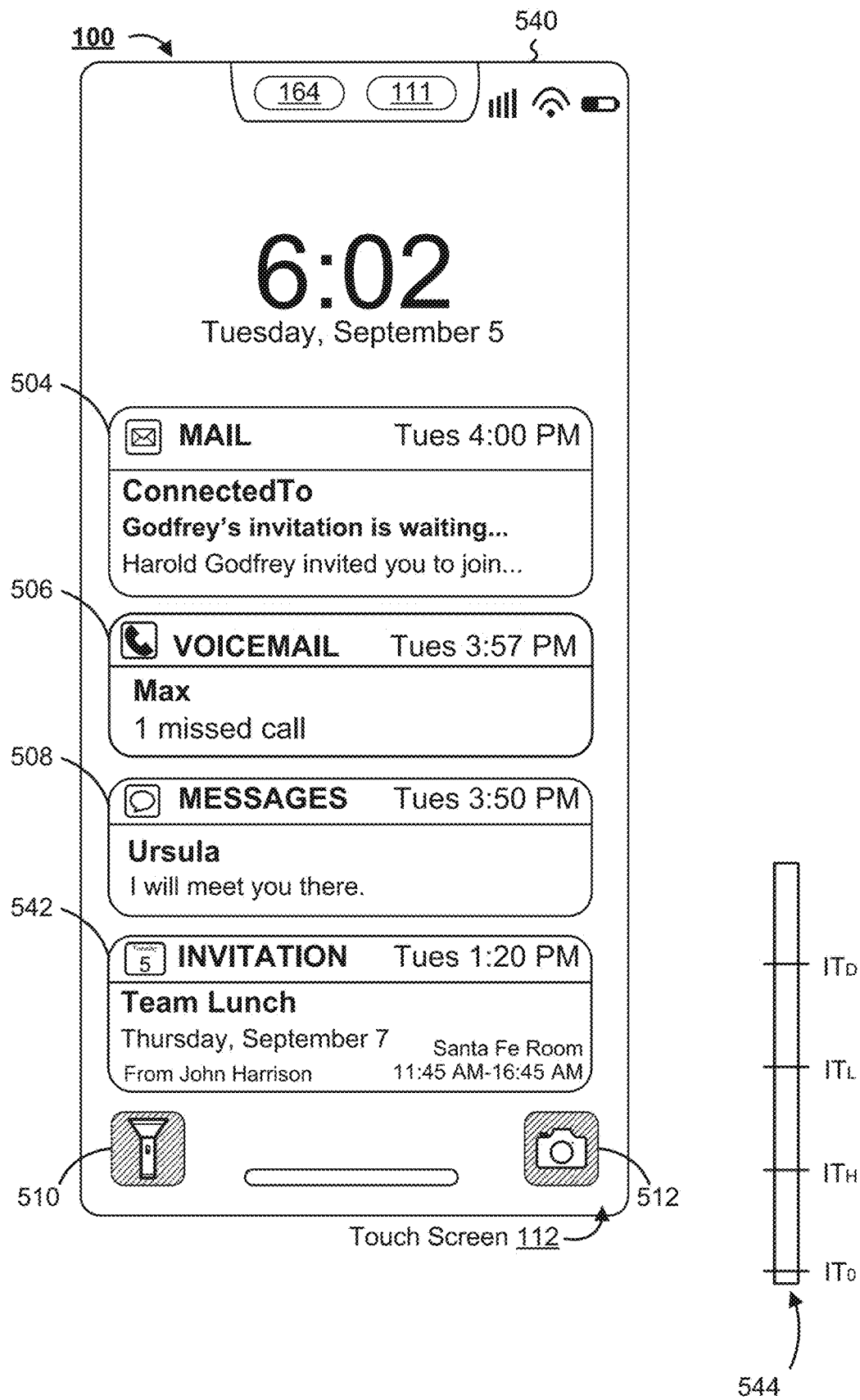

FIG. 5Q illustrates a lock screen user interface 540 displayed on touch screen 112 of device 100. Lock screen 540 is similar to lock screen 500 (FIG. 5A), except that the list of notifications on lock screen 540 includes an additional notification 542. Intensity meter 544 indicates the intensity of contacts detected on lock screen 540.

Figure 5R:
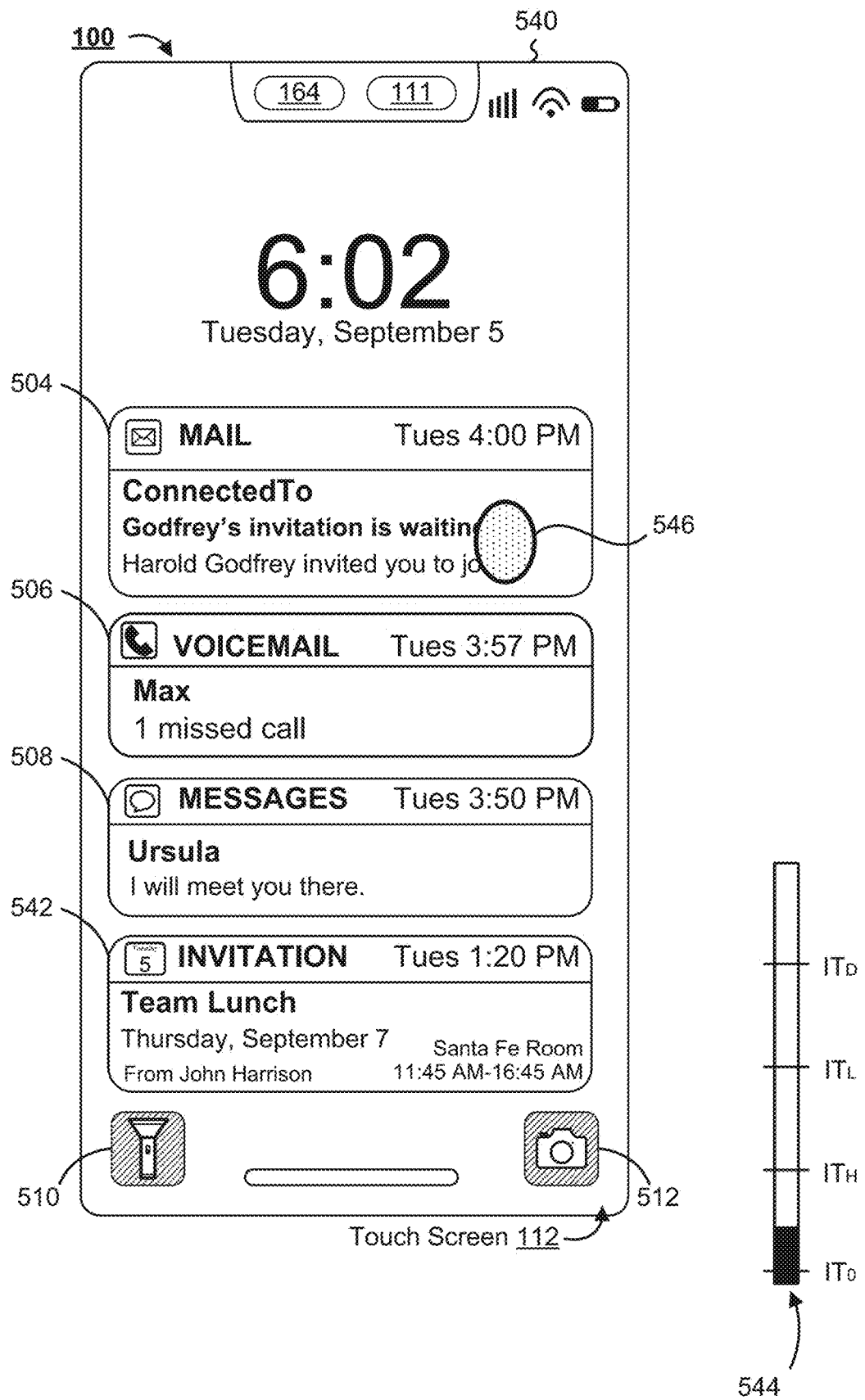

FIG. 5R illustrates a transition of lock screen 540 from FIG. 5Q. FIG. 5R shows contact 546 detected on touch screen 112 at a location corresponding to notification 504. Notification 504 notifies a user of device 100 of a received e-mail and includes a preview of information in the received e-mail. Intensity meter 544 shows that the intensity of contact 546 is above zero ($IT_0$) and below intensity threshold $IT_H$.

Figure 5S:
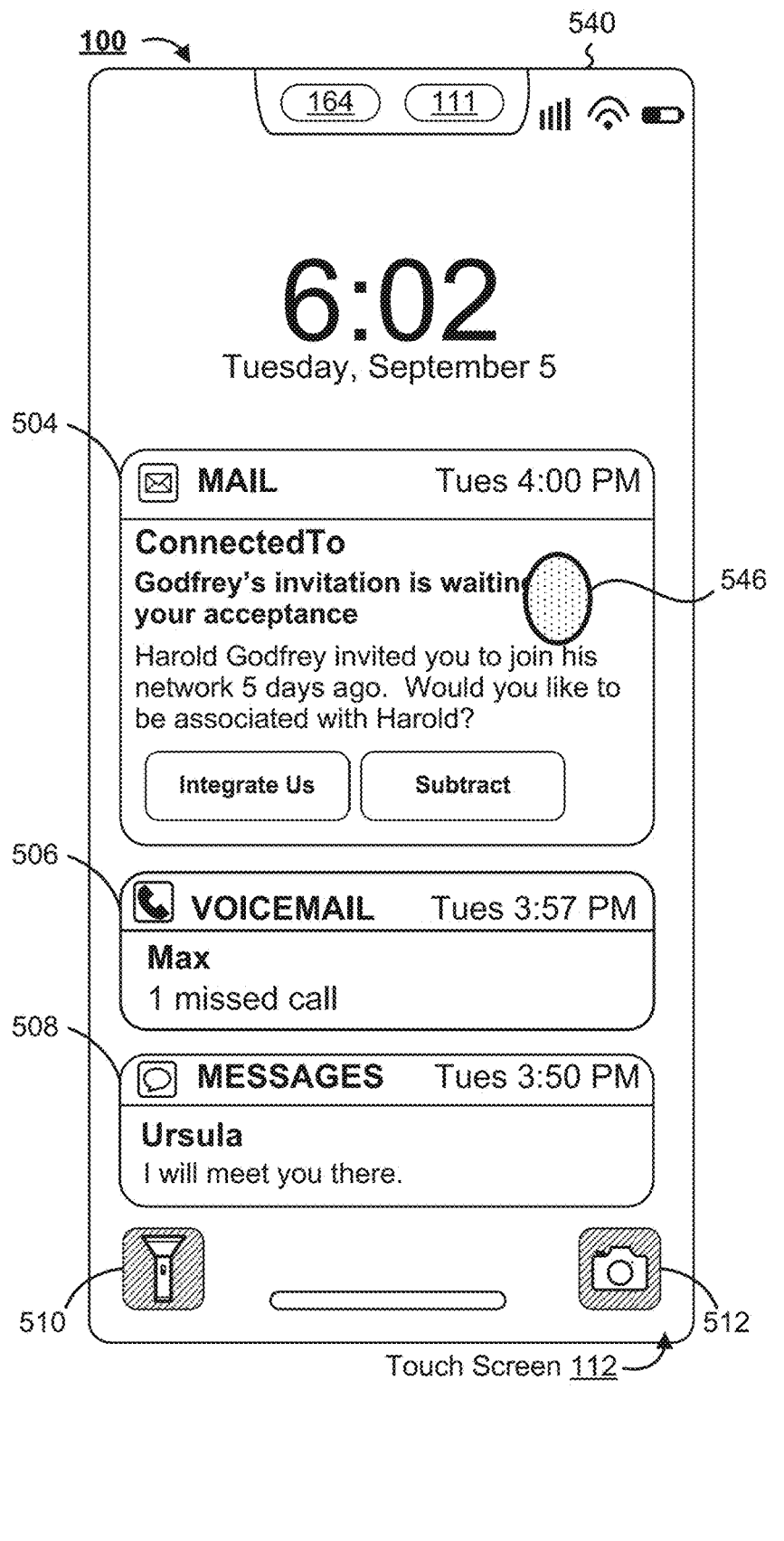

FIG. 5S illustrates a transition of lock screen 540 from FIG. 5R. In FIG. 5S, the intensity of contact 546 has increased to above intensity threshold $IT_L$. Accordingly, a size of notification 504 is increased to display additional information associated with notification 504. In FIG. 5S, notification 504, at increased size, displays a preview of a greater portion of the received e-mail.

Figure 5T:
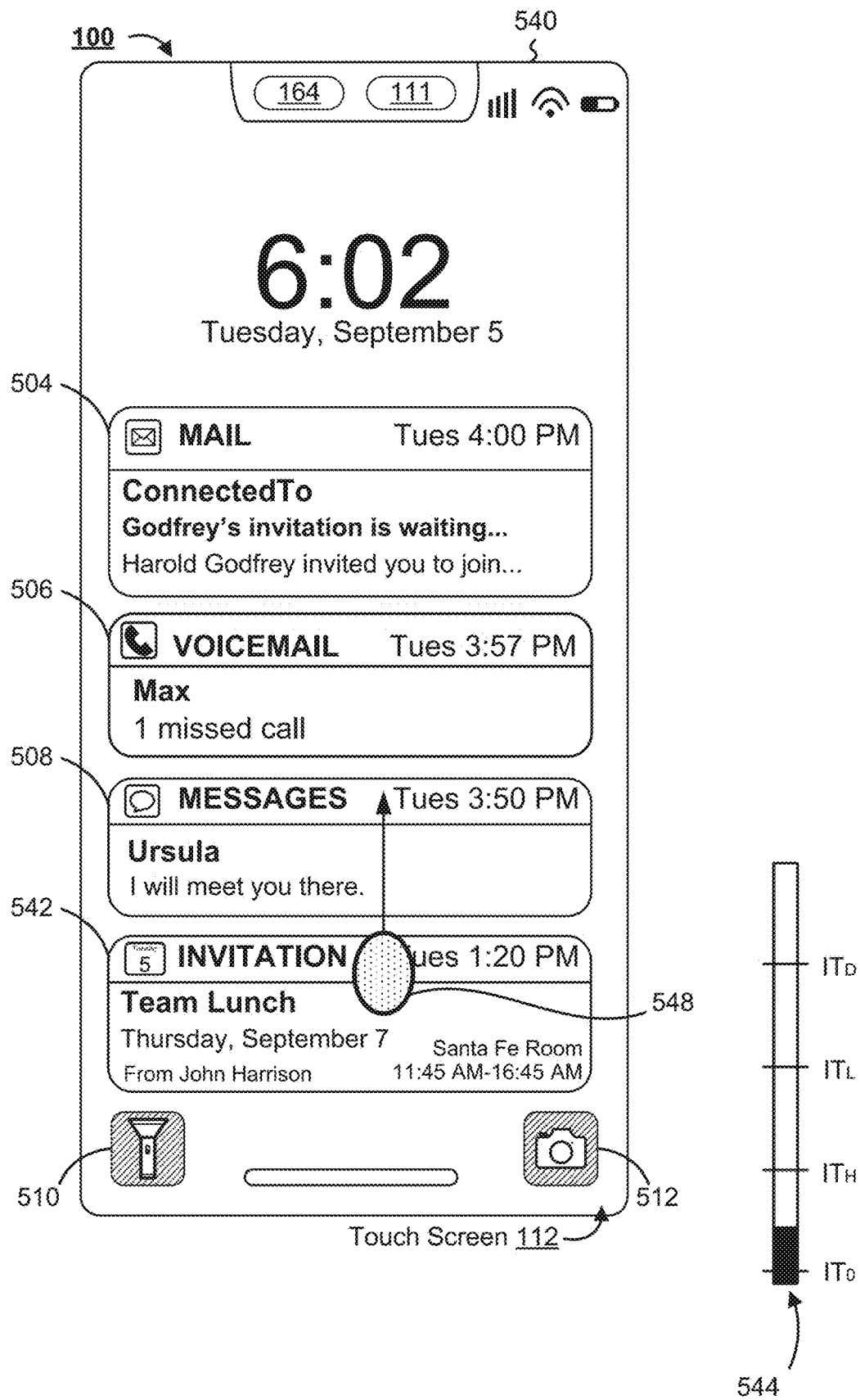

FIG. 5T illustrates an alternate transition of lock screen 540 from FIG. 5Q. FIG. 5T shows contact 548 directed to the list of notifications on lock screen 540, and upward movement of contact 548, with contact intensity above zero and below intensity threshold $IT_H$ (e.g., a scroll gesture).

Figure 5U:
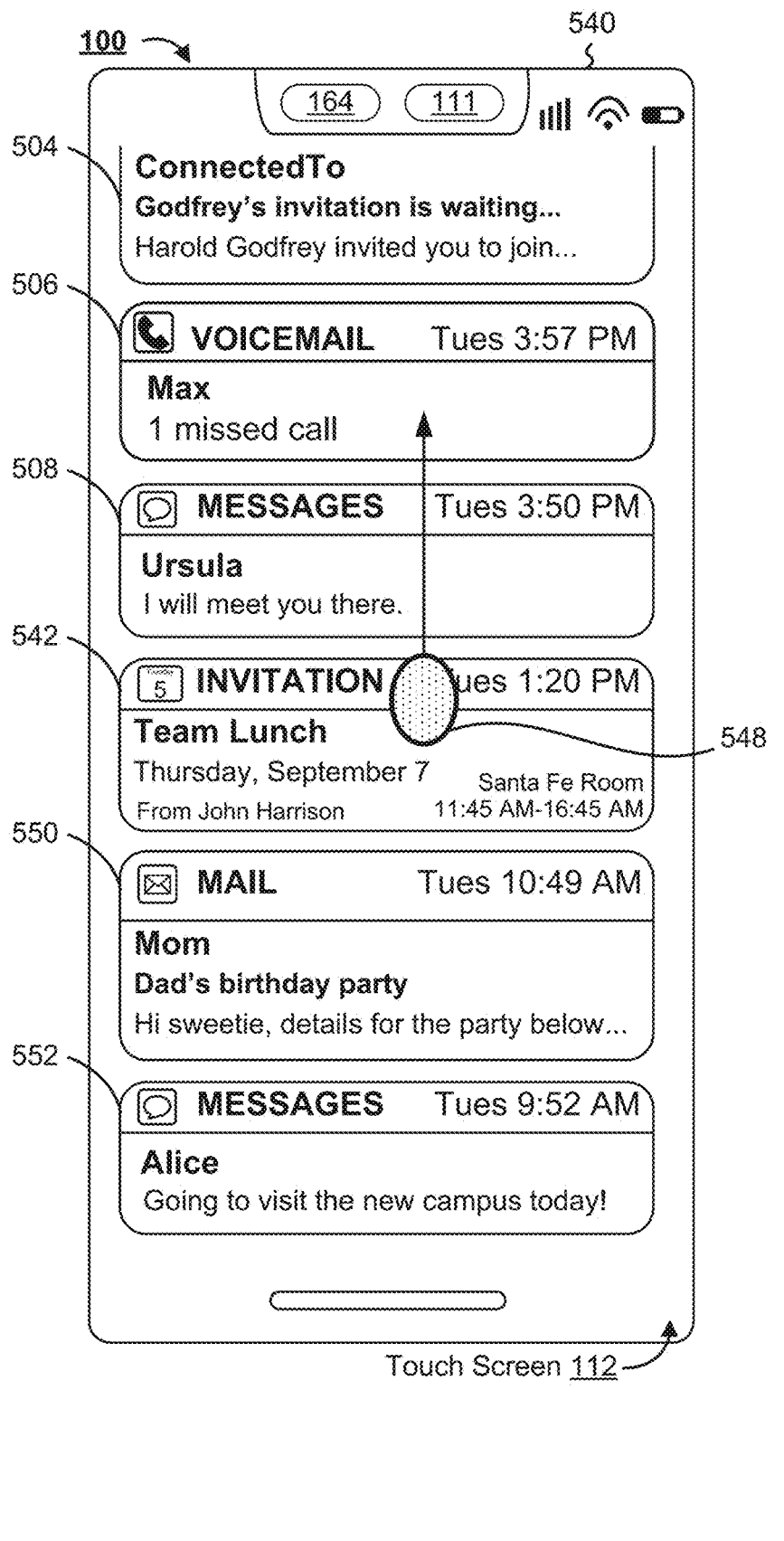

FIG. 5U illustrates a transition of lock screen 540 from FIG. 5T. FIG. 5U shows that, in response to the movement of contact 548, the list of notifications is scrolled in the direction of movement of contact 548, such that notifications 504, 506, 508 and 542 move upward. In addition, in accordance with scrolling the list of notifications on lock screen 540, flashlight icon 510 and camera icon 512 cease to be displayed. The area in which flashlight icon 510 and camera icon 512 were previously displayed is used to display additional notifications 550 and 552.

Figure 5V:
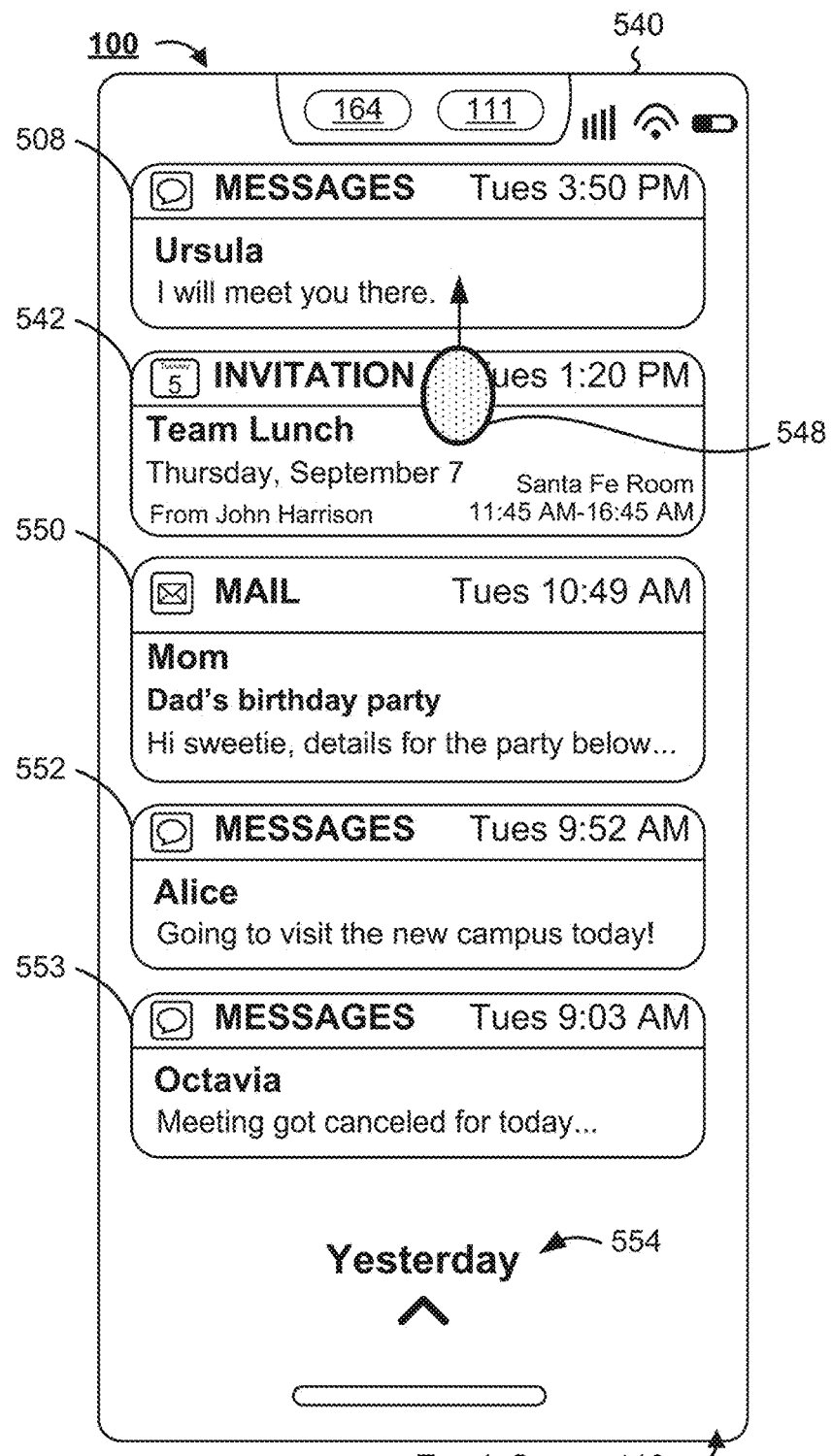
Figure 5V:
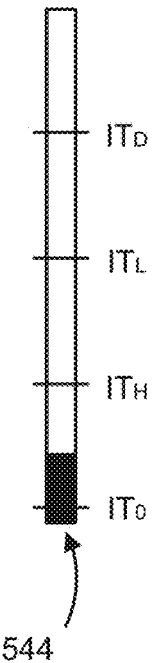

FIG. 5V illustrates a transition of lock screen 540 from FIG. 5U. FIG. 5V shows that, in response to continued movement of contact 548, the list of notifications is further scrolled. In accordance with no additional notifications from the current day (e.g., "Tuesday," as shown in FIGS. 5Q-5T) being available, an indication 554 is displayed to indicate that further scrolling of the list of notifications will result in display of notifications from a previous day (e.g., "Yesterday").

Figure 5W:
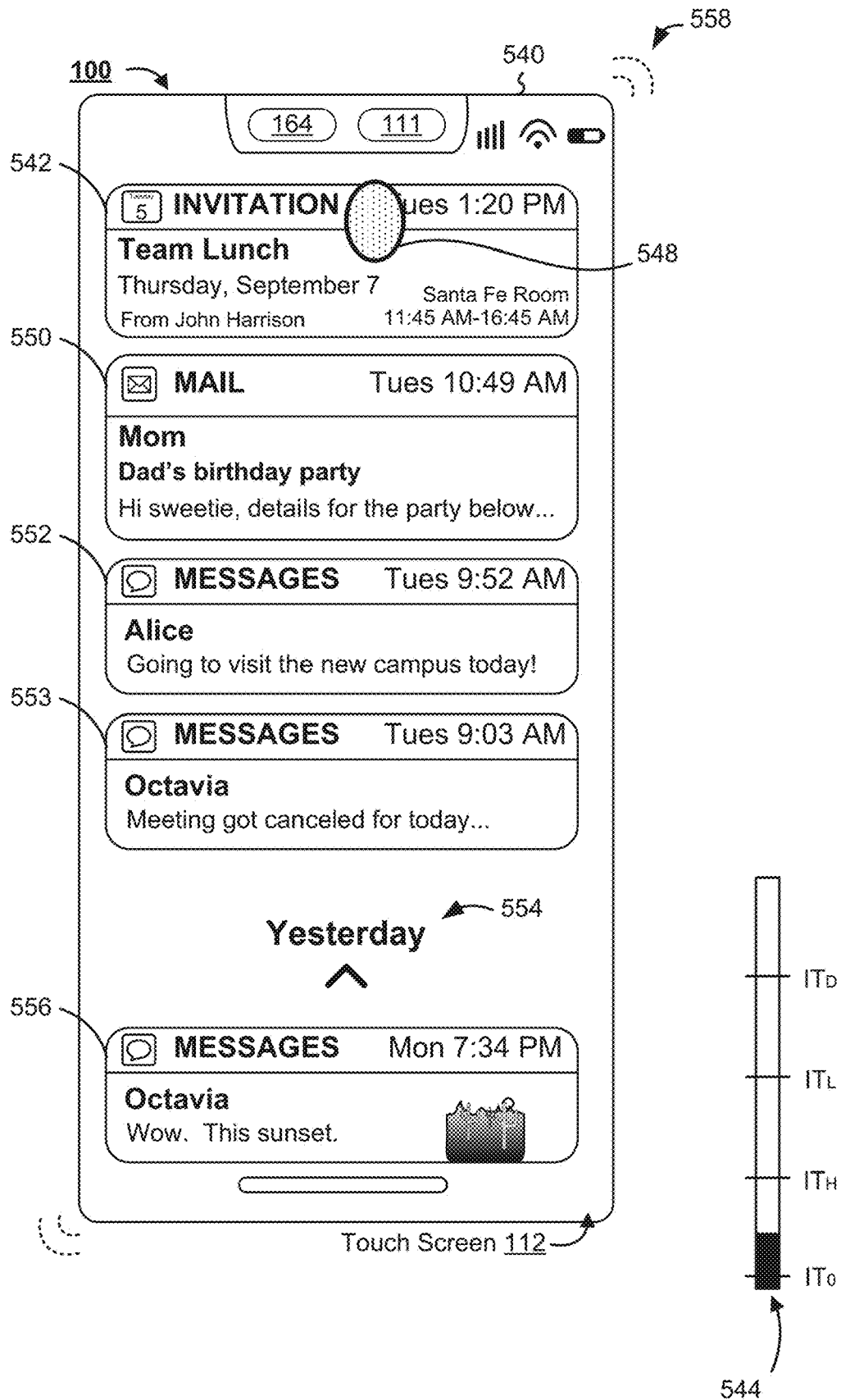

FIG. 5W illustrates a transition of lock screen 540 from FIG. 5V. FIG. 5W shows that, in response to continued movement of contact 548, the list of notifications is further scrolled to display notification 556 from the previous day (e.g., "Yesterday," which in this example was "Monday"). In accordance with the list of notifications being scrolled past a threshold (e.g., to the previous day), tactile output 558 is generated.

Figure 5X:
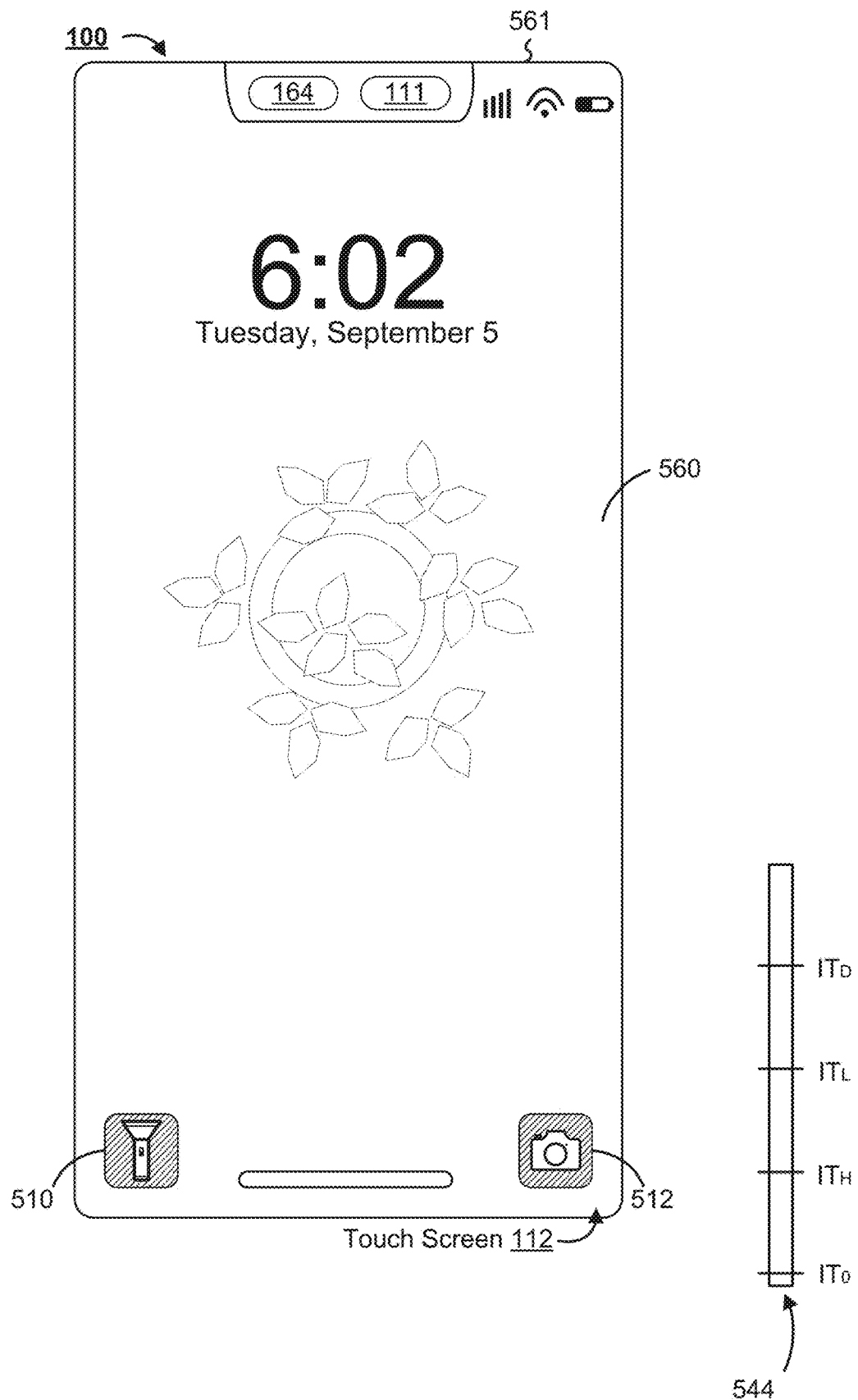

FIGS. 5X-5AA illustrate animation of a lock screen background (sometimes called wallpaper) based on intensity of a user input directed to the lock screen background. FIG. 5X illustrates lock screen user interface 561 that includes background 560. Background 560 is an animated background (e.g., includes one or more transformations or animations rather than being a static image).

Figure 5Y:
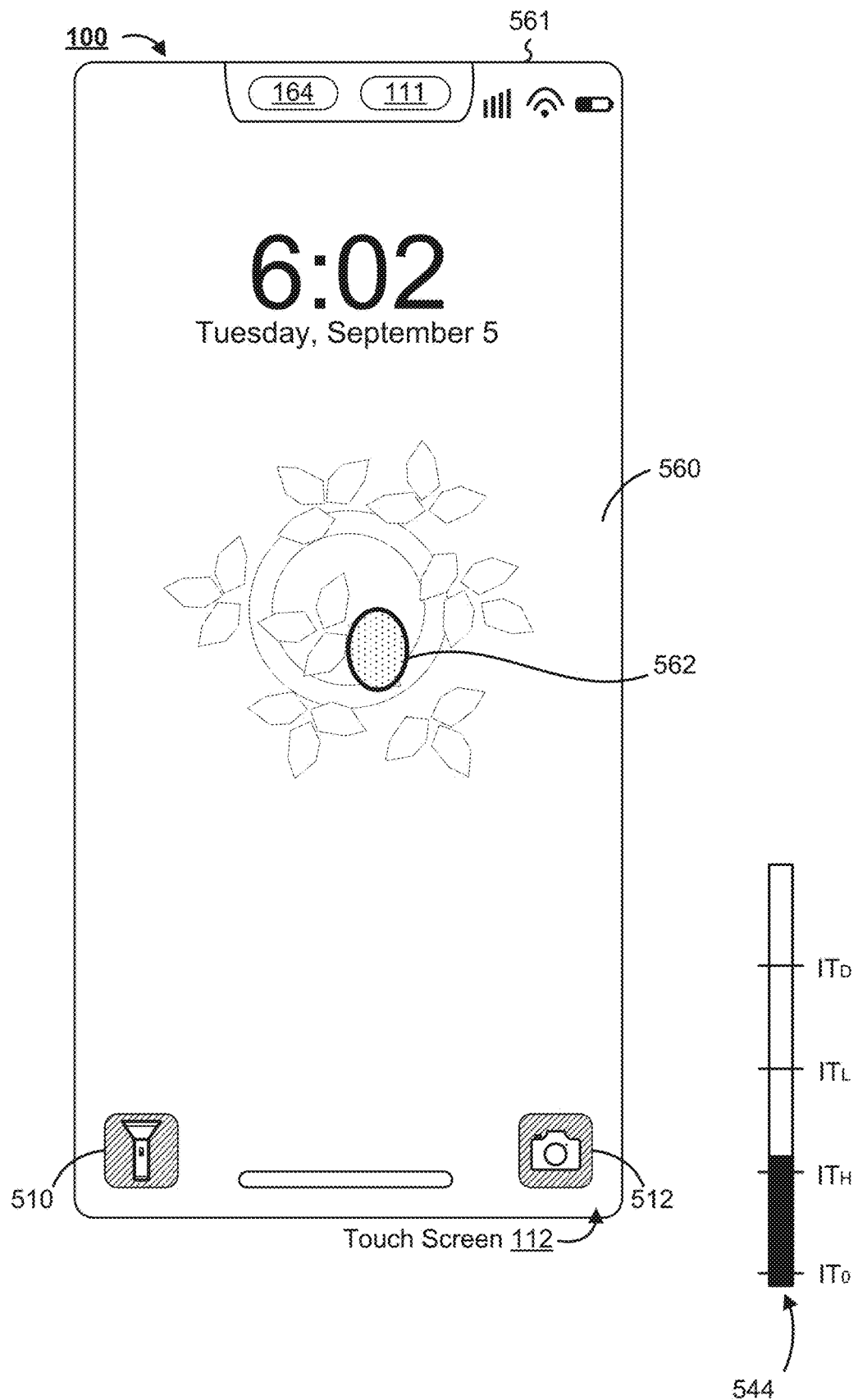

FIG. 5Y illustrates a transition of lock screen user interface 561 from FIG. 5X. FIG. 5Y shows contact 562 detected at a location on touch screen 112 corresponding to background 560. Intensity meter 544 shows that the intensity of contact 562 is above intensity threshold $IT_H$ and below intensity threshold $IT_L$. In accordance with the intensity of contact 562 being below intensity threshold $IT_L$, no change to background 560 is displayed.

Figure 5Z:
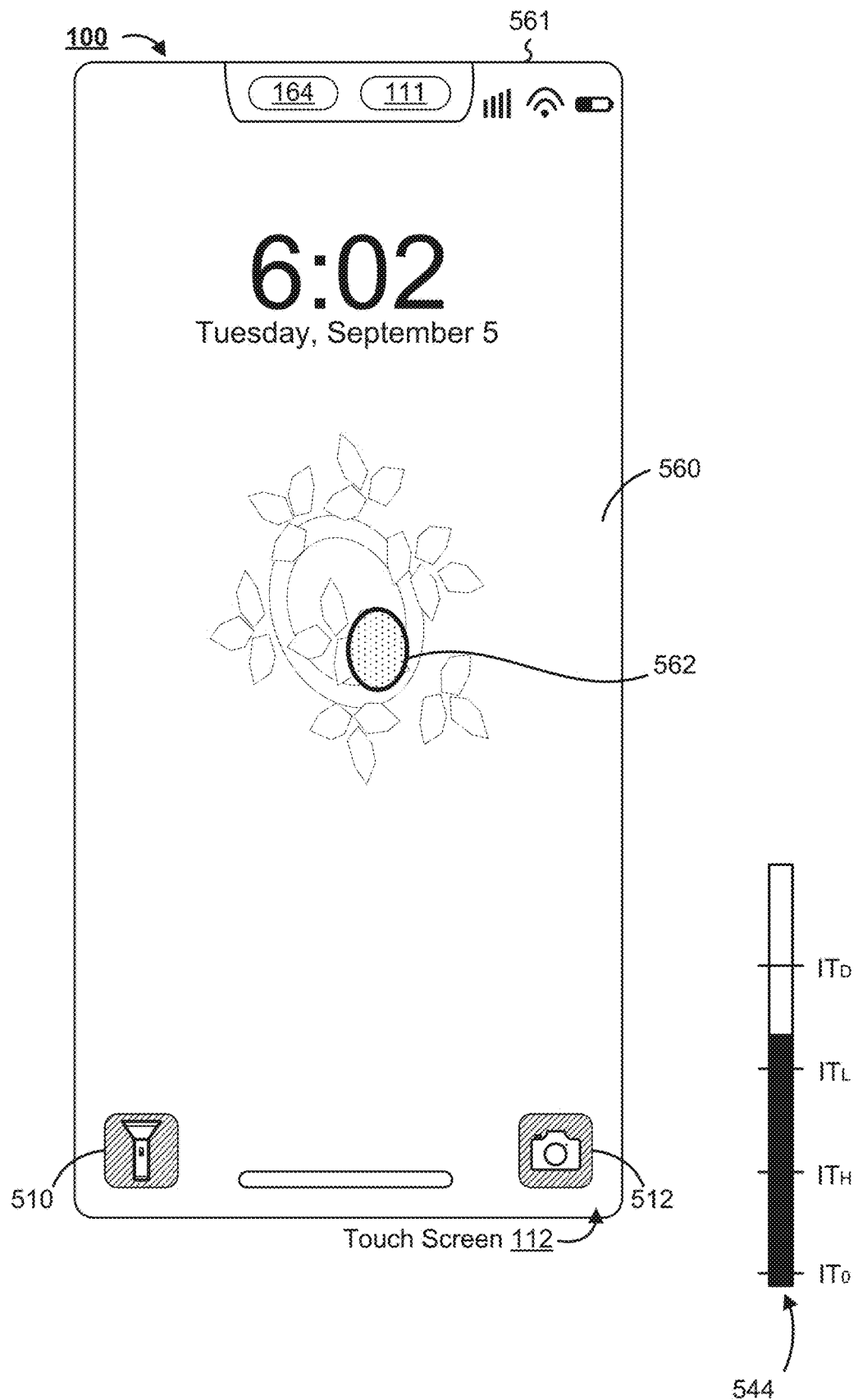
Figure 5A:
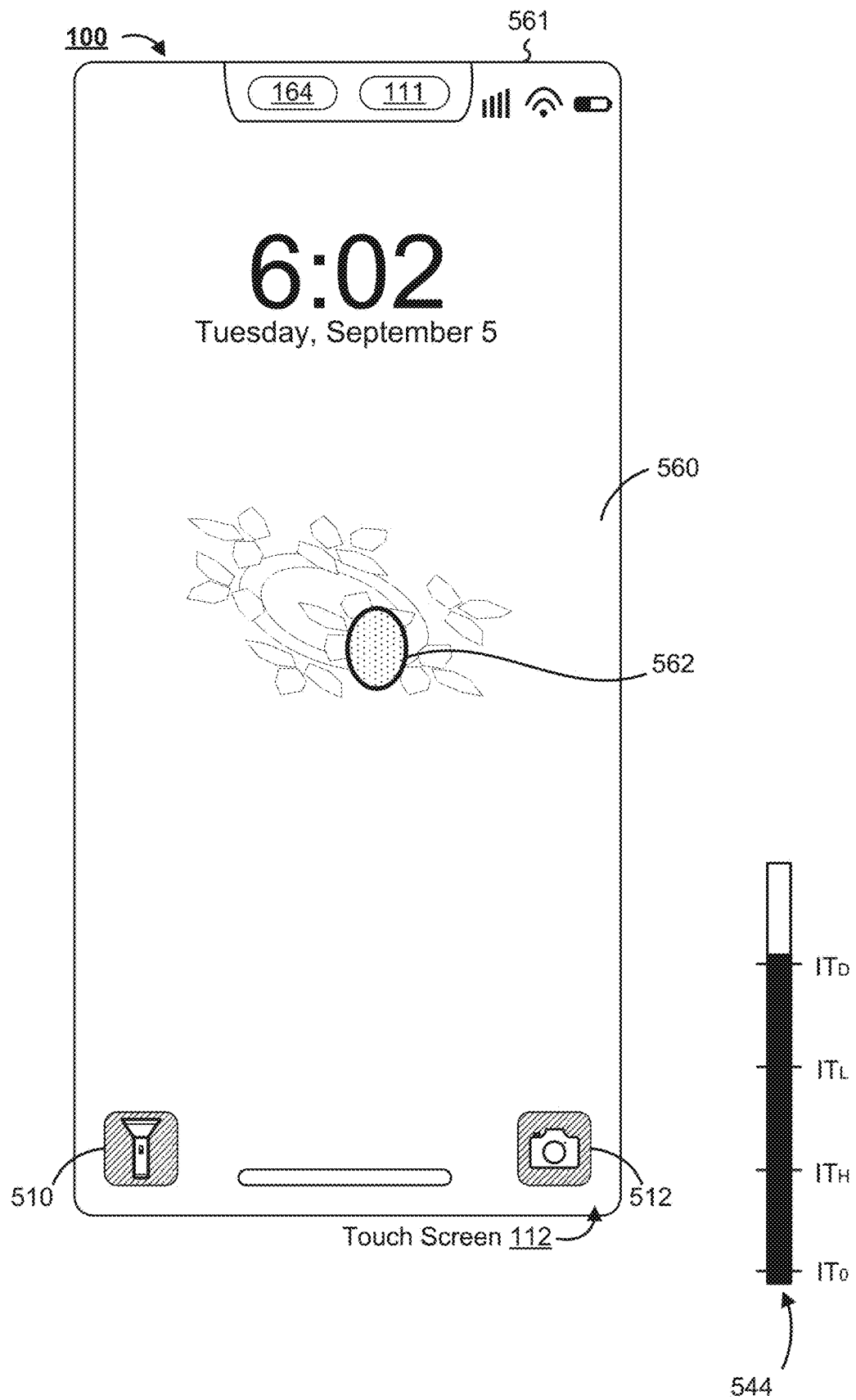
Figure 5A:
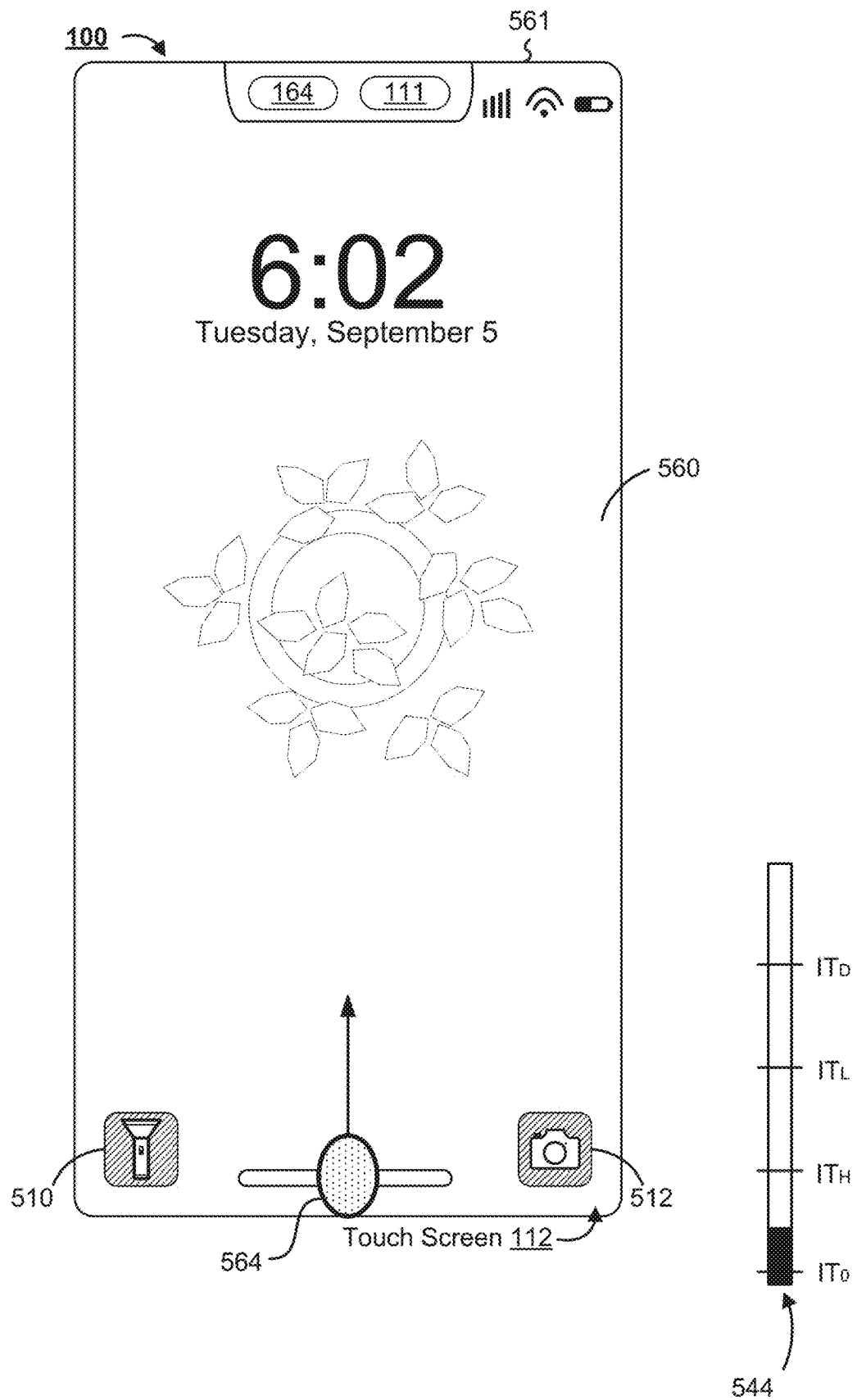
Figure 5A:
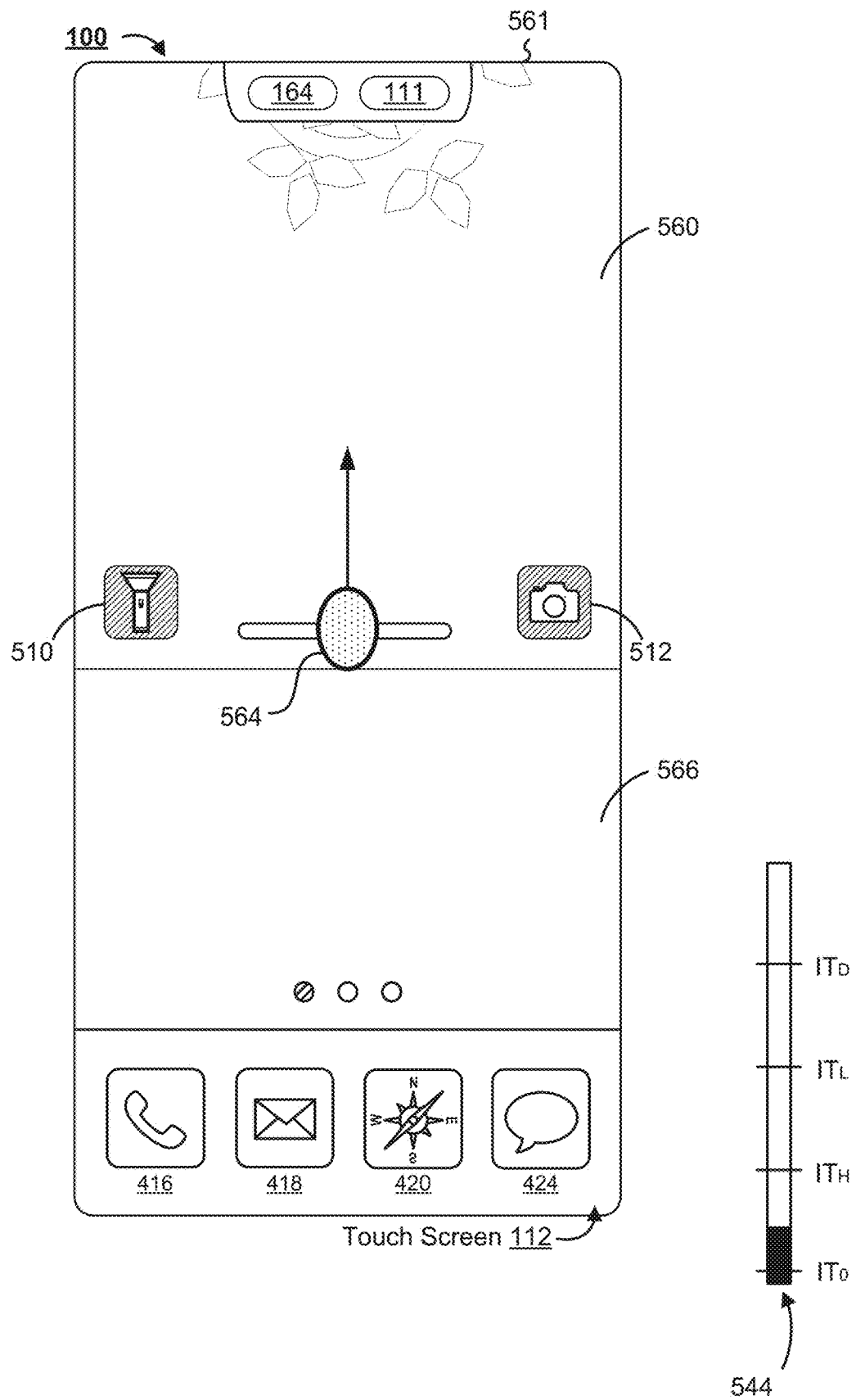
Figure 5A:
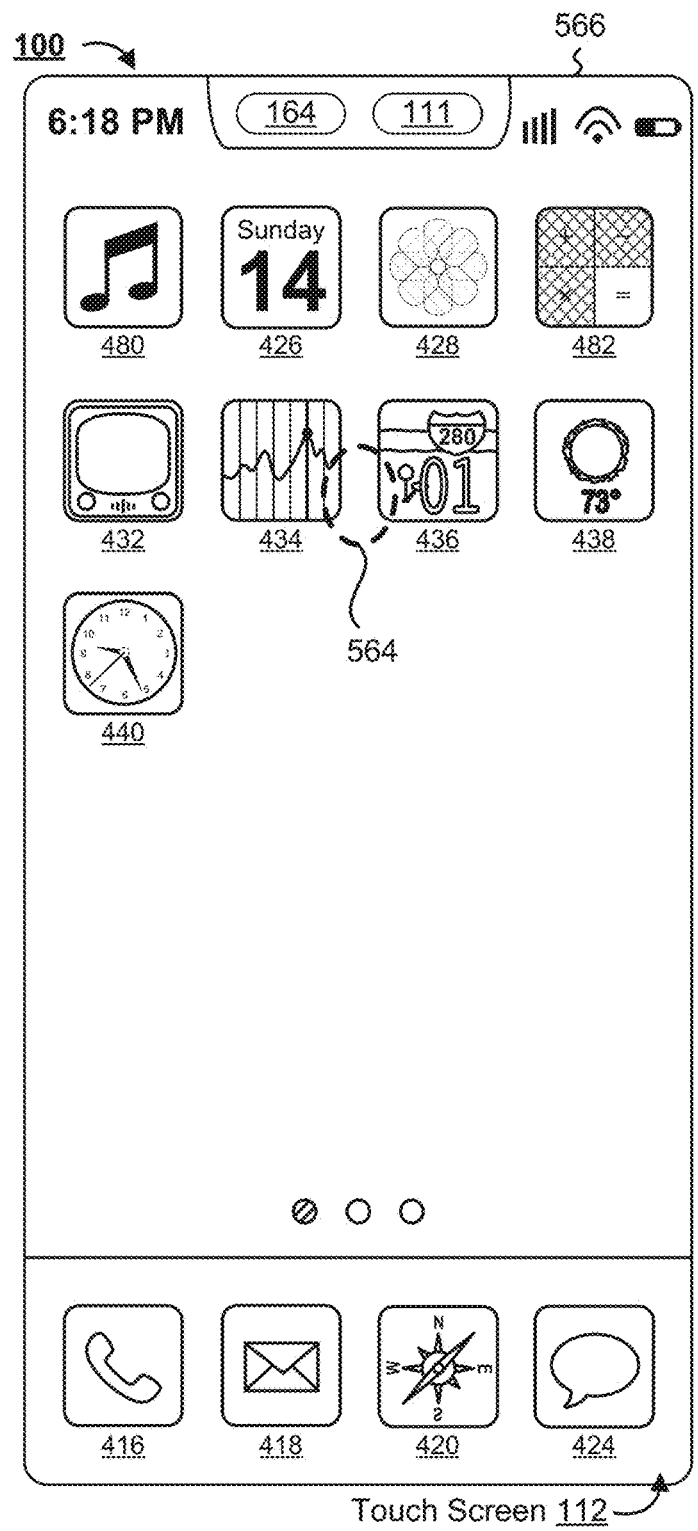
Figure 5A:
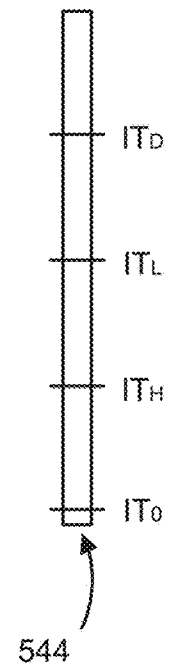
Figure 5A:
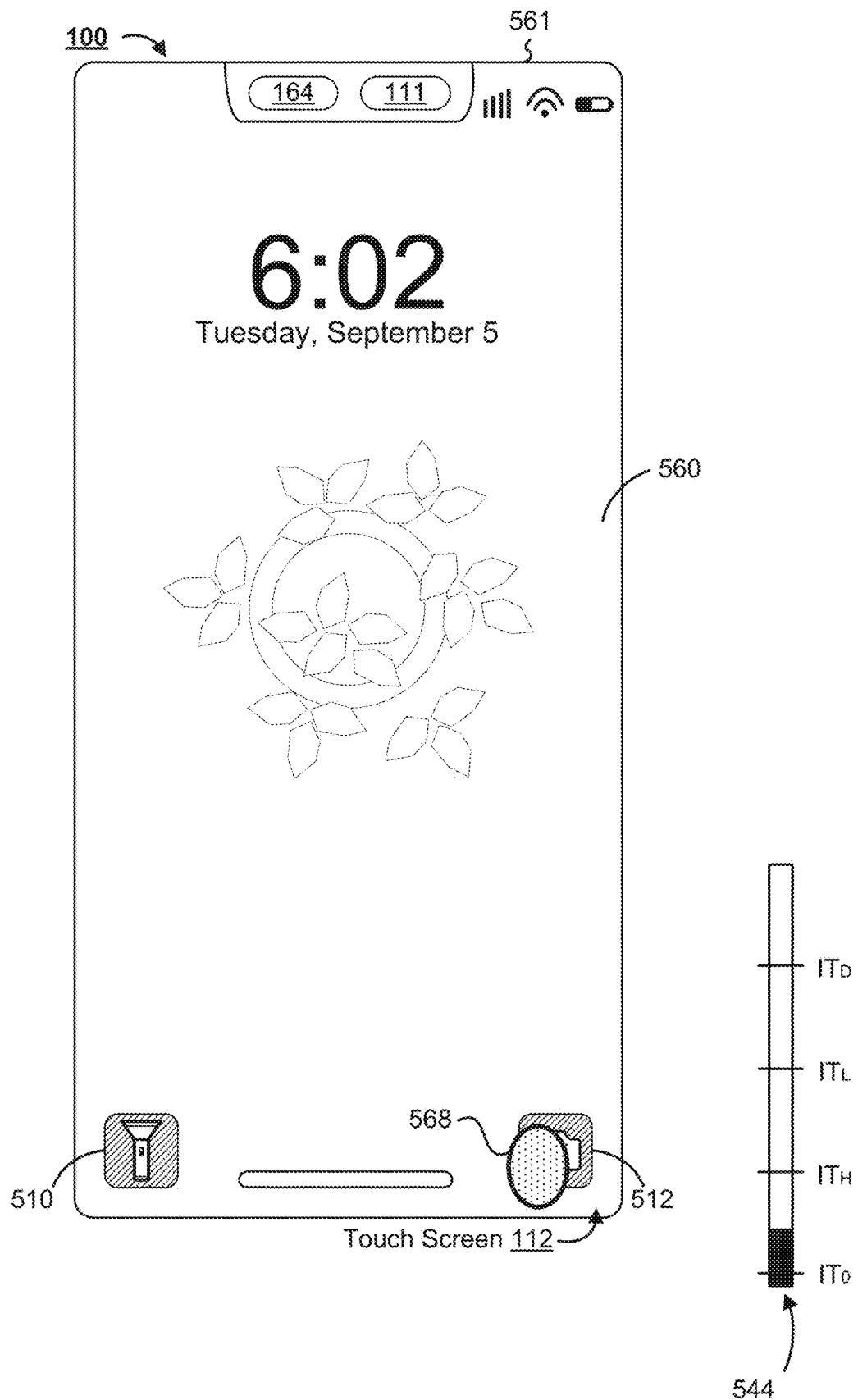
Figure 5A:
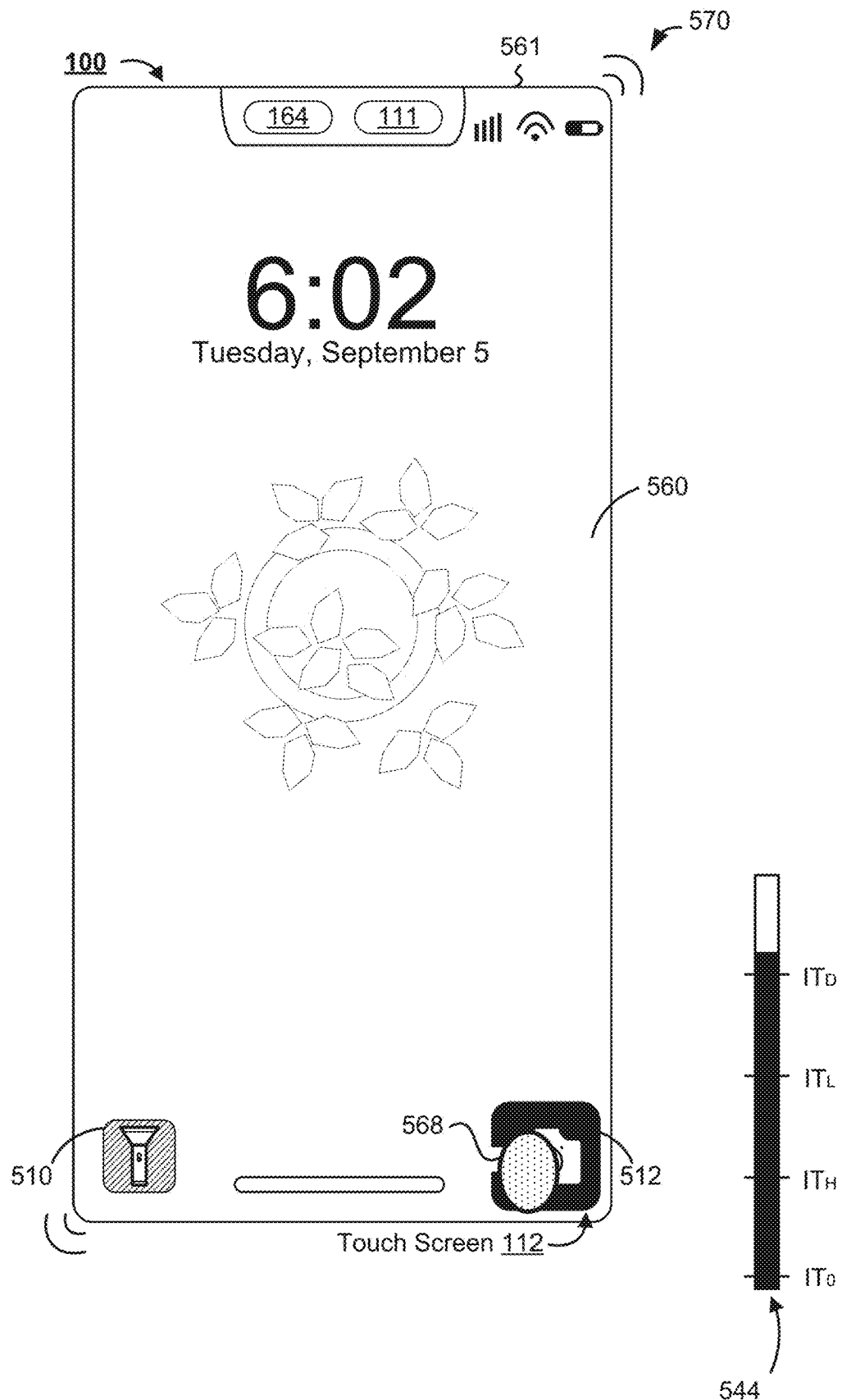
Figure 5A:
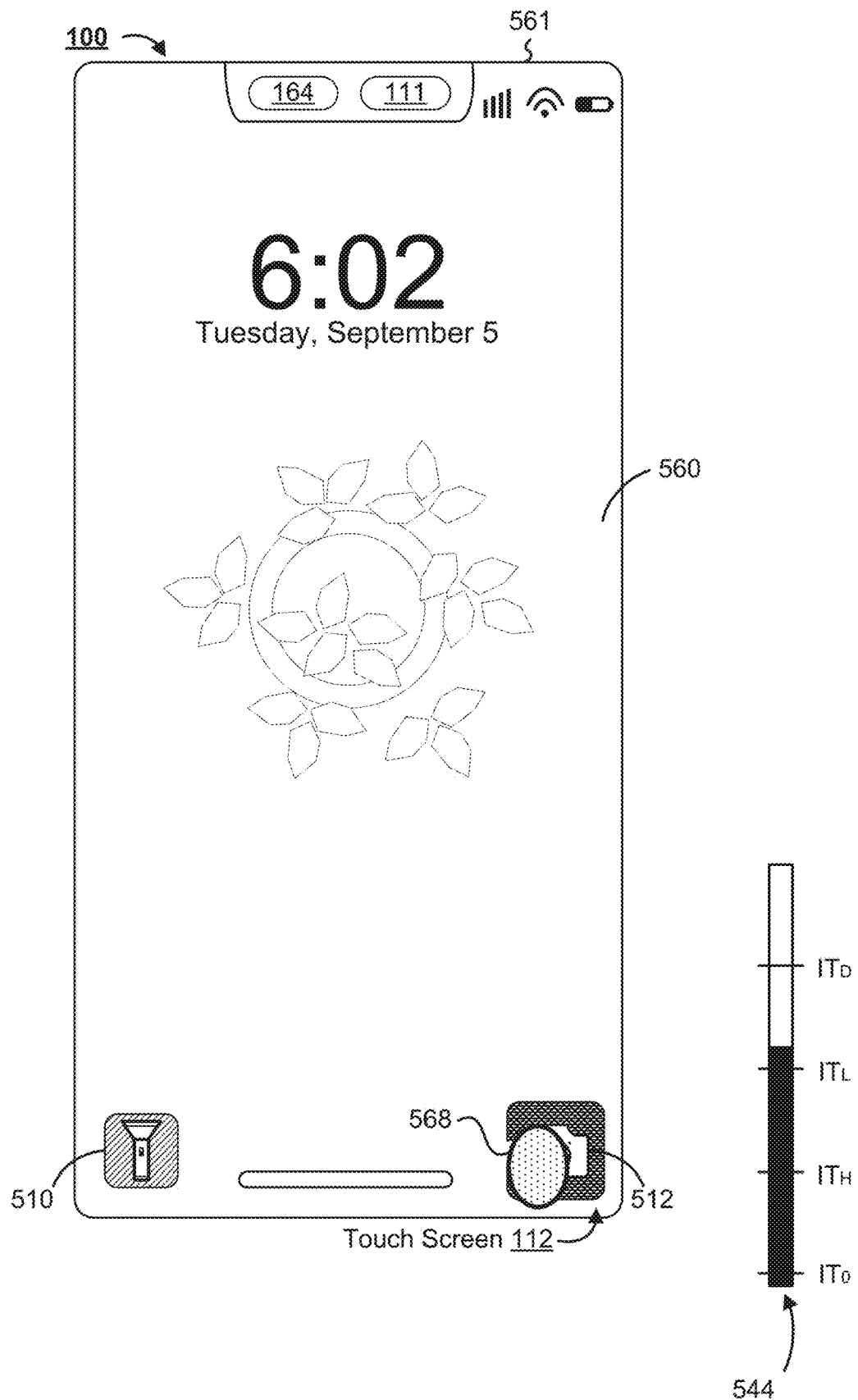
Figure 5A:
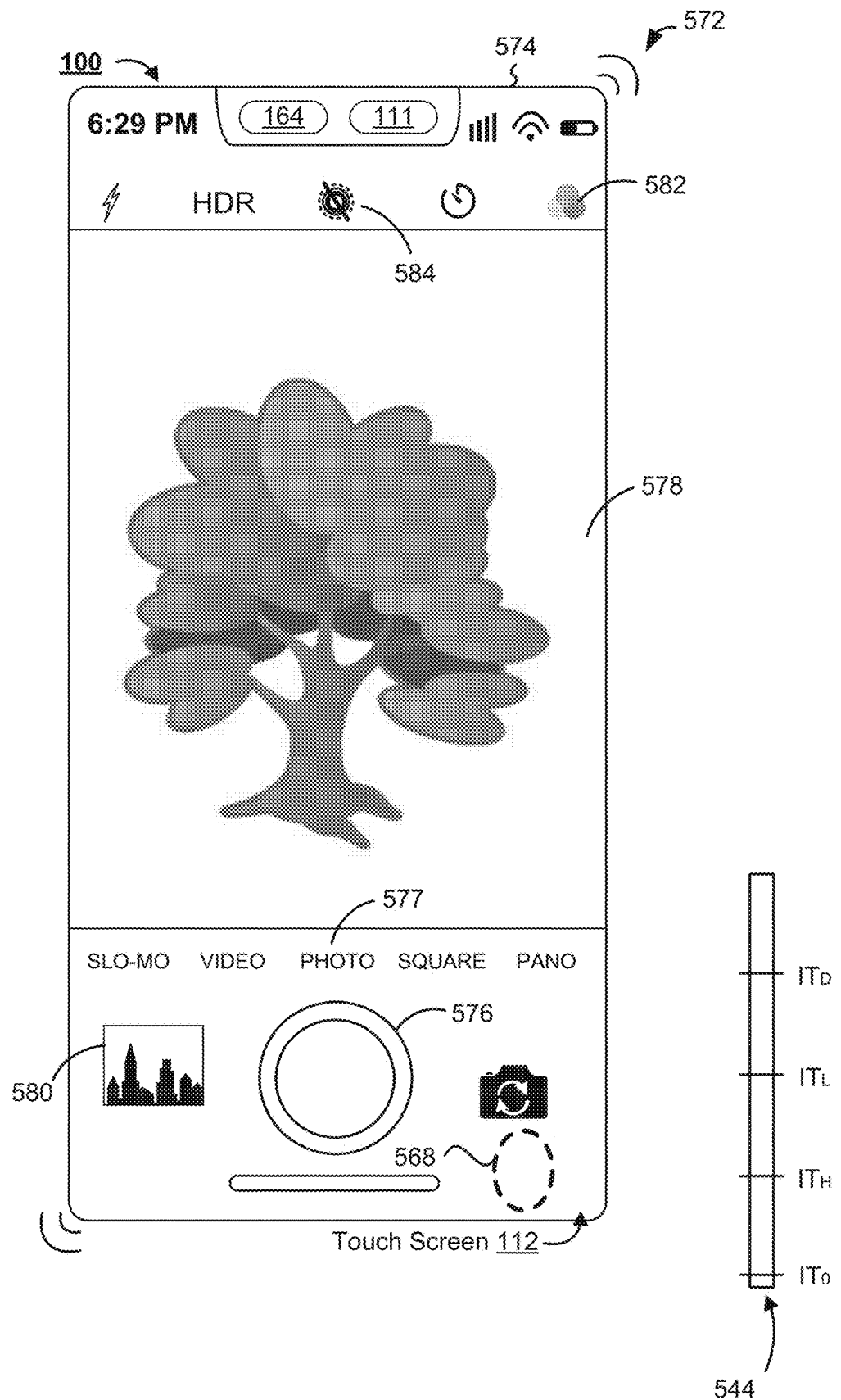
Figure 5A:
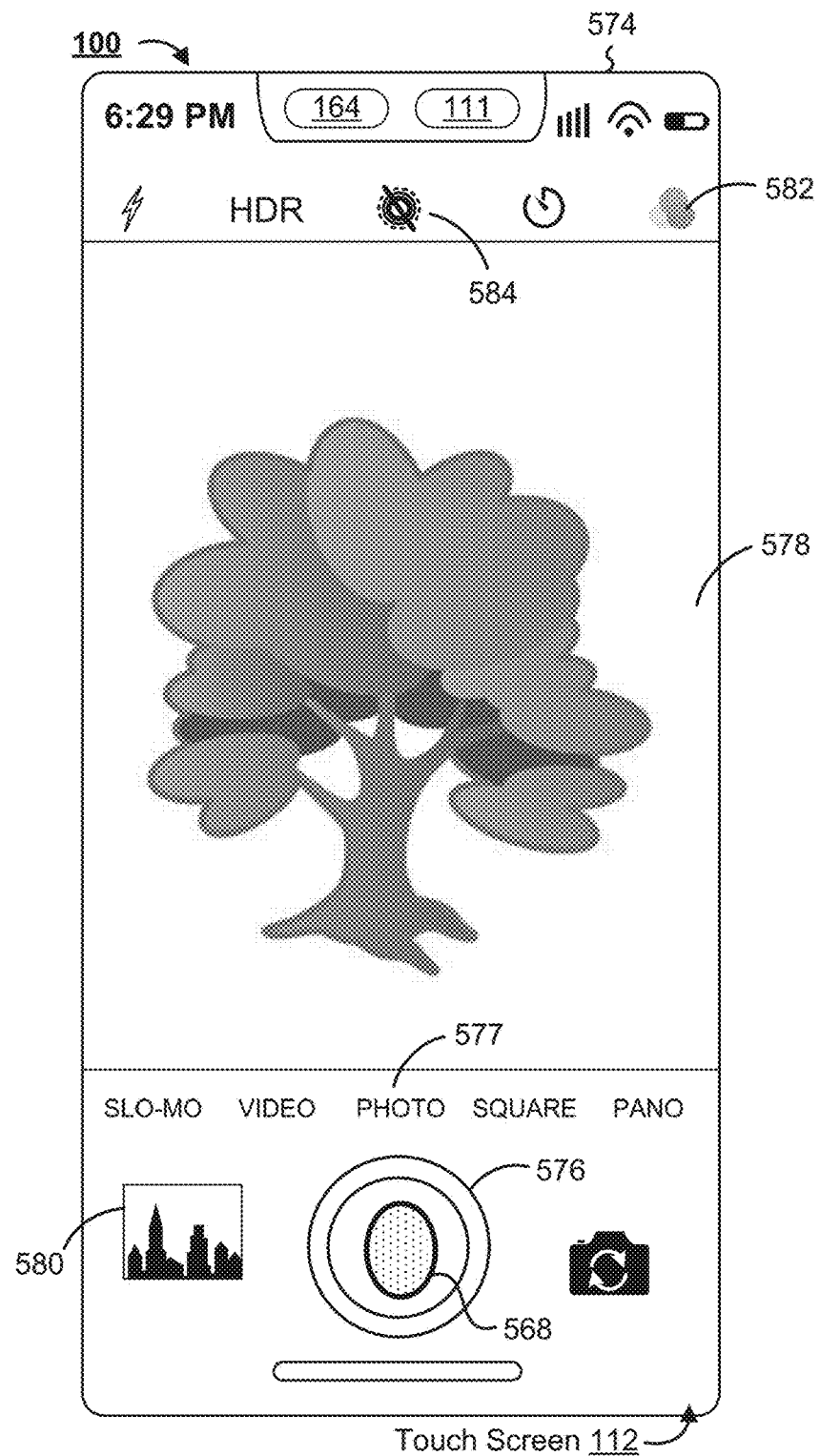
Figure 5A:
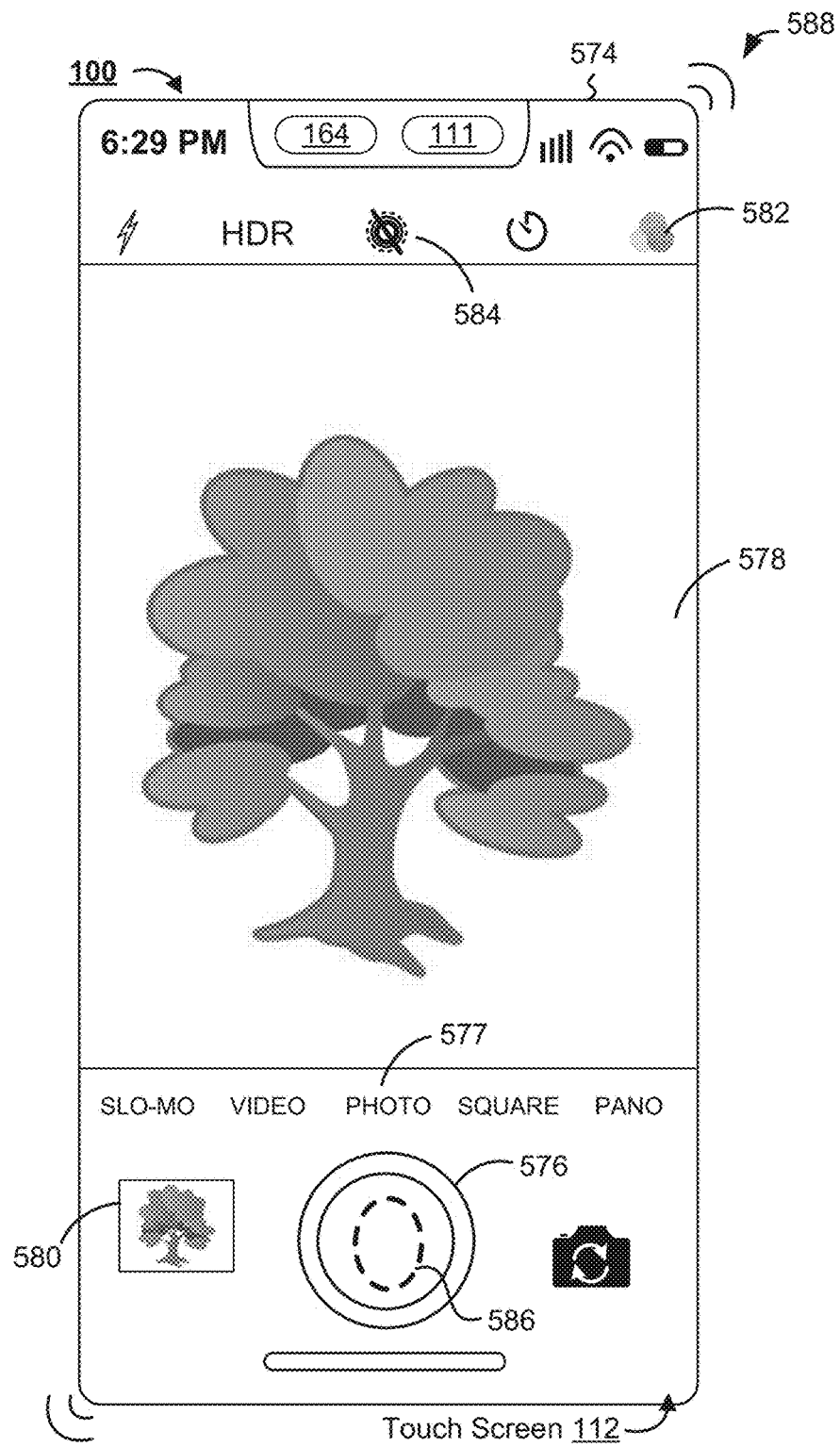
Figure 5A:
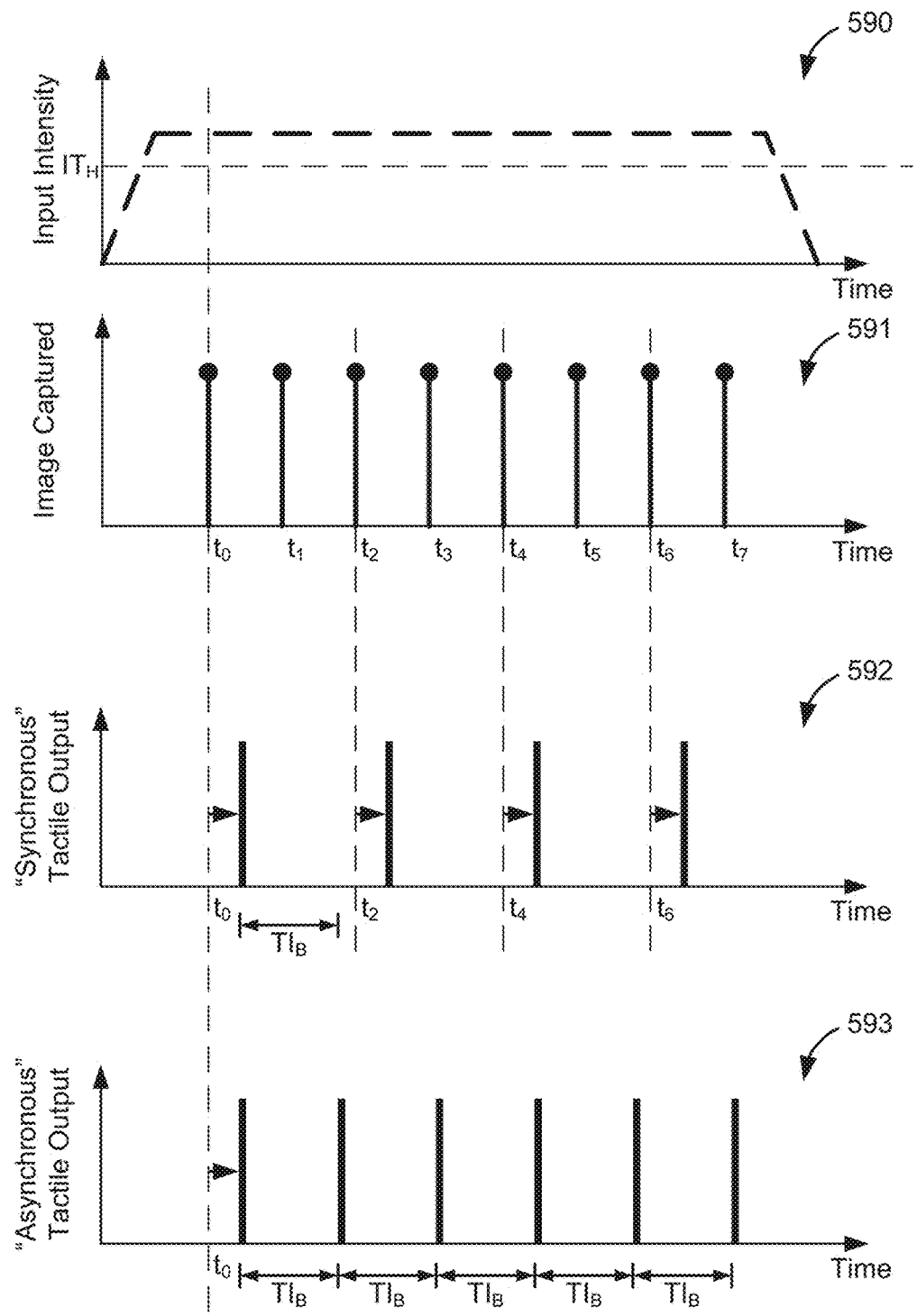
Figure 5A:
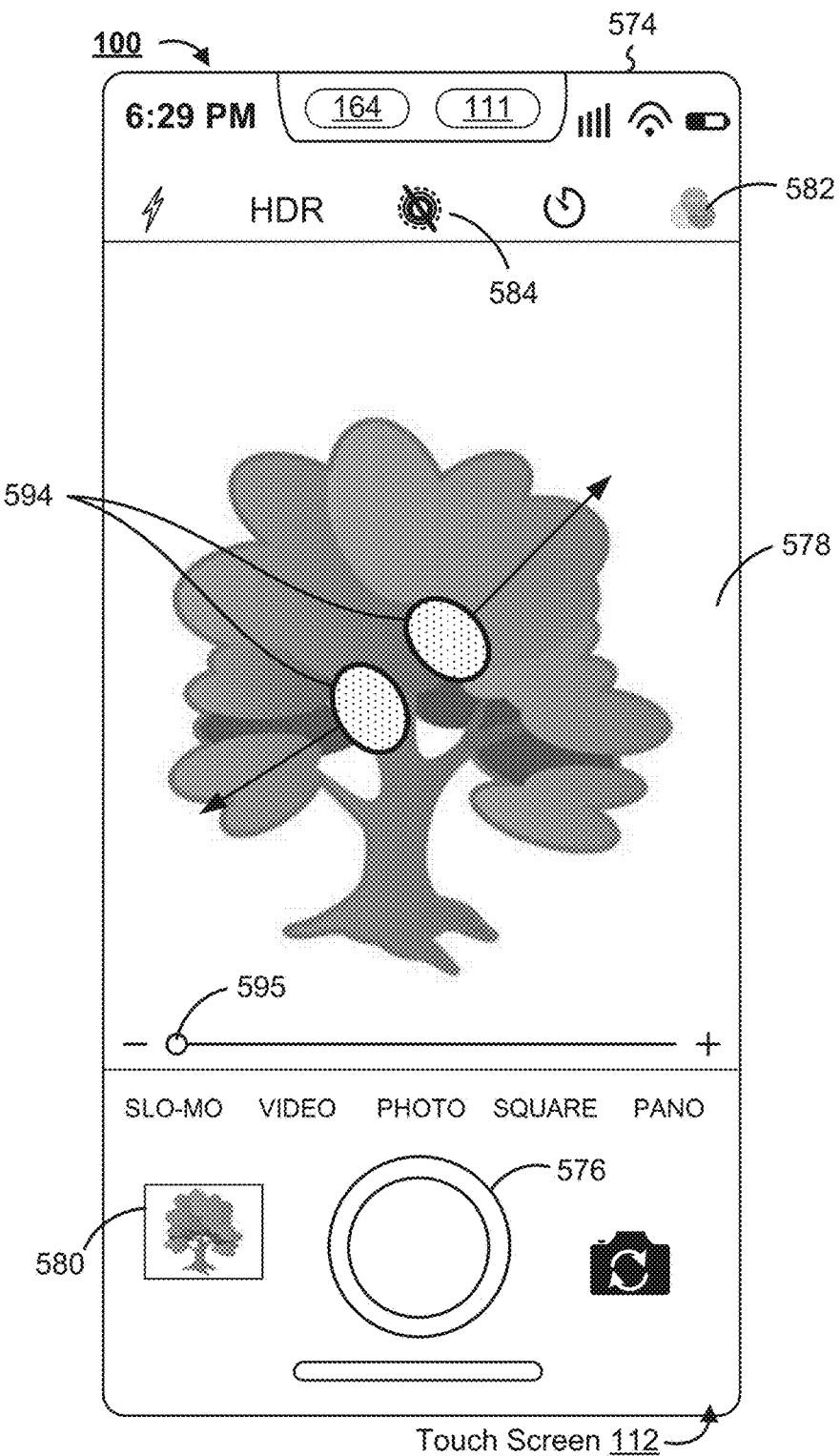
Figure 5A:
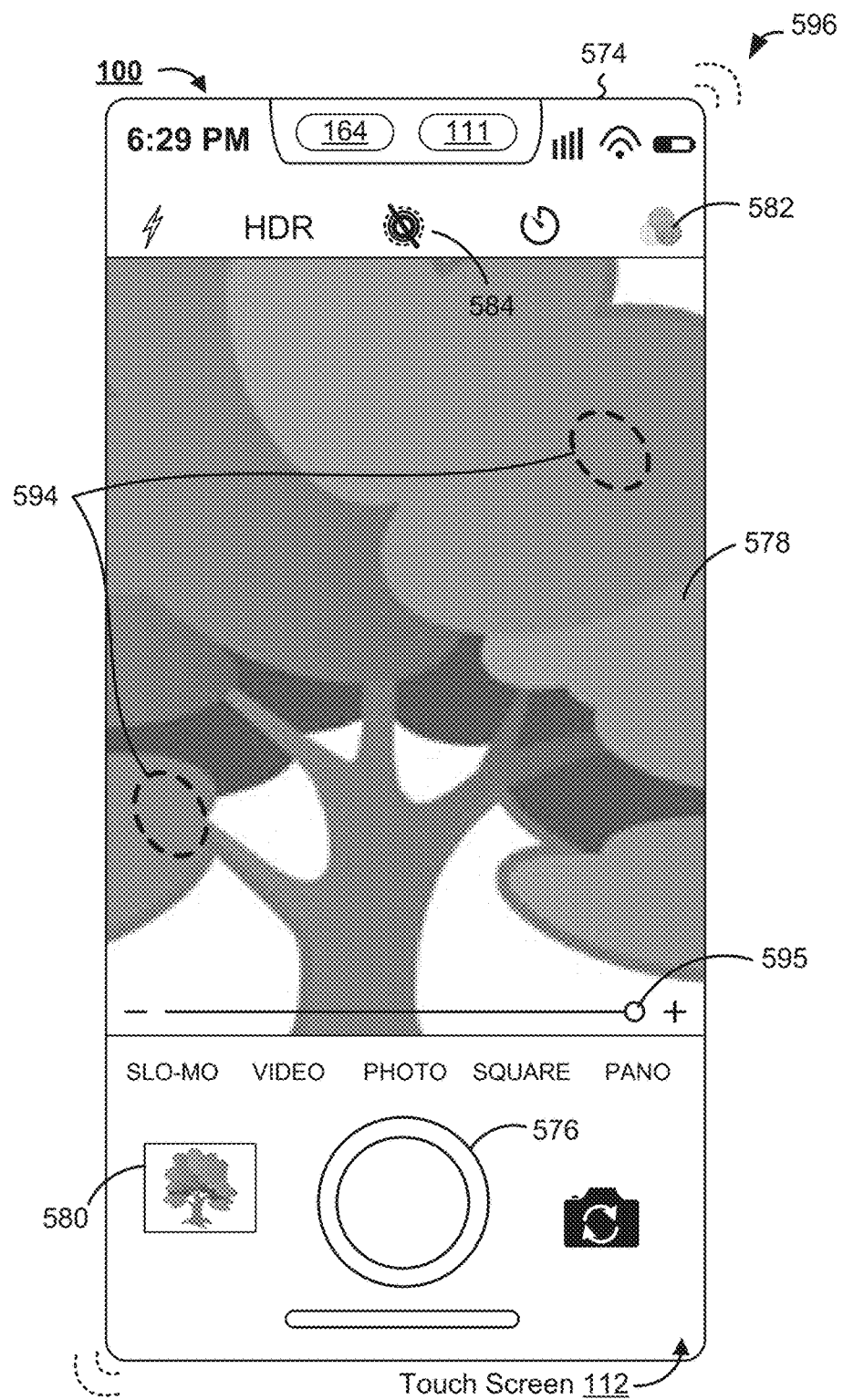
Figure 5A:
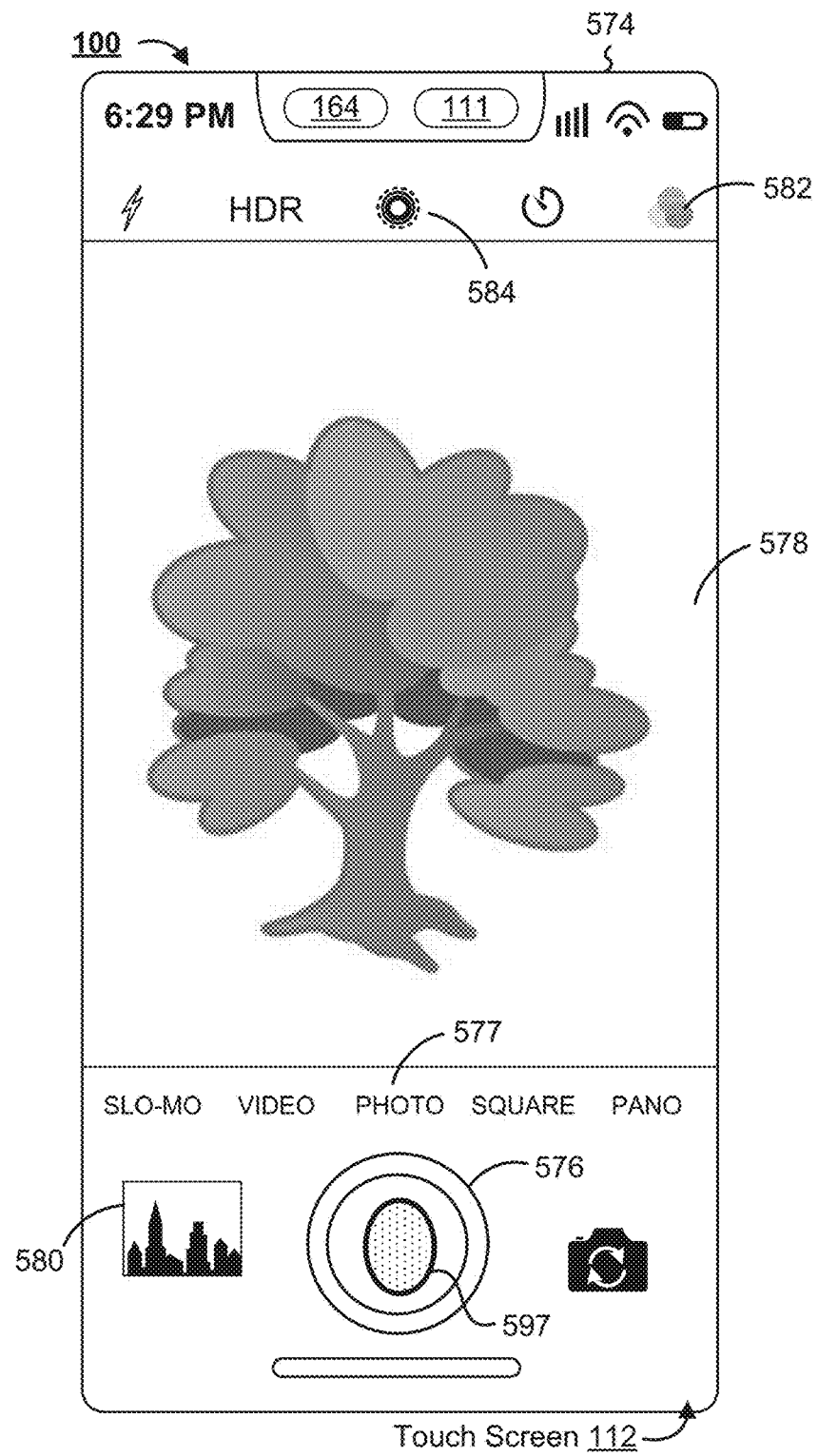
Figure 5A:
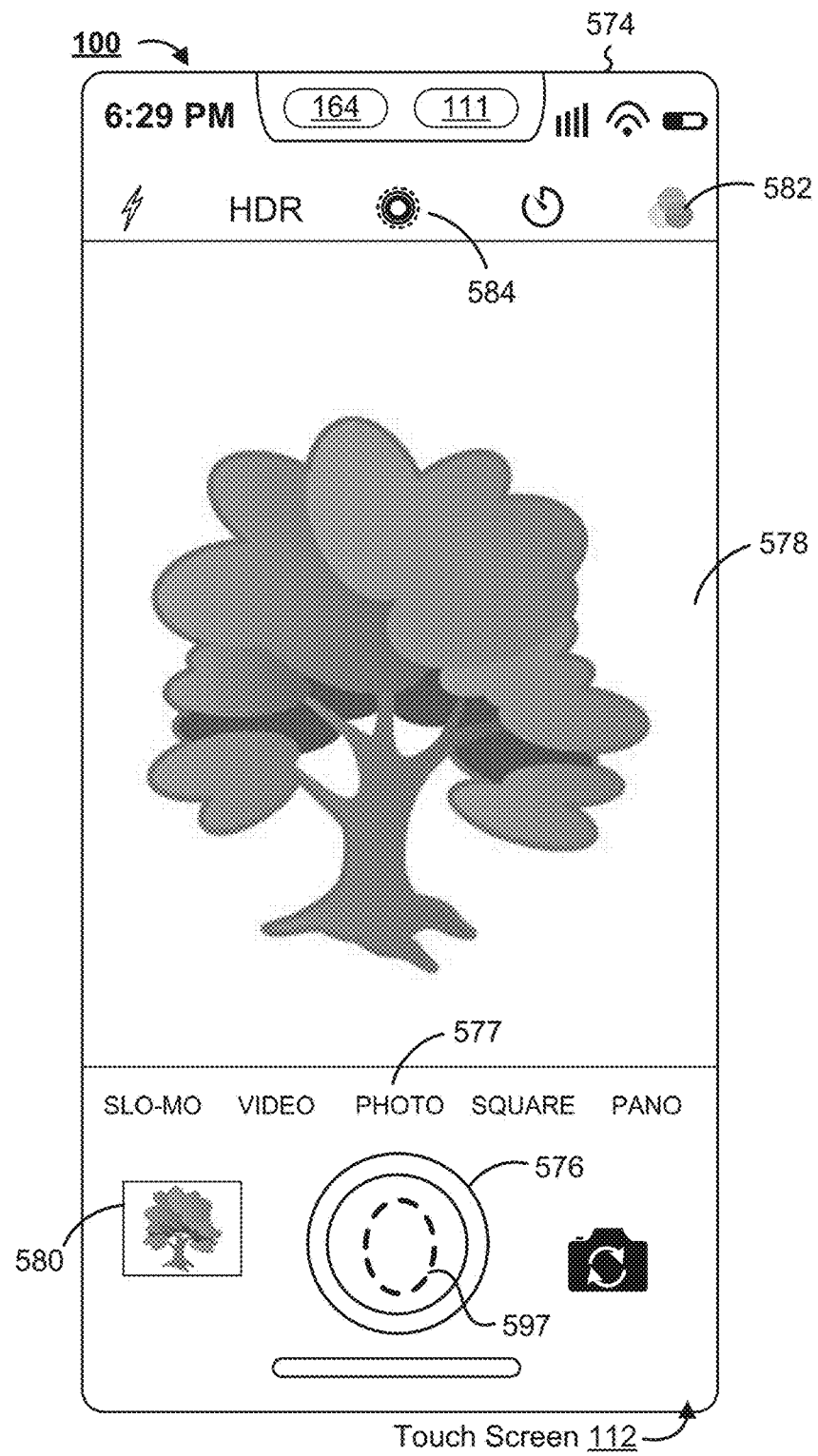
Figure 5A:
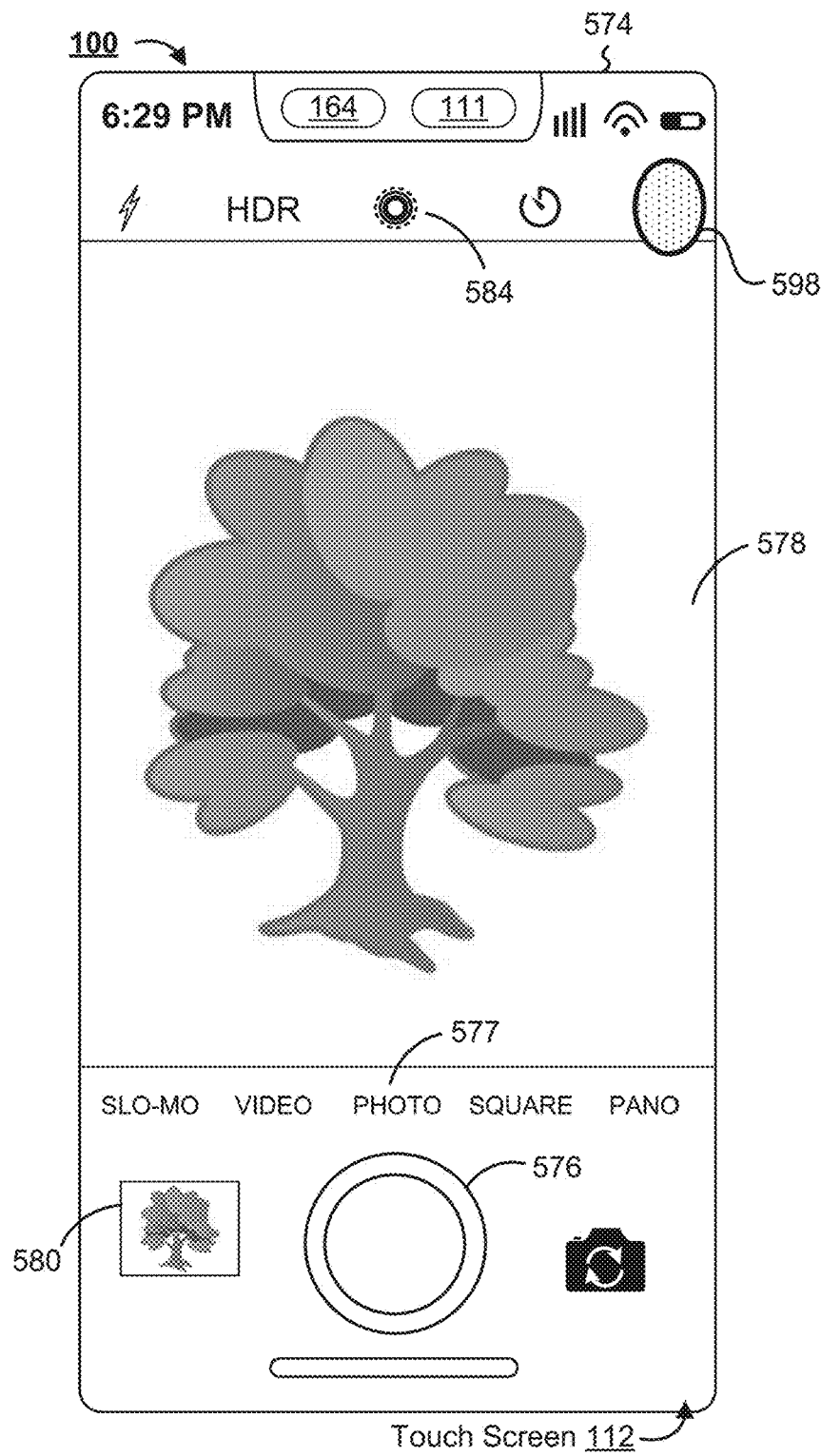
Figure 5A:
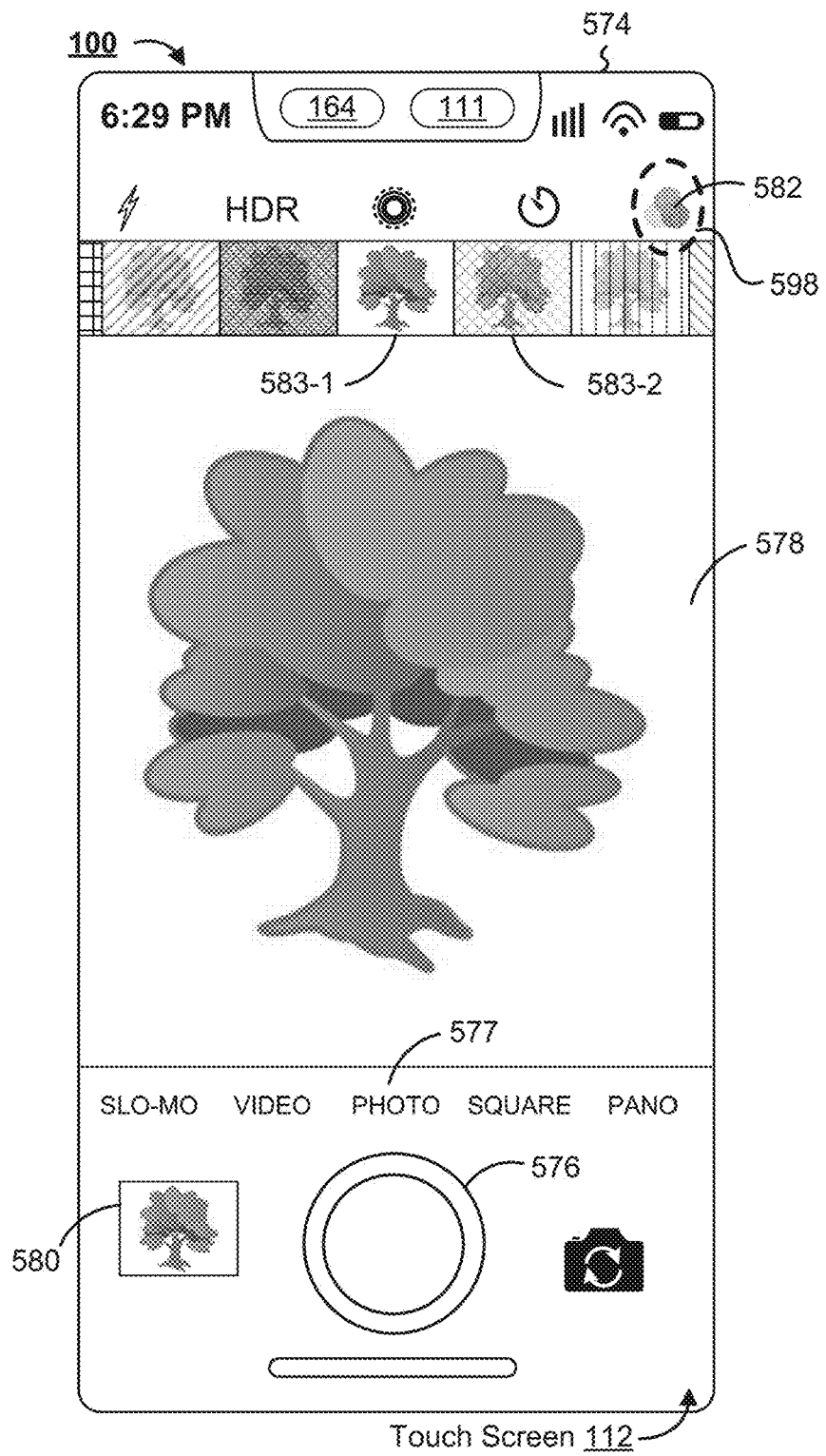
Figure 5A:
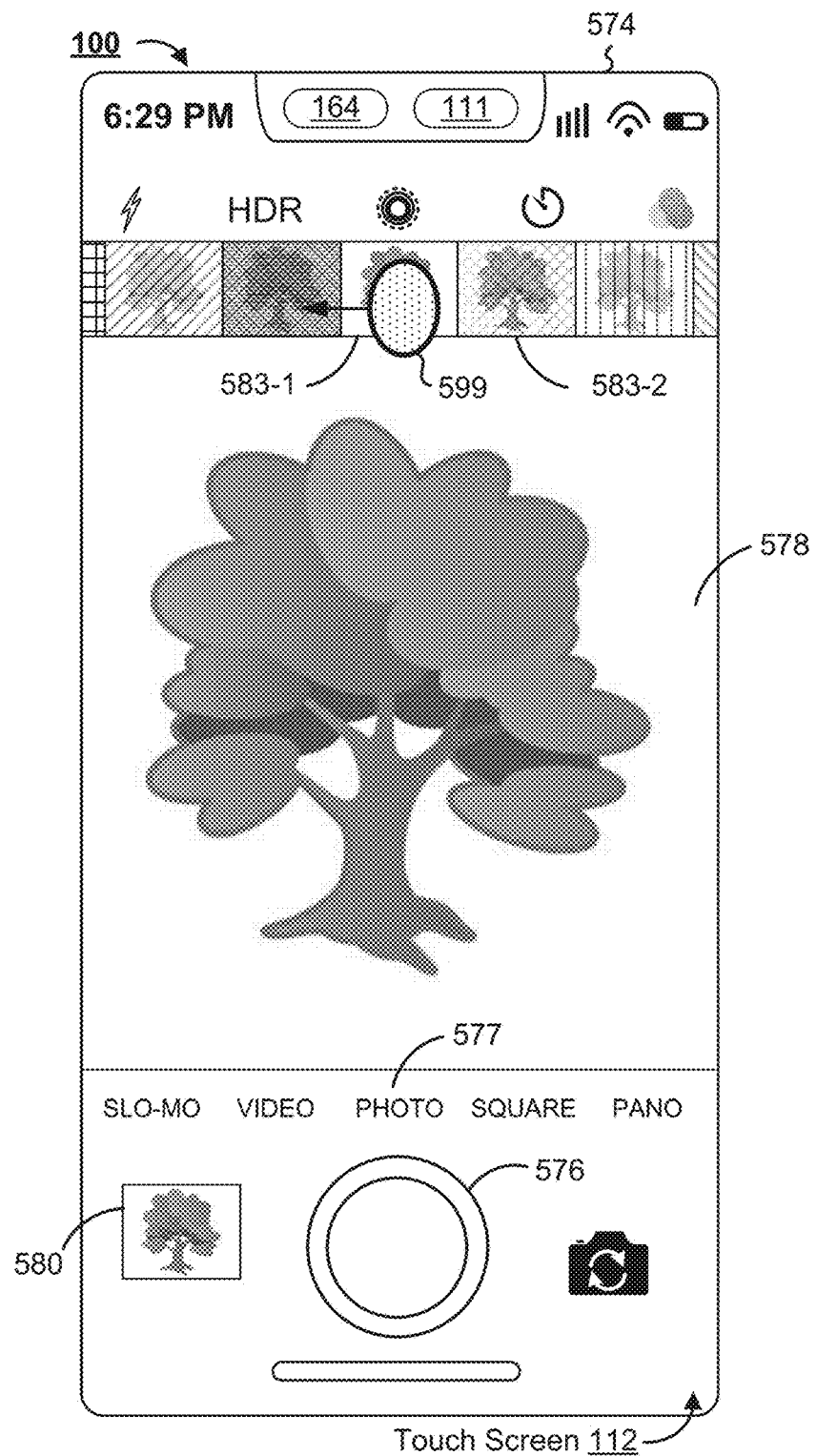
Figure 5A:
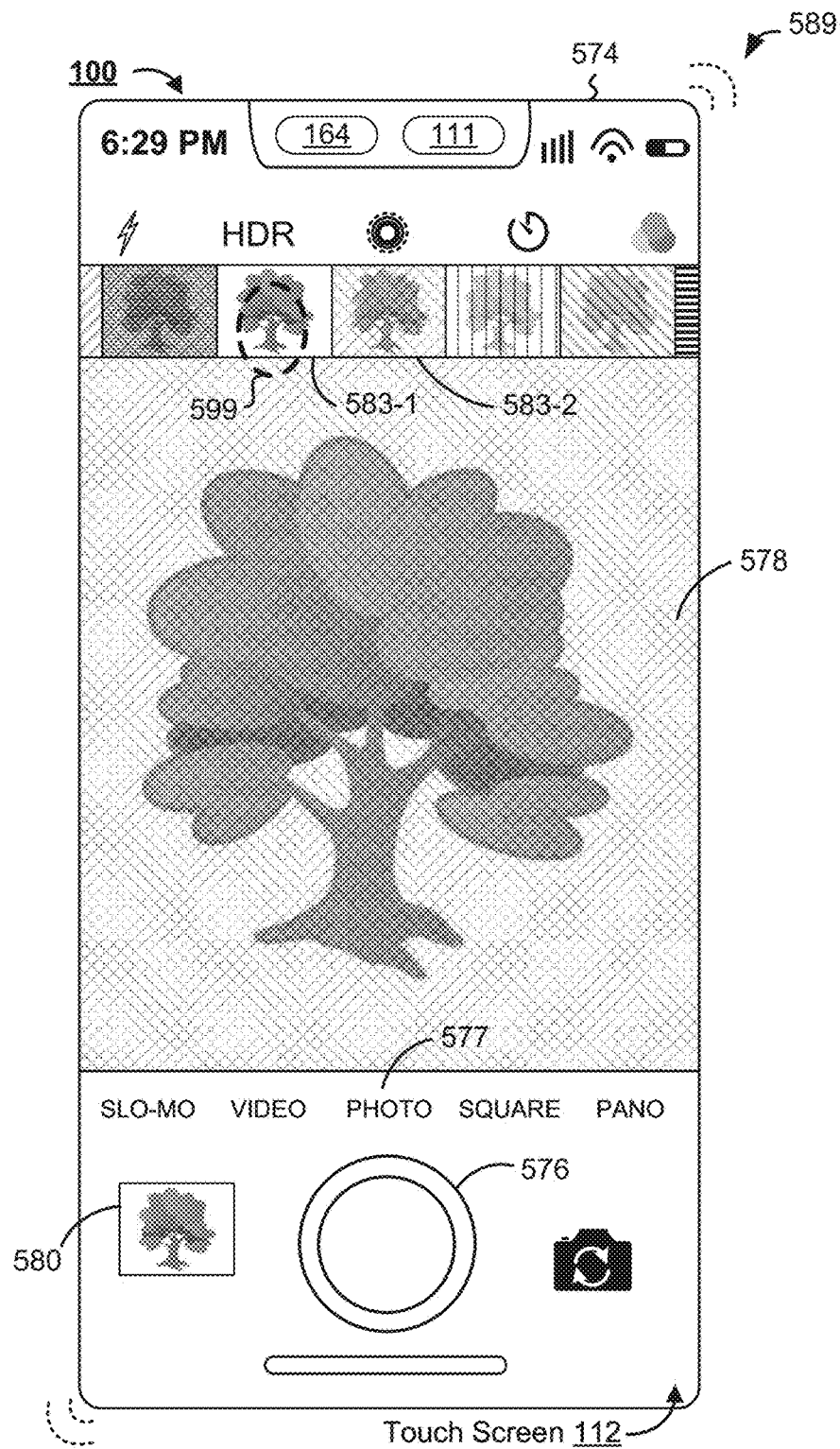
Figure 5A:
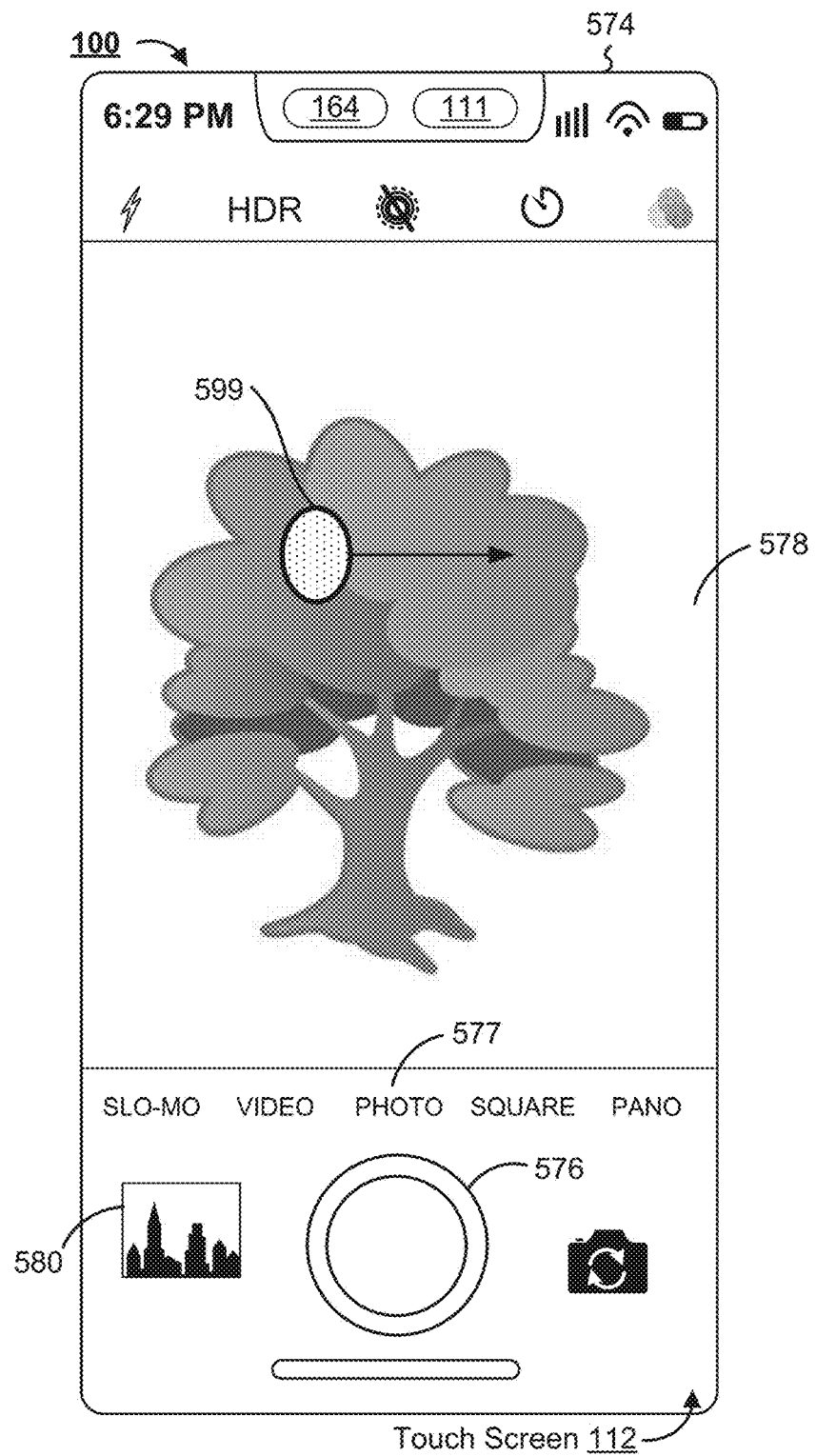
Figure 5A:
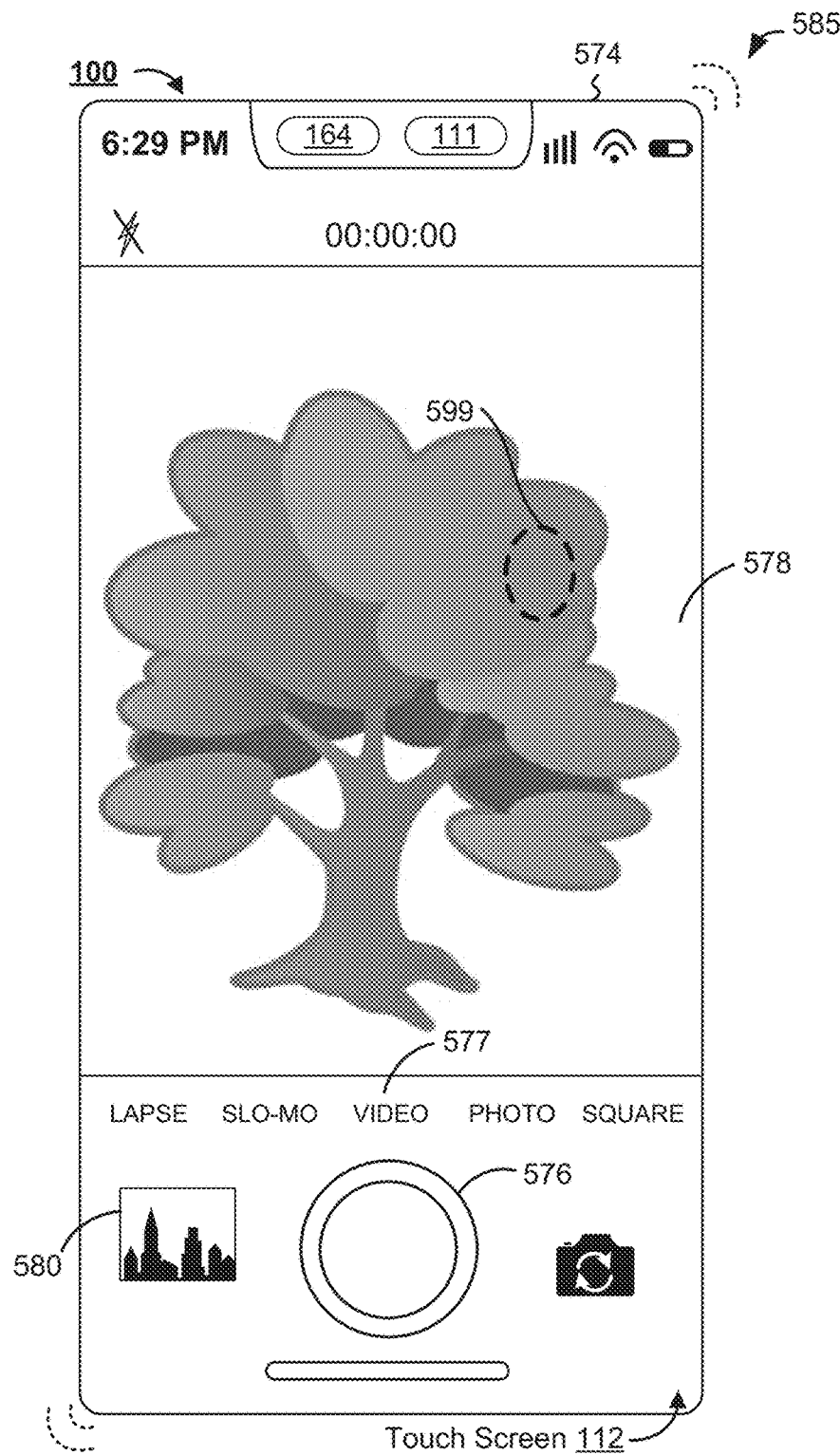
Figure 5A:
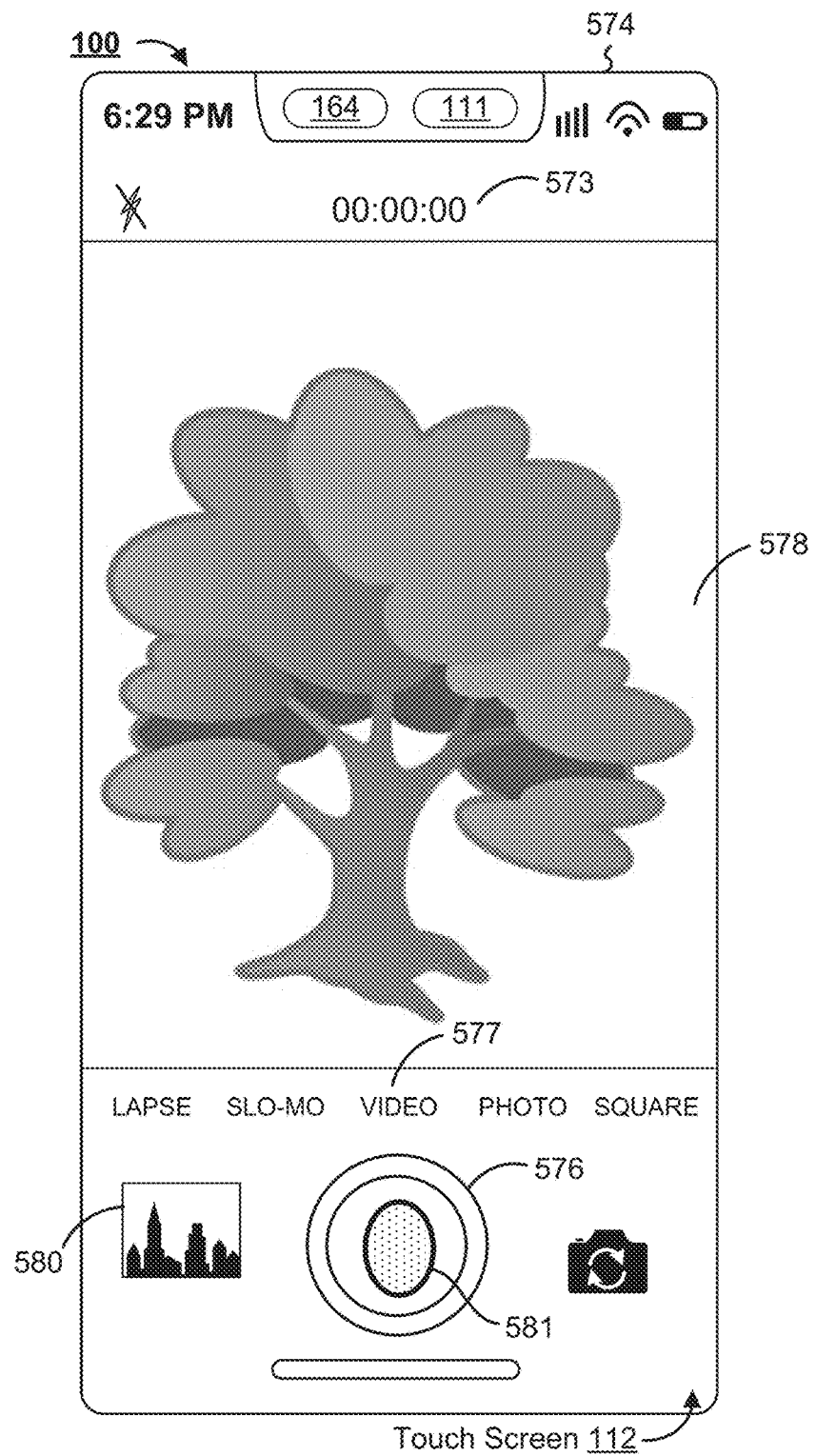
Figure 5A:
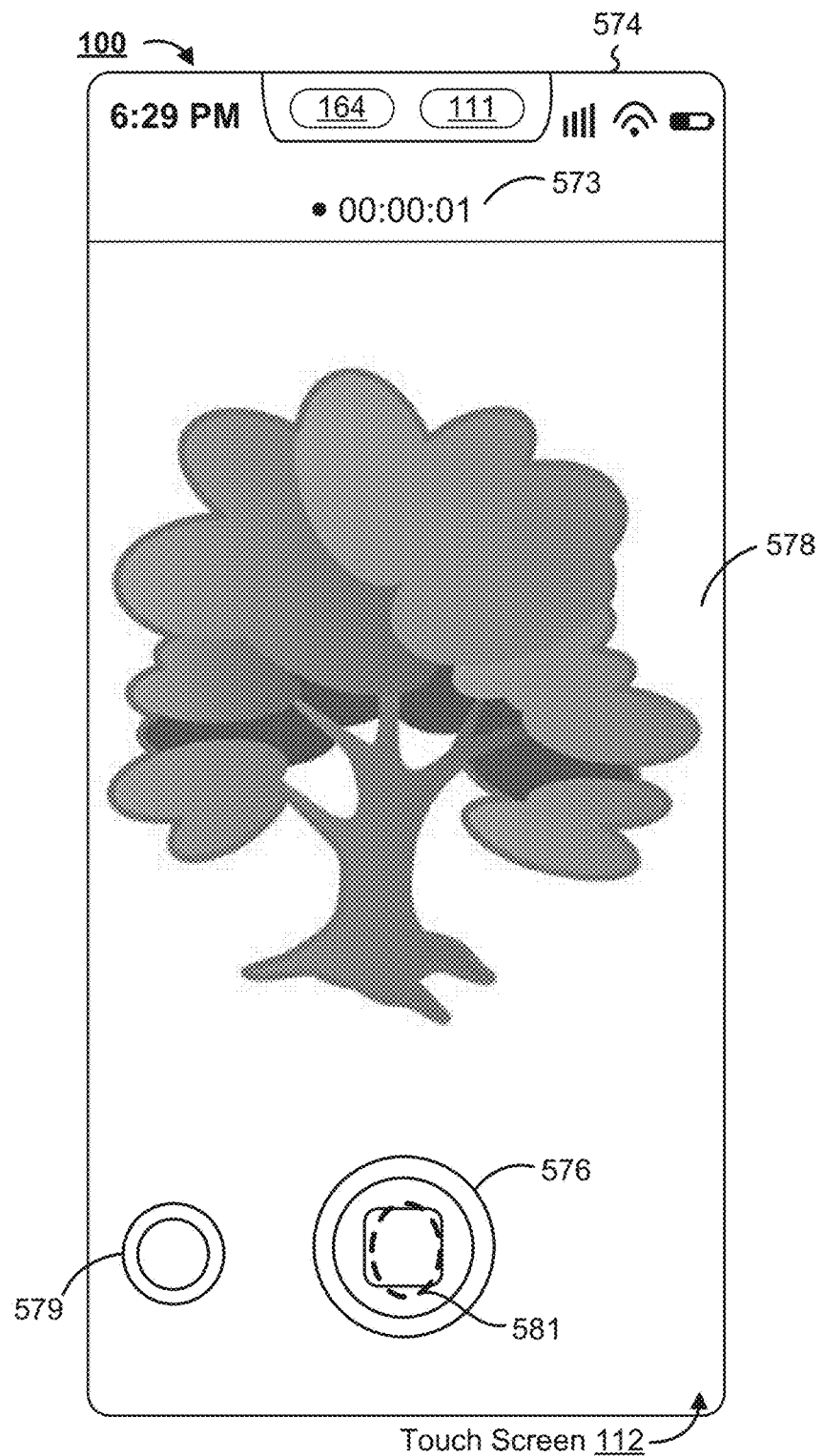
Figure 5A:
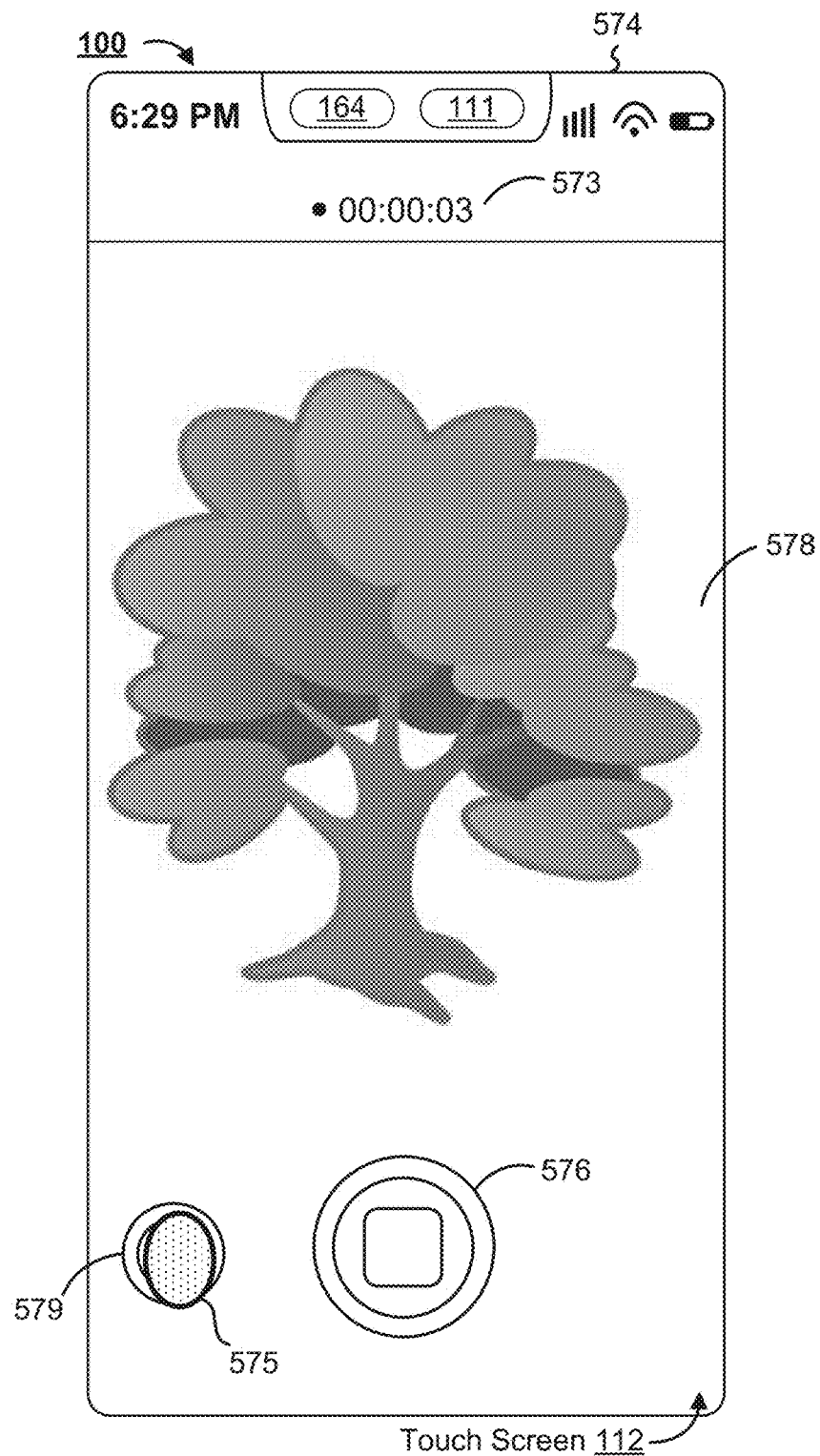
Figure 5A:
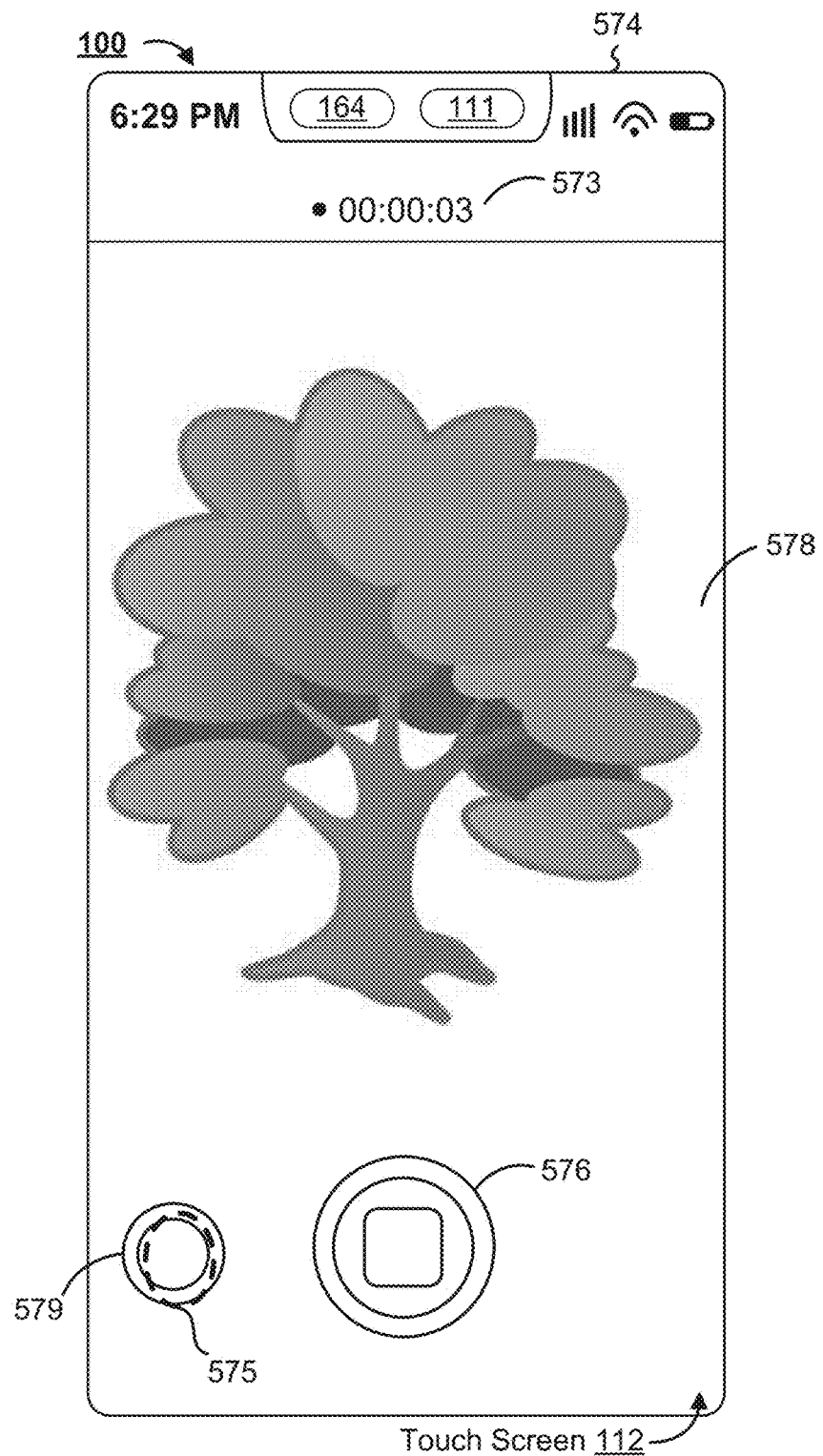
Figure 5A:
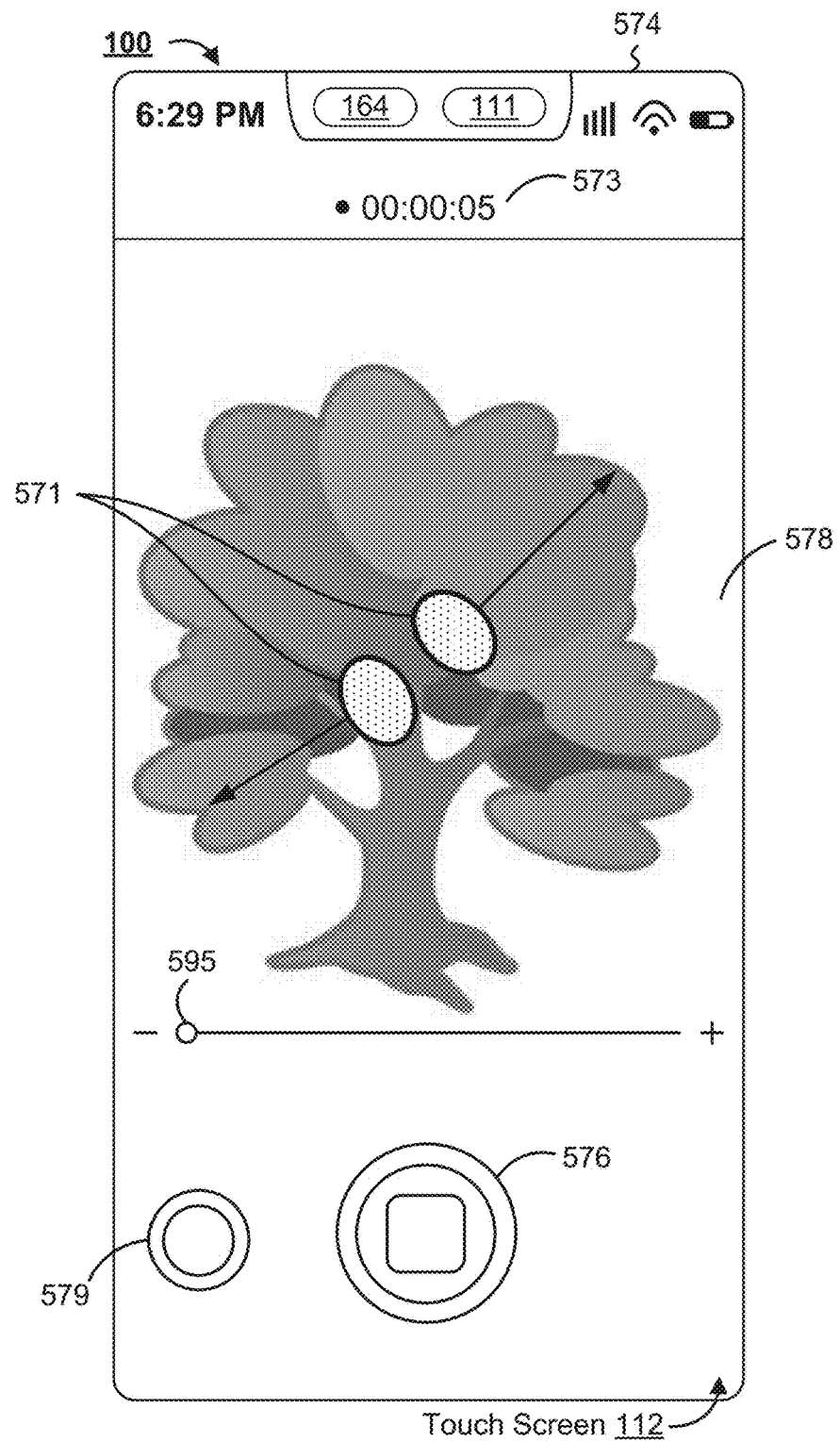
Figure 5B:
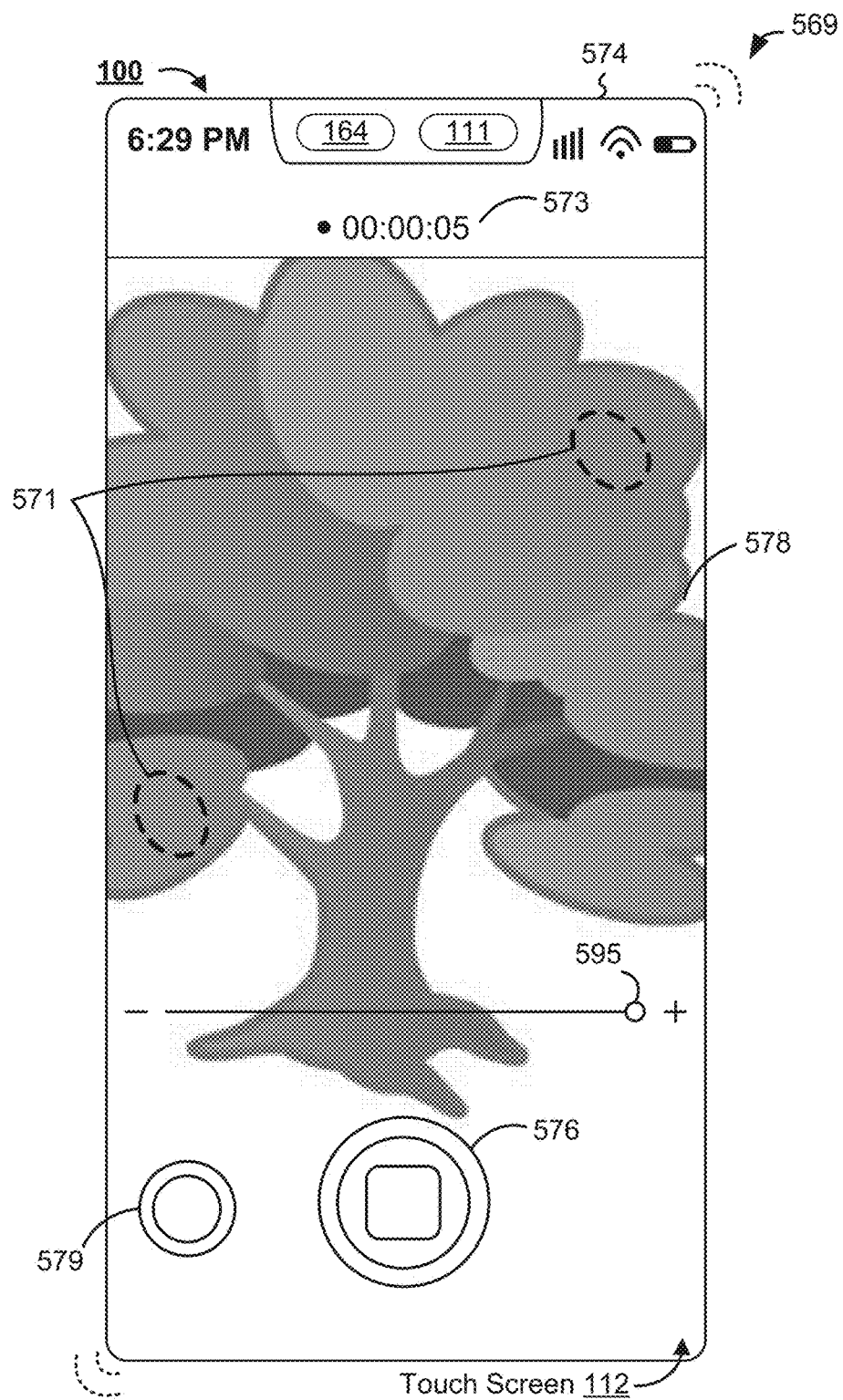
Figure 6A:
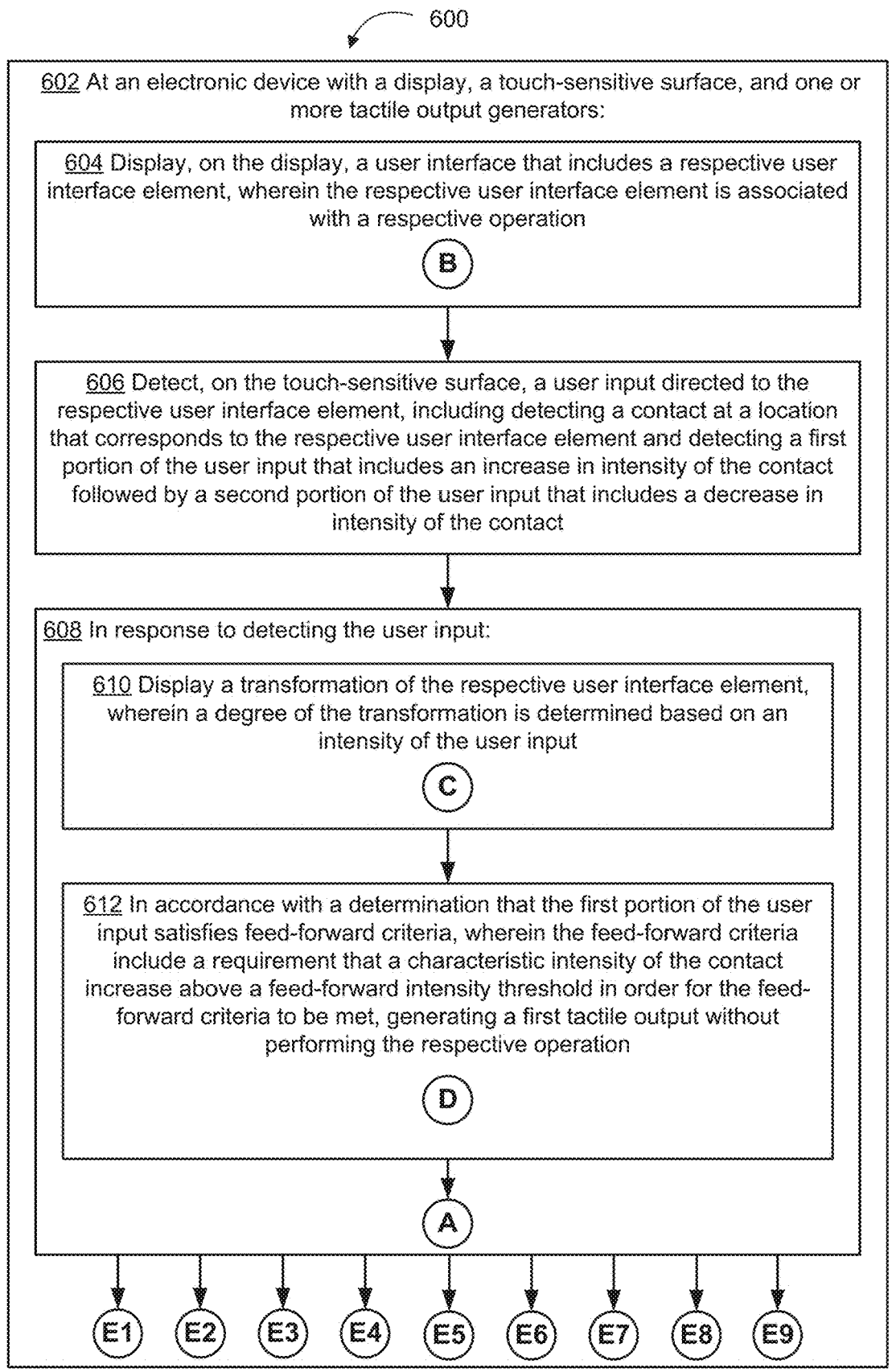
Figure 6B:
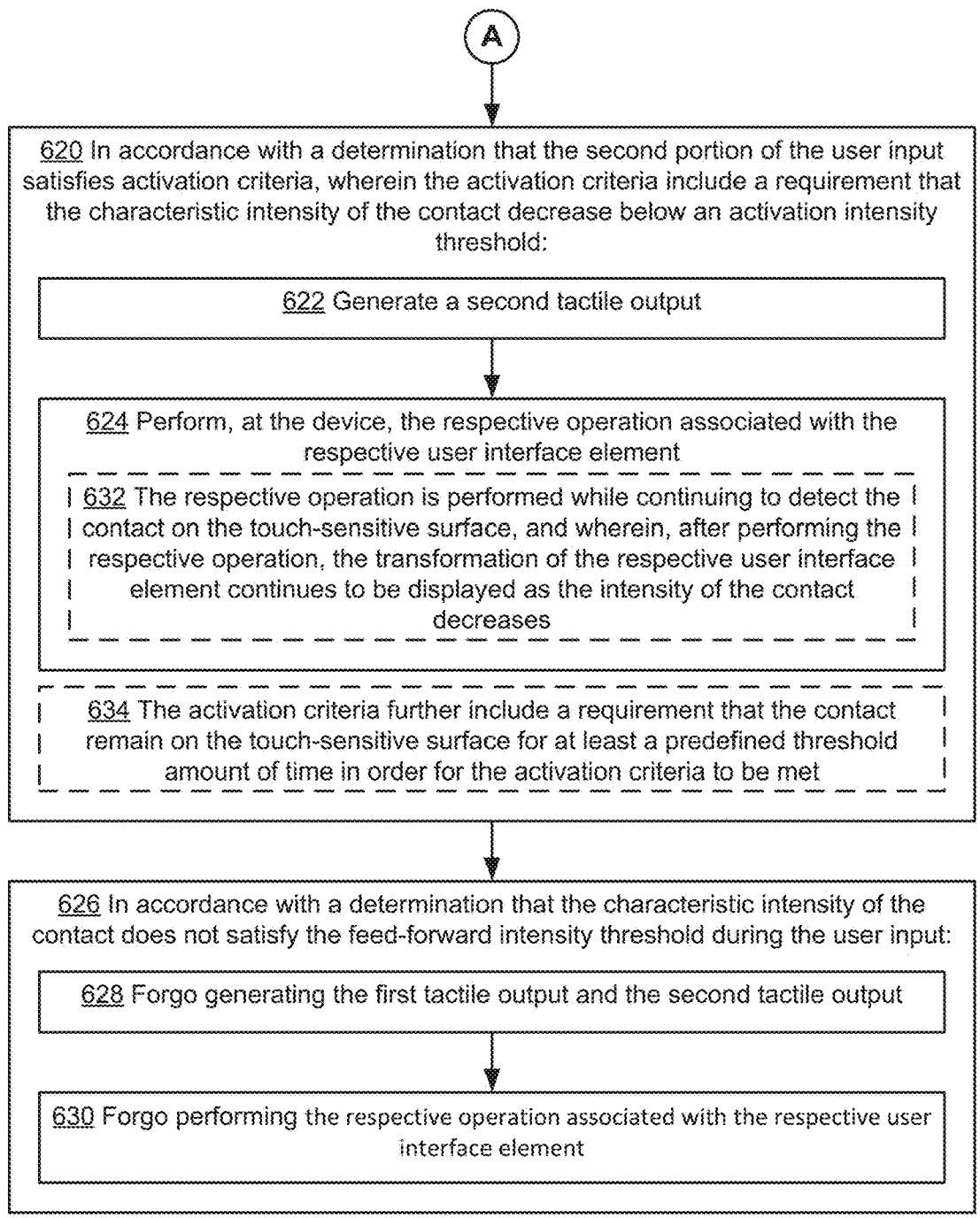
Figure 6F:
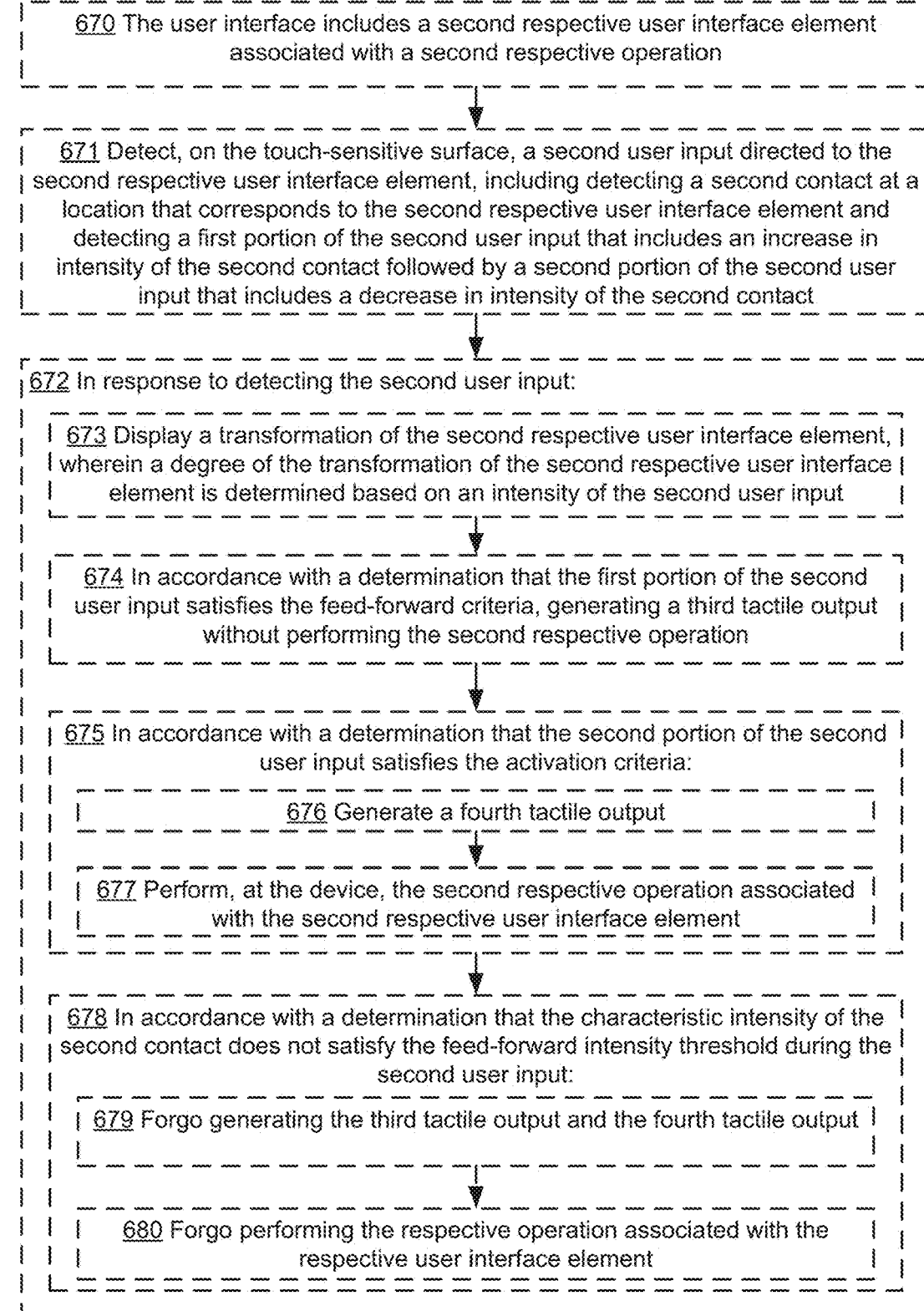

FIGS. 5Z-5AA illustrates transitions of background 560 from FIG. 5Y. In FIG. 5Z, the intensity of contact 562 has increased above intensity threshold $IT_L$. In accordance with the intensity of contact 562 being above intensity threshold $IT_L$, a first degree of transformation (e.g., an animation) of background 560 is displayed. In FIG. 5AA, the intensity of contact 562 has further increased above intensity threshold $IT_D$. In the example shown in FIGS. 5Z-5AA, the degree of transformation of background 560 increases as the intensity of contact 562 increases (e.g., the animation of background 560 is progressed forward as the intensity of contact 562 increases). In some embodiments, the degree of transformation (e.g., the animation) of background 560 is reversed as the intensity of contact 562 decreases. In some embodiments, playback of an animation of background 560 begins in accordance with the intensity of contact 562 reaching intensity threshold $IT_L$. In some embodiments, playback of the animation of background 560 continues after the intensity of contact 562 has reached intensity threshold $IT_L$, without regard to subsequently detected intensities of contact 562 (e.g., even if the intensity of contact 562 decreases below $IT_L$, and even if contact 562 is lifted off).

FIG. 5AB-5AD illustrates alternate transitions of lock screen 561 from FIG. 5X. FIG. 5AB shows contact 564 detected at a bottom edge of touch screen 112, and upward movement of contact 564, with contact intensity above zero and below intensity threshold $IT_H$ (e.g., a swipe gesture). FIG. 5AC shows continued upward movement of contact 564. FIG. 5AC shows that, in response to the upward movement of contact 564 from the bottom edge of touch screen 112, lock screen 561 is scrolled such that an upper portion of lock screen 561 ceases to be displayed, and a remaining lower portion of lock screen 561 is shifted upward. In addition, a lower portion of home screen user interface 566 is displayed in the region of the display that no longer displays lock screen 561.

FIG. 5AD shows liftoff of contact 564. In response to the movement of contact 564 and liftoff of contact 564, lock screen 561 is dismissed, and home screen 566 is displayed on the display.

FIG. 5AE illustrates another alternate transition of lock screen 561 from FIG. 5X. FIG. 5AE shows contact 568 detected at a location on touch screen 112 corresponding to camera icon 512. Intensity meter 544 shows that the intensity of contact 568 is above zero and below intensity threshold $IT_H$. In accordance with the intensity of contact 568 being below intensity threshold $IT_H$, camera icon 512 is displayed without a transformation from its initial appearance (e.g., the appearance of camera icon 512 is maintained).

FIG. 5AF illustrates a transition of lock screen 561 from FIG. 5AE. In FIG. 5AF, the intensity of contact 568 has increased above intensity threshold $IT_D$, as shown by intensity meter 544. In accordance with the intensity of contact 568 increasing above intensity threshold $IT_D$ (e.g., satisfying feed-forward criteria), camera icon 512 is displayed with an even greater (e.g., maximum) degree of transformation (e.g., with a fully darkened background and at an even greater (e.g., maximum) scale), and tactile output 570 is generated.

FIG. 5AG illustrates a transition of lock screen 561 from FIG. 5AF. In FIG. 5AG, the intensity of contact 568 has decreased below intensity threshold $IT_D$ to just above intensity threshold $IT_L$ (e.g., contact 568 is in the process of being lifted off). In accordance with the decrease in intensity of contact 568, the transformation of camera icon 512 is reversed (e.g., with a darker background than in FIG. 5AE, but not fully darkened as in FIG. 5AF, and at a scale greater than in FIG. 5AE, but not at the maximum scale as in FIG. 5AF). A tactile output is not generated, and a camera application user interface is not displayed, because the intensity of contact 568 has not decreased to or below intensity threshold $IT_L$ (e.g., contact 568 has not satisfied activation criteria, for example for activating the camera).

FIG. 5AH illustrates a transition of lock screen 561 from FIG. 5AG. In FIG. 5AH, contact 568 has been lifted off. In accordance with the intensity of contact 568 decreasing from its intensity shown in FIG. 5AG to below intensity threshold $IT_L$, tactile output 572 is generated. In addition, in accordance with the intensity of contact 568 decreasing below intensity threshold $IT_L$, camera application user interface 574 is displayed (e.g., the function associated with camera icon 512, displaying the camera application user interface, is performed). Camera interface 574 includes capture affordance 576 (e.g., for capturing media such as images or video), mode indicator 577 (e.g., for indicating a current media capture mode of the camera interface), live view area 578 (e.g., displaying a preview of media to be captured), image well 580 (e.g., displaying a preview image representing a most-recently captured image or video), filter icon 582 (e.g., for changing a camera filter), and live photo indicator 584 (e.g., for indicating whether or not the camera application is in a live photo capture mode, in which capturing media includes capturing a sequence of images with audio).

FIGS. 5AI-5AJ illustrate a transition of camera interface 574 from FIG. 5AH. FIG. 5AI shows contact 586 detected at a location on touch screen 112 corresponding to capture affordance 576, and FIG. 5AJ shows liftoff of contact 586 (e.g., contact 586 is a tap gesture). In FIG. 5AJ, in response to activation of capture affordance 576, an image is captured of the view displayed in live view area 578, and a preview of the captured image is displayed in image well 580. In response to activation of capture affordance 576, and in accordance with a determination that camera interface 574 is in a media capture mode in which capturing media includes capturing images without audio, tactile output 588 is generated (e.g., in accordance with mode indicator 577 indicating that camera interface 574 is in a photo capture mode in which capturing media includes capturing still images, and in accordance with live photo indicator 584 indicating that the live photo capture mode is deactivated).

FIG. 5AK illustrates repeated generation of tactile outputs in accordance with sustained (or alternatively, repeated) activation of capture affordance 576 in FIG. 5AI. In particular, FIG. 5AK illustrates generation of tactile outputs corresponding to contact 586 being maintained on capture affordance 576 with input intensity above intensity threshold $IT_H$, as indicated in input intensity graph 590. In accordance with continued activation of capture affordance 576, a plurality of images are captured (e.g., in a burst mode of operation of the still image capture mode) at times $t_0$, $t_1$, $t_2$, $t_3$, $t_4$, $t_5$, $t_6$, and $t_7$, as indicated in graph 591. In some embodiments, a plurality of tactile outputs corresponding to the plurality of images captured in burst mode are generated.

In some embodiments, a minimum time interval $TI_B$ is enforced between generation of sequential tactile outputs, such that if a tactile output is generated at time T, no tactile output is generated at any time between time T and time $T+TI_B$. For example, synchronous tactile output graph 592 shows that, in some embodiments in which tactile outputs are generated synchronously with capturing images, a first tactile output, corresponding to the image captured at time $t_0$, is generated. Generation of a second tactile output, corresponding to the image captured at time $t_1$, is forgone, because the second tactile output would be generated during the time interval $TI_B$ since the first tactile output was generated. A third tactile output, corresponding to the image captured at time $t_2$, is generated, because the third tactile output is generated after the time interval $TI_B$ since the first tactile output was generated. Similarly, generation of tactile outputs corresponding to images captured at times $t_3$, $t_5$, and $t_7$, is forgone, while tactile outputs corresponding to images captured at times $t_4$ and $t_6$ are generated.

In another example, asynchronous tactile output graph 593 shows that, in some embodiments in which tactile outputs are generated asynchronously with capturing images, after the first tactile output, corresponding to the image captured at time $t_0$, is generated, additional tactile outputs are repeatedly generated at time intervals equal to $TI_B$, while the input intensity remains above intensity threshold $IT_H$, and without regard to times $t_1$, $t_2$, $t_3$, $t_4$, $t_5$, $t_6$, and $t_7$ at which the additional images were captured.

FIG. 5AL illustrates a transition of camera interface 574 from FIG. 5AJ. FIG. 5AL shows user input 594, which includes two contacts moving away from each other (e.g., a de-pinch gesture), corresponding to a request to zoom (e.g., change a zoom scale of) the view displayed in live view area 578, while camera interface 574 is in a still image capture mode (e.g., a photo capture mode with live photo capture mode deactivated). In response to detecting user input 594, zoom scale bar 595 is displayed, indicating that the current zoom scale of live view area 578 is a minimum zoom scale.

FIG. 5AM illustrates a transition of camera interface 574 from FIG. 5AL. FIG. 5AM shows liftoff of user input 594 after the two contacts have moved away from each other. In response to the movement of the contacts of user input 594, the view displayed in live view area 578 is zoomed to an even greater (e.g., maximum) zoom scale. In accordance with the current zoom scale of live view area 578 reaching the maximum zoom scale, tactile output 596 is generated.

FIGS. 5AN-5AO illustrate camera interface 574 and are similar to FIGS. 5AI-5AJ, except that in FIGS. 5AN-5AO, live photo indicator 584 indicates that the live photo capture mode of camera interface 574 is activated. While camera interface 574 is in live photo capture mode, in accordance with activation of capture affordance 576 by contact 597 (FIG. 5AN) and liftoff of contact 597 (FIG. 5AO) (e.g., contact 597 is a tap gesture) a live photo is captured, where the live photo includes a sequence of images and corresponding recorded audio. A preview image representing the captured live photo is displayed in image well 580. In accordance with a determination that capture affordance 576 was activated while camera interface 574 was in the live photo capture mode (e.g., in which capturing the live photo included capturing the sequence of images and corresponding recorded audio), a tactile output is not generated in response to activation of capture affordance 576 (e.g., in contrast to FIGS. 5AI-5AJ, where a tactile output was generated in accordance with camera interface 574 being in a still image capture mode in which corresponding audio was not recorded).

FIGS. 5AP-5AS illustrate changing a camera filter in camera interface 574 while the live photo capture mode of camera interface 574 is activated. FIG. 5AP shows contact 598 detected at a location on touch screen 112 corresponding to filter icon 582. In FIG. 5AQ, in response to liftoff of contact 598, a scrollable filter selection menu is displayed. The filter selection menu includes a plurality of filter options, including currently-selected filter 583-1, and filter 583-2. The filter selection menu displays each of the plurality of filters as an image showing a preview of the respective filter as applied to the view displayed in live view area 578. FIG. 5AR shows a contact 599 detected at a location on touch screen 112 corresponding to filter 583-1, and movement of the contact toward the left. In FIG. 5AS, in response to liftoff of contact 599, the filter selection menu is scrolled such that filter 583-2 is selected as the current filter. In accordance with filter 583-2 becoming the currently-selected filter, live view area 578 is displayed with filter 583-2 applied. In accordance with the currently-selected filter being changed (e.g., from filter 583-1 to filter 583-2), tactile output 589 is generated (e.g., even though the live photo capture mode of camera interface 574 is activated). In some embodiments, the same (or an instance of the same) tactile output would be generated in response to changing filters while the camera interface 574 is in a still photo capture mode. In some embodiments, the tactile output is generated when changing filters even while capturing media that includes corresponding recorded audio.

FIGS. 5AT-5AU illustrate an alternate transition of camera interface 574 from FIG. 5AH. FIG. 5AT shows contact 587 detected at a location on touch screen 112 corresponding to live view area 578, and movement of contact 587 toward the right. In FIG. 5AU, in response to liftoff of contact 587, camera interface 574 changes from a photo capture mode, as indicated by mode indicator 577 in FIG. 5AT, to a video capture mode, as indicated by mode indicator 577 in FIG. 5AU. In accordance with changing capture modes, tactile output 585 is generated.

FIGS. 5AV-5BA illustrate transitions of camera interface 574 from FIG. 5AU, while camera interface 574 is in the video capture mode. While in the video capture mode, capture affordance 576 of camera interface 574 is used to start and stop video recording. Timer 573 indicates a current length of a video being recorded, and alternatively displays "00:00:00" when video is not being recorded. FIG. 5AV shows contact 581 detected at a location on touch screen 112 corresponding to capture affordance 576. In FIG. 5AW, in response to liftoff of contact 581, camera interface 574 indicates that device 100 has begun recording video (e.g., with corresponding audio) by a change in visual appearance of capture affordance 576 (e.g., changing capture affordance 576 from a "record" icon to a "stop recording" icon). Timer 573 indicates that the video being recorded has a current length of "00:00:01." In addition, a second capture affordance 579 is displayed to the left of capture affordance 576. Capture affordance 579 is used to capture still images while continuing to record video and corresponding audio.

FIGS. 5AX-5AY illustrate activation of still image capture affordance 579 (the second capture affordance) while recording video and audio (e.g., timer 573 indicates that video recording continues, and that the video being recorded has a current length of "00:00:03"). FIG. 5AX shows contact 575 at a location on touch screen 112 corresponding to still image capture affordance 579. In FIG. 5AY, in response to liftoff of contact 575, a still image is captured (not shown in FIG. 5AY). However, in accordance with a determination that camera interface 574 is in the video capture mode, and while video that includes audio is being recorded, a tactile output is not generated in response to detecting the activation of capture affordance 579.

FIGS. 5AZ-5BA illustrate changing a zoom scale of the view displayed in live view area 578 while recording video and audio (e.g., timer 573 indicates that video recording continues, and that the video being recorded has a current length of "00:00:05"). FIG. 5AZ shows user input 571 that includes two contacts moving away from each other (e.g., a de-pinch gesture), corresponding to a request to zoom the view displayed in live view area 578. In response to detecting user input 571, zoom scale bar 595 is displayed, indicating that the current zoom scale of live view area 578 is a minimum zoom scale. FIG. 5BA shows liftoff of user input 571 after the two contacts have moved away from each other. In response to the movement of the contacts of user input 571, the view displayed in live view area 578 is zoomed to an even greater (e.g., maximum) zoom scale. In accordance with the current zoom scale of live view area 578 reaching the maximum zoom scale, tactile output 569 is generated, even though video and audio are being recorded.

Lock Screen UI with Intensity-Based Activation Criteria and Tactile Feedback

FIGS. 6A-6H are flow diagrams illustrating method 600 of facilitating access to features of a device that are available while the device is operating in a locked mode of operation, while providing activation criteria that avoid accidental activation of those features, for example while the device is in a user's pocket, or is being picked up, put down, placed in a pocket or other container, or removed from a pocket of other container, in accordance with some embodiments. Method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way to access features that user's commonly want to remain available even while a device is operating in a locked mode of operation. The method reduces the number, extent, and/or nature of the inputs from a user when activating a locked-mode device feature, thereby creating a more efficient human-machine interface. For battery-operated electronic devices, enabling a user to activate locked-mode device features, while preventing accidental activation of such features conserves power and increases the time between battery charges, without unduly burdening the user of the device.

Method 600, which is performed at (and thus performed by) an electronic device with a display, a touch-sensitive surface, and one or more tactile output generators (602), includes displaying (604), on the display, a user interface that includes a respective user interface element, wherein the respective user interface element is associated with (e.g., corresponds to) a respective operation. For example, as shown in FIG. 5A, the user interface element is a flashlight icon 510, or a camera application icon 512. The flashlight icon 510 is associated with an on/off operation, for toggling on/off a flashlight of the device. The camera icon 512 is associated with the operation of displaying a camera application user interface.

Method 600 further includes detecting (606), on the touch-sensitive surface, a user input directed to the respective user interface element, including detecting a contact at a location that corresponds to the respective user interface element and detecting a first portion of the user input that includes an increase in intensity of the contact followed by a second portion of the user input that includes a decrease in intensity of the contact. For example, the user input can be touch input 514, discussed above with reference to FIGS. 5B-5N, touch input 534, discussed above with reference to FIGS. 5O-5P, and touch inputs 546 and 548, discussed above with reference to FIGS. 5R-5W, or touch inputs 562, 564 and 568, discussed above with reference to FIGS. 5Y-5AH.

Method 600 further includes, in response to detecting the user input (608), displaying (610) a transformation of the respective user interface element, wherein a degree of the transformation is determined based on an intensity of the user input (e.g., increasing a size, or scale, of the respective user interface element from its initial size or scale, opacity, brightness and/or changing one or more colors of the respective user interface element from its initial color(s). In some embodiments, the transformation in visual appearance of a respective user interface element progresses as a function of detected intensity of the user input corresponding to (directed to) the respective user interface element. Examples of such transformations are discussed above with reference to flashlight icon in FIGS. 5B-5P, camera icon in FIGS. 5AE-5AG, and lock screen background 560 in FIGS. 5Y-5AA.

Method 600 further includes, in accordance with a determination (612) that the first portion of the user input satisfies feed-forward criteria, wherein the feed-forward criteria include a requirement that a characteristic intensity of the contact increase above a feed-forward intensity threshold (e.g., increases above a predefined intensity threshold, such as deep press threshold $IT_D$, as shown in FIG. 5H) in order for the feed-forward criteria to be met, generating a first tactile output without performing the respective operation. As discussed above with reference to FIGS. 5A-5I, in some embodiments, an initial increase the characteristic intensity of the contact above a feed-forward intensity threshold causes a tactile output to be generated, to let the user know that a first criterion for activating the device's flashlight has been met. However, the state of the flashlight is not toggled in response to this condition, as the user can still cancel or stop short of activating the flashlight state toggle operation. By providing a pre-operation notification, in the form of a tactile output, efficient use of the device is improved by forewarning the user that a respective operation is about to be initiated, which helps users avoid accidental or unintended initiation or performance of the respective operation.

Method 600 further includes, in accordance with a determination (620) that the second portion of the user input satisfies activation criteria, wherein the activation criteria include a requirement that the characteristic intensity of the contact decrease below an activation intensity threshold: generating (622) a second tactile output, and performing (624), at the device, the respective operation associated with the respective user interface element (e.g., activating/deactivating a function associated with the respective user interface element, such as toggling a flashlight on or off (see above discussion of FIGS. 5H-5I), or displaying a camera user interface (see above discussion of FIGS. 5AG-5AH)). In some embodiments, the transformation of the respective user interface element includes a further transformation in its visual appearance, such as inverting background and foreground colors of a flashlight icon when toggling the flashlight on or off, as discussed above with reference to FIGS. 5H-5I. By providing both a pre-operation notification and an activation notification, in the form of two tactile outputs, efficient use of the device is improved by letting the user know the current state of the user's input, which helps users not only avoid accidental or unintended activation or performance of the respective operation, but also helps the user know that an input intended to cause initiate or perform the respective operation was successful, and thereby enables the user to move on to another task with confidence that the respective operation has been initiated or performed.

In some embodiments, the activation intensity threshold is a first intensity threshold, such as deep press threshold $IT_D$, or a second intensity threshold that is lower than the first intensity threshold. In some embodiments, the activation intensity threshold is selected to be a predetermined amount less than the first intensity threshold or a predetermined amount less than a peak intensity of the contact during the user input.

In some embodiments, the first tactile output and the second tactile output are distinct instances of the same tactile output. For example, the first tactile output and the second tactile output have the same tactile output pattern, the same amplitude, and the same duration. In some embodiments, the first tactile output and the second tactile output are different tactile outputs. For example, the first tactile output and the second tactile output differ by one or more of: tactile output pattern, amplitude, and duration.

Method 600 further includes, in accordance with a determination (626) that the characteristic intensity of the contact does not satisfy the feed-forward intensity threshold during the user input (e.g., the detected intensity of the user input remains below the intensity threshold, for example during a tap or a long press user input): forgoing (628) generating the first tactile output and the second tactile output, and forgoing (630) performing the respective operation associated with the respective user interface element. Forgoing generation of the first tactile output and the second tactile output in the recited circumstance in conjunction with generation of those tactile outputs in other circumstances, as described above, promotes efficient use of the device by letting the user know, via the generation or absence of tactile outputs, when the user's input has not satisfied the criteria (e.g., the feed-forward intensity threshold) for causing cause initiation or performance of the respective operation.

In some embodiments, the activation criteria further include (634) a requirement that the contact remain on the touch-sensitive surface for at least a predefined threshold amount of time in order for the activation criteria to be met (e.g., a predefined amount of time since the contact was detected). See above discussion of predefined time period $T_A$ with respect to FIG. 5I. This time duration requirement helps prevent inadvertent activation of an icon of a device's lock screen, thereby avoiding spending battery power on operations not requested by the user, which improves device efficiency and extents battery life of the device.

In some embodiments, in accordance with a determination that the first portion of the user input satisfies the feed-forward intensity threshold requirement, the first tactile output is generated, and in accordance with a determination that the second portion of the user input satisfies the activation intensity threshold requirement, the second tactile output is generated, without regard to whether the activation time duration requirement is met. More generally, the first and second tactile outputs are generated based on intensity of the contact without regard to whether the operation is performed.

In some embodiments, generation of the first and/or second tactile outputs also requires that the contact remain on the touch-sensitive surface for at least the predefined threshold amount of time (e.g., the feed-forward criteria and the activation criteria both include a time duration requirement, as discussed above with reference to FIGS. 5G-5I). More generally, the first and/or second tactile outputs are not generated for a user input that does not satisfy the requirement that the contact remain on the touch-sensitive surface for at least the predefined threshold amount of time (e.g., the first and/or second tactile outputs are not generated for a fast tap input even if the fast tap input meets the intensity criteria for generating the tactile outputs).

In some embodiments, the respective operation is performed (632) while continuing to detect the contact on the touch-sensitive surface, and, after performing the respective operation, the transformation of the respective user interface element continues to be displayed as the intensity of the contact decreases. An example of this is discussed above with reference to FIGS. 5I-5L. By continuing to transform the user interface element as the intensity of the contact decreases, the user receives visual confirmation that the device is response to the intensity of the user's touch input, which helps the user to more accurately provide inputs that reflect the user's intent, which in turn makes use of the device more efficient in terms of both time and battery usage.

In some embodiments of method 600, the user interface that includes (635) the respective user interface element is displayed in accordance with a determination that the device is in a locked state. For example, in some embodiments, the user interface (e.g., a wake screen interface) is displayed in response to waking the device from a screen-off state to a screen-on state.

In some embodiments of method 600, the electronic device includes (636) a flashlight (e.g., a light on the device that serves as a flashlight, such as a light optionally used as a camera flash), and the respective user interface element is a flashlight icon for controlling a state (e.g., an on-off state) of the flashlight. Such embodiments are discussed above with reference to FIGS. 5A-5P.

In some embodiments of method 600, the electronic device includes (638) a camera, and the respective user interface element is a camera application icon for displaying a camera application user interface for the camera. Such embodiments are discussed above with reference to FIGS. 5AH-5BA.

In some embodiments of method 600, displaying the transformation of the respective user interface element includes (640) displaying a first transformation of the respective user interface element as the intensity of the user input increases, and reversing the first transformation as the intensity of the user input decreases. Such embodiments are discussed above with reference to flashlight icon 510 (e.g., FIGS. 5A-5P), camera icon 512 (FIGS. 5AE-5AH), and the lock screen background 560 (FIGS. 5Z-5AA).

In some embodiments of method 600, the degree of the transformation of the respective user interface element increases as the intensity of the input increases and decreases as the intensity of the input decreases (e.g., a higher characteristic intensity causes a greater change to the respective user interface element). Such embodiments are discussed above with reference to flashlight icon 510 (e.g., FIGS. 5A-5P), camera icon 512 (FIGS. 5AE-5AH), and the lock screen background 560 (FIGS. 5Z-5AA).

In some embodiments of method 600, the degree of the displaying the transformation of the respective user interface element starts (644) when the detected intensity of the user input satisfies (e.g., is above) a second intensity threshold (e.g., hint threshold $IT_H$) that is below the feed-forward intensity threshold (e.g., deep press threshold $IT_D$).

In some embodiments of method 600, the feed-forward criteria (see operation 612) further include (650) a requirement that the contact remain at the location that corresponds to the respective user interface element (e.g., a requirement that contact 514 remain at the location of flashlight icon 510, FIGS. 5B-5H) during the first portion of the input in order for the feed-forward criteria to be met.

In some embodiments of method 600, the feed-forward criteria further include (652) a requirement that the contact remain on the touch-sensitive surface for at least a predefined threshold amount of time in order for the feed-forward criteria to be met. For example, the amount of time the contact remains on the touch-sensitive surface would be measured starting when the contact is first detected, and would need to continue for at least the predefined amount of time (e.g., the activation time, $T_A$, shown in FIG. 5P). In some embodiments, the requirement that the contact remain on the touch-sensitive surface for at least the predefined threshold amount of time distinguishes the user input from a tap gesture, an example of which is shown in FIGS. 5O-5P.

In some embodiments of method 600, the first tactile output includes (654) a sequence of tactile output components that change as the intensity of the contact increases (e.g., the amplitude, frequency and/or temporal spacing between sequential tactile output components increases or decreases as the intensity of the contact increases).

In some embodiments, method 600 includes, in accordance with a determination (656) that, after meeting the feed-forward criteria, the user input meets cancellation criteria, wherein the cancellation criteria include a requirement that the contact move more than a threshold distance from the respective activatable user interface object: reversing the transformation of the respective user interface object; forgoing performing the respective operation; and generating a cancellation tactile output. In some embodiments, the cancellation tactile output is the same as the second tactile output. An example of such an input that meets such cancellation criteria is discussed above with reference to FIGS. 5M-5N.

In some embodiments method 600 includes repeated activation of the user interface object in response to repetition of the activation gesture (e.g., toggling the state of the device's flashlight, again) with the same input continuing to be detected on the touch-sensitive surface, and example of which is shown in FIGS. 5I-5L. More specifically, in some embodiments, method 600 includes, continuing to detect (660), on the touch-sensitive surface, the user input directed to the respective user interface element, including detecting a third portion of the user input that includes a second increase in intensity of the contact followed by a fourth portion of the user input that includes a second decrease in intensity of the contact, wherein the third portion of the user input follows the second portion of the user input. In such embodiments, method 600 further includes, in response to detecting the user input (661): displaying (662) a second transformation of the respective user interface element, wherein a degree of the second transformation is determined based on the intensity of the user input; and in accordance with a determination that the third portion of the user input satisfies the feed-forward criteria, generating (663) the first tactile output (or an instance of the first tactile output) without performing the respective operation (e.g., toggling the state of the flashlight).

Such embodiments of method 600 further includes, in accordance with a determination (664) that the fourth portion of the user input satisfies the activation criteria: generating (665) the second tactile output (or an instance of the second tactile output), and performing (666), at the device, the respective operation associated with the respective user interface element (e.g., toggling the state of the flashlight). In some embodiments, the transformation of the respective user interface element includes a further transformation in its visual appearance (e.g., a change in the colors of the flashlight icon when toggling the flashlight on or off). In some embodiments, performing the respective operation, such as toggling a state of a flashlight, includes performing a different sub-operation such as toggling a flashlight that was turned on by the user input from on to off, or toggling a flashlight that was turned off by the user input from off to on.

In some embodiments of method 600, the user interface is a first user interface (667), and method 600 includes detecting (668) a second user input (e.g., a press of a home button, or an upward swipe gesture starting from an edge of the device, and example of which is discussed above with reference to FIGS. 5AB-5AD) corresponding to a request to display a second user interface distinct from the first user interface (e.g., a home screen); and in response to detecting the second user input, displaying the second user interface. In some embodiments, the second user interface (e.g., a home screen interface) is displayed in accordance with a determination that the device is in an authenticated and unlocked state.

In some embodiments, method 600 is repeated in response to a second user input on a second user interface element (e.g., a camera icon) associated with a second respective operation (e.g., displaying a camera application user interface), as discussed above with reference to FIGS. 5AE-5AH. More specifically, in some embodiments of method 600, the user interface includes (670) a second respective user interface element (e.g., a camera application icon) associated with (e.g., corresponds to) a second respective operation (e.g., displaying a camera application user interface), and the method includes detecting (671), on the touch-sensitive surface, a second user input (e.g., user input 568, FIGS. 5AE-5AG) directed to the second respective user interface element (e.g., camera icon 512, FIGS. 5AE-5AG), including detecting a second contact at a location that corresponds to the second respective user interface element and detecting a first portion of the second user input that includes an increase in intensity of the second contact followed by a second portion of the second user input that includes a decrease in intensity of the second contact.

In such embodiments, method 600 further includes, in response to detecting (672) the second user input: displaying (673) a transformation of the second respective user interface element, wherein a degree of the of the second respective user interface element transformation is determined based on an intensity of the second user input (e.g., increasing a size, or scale, of the second respective user interface element from its initial size or scale, opacity, brightness and/or changing one or more colors of the respective user interface element from its initial color(s)), and in accordance with a determination that the first portion of the second user input satisfies the feed-forward criteria, generating (674) a third tactile output without performing the second respective operation. In some embodiments, the transformation in visual appearance of the second respective user interface element progresses as a function of detected intensity of the second user input corresponding to (directed to) the second respective user interface element.

In such embodiments, method 600 further includes, in accordance with a determination (675) that the second portion of the second user input satisfies the activation criteria: generating (676) a fourth tactile output, and performing (678), at the device, the second respective operation associated with the second respective user interface element (e.g., activating/deactivating a function associated with the respective user interface element, such as displaying a camera user interface). In some embodiments, the transformation of the respective user interface element includes a further transformation in its visual appearance (e.g., inverting or changing the colors of a flashlight icon when toggling the flashlight on or off). In some embodiments, the third tactile output and the fourth tactile output are distinct instances of the same tactile output. For example, the third tactile output and the fourth tactile output have the same tactile output pattern, the same amplitude, and the same duration. In some embodiments, the third tactile output and the fourth tactile output are different tactile outputs. For example, the third tactile output and the fourth tactile output differ by one or more of: tactile output pattern, amplitude, and duration.

Finally, in such embodiments, method 600 includes, in accordance with a determination (678) that a characteristic intensity of the second contact does not satisfy the feed-forward intensity threshold during the second user input (e.g., the detected intensity of the user input remains below the intensity threshold, such a light-intensity tap or long press): forgoing (679) generating the third tactile output and the fourth tactile output, and forgoing (680) performing the second respective operation associated with the second respective user interface element.

In some embodiments, method 600 includes, in accordance with a determination (681) that the respective operation associated with the respective user interface element includes activating a function associated with the respective user interface element (e.g., toggling a state of a device setting, such as from a first state to a second state, such as turning a flashlight on), the first tactile output and/or the second tactile output are instances of a first reference tactile output. Furthermore, in such embodiments, method 600 includes, in accordance with a determination (682) that the respective operation includes deactivating the function associated with the respective user interface element (e.g., toggling a state of a device setting, such as from the second state to the first state, such as turning the flashlight off), the first tactile output and/or the second tactile output are instances of a second reference tactile output that is distinct from the first reference tactile output. For example, one or more of the tactile outputs generated when activating a function are different from one or more of the corresponding tactile outputs when deactivating the function.

In some embodiments of method 600, the user interface includes (683) a third respective user interface element (e.g., a notification element, such as element 504 in FIGS. 5R and 5S), and method 600 includes: detecting (684) a third user input directed to the third user interface element, and in response to detecting the third user input, displaying a transformation of the third user interface element, including increasing a size of the third user interface element (e.g., as shown in the transition from FIG. 5R to FIG. 5S). In some embodiments, the transformation in visual appearance of a respective user interface element progresses as a function of detected intensity of the user input corresponding to (directed to) the respective user interface element (e.g., the size of the object increases from an initial size as intensity increases and decreases as intensity decreases, optionally between a minimum size corresponding to the initial size of the object and a predefined maximum size. In some embodiments, as the intensity of the input increases, the background of the user interface is progressively obscured (e.g., blurred with a blur radius that increases as the intensity of the input increases). In some embodiments, when the input meets preview display criteria for the third user interface object, the third user interface object is replaced with an expanded preview of content corresponding to the third user interface object.

In some embodiments of method 600, the user interface includes (686) a plurality of user interface elements, other than the respective user interface element (e.g., the plurality of user interface elements are notifications, such as missed notifications, as shown in FIG. 5T), in a scrolling list, and method 600 includes: detecting (688) a fourth user input (e.g., user input 548, FIGS. 5T-5W) corresponding to a request to scroll the plurality of user interface elements in the scrolling list (e.g., to scroll a list of received notifications to display additional notifications not currently displayed); and in response to detecting the fourth user input: scrolling the plurality of user interface elements in the scrolling list; and ceasing to display the respective user interface element associated with the respective operation. In some embodiments, method 600 includes ceasing to display a plurality of respective user interface elements associated with respective operations (e.g., multiple buttons), an example of which is shown in the transition from FIG. 5T to FIG. 5U. In some embodiments, an example of which is shown in FIG. 5U, a region of the user interface where one or more respective user interface elements were displayed is used instead to display additional content of the scrolling list (e.g., a portion of the scrolling list that was not previously displayed). For example, the user interface (e.g., see FIG. 5T) includes a list of (missed) notifications and one or more buttons (e.g., a flashlight icon, or a camera application icon), and, when scrolling the list of (missed) notifications, the buttons disappear and the region of the user interface where the buttons were displayed is used to display one or more additional notifications (or additional portions of notifications) that were not previously displayed (e.g., see FIG. 5U).

In some embodiments of method 600, the user interface includes (690) a plurality of user interface elements, other than the respective user interface element (e.g., the plurality of user interface elements are notifications, such as missed notifications, as shown in FIG. 5T), in a scrolling list, and method 600 includes: detecting (692) a fifth user input (e.g., user input 548, FIGS. 5T-5W) corresponding to a request to scroll the plurality of user interface elements in the scrolling list (e.g., to scroll a list of notifications to display additional notifications not currently displayed); and in response to detecting the fifth user input: scrolling the plurality of user interface elements in the scrolling list, and in accordance with a determination that the scrolling list has reached a predefined threshold position, generating a third tactile output (e.g., see FIG. 5W and above discussion of FIG. 5W). For example, the third tactile output is generated in conjunction with scrolling a list of notifications past a threshold position in the scrolling list such that one or more notifications from a prior time period (e.g., a prior day) are displayed, where no notifications from the prior time period were displayed prior to the scrolling list reaching the predefined threshold position (e.g., a boundary between days).

In some embodiments of method 600, the user interface includes (694) a background (e.g., wallpaper), and method 600 includes: detecting (696) a sixth user input (e.g., user input 562, FIGS. 5Y-5AA) directed to the background of the user interface, including detecting a contact at a location that corresponds to the background and detecting change in intensity of the contact. Such embodiments of method 600 further include, in response to detecting the sixth user input: in accordance with a determination that a characteristic intensity of the contact reached a background-animation intensity threshold, displaying an animation of the background (e.g., for live wallpaper, as discussed above with reference to FIGS. 5Y-5Z); and in accordance with a determination that a characteristic intensity of the contact did not reach the background-animation intensity threshold, forgoing displaying the animation of the background. In some embodiments, the animation of the background progresses based on an intensity of the sixth user input (e.g., the contact of the sixth user input). In some embodiments, displaying the transformation of the background is in accordance with a determination that the background includes an animation (e.g., that the background is a live wallpaper). In some embodiments, displaying the transformation of the background starts when the detected intensity of the sixth user input satisfies an animation intensity threshold. In some embodiments, the animation of the background is displayed when the characteristic intensity of a contact directed to the respective user interface element reaches the background-animation intensity threshold. In some embodiments, once started, animation of the background continues even if the characteristic intensity of a contact directed to the respective user interface element falls below the background-animation intensity threshold.

In some embodiments of method 600, displaying the animation of the background includes progressing through the animation of the background as the intensity of the sixth user input increases, and reversing the progression through the animation as the intensity of the sixth user input decreases. See above discussion of FIGS. 5A-5AA.

It should be understood that the particular order in which the operations in FIGS. 6A-6H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6H. For example, the visual transformation of user interface elements and generation of tactile outputs in conjunction with user inputs meeting criteria that include intensity-based criteria, as described above with reference to method 600, optionally are also applicable to user interface elements described below with reference to method 700. For brevity, these details are not repeated here.

Context-Sensitive Tactile Output Suppression or Reduction in Camera Application

FIGS. 7A-7C are flow diagrams illustrating method 700 of forgoing the generation of certain tactile outputs in a camera application, or camera user interface, in accordance with some embodiments. Method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, method 700 provides an intuitive visual and tactile feedback to users of a camera application, which facilitates efficient use of the camera application by users, and suppresses and/or reduces the amplitude of various tactile outputs so as to avoid interference with recording the audio portion of media being captured by the camera application. The method thereby facilitates capturing media with audio, without interference from tactile outputs, while still providing, in non-audio recording contexts of the camera application, tactile outputs that facilitate efficient use of the camera application by users, thereby creating a more efficient human-machine interface. For battery-operated electronic devices, using tactile outputs to enable a user to select camera user interface features faster and more efficiently conserves power and increases the time between battery charges.

Method 700, which is performed at (and thus performed by) an electronic device with one or more input devices, one or more output devices, and one or more tactile output generators (702), includes displaying (704) a camera user interface for capturing media, wherein the camera has a plurality of media capture modes. Method 700 further includes, while displaying the camera user interface, detecting (706), via the one or more input devices, activation of a capture affordance (e.g., a displayed shutter button or a physical button that serves as a shutter button such as a volume up button). Method 700 further includes, in response (708) to detecting, via the one or more input devices, activation of the capture affordance: in accordance with a determination (710) that the activation of the capture affordance was detected while the camera user interface was in a first media capture mode (e.g., a still image capture mode), wherein capturing media in the first media capture mode includes capturing media of a first type that includes one or more images captured without audio: capturing (712) media of the first type (e.g., a still image), and generating (714) a first tactile output. An example of activation of a camera application's capture affordance and generation of a first tactile output is discussed above with reference to FIGS. 5AI-5AJ.

Method 700 further includes, in response (708) to detecting, via the one or more input devices, activation of the capture affordance: in accordance with a determination (716) that the activation of the capture affordance was detected while the camera user interface was in a second media capture mode (e.g., a video capture or live photo capture mode) that is distinct from the first media capture mode, wherein capturing media in the second media capture mode includes capturing media of a second type that includes a sequence of images and corresponding audio (e.g., recording video, or capturing a live photo): capturing (716) media of the second type (e.g., a video, or a live photo), and forgoing (718) generating the first tactile output in response to activation of the capture affordance. An example of activation of a camera application's capture affordance while in a video capture mode, and forgoing generation of the first tactile output is discussed above with reference to FIGS. 5AV-5AW.

In some embodiments, method 700 includes detects a sequence of activations of the capture affordance, including a first activation of the capture affordance detected while the camera user interface is in the first media capture mode, and a second activation of the capture affordance detected while the camera user interface is in the second media capture mode. It is noted that, generating tactile outputs provides a user of the device with confirmation that an intended result has been achieved, but forgoing generating tactile outputs while recording media that includes audio reduces interference of the tactile outputs with the captured audio.

In some embodiments, method 700 includes, in response to detecting, via the one or more input devices, the activation of the capture affordance, in accordance with the determination that the activation of the capture affordance was detected while the camera user interface was in the second media capture mode, generating a (720) second tactile output that has a lower amplitude than the first tactile output in conjunction with capturing the media of the second type. In some embodiments, the second tactile output includes the first tactile output reduced to zero. More generally, in some embodiments, tactile outputs generated in the second media capture mode in response to activation of the capture affordance are reduced with respect to tactile outputs generated in the first media capture mode in response to activation of the capture affordance. It is noted that, generally, generating tactile outputs provides user with confirmation that an intended result has been achieved, but generating tactile outputs with lower amplitude while recording media that includes audio reduces interference of the tactile outputs with the captured audio, etc.

In some embodiments of method 700, the second tactile output includes (722) the first tactile output with reduced amplitude (e.g., the second tactile output is the result of attenuating an instance of the first tactile output). It is noted that reducing tactile output amplitude still provides the user with some feedback regarding a user input, or regarding an operation being performed by the device in response to a user input, but reduces interference with audio capture.

In some embodiments of method 700, for a respective tactile output generated while capturing the media of the second type, the respective tactile output is selected (724) based on a determination that the respective tactile output interferes with the captured media by an amount that is below a predefined threshold. Such embodiments provide the user with confirmation that an intended result has been achieved for certain predefined operations regardless of operating mode, thereby making use of the device and camera application more efficient, while reducing or minimizing disruption to media captured in certain operating modes (e.g., noise reduction for recorded audio).

In some embodiments of method 700, the second tactile output includes (726) the first tactile output with scale reduced to zero (e.g., the second tactile output includes or is implemented as tactile silence). Such embodiments, which reduce the scale of a tactile output to zero, remove all interference with audio capture, while still providing tactile outputs and their attendant benefits in other contexts of the camera application.

Generation of tactile outputs when a camera application is operating in a burst mode is discussed above with reference to FIG. 5AK. In some embodiments of method 700, capturing the media of the first type includes (730) capturing a sequence of images, and the first tactile output corresponds to (e.g., is generated for) an initial image in the sequence of images (732). In such embodiments, method 700 includes, for each image in the sequence of images other than the initial image, determining (734) a time interval from a point in time corresponding to capturing a most recent prior image for which the first tactile output was generated, to a point in time corresponding to capturing the respective image (e.g., corresponding to a subsequent request to generate the first tactile output). Furthermore, in such embodiments, method 700 includes, in accordance with a determination that the time interval is less than a predefined time period, capturing (736) the respective image without generating the first tactile output; and in accordance with a determination that the time interval is greater than the predefined time period, capturing (738) the respective image and generating the first tactile output. In some embodiments, the time interval is measured from request times for the tactile outputs, times associated with capturing images, or tactile output times (actual and projected). More generally, in some embodiments, tactile outputs are generated for captured images, or not, based on whether a respective tactile output would be generated too soon after the most recently generated tactile output. In some embodiments, a minimum time interval $TI_B$ (e.g., see FIG. 5AK) is enforced between sequential tactile outputs. In some embodiments, the sequence of images are obtained in a burst mode, with sequential images temporally separated by a predefined period of time (e.g., a burst mode interval $TI_C$). In some embodiments, tactile outputs for the sequence of images are generated synchronously with the burst mode interval, when allowed. For example, in embodiments in which $TI_C$ is less than $TI_B$, after capturing a respective image (e.g., the initial image), and generating a tactile output for the respective image, tactile outputs are not generated for images captured during the minimum tactile output time interval $TI_B$ since capturing the respective image, and the next-generated tactile output corresponds to the next-captured image following expiration of the minimum tactile output time interval since capturing the respective image.

In some embodiments, tactile output generation for the sequence of images is asynchronous with the burst interval (e.g., see "Asynchronous Tactile Output" graphs 593, FIG. 5AK). In some embodiments, the generation of the first tactile output is repeated at the minimum time intervals while continuing to detect the activation of the capture affordance (e.g., while activation of the capture affordance is maintained), regardless of any respective time interval between capturing a first respective image and capturing a second respective image immediately following (or preceding) the first respective image.

Forgoing generation of tactile outputs based on time intervals from preceding tactile outputs reduces excessive generation of tactile outputs, thereby complying with hardware specifications and limitations and protecting tactile output generators. In addition, forgoing generation of tactile outputs based on time intervals from preceding tactile outputs reduces overloading the user with tactile outputs, thereby allowing the user to focus on more important tactile outputs. Thus, these features (e.g., 730-738 or a subset thereof) protect the device and makes the user-device interface more efficient (e.g., by providing more important tactile outputs and reducing user mistakes and/or unintended operations when operating/interacting with the device).

In some embodiments, method 700 including detecting (740) a user input to switch from a first respective media capture mode to a second respective media capture mode. For example, see above discussion of FIGS. 5AT-5AU. In some embodiments, the user input (to switch modes) is detected while the camera user interface is in the first media capture mode, and switches the camera user interface from the first media capture mode to the second media capture mode. In some embodiments, the user input is detected while the camera user interface is in the second media capture mode, and switches the camera user interface from the second media capture mode to the first media capture mode. In some embodiments, the user input is detected subsequent to detecting the activation of the capture affordance. In some embodiments, the user input is a left-to-right, or right-to-left, swipe gesture. In some embodiments, the user input is a tap gesture on an affordance, displayed in the camera user interface (e.g., while the camera user interface is in the first respective media capture mode), for the second respective media capture mode.

Such embodiments of method 700 further include, in response (742) to detecting the user input: switching (744) the camera user interface from the first respective media capture mode to the second respective media capture mode; and generating (746) a third tactile output. More generally, in some embodiments, a tactile output (e.g., a third tactile output) is generated in conjunction with switching between media capture modes. In some embodiments, the third tactile output is different (e.g., has a different tactile output pattern) from the first tactile output and/or the second tactile output. These features provide the user of the device with confirmation that an intended result has been achieved, which helps avoid repeated user inputs that attempt to perform a function that has already been performed.

In some embodiments, method 700 includes, while displaying (750) the camera user interface, detecting, via the one or more input devices, a second user input (e.g., user input 598, FIG. 5AP) for performing an operation in the camera user interface other than activation of the capture affordance, for example, an operation other than capturing media, such as changing a setting of the camera user interface. In some embodiments, the operation may include switching between different capture modes, switching between different camera filters (e.g., as shown in FIGS. 5AP-5AS), or zooming a live view of the camera in or out (e.g., as shown in FIGS. 5AL-5AM and 5AZ-5BA).

In such embodiments, method 700 further includes, in response to detecting the second user input via the one or more input devices, performing (752) the operation in the camera user interface and generating a fourth tactile output without regard to whether the camera user interface is in the first media capture mode (e.g., still image capture) or the second media capture mode (e.g., video capture or live photo capture). More generally, in some embodiments, a tactile output (e.g., the fourth tactile output) is generated in accordance with performing an operation in the user interface (e.g., an operation other than activation of the capture affordance) regardless of media capture mode. For example, the fourth tactile output is generated in accordance with performing the operation (e.g., changing a filter) in the first media capture mode (e.g., still photo capture), and the fourth tactile output (or an instance of the fourth tactile output) is also generated in accordance with performing the operation (e.g., changing a filter) in the second media capture mode (e.g., without regard to whether media, such as a video or a live photo, is being captured in the second media capture mode, and optionally even while buffering media to be captured, prior to detecting activation of the capture affordance, such as for a live photo), rather than being reduced in the second media capture mode. In some embodiments, the fourth tactile output is different (e.g., has a different tactile output pattern) from the first tactile output, and/or from the second tactile output, and/or from the third tactile output. Such embodiments consistently provide a user with confirmation that an intended result has been achieved for certain predefined operations, regardless of operating mode.

In some embodiments of method 700, the operation in the camera user interface includes changing a scale (e.g., changing a zoom factor, as shown in FIGS. 5AL-5AM and 5AZ-5BA) of a displayed user interface element in the camera user interface (e.g., increasing or decreasing a zoom factor in a live view of the camera). In such embodiments of method 700, the fourth tactile output is generated in accordance with a determination that the scale of the displayed user interface element satisfies a predefined limit (e.g., a maximum or minimum zoom level has been reached or exceeded). For example, a tactile output (e.g., the fourth tactile output, such as a zoom limit tactile output) is generated in accordance with reaching a zoom limit while zooming in or zooming out the live view of the camera user interface (e.g., the live view region of the camera user interface that helps the user to see what is being captured through the lens of the camera). In some embodiments, the zoom limit tactile output is generated regardless of media capture mode. For example, the zoom limit tactile output is generated in accordance with reaching (or, in some embodiments, exceeding) a zoom limit in the still photo capture mode, and the zoom limit tactile output (or an instance of the zoom limit tactile output) is also generated in accordance with reaching (or exceeding) the zoom limit in a second media capture mode, such as a video capture mode or a live photo capture mode, rather than being reduced in the second media capture mode. Such embodiments provide a user with confirmation that an intended result has been achieved for certain predefined operations regardless of operating mode, while causing minimal disruption to media captured in certain operating modes (e.g., noise reduction for recorded audio).

In some embodiments of method 700, the operation in the camera user interface includes changing a filter setting of the camera user interface (e.g., tapping on a filter setting different from a currently-selected filter setting, or scrolling to or through a filter setting in a scrollable sequence of filter settings; see above discussion of FIGS. 5AQ-5AS). For example, a tactile output (e.g., the fourth tactile output, such as a selection change tactile output) is generated in accordance with changing a filter for the camera user interface from a currently-selected filter. In some embodiments, the selection change tactile output is generated regardless of media capture mode. For example, the selection change tactile output is generated in accordance with changing to a different filter in the still photo capture mode, and the selection change tactile output (or an instance of the selection change tactile output) is also generated in accordance with changing to a different filter in a second media capture mode, such as a video capture mode or live photo capture mode, rather than being reduced in the second media capture mode. Such embodiments provide a user with confirmation that an intended result has been achieved for certain predefined operations regardless of operating mode, while causing minimal disruption to media captured in certain operating modes (e.g., live picture and video capture modes).

It should be understood that the particular order in which the operations in FIGS. 7A-7C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7C. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:
1. A method, comprising:
at an electronic device with a display, a touch-sensitive surface, and one or more tactile output generators:
displaying, on the display, a user interface that includes a respective user interface element, wherein the respective user interface element is associated with a respective operation;
detecting, on the touch-sensitive surface, a user input directed to the respective user interface element, including detecting a contact at a location that corresponds to the respective user interface element and detecting a first portion of the user input followed by a second portion of the user input;
in response to detecting the user input:
displaying a transformation of the respective user interface element, wherein a degree of the transformation is determined based on a characteristic of the contact; and
in accordance with a determination that the first portion of the user input satisfies feed-forward criteria, wherein the feed-forward criteria include a requirement that the contact remain on the touch-sensitive surface for at least a predefined amount of time in order for the feed-forward criteria to be met:
generating first feedback, including generating a first tactile output without performing the respective operation;
in accordance with a determination that the user input meets cancellation criteria after meeting the feed-forward criteria and before meeting activation criteria, wherein the activation criteria include a requirement that the contact be lifted off the touch-sensitive surface, and the cancellation criteria include a requirement that the contact move more than a threshold distance from the respective user interface element:
reversing the transformation of the respective user interface element in response to the user input meeting the cancellation criteria after meeting the feed-forward criteria and before meeting the activation criteria;
forgoing performing the respective operation; and
forgoing generating a second tactile output; and
in accordance with a determination that the first portion of the user input satisfies feed-forward criteria and that the second portion of the user input satisfies the activation criteria, in response to the second portion of the user input:
generating second feedback, including generating the second tactile output; and
performing, at the electronic device, the respective operation associated with the respective user interface element, including activating a function associated with the respective user interface element, wherein the respective operation is distinct from generating the first feedback and generating the second feedback, and the function remains activated after the contact is lifted off the touch-sensitive surface; and
in accordance with a determination that the characteristic of the contact does not satisfy the feed-forward criteria during the user input:
forgoing generating the first tactile output and the second tactile output; and
forgoing performing the respective operation associated with the respective user interface element.

2. The method of claim 1, wherein displaying the transformation of the respective user interface element includes displaying a first transformation of the respective user interface element as an intensity of the user input increases, and reversing the first transformation as the intensity of the user input decreases.

3. The method of claim 1, wherein the feed-forward criteria further include a requirement that the contact remain at the location that corresponds to the respective user interface element during the first portion of the user input in order for the feed-forward criteria to be met.

4. The method of claim 1, wherein the activation criteria further include a requirement that the contact remain on the touch-sensitive surface for at least a predefined threshold amount of time in order for the activation criteria to be met.

5. The method of claim 1, wherein the degree of the transformation of the respective user interface element increases as an intensity of the user input increases and decreases as the intensity of the user input decreases.

6. The method of claim 1, wherein the first tactile output includes a sequence of tactile output components that change as an intensity of the contact increases.

7. The method of claim 1, wherein displaying the transformation of the respective user interface element starts when the characteristic of the contact satisfies a second threshold that is below a feed-forward threshold.

8. The method of claim 1, wherein the user interface that includes the respective user interface element is displayed in accordance with a determination that the electronic device is in a locked state.

9. The method of claim 1, wherein the user interface includes a second respective user interface element associated with a second respective operation, and the method includes:
detecting, on the touch-sensitive surface, a second user input directed to the second respective user interface element, including detecting a second contact at a location that corresponds to the second respective user interface element and detecting a first portion of the second user input followed by a second portion of the second user input;
in response to detecting the second user input:
displaying a transformation of the second respective user interface element, wherein a degree of the transformation of the second respective user interface element is determined based on a characteristic of the second contact; and
in accordance with a determination that the first portion of the second user input satisfies the feed-forward criteria:
generating a third tactile output without performing the second respective operation; and
in accordance with a determination that the second portion of the second user input satisfies the activation criteria:
generating a fourth tactile output; and
performing, at the electronic device, the second respective operation associated with the second respective user interface element; and
in accordance with a determination that the characteristic of the second contact does not satisfy the feed-forward criteria during the second user input:
forgoing generating the third tactile output and the fourth tactile output; and
forgoing performing the second respective operation associated with the second respective user interface element.

10. The method of claim 1, wherein the user interface is a first user interface, and the method includes:
detecting a second user input corresponding to a request to display a second user interface distinct from the first user interface; and
in response to detecting the second user input, displaying the second user interface.

11. The method of claim 1, wherein the electronic device includes a flashlight, and the user interface is a wake screen user interface that includes the respective user interface element, wherein the respective user interface element is a flashlight icon for controlling a state of the flashlight.

12. The method of claim 1, wherein the electronic device includes a camera, and the user interface is a wake screen user interface that includes the respective user interface element, wherein the respective user interface element is a camera application icon for displaying a camera application user interface for the camera.

13. The method of claim 1, wherein:
in accordance with a determination that the respective operation associated with the respective user interface element includes activating the function associated with the respective user interface element, the first tactile output and/or the second tactile output are instances of a first reference tactile output that is different from a second reference tactile output that is used in accordance with a determination that the respective operation includes deactivating the function associated with the respective user interface element.

14. The method of claim 1, wherein the user interface includes a third respective user interface element, and the method includes:
detecting a third user input directed to the third respective user interface element; and
in response to detecting the third user input, displaying a transformation of the third respective user interface element, including increasing a size of the third respective user interface element.

15. The method of claim 1, wherein the user interface includes a plurality of user interface elements, other than the respective user interface element, in a scrolling list, and the method includes:

detecting a fourth user input corresponding to a request to scroll the plurality of user interface elements in the scrolling list; and in response to detecting the fourth user input:

scrolling the plurality of user interface elements in the scrolling list; and ceasing to display the respective user interface element associated with the respective operation.

16. The method of claim 1, wherein the user interface includes a plurality of user interface elements, other than the respective user interface element, in a scrolling list, and the method includes:

detecting a fifth user input corresponding to a request to scroll the plurality of user interface elements in the scrolling list; and in response to detecting the fifth user input:

scrolling the plurality of user interface elements in the scrolling list; and in accordance with a determination that the scrolling list has reached a predefined threshold position, generating a third tactile output.

17. The method of claim 1, wherein the user interface includes a background, and the method includes:

detecting a sixth user input directed to the background of the user interface, including detecting a contact at a location that corresponds to the background and detecting change in intensity of the contact; and in response to detecting the sixth user input:

in accordance with a determination that a characteristic intensity of the contact of the sixth user input reached a background-animation intensity threshold, displaying an animation of the background; and in accordance with a determination that a characteristic intensity of the contact of the sixth user input did not reach the background-animation intensity threshold, forgoing displaying the animation of the background.

18. The method of claim 17, wherein displaying the animation of the background includes progressing through the animation of the background as the characteristic intensity of the contact of the sixth user input increases, and reversing the progression through the animation as the characteristic intensity of the contact of the sixth user input decreases.

19. The method of claim 1, wherein the user interface is a lock screen interface that is displayed while the electronic device operates in a locked mode, the lock screen interface displays a plurality of user interface elements, including a list of notifications, a flashlight icon, and a camera application icon, and the respective user interface element comprises the flashlight icon or the camera application icon.

20. An electronic device, comprising:

a display;

a touch-sensitive surface;

one or more tactile output generators;

one or more processors; and memory storing one or more programs, wherein the one or more programs are configured to be executed by the one or more processors, the one or more programs including instructions for:

displaying, on the display, a user interface that includes a respective user interface element, wherein the respective user interface element is associated with a respective operation;

detecting, on the touch-sensitive surface, a user input directed to the respective user interface element, including detecting a contact at a location that corresponds to the respective user interface element and detecting a first portion of the user input followed by a second portion of the user input;

in response to detecting the user input:

displaying a transformation of the respective user interface element, wherein a degree of the transformation is determined based on a characteristic of the contact; and in accordance with a determination that the first portion of the user input satisfies feed-forward criteria, wherein the feed-forward criteria include a requirement that the contact remain on the touch-sensitive surface for at least a predefined amount of time in order for the feed-forward criteria to be met:

generating first feedback, including generating a first tactile output without performing the respective operation;

in accordance with a determination that the user input meets cancellation criteria after meeting the feed-forward criteria and before meeting activation criteria, wherein the activation criteria include a requirement that the contact be lifted off the touch-sensitive surface, and the cancellation criteria include a requirement that the contact move more than a threshold distance from the respective user interface element:

reversing the transformation of the respective user interface element in response to the user input meeting the cancellation criteria after meeting the feed-forward criteria and before meeting the activation criteria;

forgoing performing the respective operation; and forgoing generating a second tactile output; and in accordance with a determination that the first portion of the user input satisfies feed-forward criteria and that the second portion of the user input satisfies the activation criteria in response to the second portion of the user input:

generating second feedback, including generating the second tactile output; and performing, at the electronic device, the respective operation associated with the respective user interface element, including activating a function associated with the respective user interface element, wherein the respective operation is distinct from generating the first feedback and generating the second feedback, and the function remains activated after the contact is lifted off the touch-sensitive surface; and in accordance with a determination that the characteristic of the contact does not satisfy the feed-forward criteria during the user input:

forgoing generating the first tactile output and the second tactile output; and forgoing performing the respective operation associated with the respective user interface element.

21. The electronic device of claim 20, wherein the feed-forward criteria further include a requirement that the contact remain at the location that corresponds to the respective user interface element during the first portion of the user input in order for the feed-forward criteria to be met.

22. The electronic device of claim 20, wherein the activation criteria further include a requirement that the contact remain on the touch-sensitive surface for at least a predefined threshold amount of time in order for the activation criteria to be met.

23. The electronic device of claim 20, wherein displaying the transformation of the respective user interface element starts when the characteristic of the contact satisfies a second threshold that is below a feed-forward threshold.

24. The electronic device of claim 20, wherein the user interface that includes the respective user interface element is displayed in accordance with a determination that the electronic device is in a locked state.

25. The electronic device of claim 20, wherein the user interface includes a second respective user interface element associated with a second respective operation, and the one or more programs include instructions for:
   detecting, on the touch-sensitive surface, a second user input directed to the second respective user interface element, including detecting a second contact at a location that corresponds to the second respective user interface element and detecting a first portion of the second user input followed by a second portion of the second user input;
   in response to detecting the second user input:
      displaying a transformation of the second respective user interface element, wherein a degree of the transformation of the second respective user interface element is determined based on a characteristic of the second contact; and
      in accordance with a determination that the first portion of the second user input satisfies the feed-forward criteria:
         generating a third tactile output without performing the second respective operation; and
         in accordance with a determination that the second portion of the second user input satisfies the activation criteria:
            generating a fourth tactile output; and
            performing, at the electronic device, the second respective operation associated with the second respective user interface element; and
      in accordance with a determination that the characteristic of the second contact does not satisfy the feed-forward criteria during the second user input:
         forgoing generating the third tactile output and the fourth tactile output; and
         forgoing performing the second respective operation associated with the second respective user interface element.

26. The electronic device of claim 20, wherein the electronic device includes a flashlight, and the user interface is a wake screen user interface that includes the respective user interface element, wherein the respective user interface element is a flashlight icon for controlling a state of the flashlight.

27. The electronic device of claim 20, wherein the electronic device includes a camera, and the user interface is a wake screen user interface that includes the respective user interface element, wherein the respective user interface element is a camera application icon for displaying a camera application user interface for the camera.

28. The electronic device of claim 20, wherein:
   in accordance with a determination that the respective operation associated with the respective user interface element includes activating the function associated with the respective user interface element, the first tactile output and/or the second tactile output are instances of a first reference tactile output that is different from a second reference tactile output that is used in accordance with a determination that the respective operation includes deactivating the function associated with the respective user interface element.

29. The electronic device of claim 20, wherein the user interface includes a third respective user interface element, and the one or more programs include instructions for:
   detecting a third user input directed to the third respective user interface element; and
   in response to detecting the third user input, displaying a transformation of the third respective user interface element, including increasing a size of the third respective user interface element.

30. The electronic device of claim 20, wherein the user interface includes a plurality of user interface elements, other than the respective user interface element, in a scrolling list, and the one or more programs include instructions for:
   detecting a fourth user input corresponding to a request to scroll the plurality of user interface elements in the scrolling list; and
   in response to detecting the fourth user input:
      scrolling the plurality of user interface elements in the scrolling list; and
      ceasing to display the respective user interface element associated with the respective operation.

31. The electronic device of claim 20, wherein the user interface includes a plurality of user interface elements, other than the respective user interface element, in a scrolling list, and the one or more programs include instructions for:
   detecting a fifth user input corresponding to a request to scroll the plurality of user interface elements in the scrolling list; and
   in response to detecting the fifth user input:
      scrolling the plurality of user interface elements in the scrolling list; and
      in accordance with a determination that the scrolling list has reached a predefined threshold position, generating a third tactile output.

32. The electronic device of claim 20, wherein the user interface includes a background, and the one or more programs include instructions for:
   detecting a sixth user input directed to the background of the user interface, including detecting a contact at a location that corresponds to the background and detecting change in intensity of the contact; and
   in response to detecting the sixth user input:
      in accordance with a determination that a characteristic intensity of the contact of the sixth user input reached a background-animation intensity threshold, displaying an animation of the background; and
      in accordance with a determination that a characteristic intensity of the contact of the sixth user input did not reach the background-animation intensity threshold, forgoing displaying the animation of the background.

33. The electronic device of claim 20, wherein the user interface is a lock screen interface that is displayed while the electronic device operates in a locked mode, the lock screen interface displays a plurality of user interface elements, including a list of notifications, a flashlight icon, and a camera application icon, and the respective user interface element comprises the flashlight icon or the camera application icon.

34. A non-transitory computer readable storage medium storing one or more programs, the one or more programs comprising instructions, which, when executed by an electronic device with a display, a touch-sensitive surface, and one or more tactile output generators, cause the electronic device to:
display, on the display, a user interface that includes a respective user interface element, wherein the respective user interface element is associated with a respective operation;
detect, on the touch-sensitive surface, a user input directed to the respective user interface element, including detecting a contact at a location that corresponds to the respective user interface element and detecting a first portion of the user input followed by a second portion of the user input;
in response to detecting the user input:
display a transformation of the respective user interface element, wherein a degree of the transformation is determined based on a characteristic of the contact; and
in accordance with a determination that the first portion of the user input satisfies feed-forward criteria, wherein the feed-forward criteria include a requirement that the contact remain on the touch-sensitive surface for at least a predefined amount of time in order for the feed-forward criteria to be met:
generate first feedback, including generating a first tactile output without performing the respective operation;
in accordance with a determination that the user input meets cancellation criteria after meeting the feed-forward criteria and before meeting activation criteria, wherein the activation criteria include a requirement that the contact be lifted off the touch-sensitive surface, and the cancellation criteria include a requirement that the contact move more than a threshold distance from the respective user interface element:
reverse the transformation of the respective user interface element in response to the user input meeting the cancellation criteria after meeting the feed-forward criteria and before meeting the activation criteria;
forgo performing the respective operation; and
forgo generating a second tactile output; and
in accordance with a determination that the first portion of the user input satisfies feed-forward criteria and that the second portion of the user input satisfies the activation criteria, in response to the second portion of the user input:
generate second feedback, including generating the second tactile output; and
perform, at the electronic device, the respective operation associated with the respective user interface element, including activating a function associated with the respective user interface element, wherein the respective operation is distinct from generating the first feedback and generating the second feedback, and the function remains activated after the contact is lifted off the touch-sensitive surface; and in accordance with a determination that the characteristic of the contact does not satisfy the feed-forward criteria during the user input:
forgo generating the first tactile output and the second tactile output; and
forgo performing the respective operation associated with the respective user interface element.

35. The non-transitory computer readable storage medium of claim 34, wherein the feed-forward criteria further include a requirement that the contact remain at the location that corresponds to the respective user interface element during the first portion of the user input in order for the feed-forward criteria to be met.

36. The non-transitory computer readable storage medium of claim 34, wherein the activation criteria further include a requirement that the contact remain on the touch-sensitive surface for at least a predefined threshold amount of time in order for the activation criteria to be met.

37. The non-transitory computer readable storage medium of claim 34, wherein displaying the transformation of the respective user interface element starts when the characteristic of the contact satisfies a second threshold that is below a feed-forward threshold.

38. The non-transitory computer readable storage medium of claim 34, wherein the user interface that includes the respective user interface element is displayed in accordance with a determination that the electronic device is in a locked state.

39. The non-transitory computer readable storage medium of claim 34, wherein the user interface includes a second respective user interface element associated with a second respective operation, and the one or more programs include instructions that, when executed by the electronic device, cause the electronic device to:
detect, on the touch-sensitive surface, a second user input directed to the second respective user interface element, including detecting a second contact at a location that corresponds to the second respective user interface element and detecting a first portion of the second user input followed by a second portion of the second user input;
in response to detecting the second user input:
display a transformation of the second respective user interface element, wherein a degree of the transformation of the second respective user interface element is determined based on a characteristic of the second contact; and
in accordance with a determination that the first portion of the second user input satisfies the feed-forward criteria:
generate a third tactile output without performing the second respective operation; and
in accordance with a determination that the second portion of the second user input satisfies the activation criteria:
generate a fourth tactile output; and
perform, at the electronic device, the second respective operation associated with the second respective user interface element; and
in accordance with a determination that the characteristic of the second contact does not satisfy the feed-forward criteria during the second user input:
forgo generating the third tactile output and the fourth tactile output; and
forgo performing the second respective operation associated with the second respective user interface element.

40. The non-transitory computer readable storage medium of claim 34, wherein the electronic device includes a flashlight, and the user interface is a wake screen user interface that includes the respective user interface element, wherein the respective user interface element is a flashlight icon for controlling a state of the flashlight.

41. The non-transitory computer readable storage medium of claim 34, wherein the electronic device includes a camera, and the user interface is a wake screen user interface that includes the respective user interface element, wherein the respective user interface element is a camera application icon for displaying a camera application user interface for the camera.

42. The non-transitory computer readable storage medium of claim 34, wherein:
  in accordance with a determination that the respective operation associated with the respective user interface element includes activating the function associated with the respective user interface element, the first tactile output and/or the second tactile output are instances of a first reference tactile output that is different from a second reference tactile output that is used in accordance with a determination that the respective operation includes deactivating the function associated with the respective user interface element.

43. The non-transitory computer readable storage medium of claim 34, wherein the user interface includes a third respective user interface element, and the one or more programs include instructions that, when executed by the electronic device, cause the electronic device to:
  detect a third user input directed to the third respective user interface element; and
  in response to detecting the third user input, display a transformation of the third respective user interface element, including increasing a size of the third respective user interface element.

44. The non-transitory computer readable storage medium of claim 34, wherein the user interface includes a plurality of user interface elements, other than the respective user interface element, in a scrolling list, and the one or more programs include instructions that, when executed by the electronic device, cause the electronic device to:
  detect a fourth user input corresponding to a request to scroll the plurality of user interface elements in the scrolling list; and
  in response to detecting the fourth user input:
    scroll the plurality of user interface elements in the scrolling list; and
    cease to display the respective user interface element associated with the respective operation.

45. The non-transitory computer readable storage medium of claim 34, wherein the user interface includes a plurality of user interface elements, other than the respective user interface element, in a scrolling list, and the one or more programs include instructions that, when executed by the electronic device, cause the electronic device to:
  detect a fifth user input corresponding to a request to scroll the plurality of user interface elements in the scrolling list; and
  in response to detecting the fifth user input:
    scroll the plurality of user interface elements in the scrolling list; and
    in accordance with a determination that the scrolling list has reached a predefined threshold position, generate a third tactile output.

46. The non-transitory computer readable storage medium of claim 34, wherein the user interface includes a background, and the one or more programs include instructions that, when executed by the electronic device, cause the electronic device to:
  detect a sixth user input directed to the background of the user interface, including detecting a contact at a location that corresponds to the background and detecting change in intensity of the contact; and
  in response to detecting the sixth user input:
    in accordance with a determination that a characteristic intensity of the contact of the sixth user input reached a background-animation intensity threshold, display an animation of the background; and
    in accordance with a determination that a characteristic intensity of the contact of the sixth user input did not reach the background-animation intensity threshold, forgo displaying the animation of the background.

47. The non-transitory computer readable storage medium of claim 34, wherein the user interface is a lock screen interface that is displayed while the electronic device operates in a locked mode, the lock screen interface displays a plurality of user interface elements, including a list of notifications, a flashlight icon, and a camera application icon, and the respective user interface element comprises the flashlight icon or the camera application icon.

* * * * *